(12) United States Patent
Volin

(10) Patent No.: US 10,842,126 B1
(45) Date of Patent: Nov. 24, 2020

(54) TWELVE-DEVICE-IN-ONE INTERCHANGEABLE-CANOPY-PATIO-BALCONY-WINDSCREEN-CHAIR-AWNING-PERCH-TENT-SLED-STAND-BASKET-HAMMOCK-BED PET CRATE, HAVING MULTI-PET-CONTAINING PANEL SYSTEM, MULTI-PET MULTI-ENTRANCE DOOR SYSTEM, INTERCHANGEABLE-CANOPY-PATIO-BALCONY-WINDSCREEN-CHAIR-AWNING-PERCH-TENT-SLED-STAND-BASKET-HAMMOCK-BED SYSTEM, TICK-BLOCKING WATER-DRAINING WIRE-CLAMPING CAP SYSTEM, AND TRAY-LOCKING SHOCK-ABSORBING GUSSET SYSTEM

(71) Applicant: Dee Volin, Gresham, OR (US)

(72) Inventor: Dee Volin, Gresham, OR (US)

(*) Notice: Subject to any disclaimer, the term of this patent is extended or adjusted under 35 U.S.C. 154(b) by 0 days.

(21) Appl. No.: 16/904,566

(22) Filed: Jun. 18, 2020

(51) Int. Cl.
| | |
|---|---|
| *A01K 1/035* | (2006.01) |
| *A01K 1/02* | (2006.01) |
| *A01K 1/01* | (2006.01) |
| *A01K 1/00* | (2006.01) |
| *A01K 13/00* | (2006.01) |
| *A47C 13/00* | (2006.01) |

(52) U.S. Cl.
CPC ............ *A01K 1/035* (2013.01); *A01K 1/0035* (2013.01); *A01K 1/0107* (2013.01); *A01K 1/029* (2013.01); *A01K 1/0245* (2013.01); *A01K 1/0353* (2013.01); *A01K 13/001* (2013.01); *A47C 13/00* (2013.01)

(58) Field of Classification Search
CPC .. A01K 1/0035; A01K 1/0107; A01K 1/0245; A01K 1/029; A01K 1/035; A01K 1/0353; A01K 13/001; A47C 13/00

USPC ........................................................ 119/472
See application file for complete search history.

(56) References Cited

U.S. PATENT DOCUMENTS

| | | |
|---|---|---|
| 700,817 A | 5/1902 | Porterfield |
| 844,955 A | 2/1907 | Morgan |
| 1,550,829 A | 8/1925 | Mcbride |
| 2,706,836 A | 4/1955 | Sharswood |
| 3,234,908 A | 2/1966 | Doskocil |
| 3,896,766 A | 7/1975 | Martin |
| 4,006,713 A | 2/1977 | Hawley, III |
| 4,319,545 A | 3/1982 | Yamamoto |
| 4,763,606 A * | 8/1988 | Ondrasik, II .......... A01K 31/08 119/474 |
| 5,000,121 A | 3/1991 | Daily |

(Continued)

*Primary Examiner* — Christopher D Hutchens
*Assistant Examiner* — Brady W Frazier

(57) ABSTRACT

A twelve-device-in-one pet crate comprises: top, bottom, left, right, front, and rear panels attached to one another, having a tray-and-bed-locking clamp, multi-pet crate divider and urine-waste-water-storing tray inserted inside the panels to create multiple pet-containing compartments, first and second multi-pet doors hinged to the pet crate, interchangeable side frame supports and end frame supports, an interchangeable bed attached to the side and end frame supports, waterproof toilets sewn to the bed, and interchangeable T-shaped straight frame connectors, T-shaped corner frame connectors, adjustable leg supports and an adjustable center-brace leg support attached to the bed to configure the bed into twelve different devices to function as a canopy, a patio, a balcony, a windscreen, a chair, an awning, a perch, a pet tent, a sled, a stand, a basket, a pet hammock, a multi-position pet bed, a grooming platform, a drying platform, and a privacy screen.

20 Claims, 79 Drawing Sheets

(56) References Cited

U.S. PATENT DOCUMENTS

| | | | |
|---|---|---|---|
| 5,092,270 A | 3/1992 | Simons | |
| 5,335,617 A | 8/1994 | Hoffman | |
| 5,626,098 A | 5/1997 | Askins | |
| 6,408,797 B2 | 6/2002 | Pivonka | |
| 6,681,720 B1 | 1/2004 | Skurdalsvold | |
| 6,732,676 B1 | 5/2004 | Smith | |
| 6,883,463 B2 | 4/2005 | Link | |
| 7,021,242 B2 | 4/2006 | Axelrod | |
| 7,293,530 B2 | 11/2007 | Italiano | |
| 7,380,521 B2 | 6/2008 | Morton | |
| 7,455,032 B2 | 11/2008 | Axelrod | |
| 7,487,744 B1 * | 2/2009 | Goldberg | A01K 1/031 |
| | | | 119/453 |
| D171,740 S | 8/2010 | Jakubowski | |
| 7,802,540 B2 | 9/2010 | Jakubowski | |
| 7,926,447 B2 | 4/2011 | Flannery | |
| 8,267,048 B2 | 9/2012 | Flannery | |
| 8,336,500 B1 | 12/2012 | Britt | |
| 8,342,126 B2 | 1/2013 | Simon | |
| 8,544,417 B2 * | 10/2013 | Sangl | A01K 1/0245 |
| | | | 119/455 |
| 8,671,887 B2 | 3/2014 | Baker | |
| 8,733,292 B2 | 4/2014 | Nichols | |
| 8,925,492 B2 | 1/2015 | Cantwell | |
| D723,225 S | 2/2015 | Lee | |
| D739,656 S | 9/2015 | Gallo | |
| 9,119,375 B2 | 9/2015 | Flannery | |
| 9,253,962 B2 | 2/2016 | Gallo | |
| 9,339,006 B1 | 5/2016 | Eby | |
| 9,370,165 B2 | 6/2016 | de Humberto Bien | |
| D770,692 S | 11/2016 | Cantwell | |
| 9,485,957 B2 | 11/2016 | Kellogg | |
| 9,596,826 B2 | 3/2017 | Lu | |
| 9,706,750 B2 | 7/2017 | Vaccari | |
| 9,708,853 B2 | 7/2017 | Cantwell | |
| 2001/0054394 A1 * | 12/2001 | Marchioro | A01K 31/06 |
| | | | 119/452 |
| 2006/0032453 A1 * | 2/2006 | Bonner | A01K 1/03 |
| | | | 119/452 |
| 2006/0219181 A1 | 10/2006 | Pape | |
| 2008/0276872 A1 * | 11/2008 | Chern | A47C 19/122 |
| | | | 119/28.5 |
| 2010/0282180 A1 * | 11/2010 | Moffett-Chaney | E06B 7/32 |
| | | | 119/484 |
| 2012/0006498 A1 * | 1/2012 | Potter | E04F 11/1842 |
| | | | 160/127 |
| 2012/0210947 A1 | 8/2012 | DiPaolo | |
| 2013/0036986 A1 * | 2/2013 | Callari | A01K 1/035 |
| | | | 119/702 |
| 2015/0047572 A1 * | 2/2015 | Rybka | A01K 1/034 |
| | | | 119/479 |
| 2015/0305296 A1 | 10/2015 | Lu | |
| 2016/0192616 A1 * | 7/2016 | Kitchen | A01K 1/0064 |
| | | | 119/485 |
| 2017/0020103 A1 | 1/2017 | Nichols | |
| 2017/0268294 A1 | 9/2017 | Cantwell | |

* cited by examiner

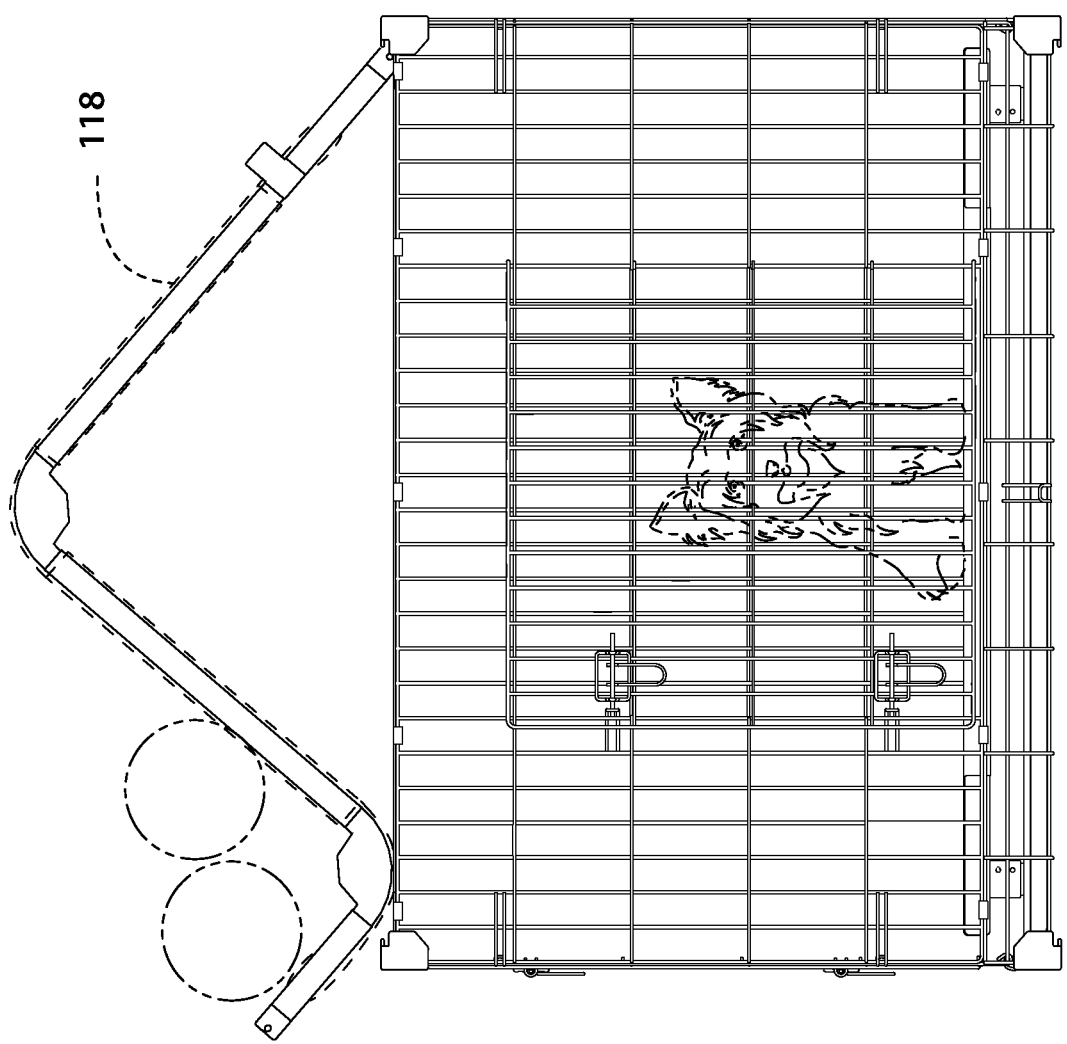

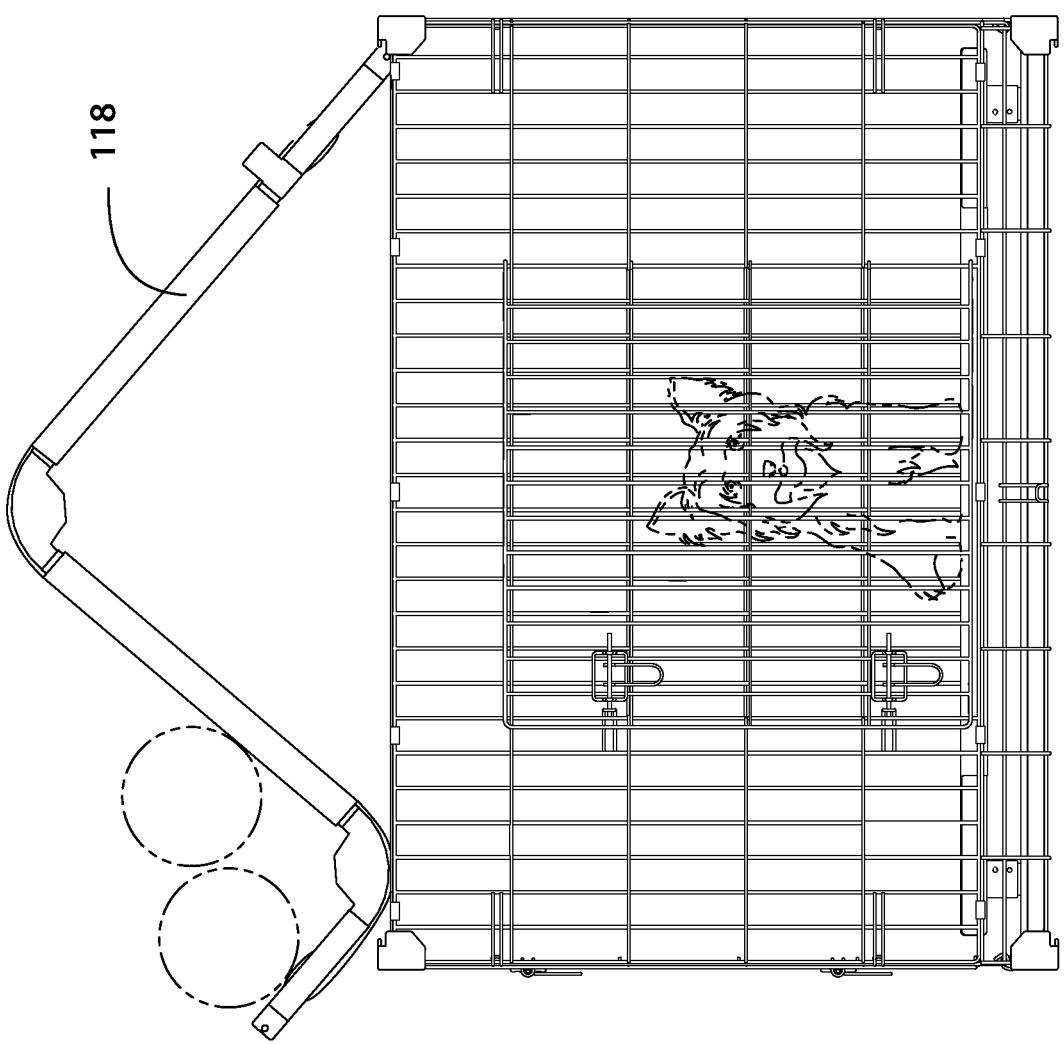

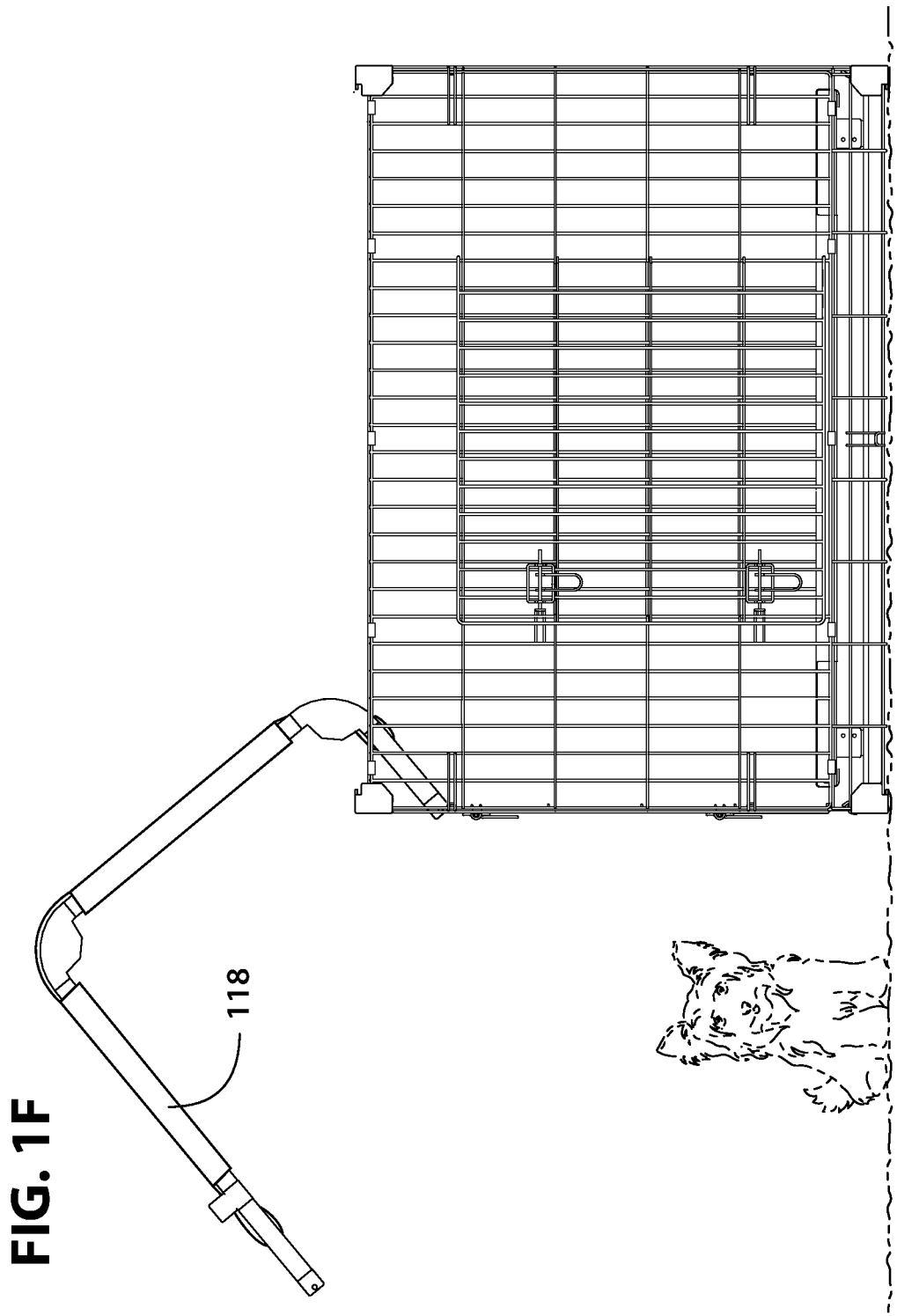

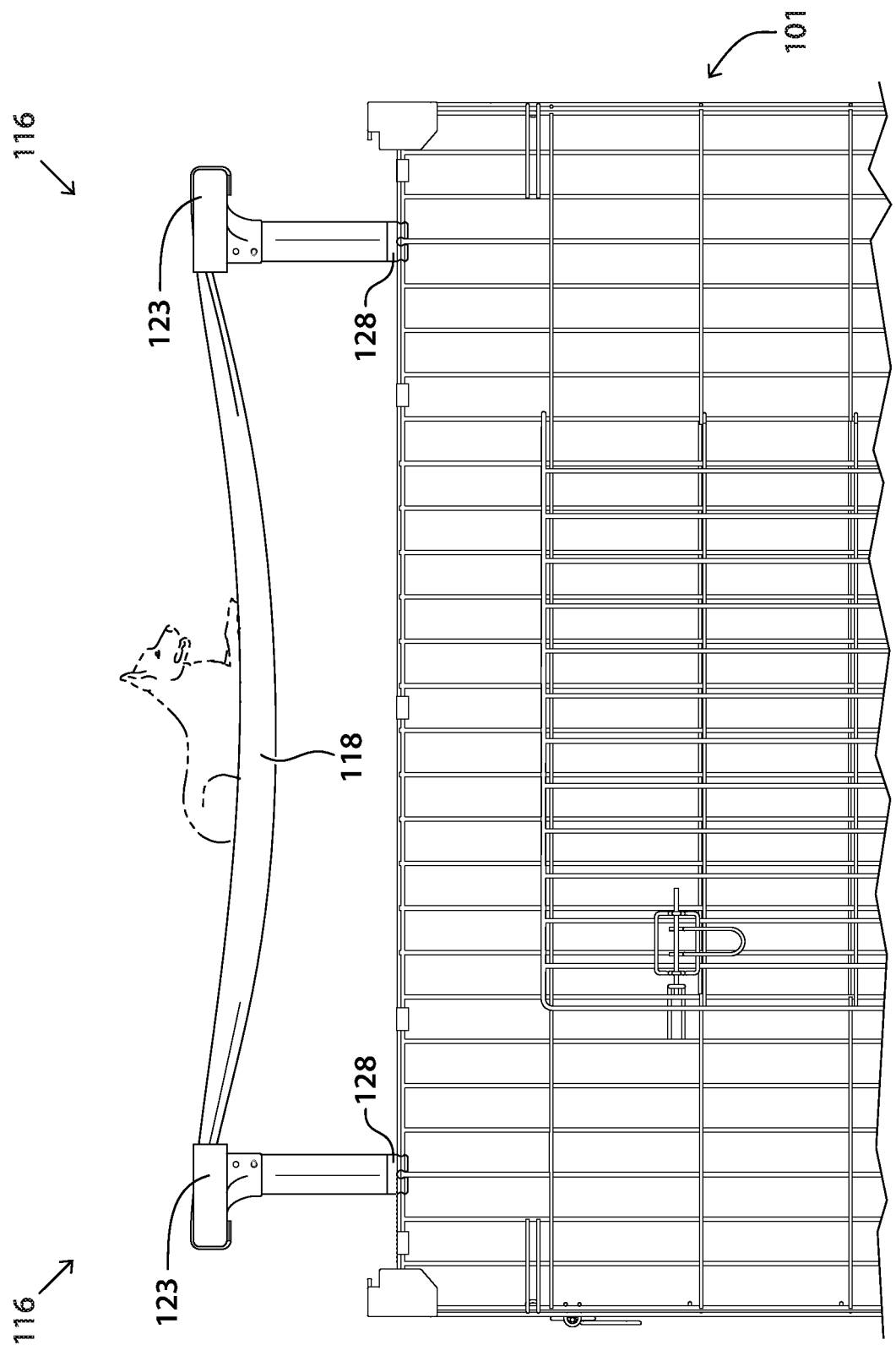

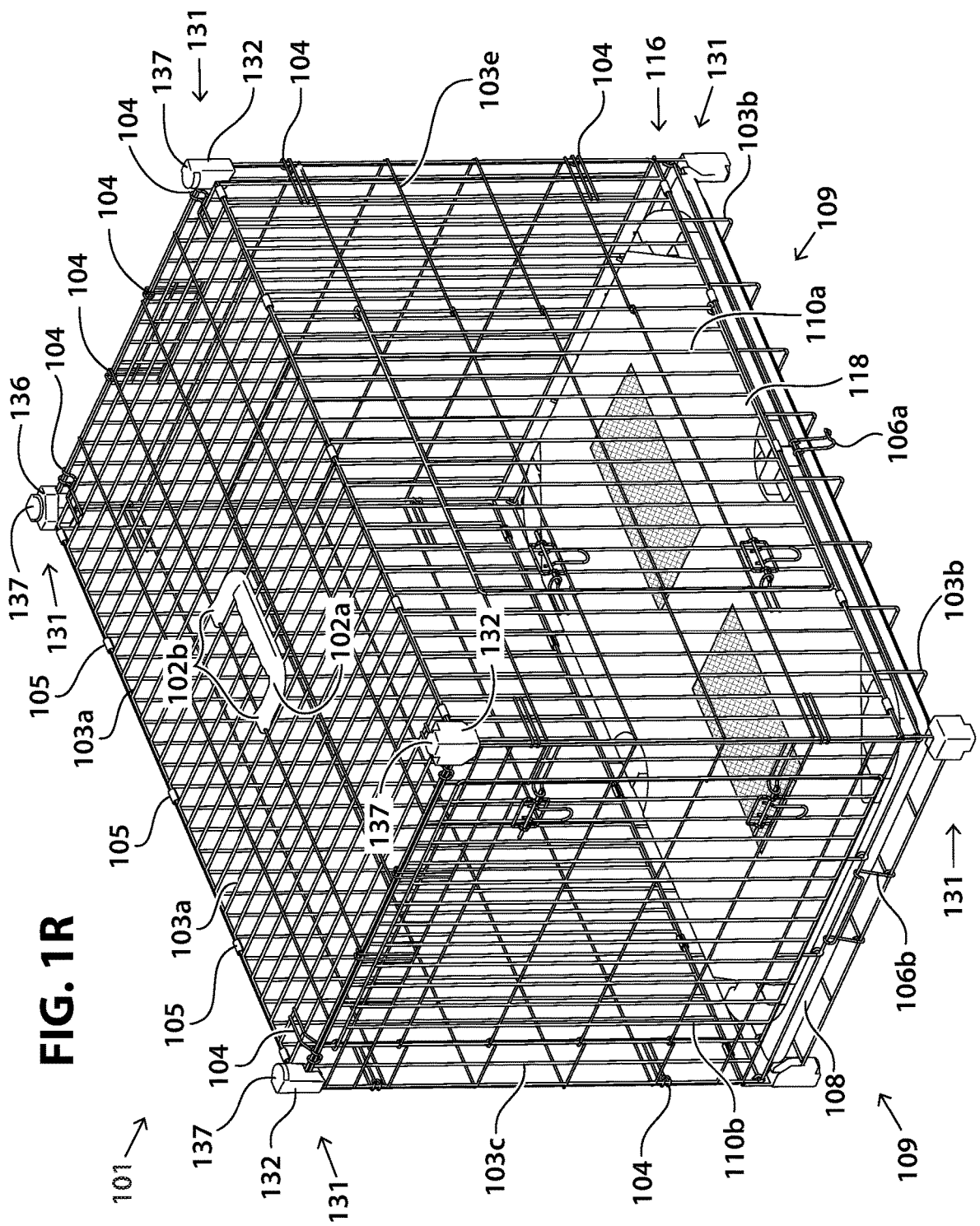

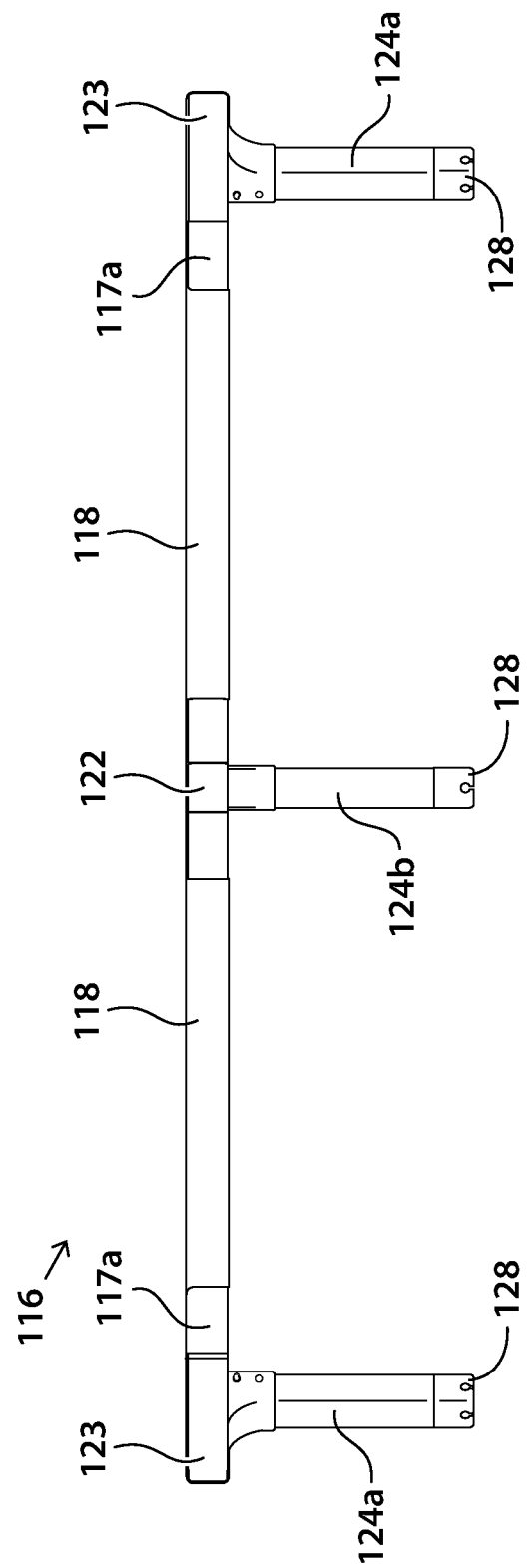

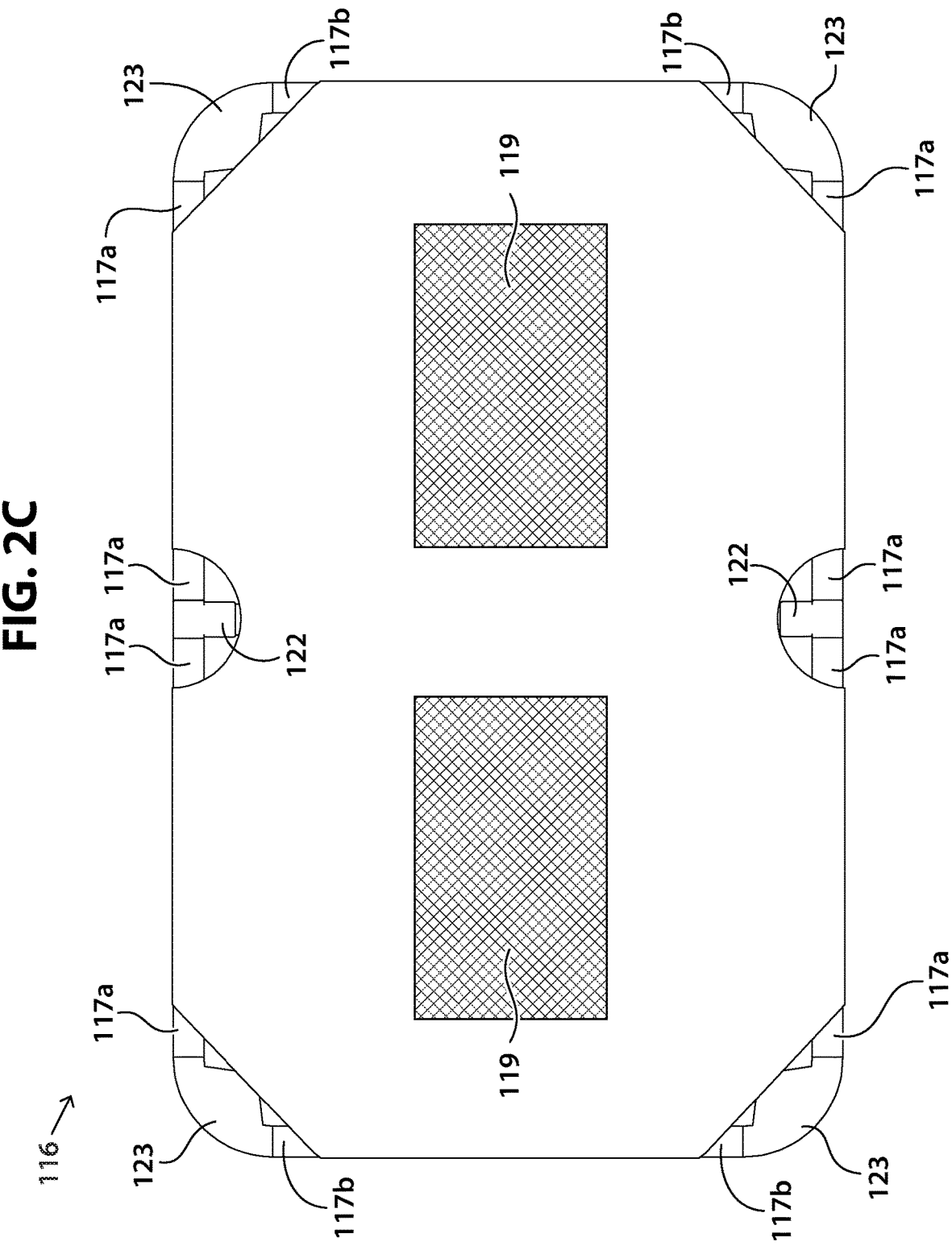

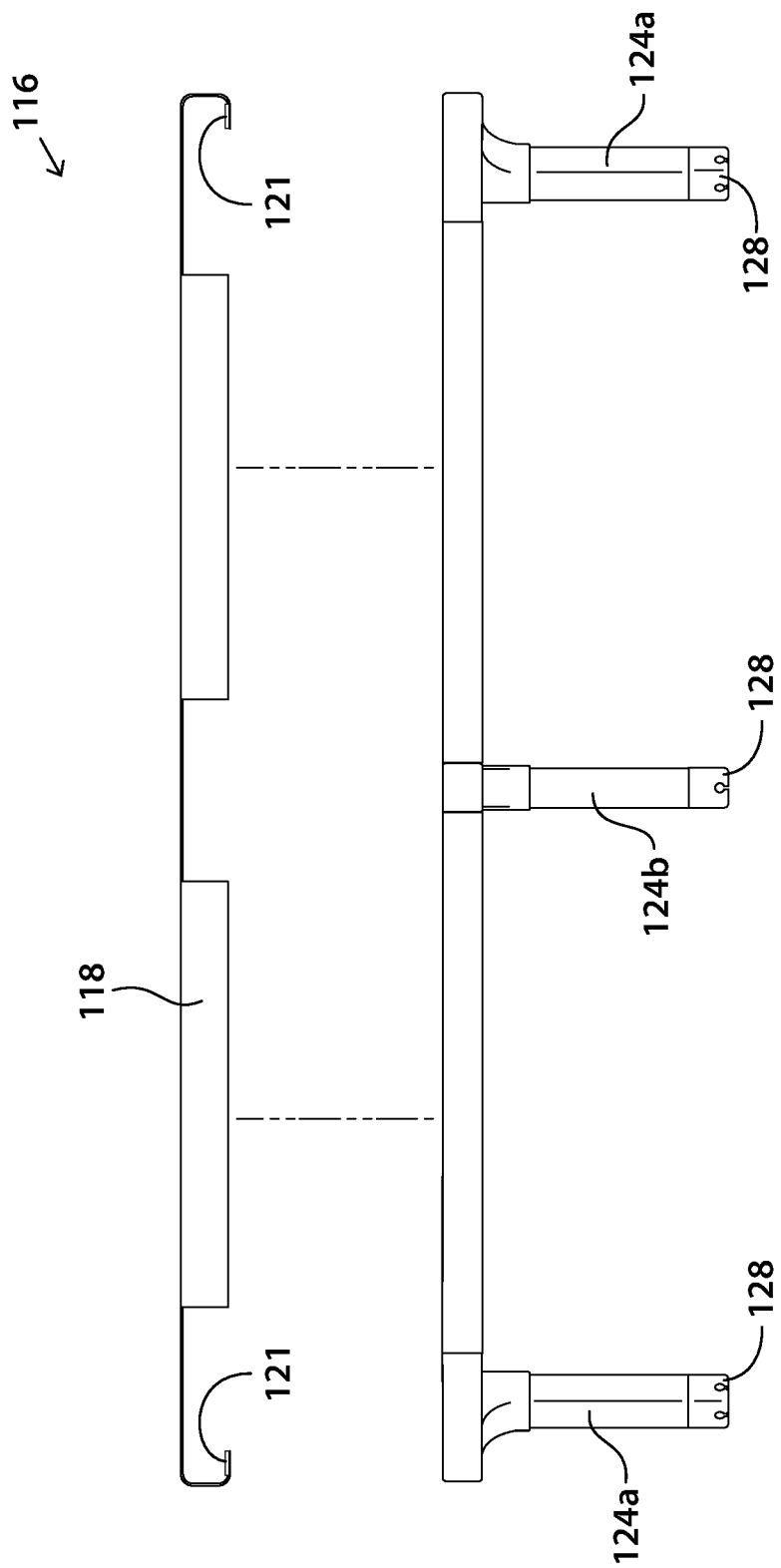

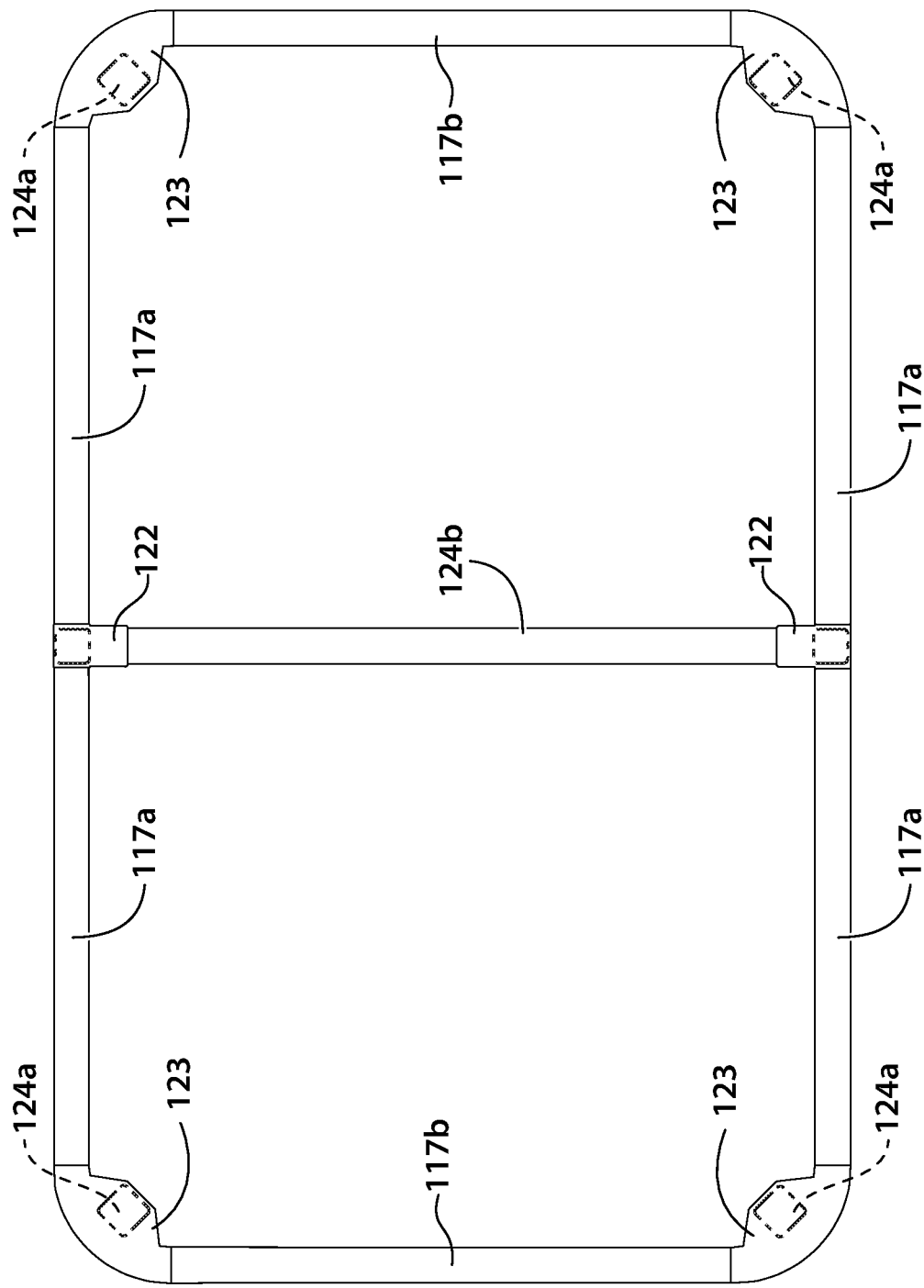

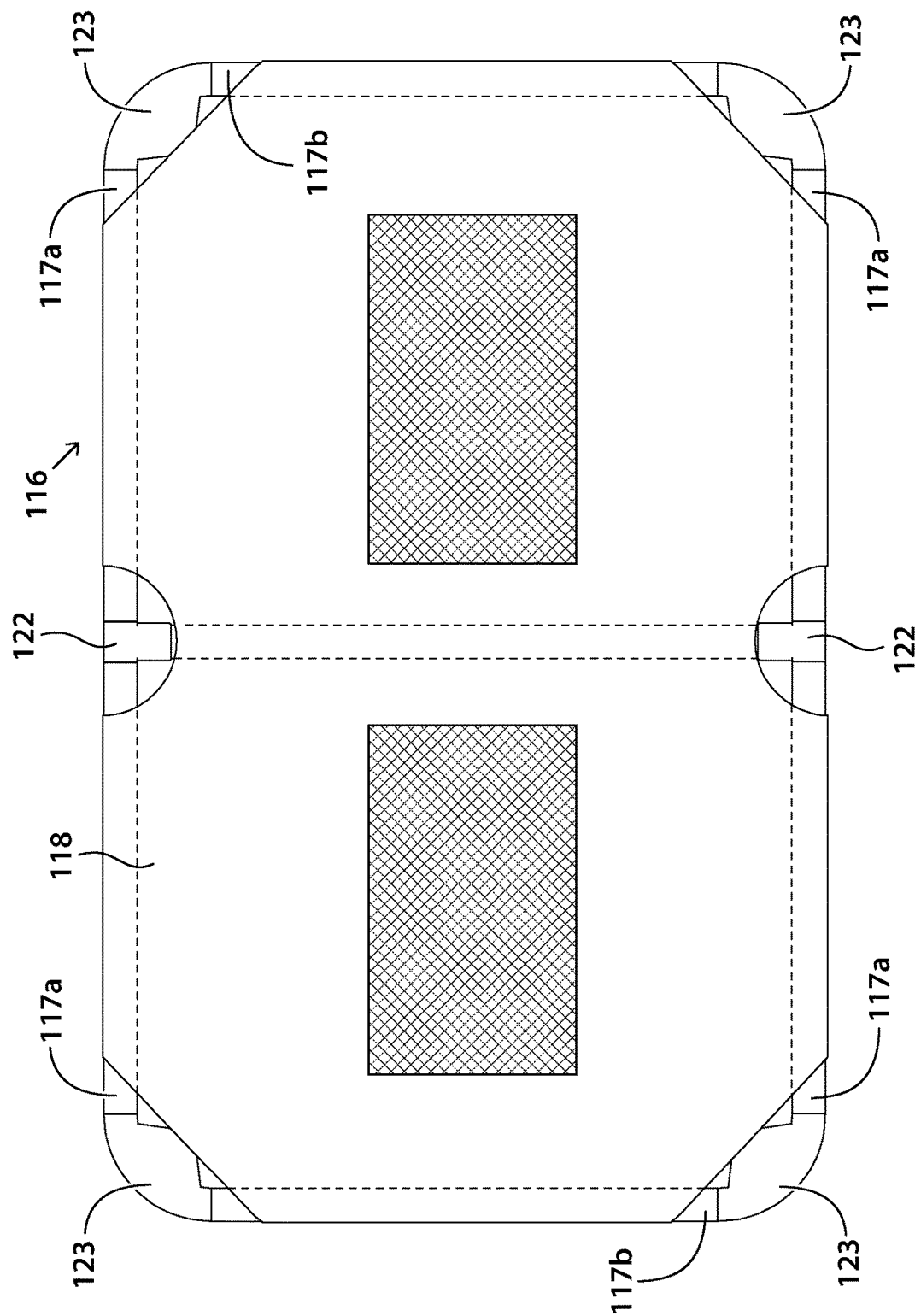

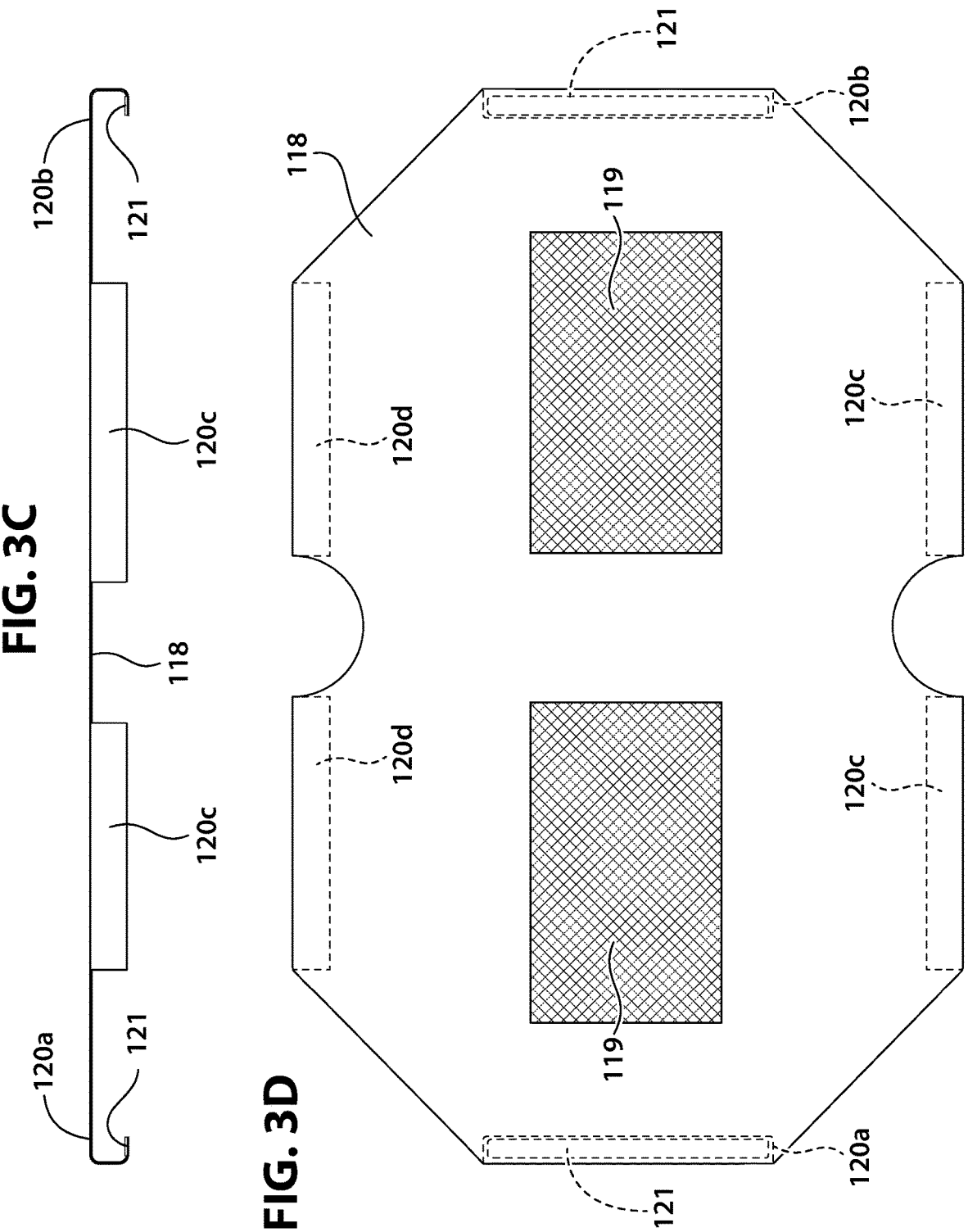

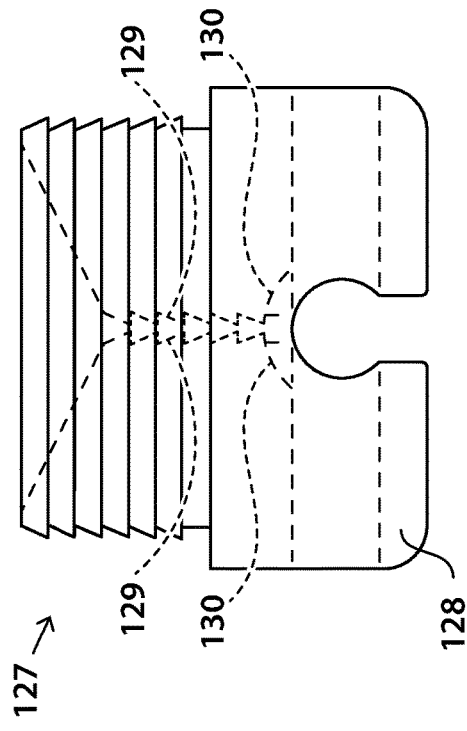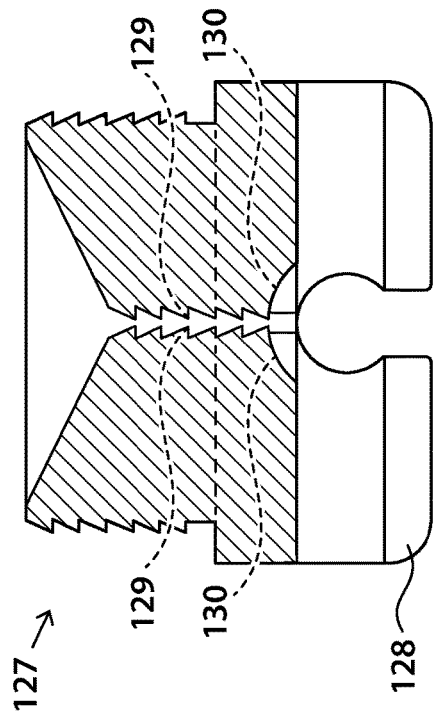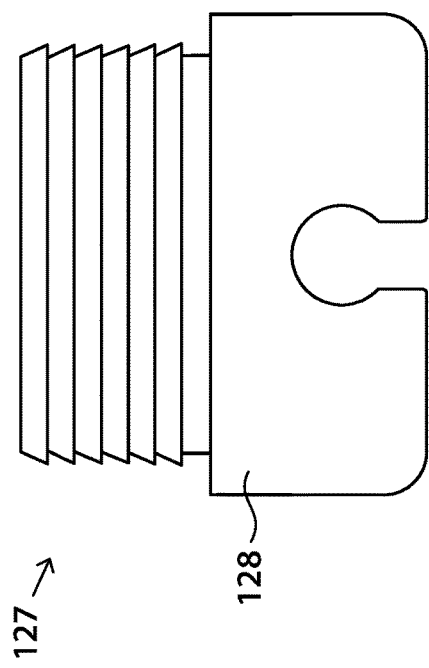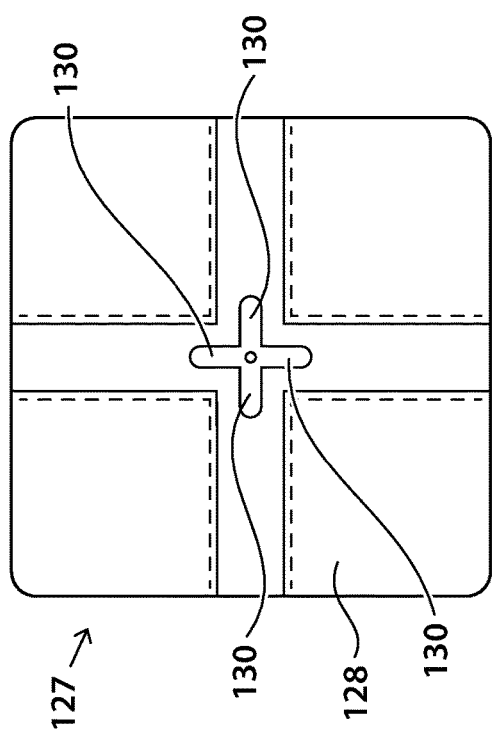

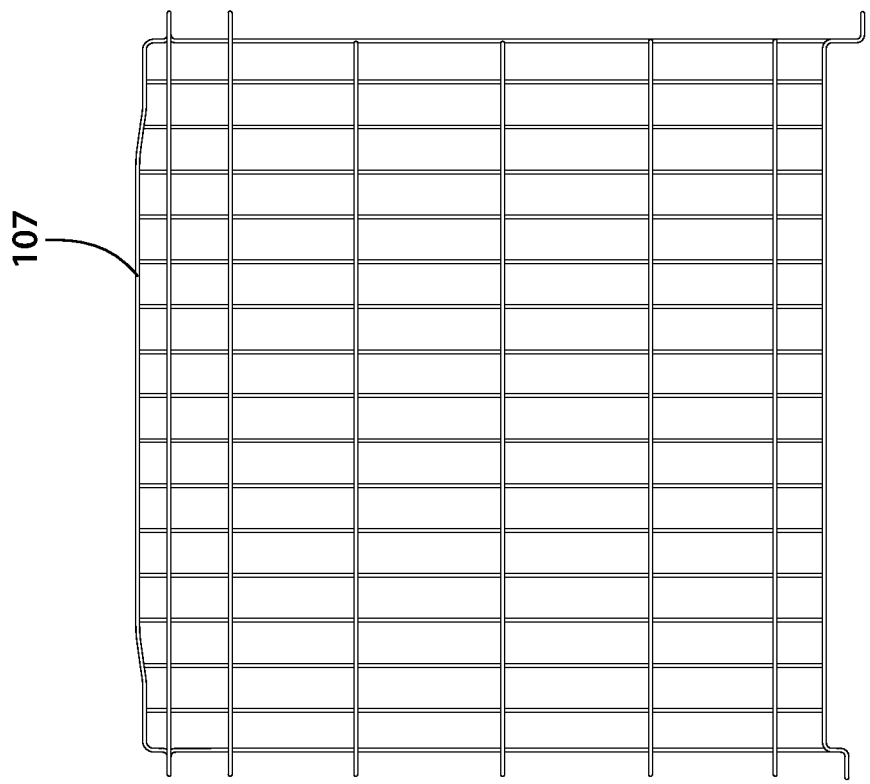
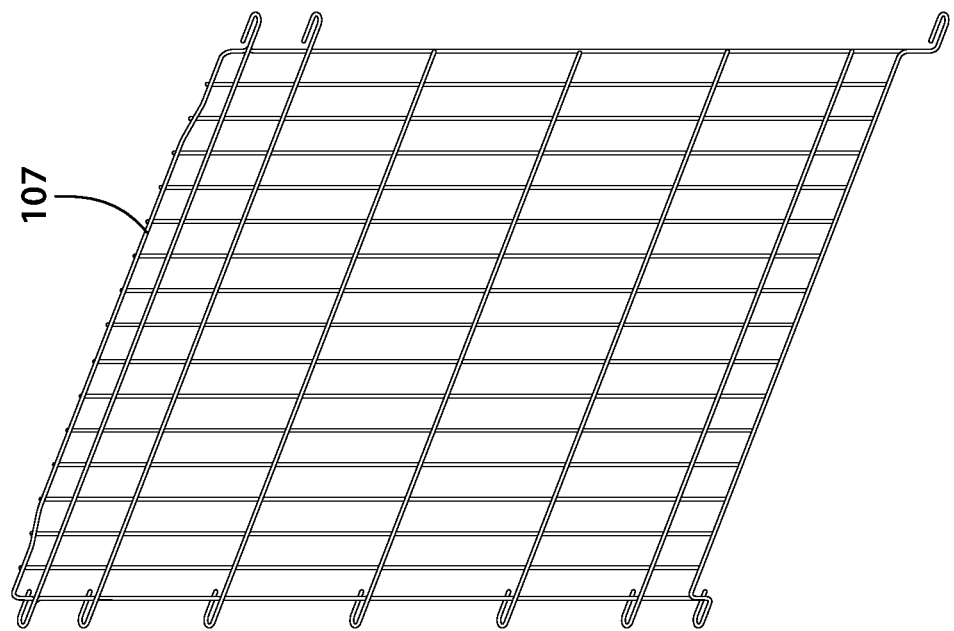

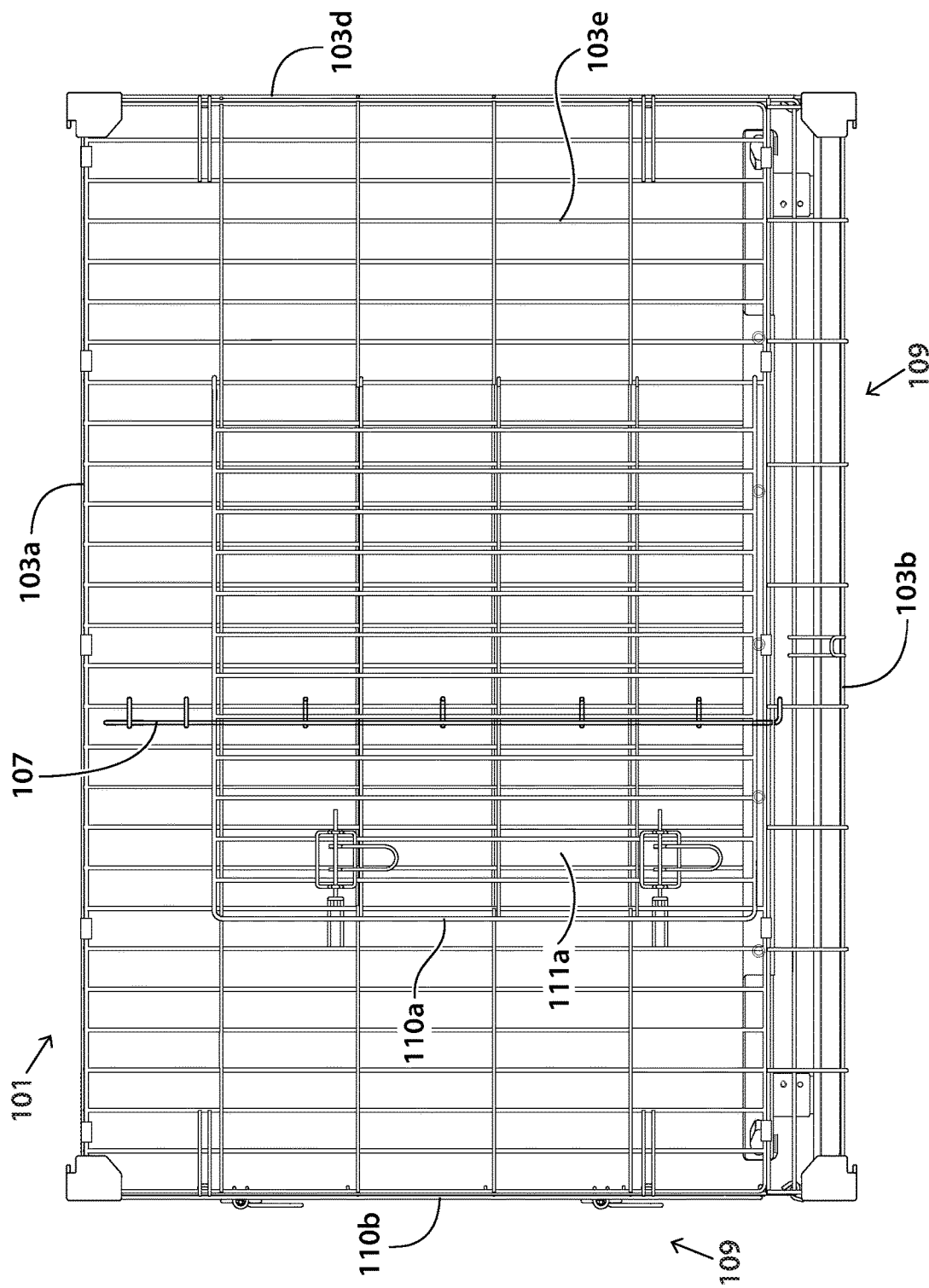

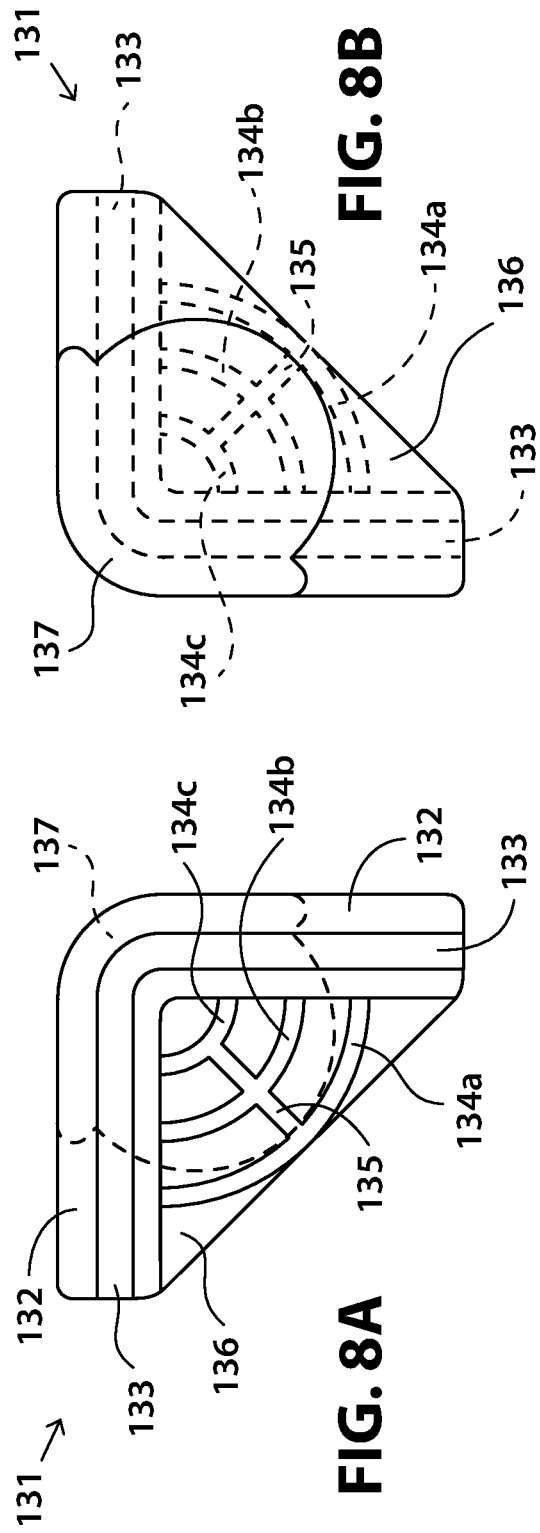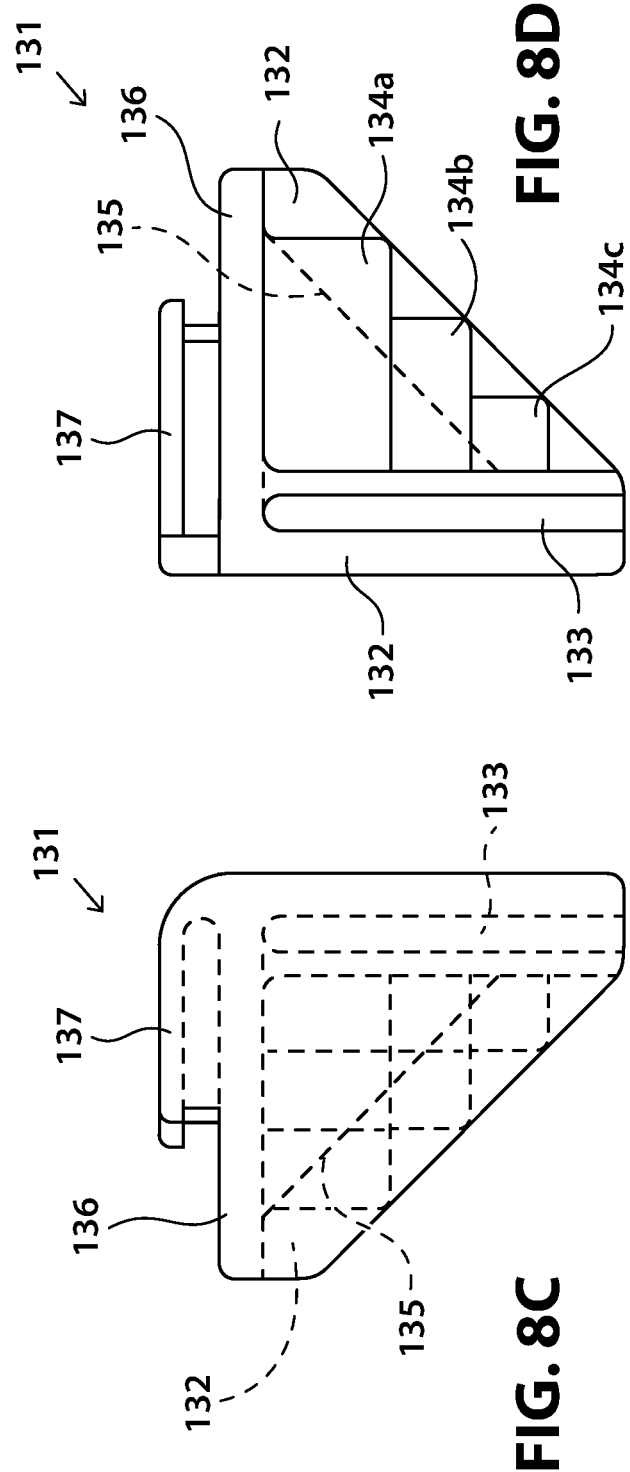

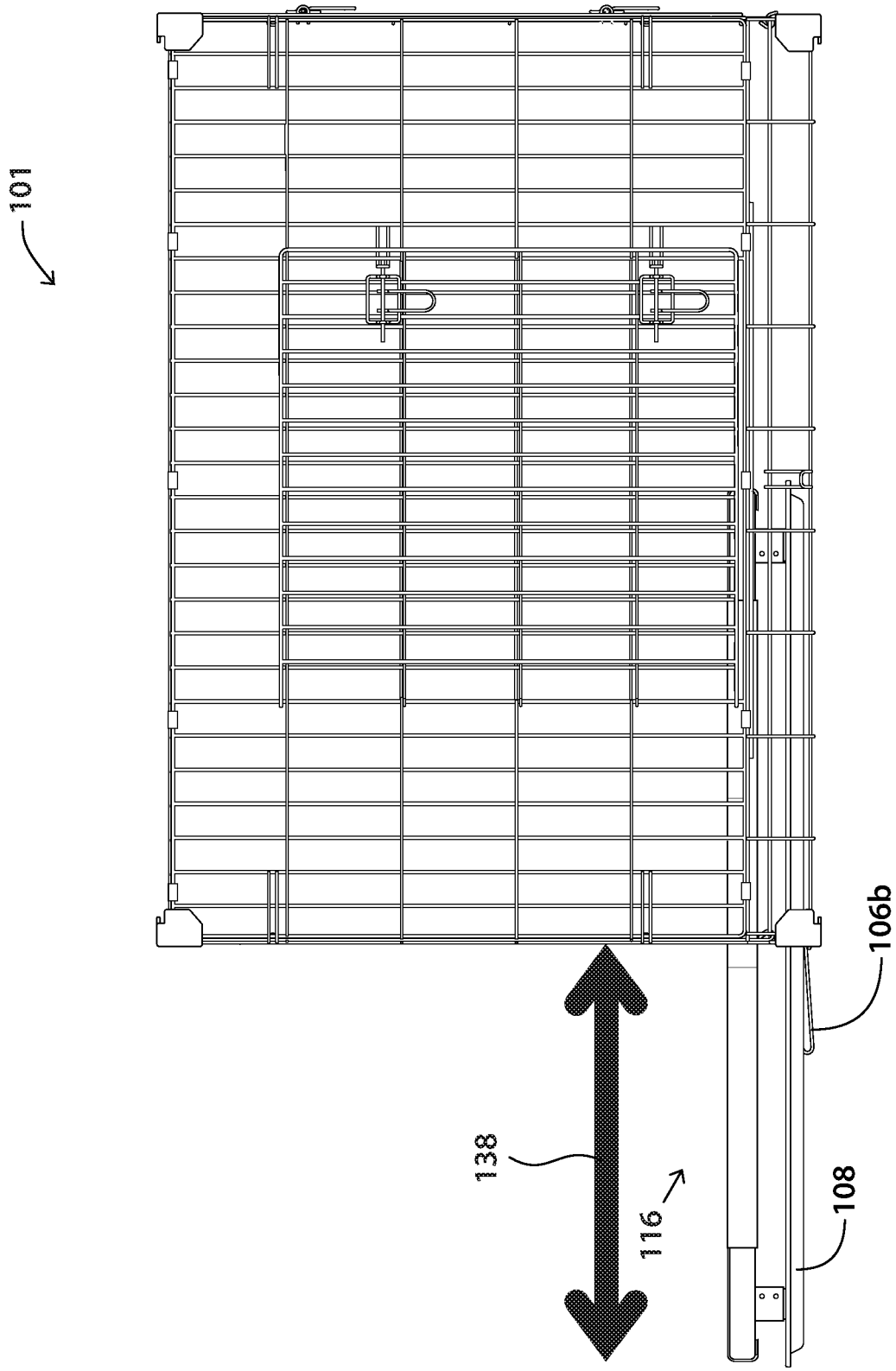

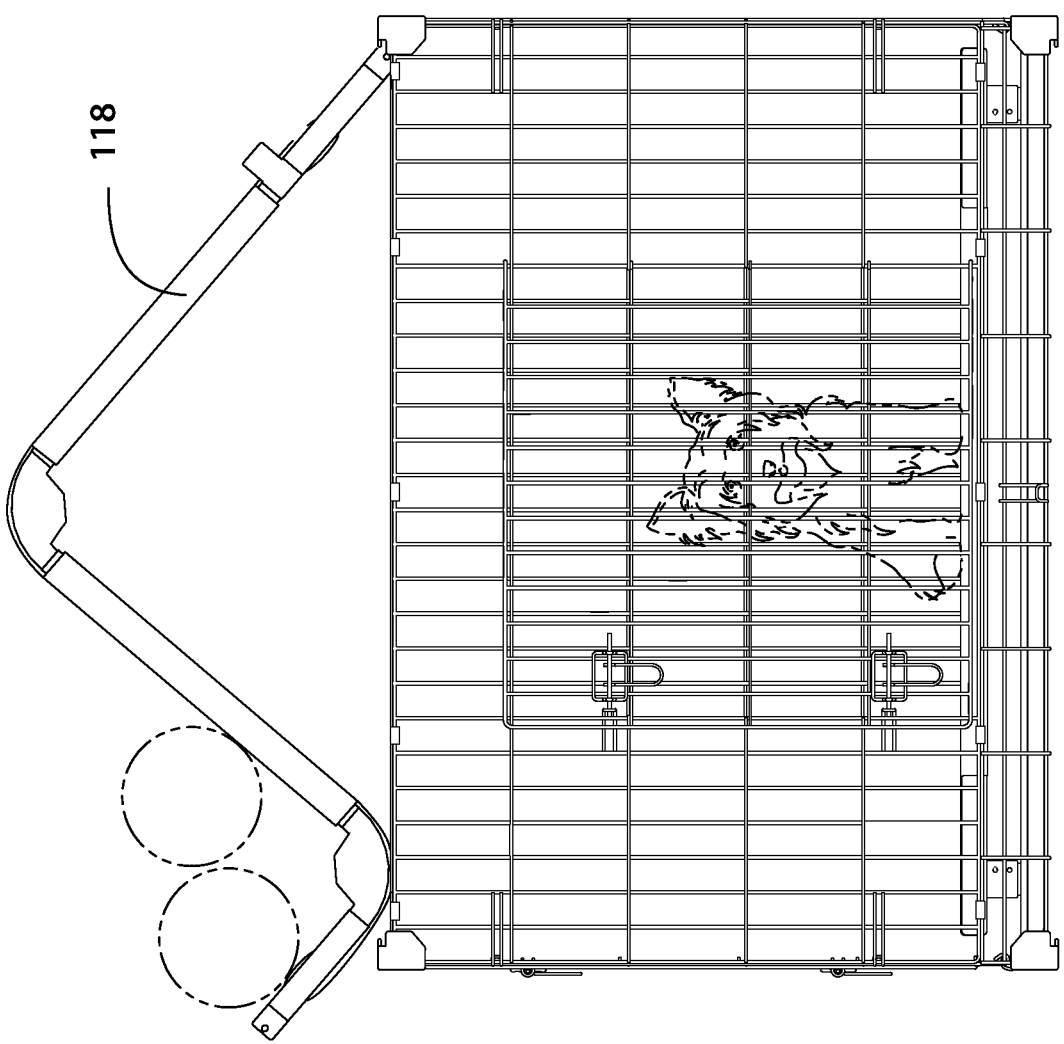

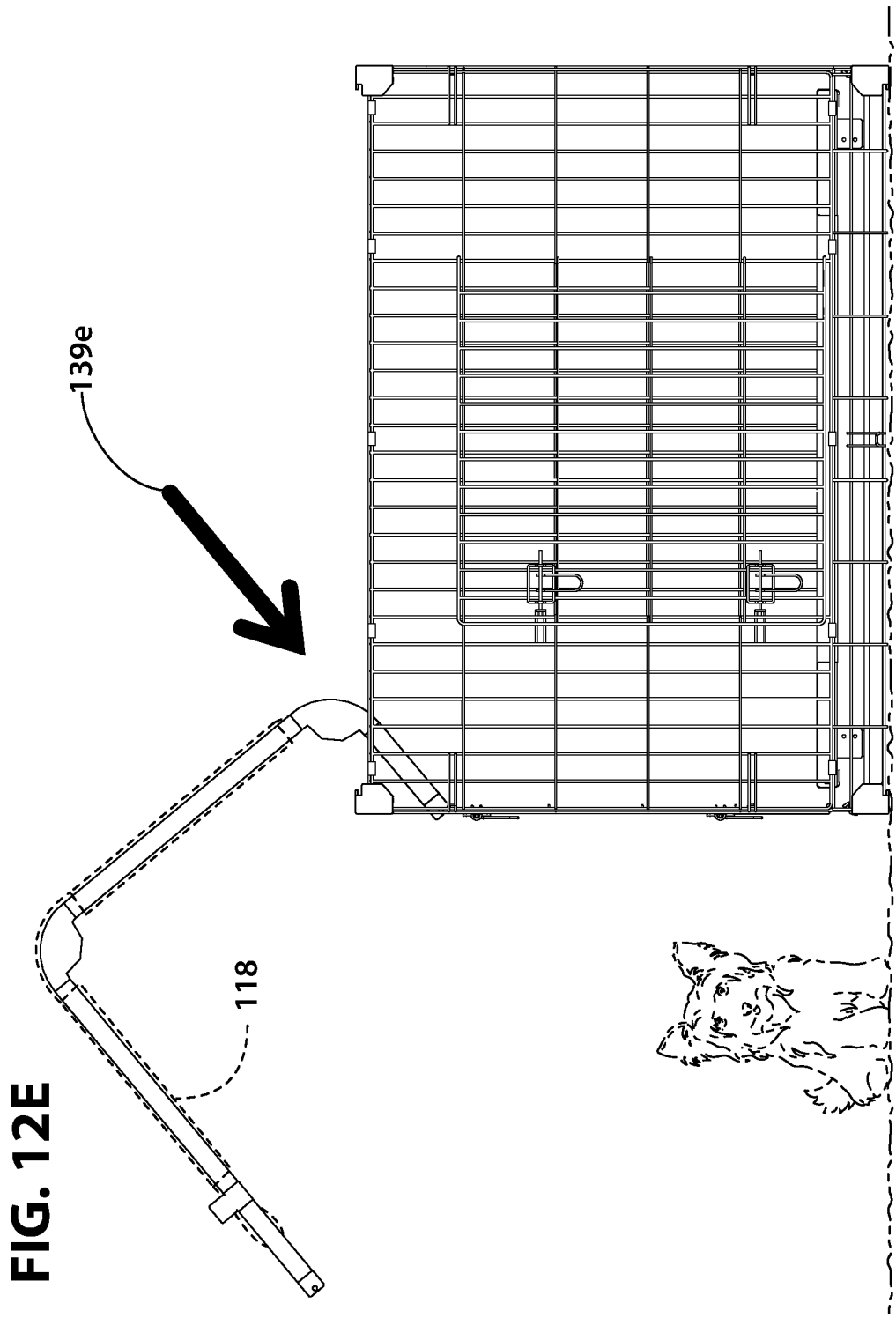

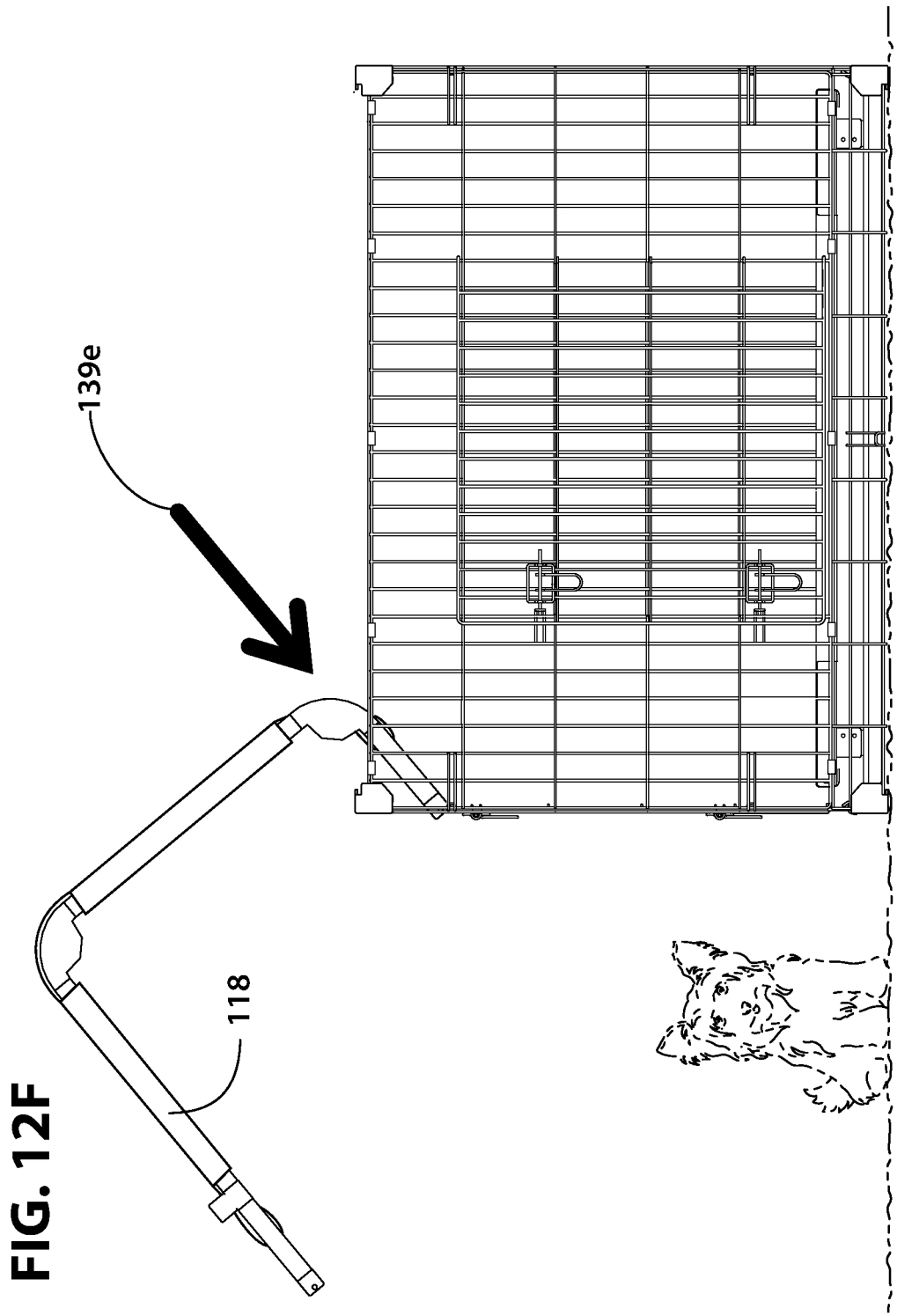

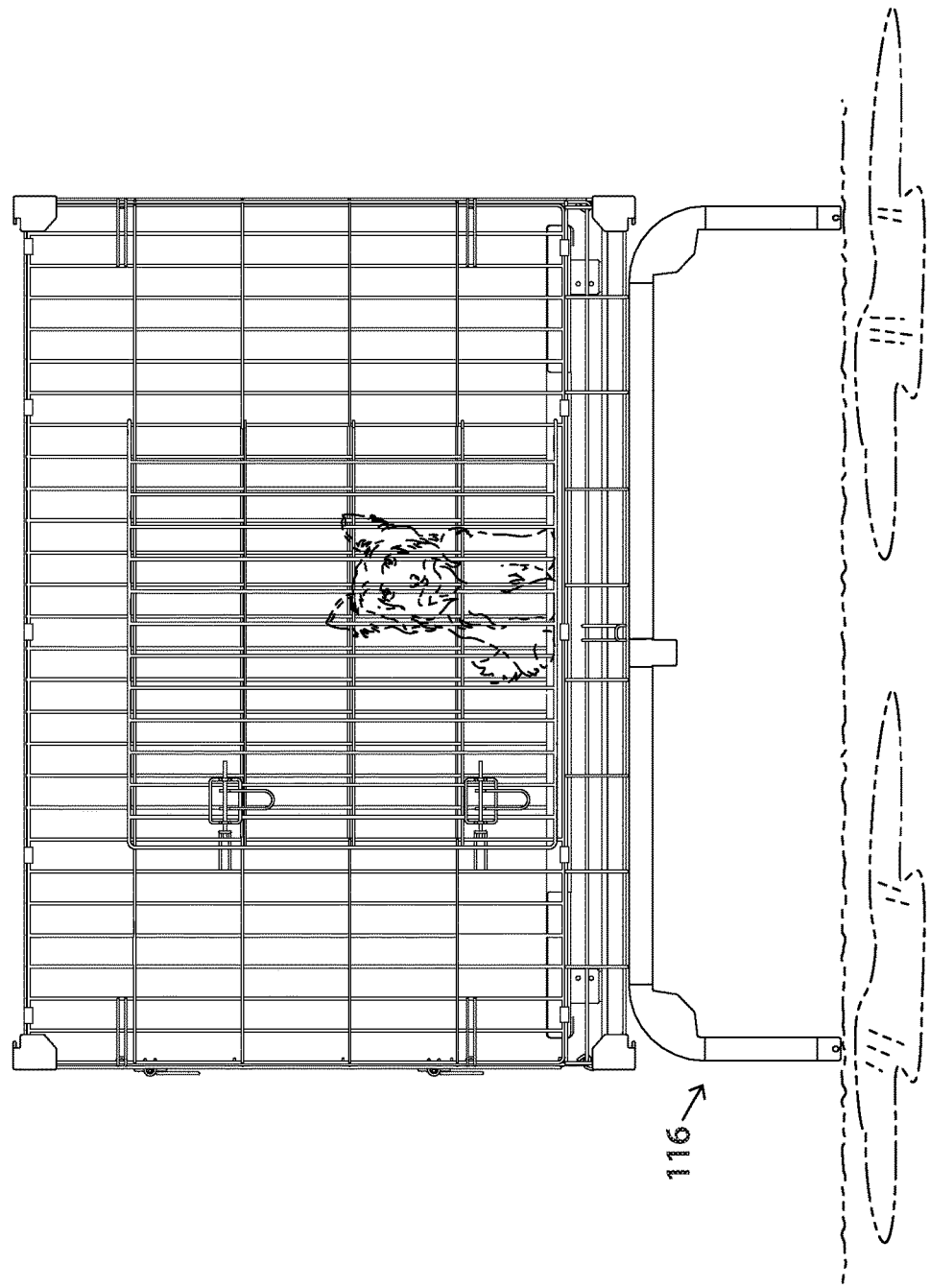

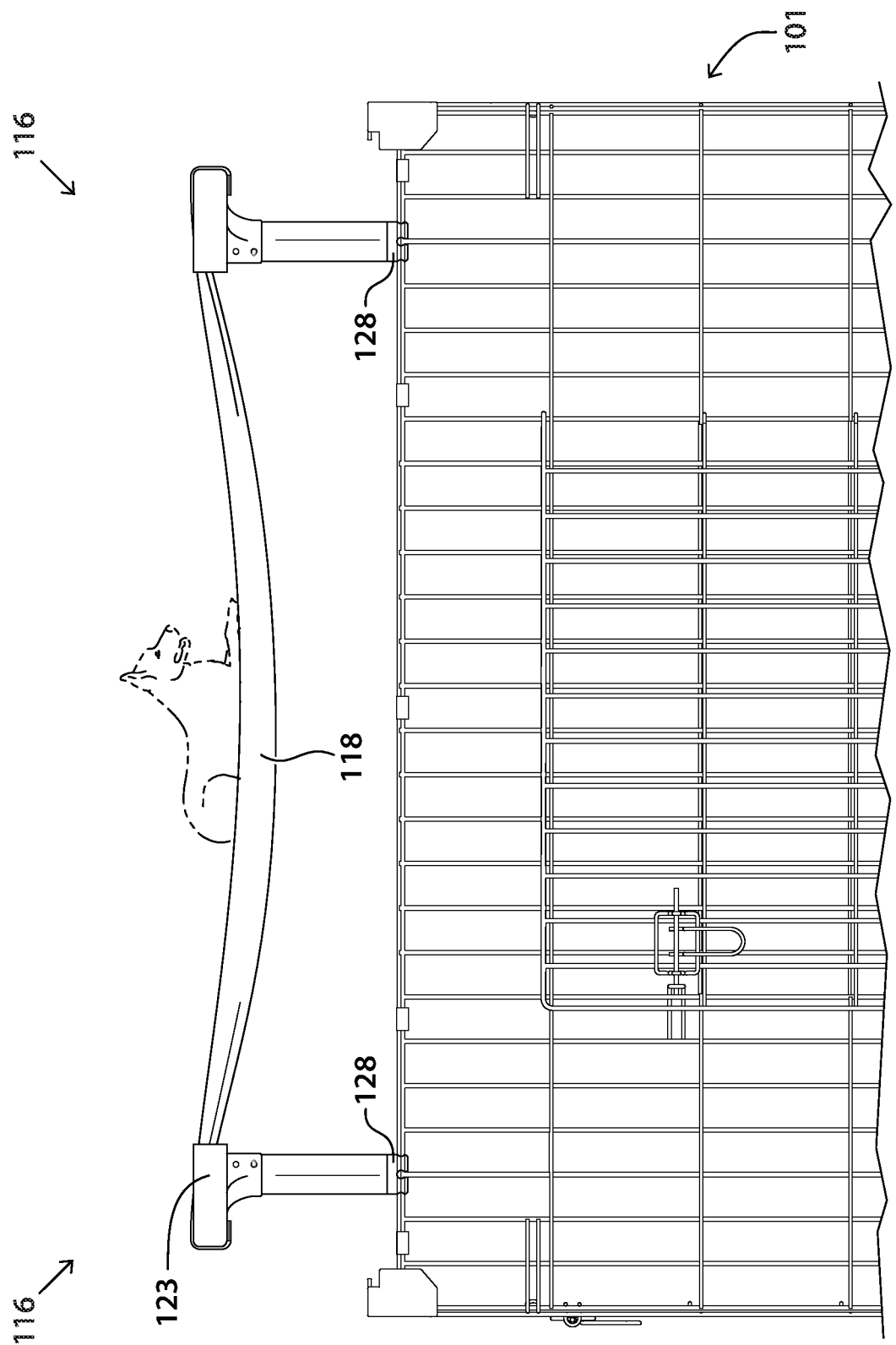

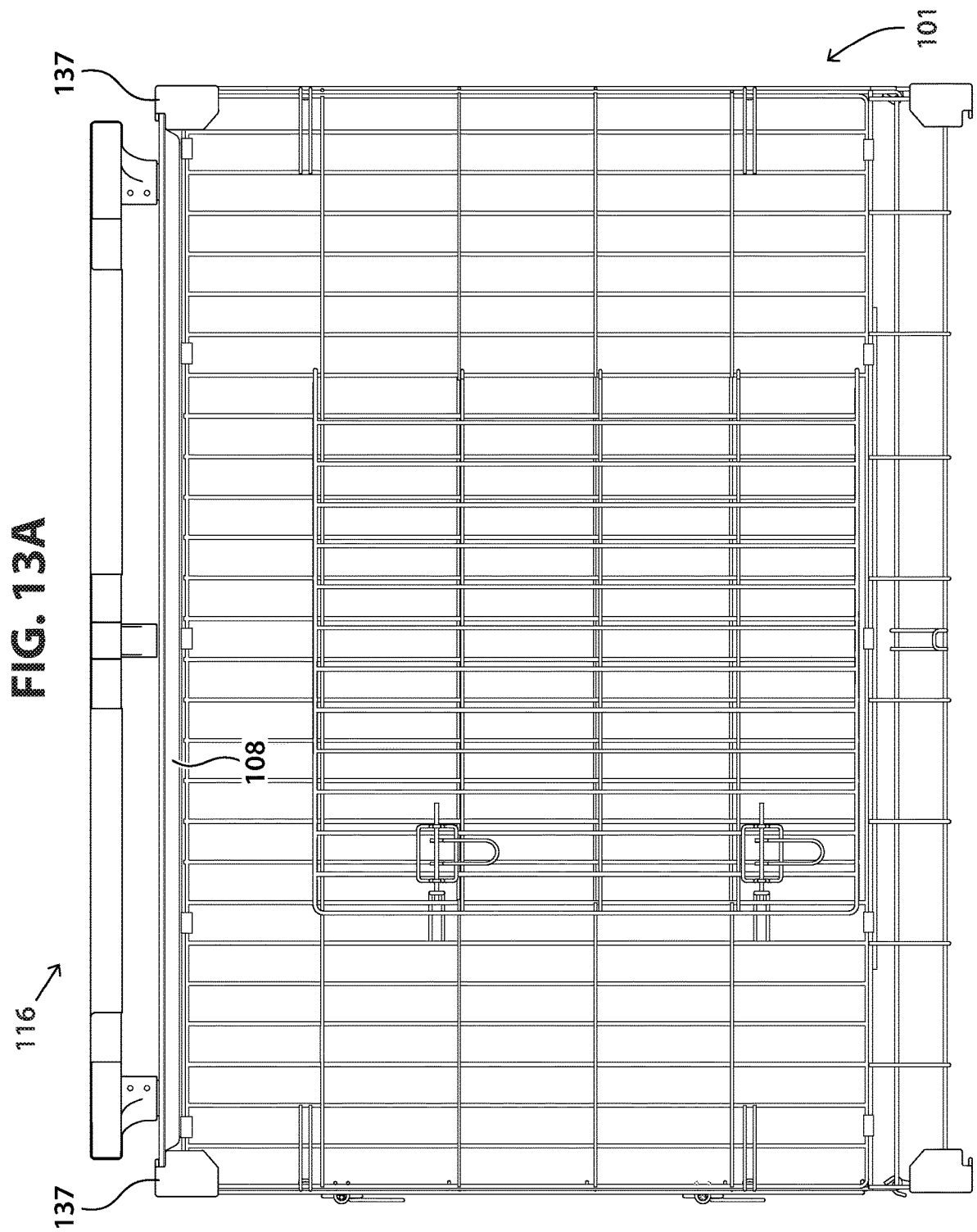

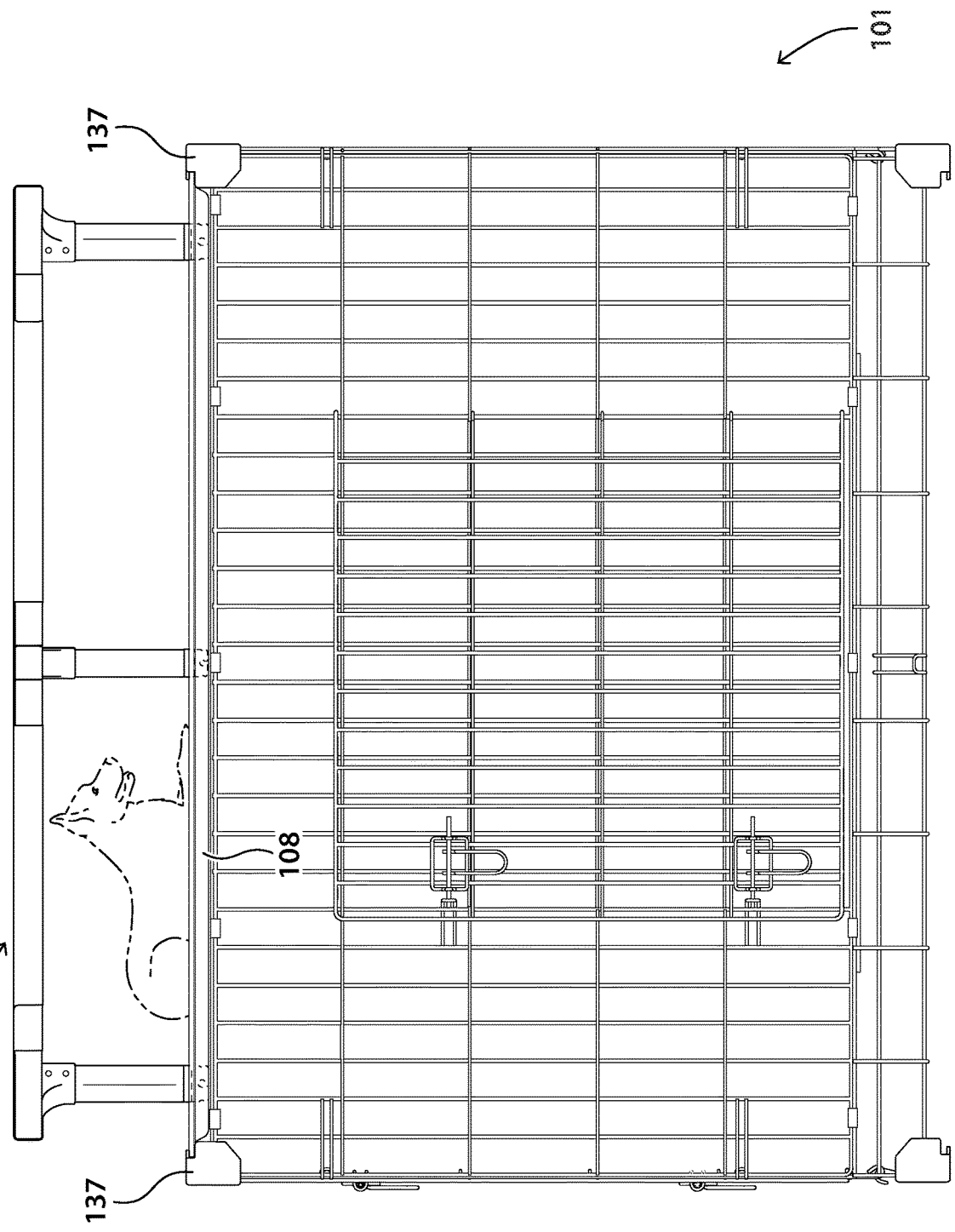

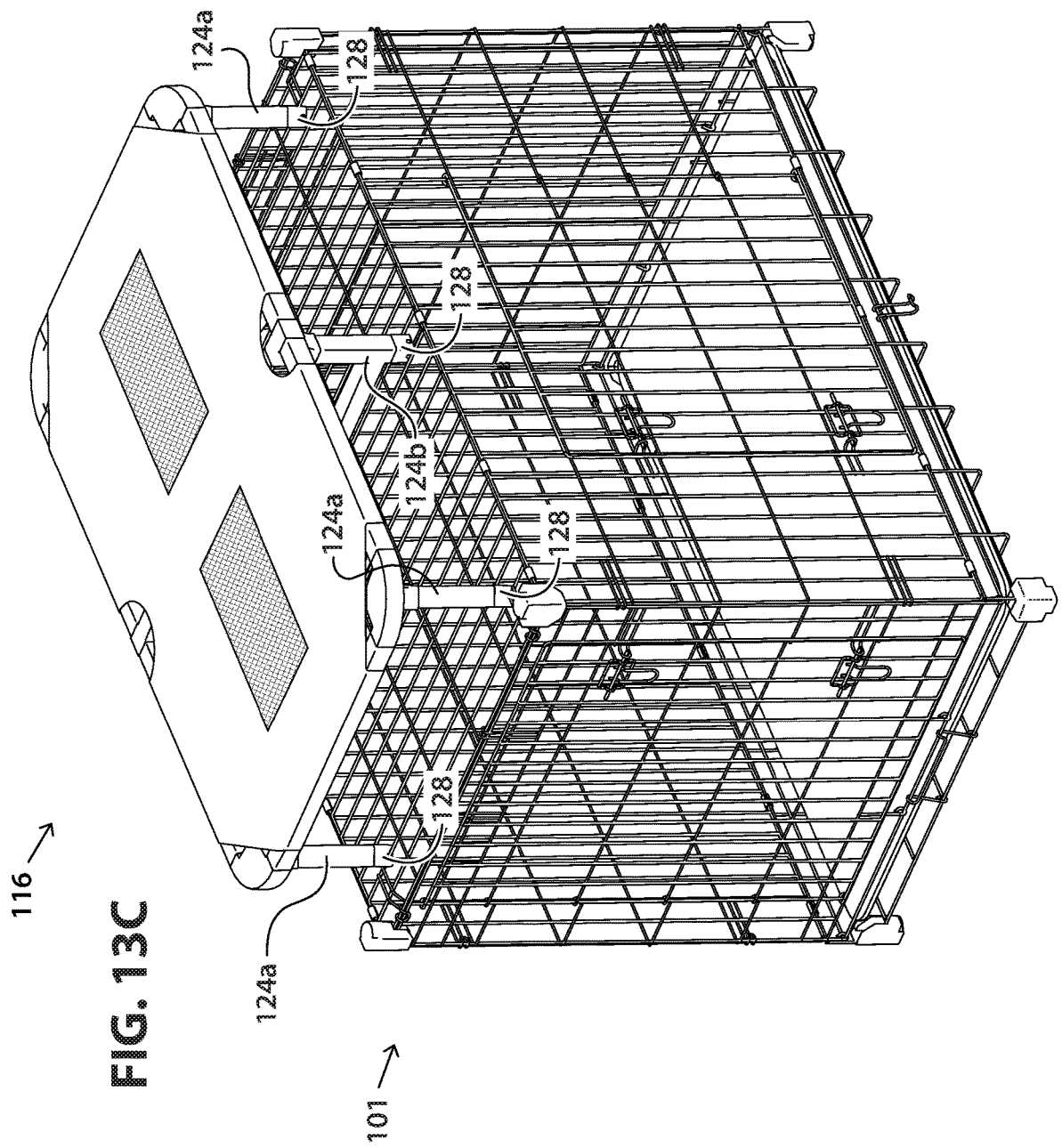

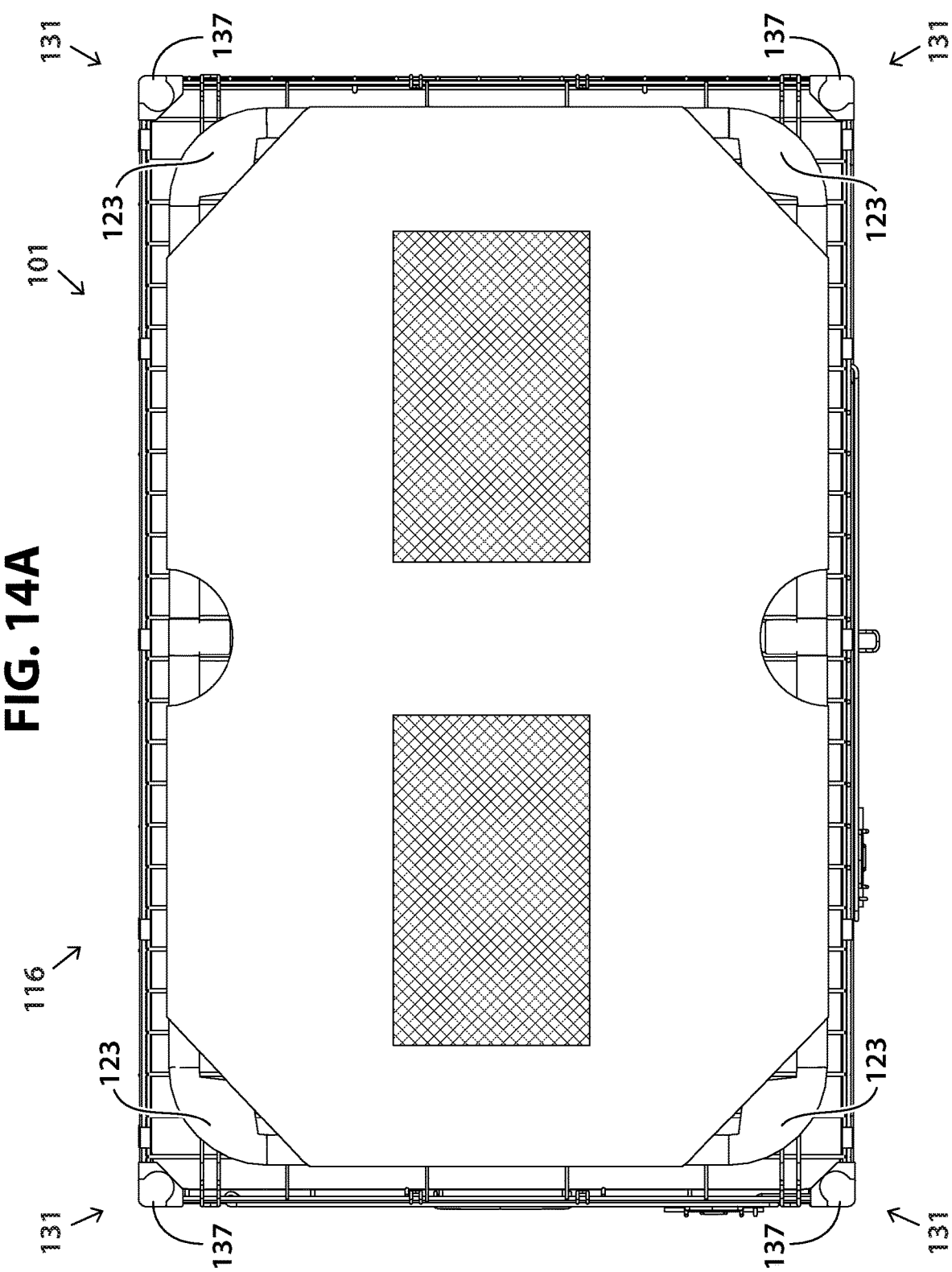

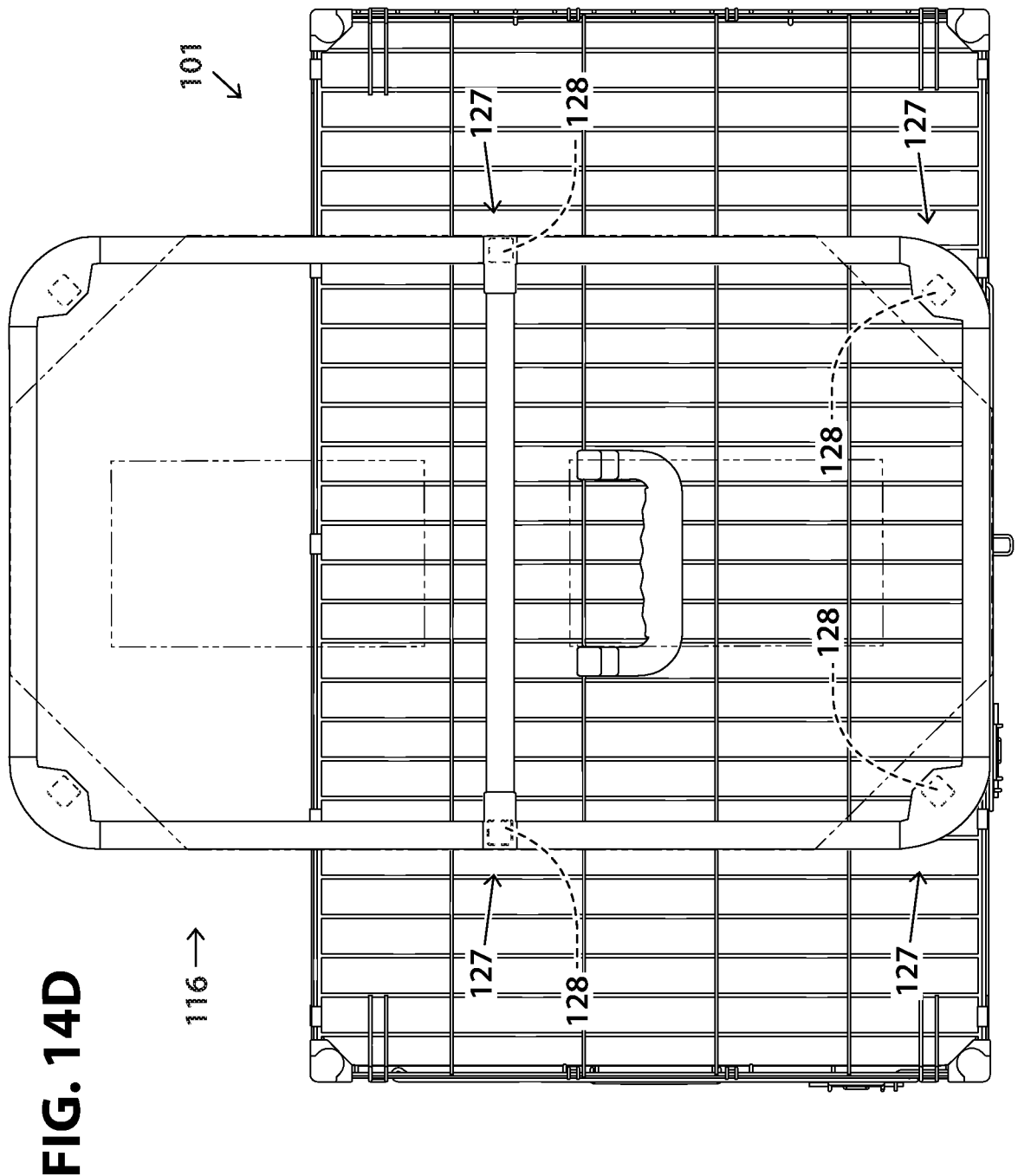

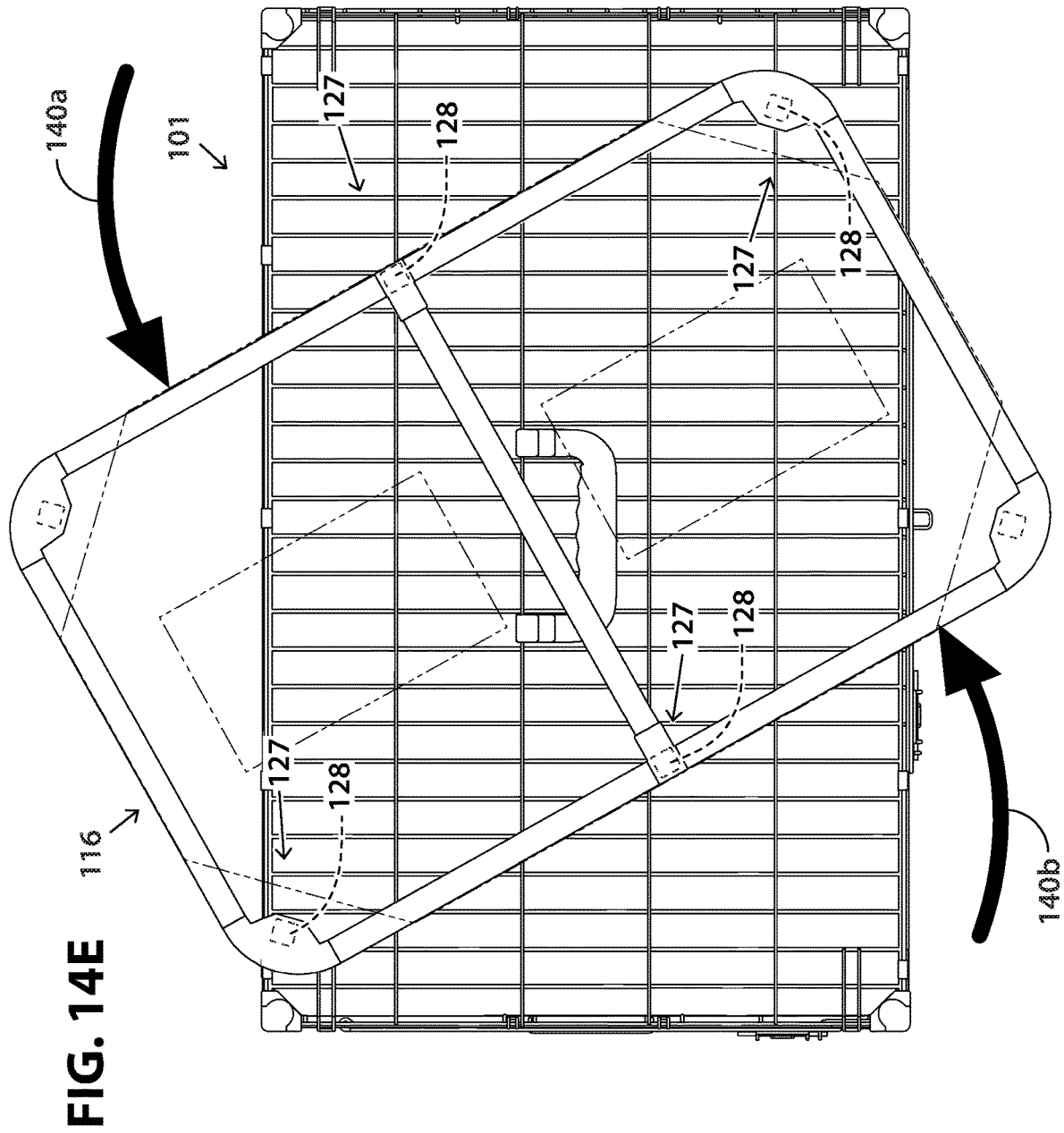

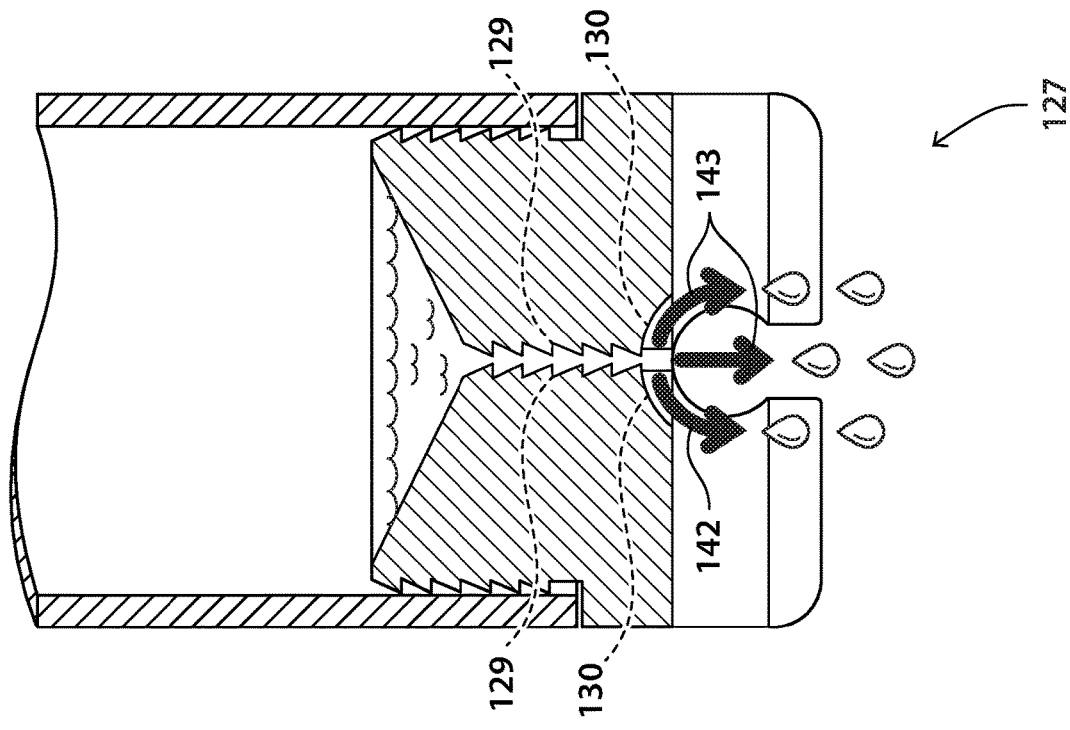
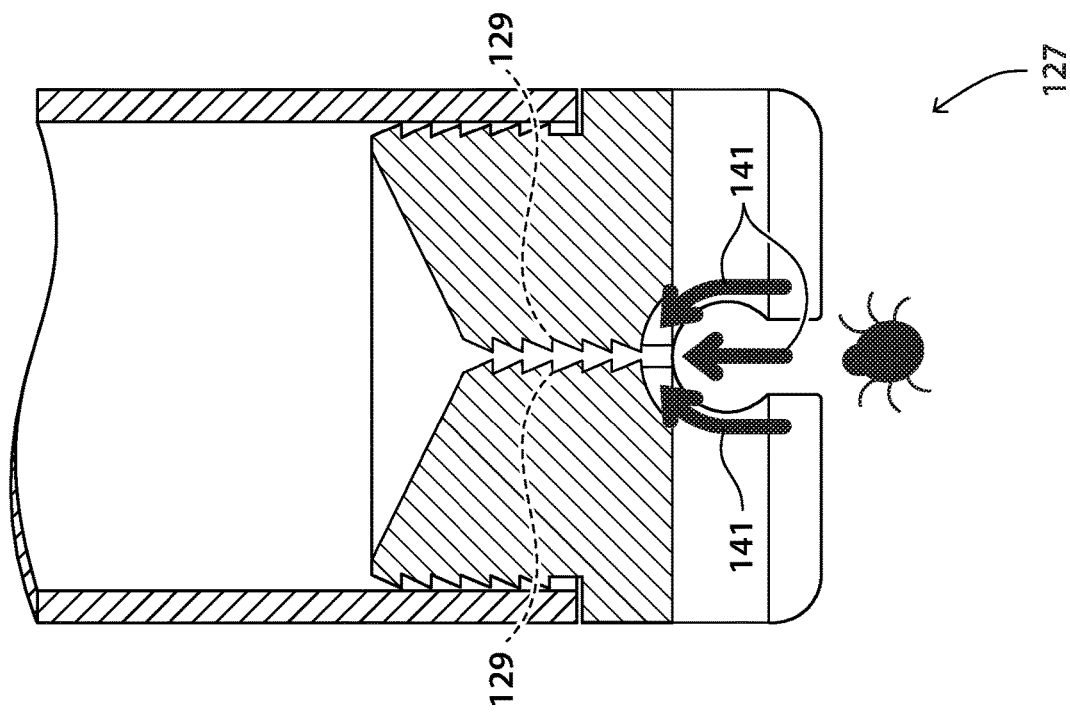

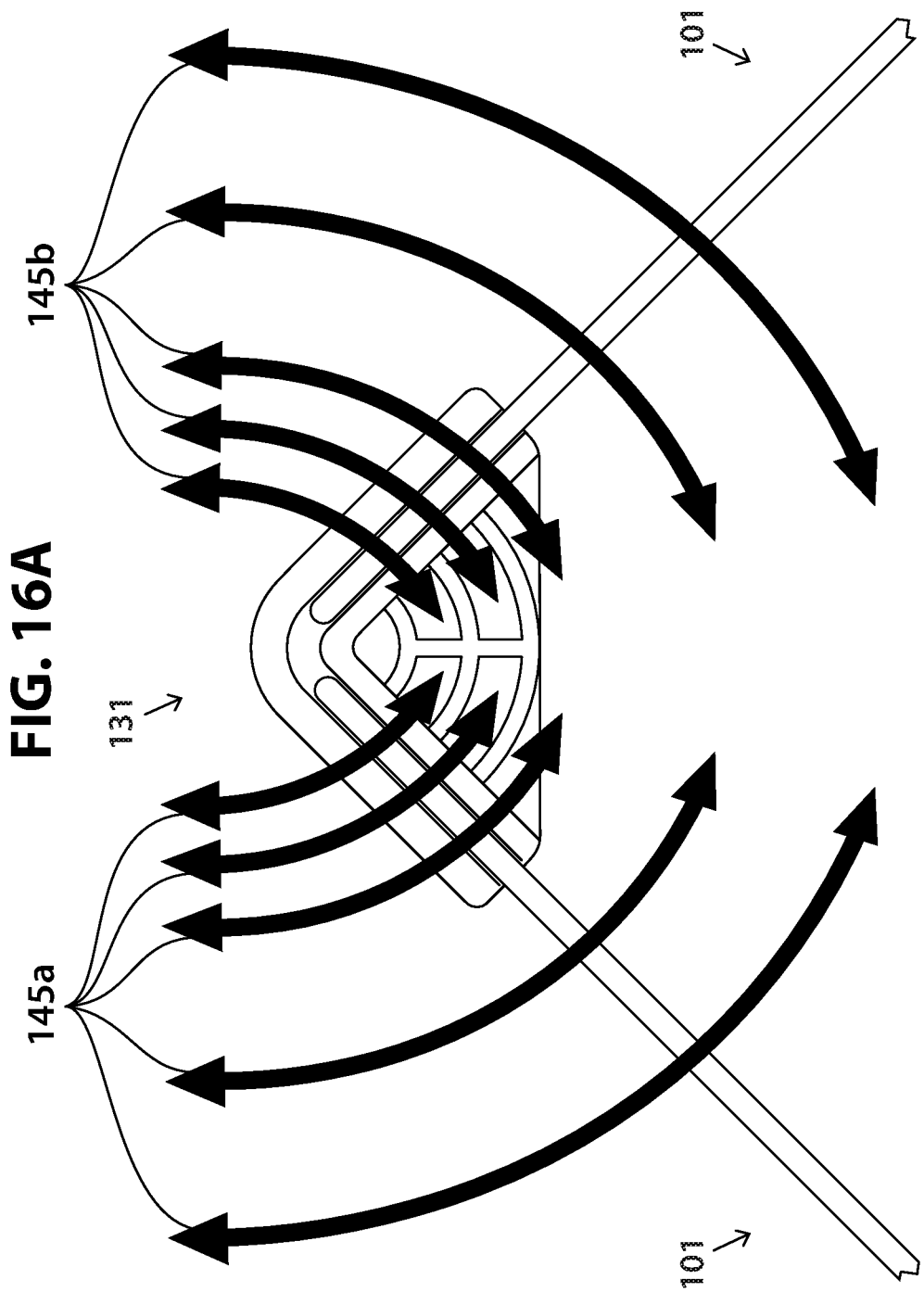

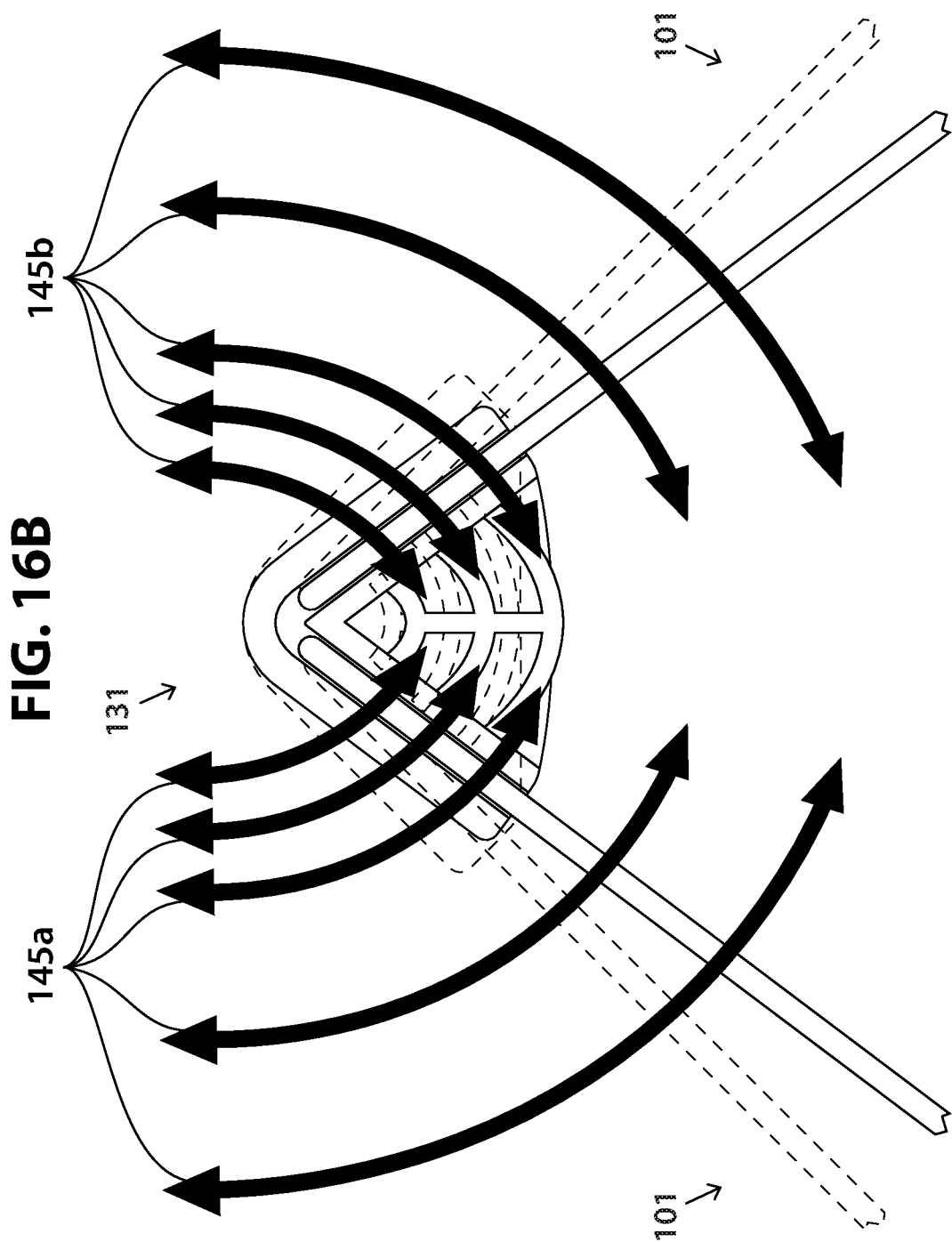

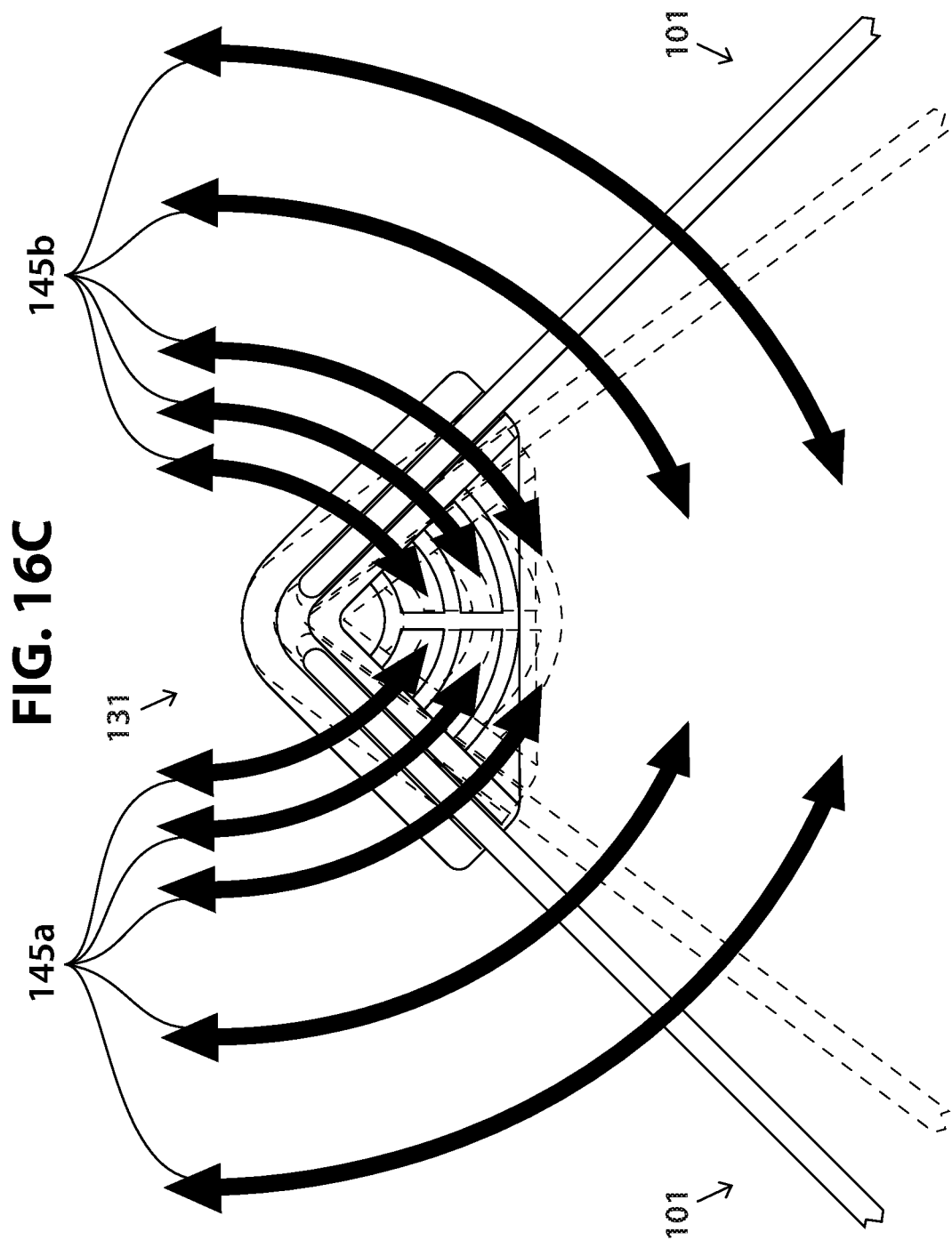

US 10,842,126 B1

TWELVE-DEVICE-IN-ONE INTERCHANGEABLE-CANOPY-PATIO-BALCONY-WINDSCREEN-CHAIR-AWNING-PERCH-TENT-SLED-STAND-BASKET-HAMMOCK-BED PET CRATE, HAVING MULTI-PET-CONTAINING PANEL SYSTEM, MULTI-PET MULTI-ENTRANCE DOOR SYSTEM, INTERCHANGEABLE-CANOPY-PATIO-BALCONY-WINDSCREEN-CHAIR-AWNING-PERCH-TENT-SLED-STAND-BASKET-HAMMOCK-BED SYSTEM, TICK-BLOCKING WATER-DRAINING WIRE-CLAMPING CAP SYSTEM, AND TRAY-LOCKING SHOCK-ABSORBING GUSSET SYSTEM

1) FIELD OF THE INVENTION

The present invention relates to a pet crate, which is economical to produce, is easy to ship as one unit, requires no tools, and can be quickly and easily folded and unfolded. Particularly, the present invention relates to a twelve-device-in-one interchangeable-canopy-patio-balcony-windscreen-chair-awning-perch-tent-sled-stand-basket-hammock-bed pet crate, comprising:
  1) Multi-pet-containing panel system,
  2) Multi-pet multi-entrance door system,
  3) Interchangeable-canopy-patio-balcony-windscreen-chair-awning-perch-tent-sled-stand-basket-hammock-bed system,
  4) Tick-blocking water-draining wire-clamping cap system, and
  5) Tray-locking shock-absorbing gusset system.

2) DESCRIPTION OF THE PRIOR ART

A number of pet crates have been introduced.

U.S. Pat. No 700,817, issued 1902 May 27, to John C Porterfield, describes containers having bodies formed by interconnecting or uniting two or more rigid, or substantially rigid, components made wholly or mainly of wood or substitutes therefor collapsible, e.g. with all parts detachable with all parts hinged together.

U.S. Pat. No 844,955, issued 1907 Feb. 19, to Robert Morgan, describes an improvement in crates of the collapsible type, and consists in certain novel constructions and combinations of parts hereinafter described and claimed.

U.S. Pat. No. 1,550,829, issued 1925 Aug. 25, to Dwight D Mcbride, describes vehicles adapted to transport, to carry or to comprise special loads or objects for transporting animals.

U.S. Pat. No. 2,706,836, issued 1955 Apr. 26, to Swope Sharswood, describes portable, knockdown enclosures in general but more particularly to dog houses or kennels which may be collapsed for storage and shipment.

U.S. Pat. No. 3,234,908, issued 1966 Feb. 15, to Benjamin L Doskocil, describes an improved portable knockdown carrying and shipping crate for pet animals (cats, dogs and other household pets), which is a practical and desirable contribution to the art in that it features a construction which assures quick and easy assembling of prefabricated parts and weather control means.

U.S. Pat. No. 3,896,766, issued 1975 Jul. 29, to Harlan W. Martin, describes a collapsible animal cage formed of rectilinear welded wire fabric or the like. The cage has front and rear rectangular end wall structures movable between an erected position and a folded position overlying a litter tray on the bottom of the cage, side wall structures intermediately hinged between their tops and bottoms and foldable over the end wall structures, and a top hingedly secured to the top of the side wall structures. Means are provided to hold the various structures in their erected position in a relatively rigid manner. The front end structure has a foldable door which can be readily latched in its closed position or held in its open position. The litter tray can be readily removed from the cage when the parts are in their erected position.

U.S. Pat. No. 4,006,713, issued 1977 Feb. 8, to Charles B. Hawley, III, describes a collapsible dog house, which has two opposite side walls, a front wall, a rear wall, a roof and a floor which are separable components, preferably made of marine plywood. The floor and roof are provided with rectangular skirts. The side walls are notched and grooved to interfit with the skirts and front and rear walls. Interlocking means are provided on the two skirts so that when the skirts are in confronting abutment they define the perimeter of a case whose sides are the roof and floor of the dog house. In that instance, the side walls, front wall and back wall are received in a stack within the case. Hardware is provided for retaining the case in a closed condition. A carrying handle is provided on one skirt, so the case may be carried like a brief case. Preferably one skirt is wider than the other, and the handle is mounted near the free edge of the wider skirt, so it is more centered on the case, for balance in carrying. The skirt of the floor doubles as a sill to keep out rain run off and the like.

U.S. Pat. No. 4,319,545, issued 1982 Mar. 16, to Yoshikazu Yamamoto, describes a sectional pet cage for keeping small animals therein. The pet cage comprises a sectional frame including a back plate, a pair of side plates, and a top plate which are detachably connected with each other to form the rigid frame, a covering wire net which is simultaneously incorporated into the frame so as to cover the upper and the front portions of the frame, thereby forming an enclosure therein, a base dish and a base wire net slidably supported by the side plates therebetween at the lower portion of the frame, and a shutter plate which is vertically movably supported by the side plates therebetween, engaging at the front end with a vertically slidable lid for an window of the covering net, thereby keeping the window closed when the lid is by chance drawn up, and engaging at the lower end with the base dish, thereby serving as stops therefor.

U.S. Pat. No. 4,763,606, issued 1988 Aug. 16, to Vladimir J. Ondrasik, II, describes an animal cage, which comprises an outer frame defining the peripheral edges of a box like enclosure, and a series of wall panels for releasably mounting in respective faces of the enclosure to form spaced side, end, and top and bottom walls of the enclosure. Each panel is held in the surrounding frame by spring loaded latch pins adjacent each end of the frame which are urged into corresponding openings in the frame and can be released at either end for swinging the panel open about the opposite end latch pin, or released at both ends for removing the panel from the frame. The frame is releasably securable to one or more additional frames arranged one on top of the other, side to side, or end to end. The internal wall panels may be removed to increase the height, width or length of the enclosure, or left in place to provide an assembly of separate cages for different animals.

U.S. Pat. No. 5,000,121, issued 1991 Mar. 19, to Raymond P. Daily, describes a cage structure, which consists of a roof member and base member each having a bore at each of its corners, and a series of wall members releasably securable together and to the roof and base members to form an enclosure. Each wall member also has a bore at each of its corners. Three way connectors or joints releasably connect the corners of the adjacent three members at each corner of the cage. Each three way connector has three arms which engage in the respective bores of the three members at that corner to secure the members together, so that a major part or all of the connector is concealed when the cage is assembled.

U.S. Pat. No. 5,092,270, issued 1992 Mar. 3, to Stephen K. Simons, describes a carrier cage of the invention, which is dual compartmented, with an open-walled living compartment at one end and a closed-walled sanitation compartment at the opposite end divided by a position having a passageway therethrough for arrival movement between the two compartments. The sanitation compartment is provided with a removable litter box preferably located under an apertured floor with provision for moving the litter box as a drawer. Space under the floor of the living compartment may be used to store grooming and other useful articles.

U.S. Pat. No. 5,335,617, issued 1994 Aug. 9, to Oneal M. Hoffman, describes an apparatus for use in the housing of dogs which includes a molded fiberglass flooring, fencing and a top. The apparatus is movable and sanitary, and can be used in a modular fashion with standard-sizes of fencing that can be shared in part by adjacent modules. The fiberglass flooring has rimmed sides that act as "splash guards" and a trough with a drain at one end outside the fencing for flushing animal wastes into a sewage system. The bottom of the fiberglass flooring is reinforced by a plurality of ribs running parallel to the sides and toward the trough. The top of the fiberglass flooring is textured in lanes, also running parallel to the sides of the flooring and perpendicular to the trough, to provide the animal with a non-abrasive, non-slip surface, that is easy to clean, stain-resistant, non-porous, waterproof and rigid.

U.S. Pat. No. 5,626,098, issued 1997 May 6, to William E. Askins, describes a collapsible cage for dogs or rabbits which has a rectangular base, fold-down end walls folding side walls and a roof. The walls and roof are made of metal grids. The end walls fold down onto the base one over the other. The side walls fold in the middle concertina-wise and are hinged at the top to opposite edges of the roof allowing the side walls and roof to collapse onto the base over the end walls. The base has a pull-out tray or pan and an access door is provided in one of the end walls. Releasable clips are provided to hold the walls and roof together in an elevated position of the structure.

U.S. Pat. No. 6,408,797, issued 2002 Jun. 25, to Scott Pivonka, describes a collapsible pet housing structure that includes a floor panel having a pair of parallel sides and a pair of ends extending between the sides. A pair of generally opposing walls are hingedly attached to the parallel sides of the floor panel, each wall including at least two generally planar wall panels hingedly connected to one another, each of the wall panels having an external surface and an internal surface, the internal surface of the wall panels of one wall facing the internal surface of the wall panels of the opposing wall, the hinged connection allowing movement of the wall panels from a first position where the external surfaces of the wall panels are at an acute angle relative to one another to a second position where the external surfaces of the wall panels are retained at an angle greater than 180 degrees relative to one another. The walls will preferably include supports for retaining the external surfaces of the wall panels at the second position relative to one another. The structure will also include a roof panel that extends between the walls and which is hingedly connected to the walls; and a pair of endwalls, each endwall being hingedly attached to the floor panel at opposing ends of the floor panel, the endwalls being adapted for supporting the wall panels in the second position, so that the roof panel is supported by the walls when the wall panels are at the second position.

U.S. Pat. No. 6,681,720, issued 2004 Jan. 27, to Scott A. Skurdalsvold, describes a wire cage operable between an expanded position and a folded position which includes a top wall and a bottom wall, a first sidewall, a second sidewall, a front wall and a rear wall attach to the bottom and top walls. The front and rear walls contain rounded sides. The cage includes an entrance door. A pass through door is mounted on the entrance door. In order to open the pass through door, the entrance door must be closed and locked. The cage top wall optionally contains a top wall door hinged on the edge of the top wall so that the user can easily access the cage from the top wall. The top door can be rotated so that it rests flush with the cage sidewall. A pan is inserted over the bottom surface.

U.S. Pat. No. 6,732,676, issued 2004 May 11, to Douglas C. Smith, describes an integrated pet storage crate and grooming table. The integrated table includes a structure having a pet storage area covered by an openable gate, an equipment storage area for storing equipment, a horizontal surface resting on a top portion of the pet storage area and the equipment storage area, and a grooming surface rotatably connected to the horizontal surface. The grooming surface, which may be optionally covered with a material, covers the equipment storage area in a vertical orientation and is rotated upwardly to a horizontal orientation against the horizontal surface to provide an area for grooming a pet. The structure also includes a plurality of wheels mounted on a bottom surface of the structure allowing mobility of the structure. In addition, a telescopic ramp is mounted under the bottom surface of the structure to facilitate movement of the structure.

U.S. Pat. No. 6,883,463, issued 2005 Apr. 26, to David B. Link, describes an animal enclosure, having a top wall panel, a bottom rack disposed opposite to the top wall panel, two opposite first side wall panels, a third side wall panel and a fourth side wall panel. Each of the first side wall panels has a top edge hinged to the top wall panels and a bottom edge hinged with the bottom rack at a first elevation. The second side wall panel disposed between and adjacent to the first side wall panels has a bottom edge hinged to the bottom rack at a second elevation. The third side wall panel is opposite to the second side wall panel and adjacent to the first side wall panels. The third side wall has a bottom edge hinged to the bottom rack at a third elevation. The first, second and third elevations are at different from each other such that the top wall panel, the first, second and fourth side wall panels can be folded stacked with each other on the bottom rack. The animal enclosure includes at least one removable door formed on one of the side wall panels allowing the user to use the enclosure as a training space.

U.S. Pat. No. 7,021,242, issued 2006 Apr. 4, to Glen S. Axelrod, describes a foldable/collapsible structure that folds and collapses between an open and closed condition. The structure includes a top and bottom section, and a plurality of collapsible wall sections extending between said top and bottom sections. The wall sections and the top and bottom sections define an enclosure and also contain a longitudinal member extending between said top and bottom section. The longitudinal member contains a pivot connection at a location between the top and bottom section. The pivot section allows movement of the top and bottom section relative to one another, so that the foldable/collapsible structure can be configured between an open or closed condition.

U.S. Pat. No. 7,293,530, issued 2007 Nov. 13, to Barbara Italiano, describes a series of lightweight, easily transportable identical frame pieces attached together to form an expandable pet enclosure that can be assembled into a multiplicity of configurations, optionally with a floor or a roof that comprises the same frame pieces.

U.S. Pat. No. 7,380,521, issued 2008 Jun. 3, to Julian Morton, describes a collapsible cage/crate for pets having an inner framework within a soft-sided shell. The internal framework is integrated and manipulated by two locking hubs such that when the hubs are unlocked and urged towards each other, the crate collapses. In its deployed configuration, the crate provides an area for an animal to be confined whereas when the crate is collapsed the crate is compact and easy to transport. The outer shell of the crate is formed of fabric and includes one or more mesh panels in order to provide airflow into and out of the crate. Access is gained to the interior of the crate through one or more doors.

U.S. Pat. No. 7,455,032, issued 2008 Nov. 25, to Glen S. Axelrod, describes a foldable/collapsible structure that folds and collapses between an open and closed condition. The structure includes a top and bottom section, and a plurality of collapsible wall sections extending between said top and bottom sections. The wall sections and the top and bottom sections define an enclosure and also contain a longitudinal member extending between said top and bottom section. The longitudinal member contains a pivot connection at a location between the top and bottom section. The pivot section allows movement of the top and bottom section relative to one another, so that the foldable/collapsible structure can be configured between an open or closed condition.

U.S. Pat. No. 7,802,540, issued 2010 Sep. 28, to Todd M. Jakubowski, describes a collapsible soft crate comprising a frame having at least one top member, at least one bottom member, and at least two side members. The at least one top and bottom members are hinged along a length thereof. The at least one top member and the at least one bottom member are connected to the at least two side members. At least four panels are connected together and surround at least a portion of the frame. This configuration allows the crate to collapse more compactly than those in the art.

U.S. Pat. No. 7,926,447, issued 2011 Apr. 19, to Mark A. Flannery, describes a bed for a pet such as a cat or dog that includes a frame having a collapsible and expandable network of interlocking legs and a covering for the frame. The covering includes a first cover portion for extending over a top and four sides of the frame, and a second cover portion for further extending over the top side or raised floor of the frame. The network of interlocking legs includes pairs of pivoting legs interconnected via hubs and, as a whole, is resilient so as to provide a forgiving or hammock style of pet bed. The first cover portion hides the networked frame from view. The second cover portion includes a cushion to provide further resiliency to the pet bed and further includes a carpet of soft fibers on which the pet directly makes contact when lying down.

U.S. Pat. No. 8,267,048, issued 2012 Sep. 18, to Mark A. Flannery, describes a pet crate having a top, a bottom, and a cage between the top and bottom. The cage can be engaged and disengaged from each of the top and bottom. When engaged to the top and bottom, or when disengaged from either one or both of the top and bottom, the cage is endless and can safely hold a pet therein. When disengaged from the top and bottom, the cage is foldable into a closed, endless and flat configuration such that the cage can be stored between the top and bottom such that the crate as a whole in such stored configuration is generally flat. When disengaged from the top and bottom, the cage is foldable out into a fence configuration by disconnecting two ends of the cage.

U.S. Pat. No. 8,336,500, issued 2012 Dec. 25, to Jeremy Britt, describes a pet crate device for providing a pet a place to rest and a place to use the bathroom. The device features a first container with a first access door which is disposed in the front of the first container and a first back opening is disposed in the back, and a second container with a second back opening is disposed in the back. A first attachment means secures the backs of the two containers together. A track surrounding the first back opening, and a divider board can slide into and out of the track allowing and preventing access to the inner cavity of the first compartment. A tab extends upwardly from the top of the divider board. The tab functions as a handle. A divider board lock can secure the divider board in the closed position.

U.S. Pat. No. 8,342,126, issued 2013 Jan. 1, to Arthur Louis Simon, describes an enhanced pet bed which comprises an outer cover having an inner volume, and at least one stuff sack that is preferably porous, for placement within the inner volume of the outer cover. While the inner stuff sack may be filled with a wide variety of stuffing items, the stuff sack is preferably filled with a plurality of items supplied by the owner, and may preferably inherently include a scent that is desirable or comforting to the intended animal, e.g. the scent of a known person or animal. For embodiments having permeable stuff sacks, the entire stuff sack assembly may preferably be laundered, e.g. washed and dried, as a unit, i.e. with the stuffing retained. Since the enhanced pet beds are typically provided without stuffing, the intended waste footprint of the is purchased product is significantly less than that of a conventional bed.

U.S. Pat. No. 8,544,417, issued 2013 Oct. 1, to Douglas L. Sangl, describes a pet crate which broadly includes a crate housing. The crate housing includes first and second connector sections and a support wall extending between and interconnecting the sections. The connector sections and wall extend between opposite housing ends of the crate housing to cooperatively present an enclosed pet space. The crate housing presents a crate opening at a corresponding housing end. The crate opening permits pet ingress and egress relative to the enclosed pet space.

U.S. Pat. No. 8,671,887, issued 2014 Mar. 18, to Robert Baker, Jeffrey L. Jones, and Mark V. Jackson, describes an orthopedic pet bed including an upper sheet and a lower sheet coupled together so as to define an interior volume subdivided into a plurality of cells, of which adjacent cells are in fluid communication with one another. The cells may be substantially shaped as hexagons, triangles, parallelograms, or any combination thereof.

U.S. Pat. No. 8,733,292, issued 2014 Apr. 27, to Amy R. Nichols, describes a collapsible pet crate, which is mountable to a wall such that the crate may be assembled for pet usage while mounted to the wall and collapsed into a compact package while mounted to the wall and not being used. A mounting bracket affixed to the wall receives a mounting rod (or mounting pins) integral with, or connected to, the crate to facilitate operation of the crate. The mounting bracket includes a first position for receipt of the mounting rod corresponding to the assembled or opened crate and a second position for receipt of the mounting rod corresponding to the collapsed or stowed crate. In another version, a pair of latches rotatably joined to a back wall for (i) joining the wall to the bottom tray in a collapsed configuration and (ii) securing the foldable cage to the back wall in an assembled configuration.

U.S. Pat. No. 8,925,492, issued 2015 Jan. 6, to Brad Cantwell, describes a wire crate for housing an animal. The wire crate includes a top panel, a bottom panel, a front panel, a back panel, and a pair of side panels oppositely disposed from one another. The crate also includes a front opening defined in the front panel. The front opening is configured to provide access to the interior of the crate. The crate further includes a pair of tracks coupled to each side of the front opening and a door slidably coupled to the pair of tracks. The door slides along the pair of tracks between an open position and a closed position.

U.S. Pat. No. 9,119,375, issued 2015 Sep. 1, to Mark A. Flannery, describes a pet crate having a top, a bottom, and a cage between the top and bottom. The cage can be engaged to and disengaged from each of the top and bottom. When engaged to the top and bottom, or when disengaged from either one or both of the top and bottom, the cage is endless and can safely hold a pet therein. When disengaged from the top and bottom, the cage is foldable into a closed, endless and flat configuration such that the cage can be stored between the top and bottom such that the crate as a whole in such stored configuration is generally flat. When disengaged from the top and bottom, the cage is foldable out into a fence configuration by disconnecting two ends of the cage.

U.S. Pat. No. 9,253,962, issued 2016 Feb. 9, to Sandra Marie Gallo, describes a pet pocket bed/pad comprising of a hollow flexible shell, top wall, bottom wall, surrounding walls which interconnect the top and bottom wall, fill material is disposed inside, to create a pet bed/pad. Additional compartment is added underneath comprising of three side walls, bottom wall, interconnecting the bottom wall of the upper pet bed, to create a pocket compartment, which is equal or greater, with an opening on one end or side, to allow a solid planar flat surface to be inserted inside, working in combination with the bed/pad, secured with closure to keep the flat surface inside the pocket, which prevents bunching up. Padded inserts comprising of a top and bottom wall, surrounding walls interconnected, will create a pillow of similar size and perimeter, to be inserted inside the interior underneath pocket of the bed/pad, to customize the plushness for additional comfort.

U.S. Pat. No. 9,339,006, issued 2016 May 17, to Michael L. Eby, describes a pet kennel configured to restrain a pet indoors while allowing access to out-of-doors which includes a bottom and a plurality of peripheral panels attached to the bottom and extending upwardly therefrom and wherein at least one of the panels is constructed of a durable mesh. A top is affixed to an upper edge of the plurality of peripheral panels. At least one access door is integrated in one of the panels and is selectively openable and closable for access to an interior of the kennel. One of the panels other than the panel with the door is removable therefrom and defines an end perimeter. A bracket assembly is joinable with an end of at least one of the panels other than the panel with the integrated door.

U.S. Pat. No. 9,370,165, issued 2016 Jun. 21, to de Humberto Bien, describes an apparatus for housing an animal, which includes a top portion wherein an upper flange is disposed along the lower edge of the bottom portion. A locking member is movably mounted to the upper flange. The apparatus may also include a bottom portion wherein a lower flange is disposed along the upper bottom edge of the bottom portion. The locking member engages with the lower flange when the locking member is in the outwardly extending locking orientation, which is at least partially defined by the locking member structured to engage at least a portion of the lower flange in an abutting relation to prevent detachment of the bottom portion from the top portion while disposed in the outwardly extending locking orientation. The apparatus may include a biasing mechanism structured to normally dispose and maintain the locking member in the outwardly extending locking orientation.

U.S. Pat. No. 9,485,957, issued 2016 Nov. 8, to Adam M. Kellogg, describes a system and method directed to the art of pet kennels, more particularly collapsible pet kennels, are provided. A collapsible pet kennel having a first framework and a second framework both rotatably attached to a base framework, a first swing arm pivotably attached to the first framework and removably engageable with the second framework, a second swing arm pivotably attached to the second framework and removably engageable with the first framework, and a covering which encloses the pet kennel. The pet kennel is capable of being collapsed without removing the covering.

U.S. Pat. No. 9,596,826, issued 2017 Mar. 21, to Kongzhi Lu, describes a pet house or a pet crate which is easily collapsible, foldable and portable, having four side walls, connected to a roof plate, with a frame support built to the edges of the left and right side walls, when two first zippers zip up along the left and right side walls' edges to form the complete and assembled pet crate. A special 180-degree flip of a second zipper strip is made to the portion along the edges of the roof plate, so that the orientation of the zipper teeth at the portion connected to the roof plate is reversed in direction to the portion connected to the front and back side walls, providing a stronger propping power for the corners under the roof plate, when zipped up and fully erected.

U.S. Pat. No. 9,706,750, issued 2017 Jul. 18, to Carlo Vaccari, describes a cage for rabbits or similar pets comprising a grill element generally having a rectangular shape and which can be curved or shaped at the top as required, and where the grill element is applied to the top edge of a basin-shaped tray with modular walls and where this base comprises a bottom surface and side walls which respectively form the long sides and the short sides of the tray, where the cage can be joined to at least one further cage alongside, where the cages are joined by removing from each of the cages their respective vertical wall on the joining side, preferably the short side but also the long side, and where the two trays are held together by a specially shaped horizontal profile with an up-turned "U" shape comprising the two vertical sides which overlap on the joined edges of the tray bottoms positioned side by side.

U.S. Pat. No. 9,708,853, issued 2017 Jul. 18, to Brad Cantwell, describes a door assembly for an animal enclosure. The assembly includes a door frame having a plurality of interconnected horizontal and vertical wires that define an opening for an animal to pass therethrough. The assembly also includes a door configured to move between an open position and a close position relative to the door frame. A latch is pivotably coupled to the door and includes a mechanism that is removably coupled to the door frame. The assembly further includes a first vertical wire and a second vertical wire of the door. A first guide wire and a second guide wire are coupled to the door frame. The first vertical wire is coupled to and moves along the first guide wire between the open and close positions, and the second vertical wire is coupled to and moves along the second guide wire between the open and close positions.

U.S. Pat. No. D171,740, issued 2010 Aug. 17, to Todd M. Jakubowski, depicts an ornamental design for a foldable pet crate, as shown and described.

U.S. Pat. No. D723,225, issued 2015 Feb. 24, to Melody Lee, describes the ornamental design for a pet crate, as shown and described.

U.S. Pat. No. D739,656, issued 2015 Sep. 29, to Sandra Marie Gallo, depicts an ornamental design for a collapsible structure, as shown and described.

U.S. Pat. No. D770,692, issued 2016 Nov. 1 Brad Cantwell describes the ornamental design for a combined swing door and door frame of an animal enclosure, as shown and described.

U.S. Patent Application No 20060219181, Published 2006-10-05, to Paulette Pape, describes a pet bed that is foldable to a compact configuration when not in use. When it is desired to use the pet bed, the pet bed is folded to an extended configuration in which a sleeping surface is extended horizontally and a frame spaces the sleeping surface from the floor. The frame for the pet bed includes one or more stops to prevent collapsing of the frame when the pet bed is in the extended configuration. The stops release as the pet bed is folded back into the storage configuration.

U.S. Patent Application No 20120210947, published 2012 Aug. 23, by Nicholas DiPaolo, describes the present invention for a puppy apartment for use by domestic animals which includes a container portion and a room divider having a kennel opening thereby allowing the animal to pass between apartment bedroom and bathroom portions. Adjustable apartment boundary regions for bathroom, bedroom, and living areas are adaptably configured to accommodate the pet in a comfortable domestic training environment. The present invention includes a method for providing positive and consistent household pet puppy training with the puppy apartment device.

U.S. Patent Application No 20150305296, Published 2015-10-29, to Kongzhi LU, describes the present invention providing a pet house or a pet crate that is easily collapsible, foldable and portable, having four side walls, connected to a roof plate, with a frame support built to the edges of the left and right side walls, when two first zippers zip up along the left and right side walls' edges to form the complete and assembled pet crate. A special 180-degree flip of a second zipper strip is made to the portion along the edges of the roof plate, so that the orientation of the zipper teeth at the portion connected to the roof plate is reversed in direction to the portion connected to the front and back side walls, providing a stronger propping power for the corners under the roof plate, when zipped up and fully erected.

U.S. Patent Application No 20170020103, published 2017 Jan. 26, by Amy R. Nichols, describes a collapsible, mountable pet crate. A collapsible crate mountable to a wall such that the crate may be assembled for pet usage while mounted to the wall and collapsed into a compact package while mounted to the wall and not being used. A mounting bracket affixed to the wall receives a mounting rod (or mounting pins) integral with, or connected to, the crate to facilitate operation of the crate. The mounting bracket includes a first position for receipt of the mounting rod corresponding to the assembled or opened crate and a second position for receipt of the mounting rod corresponding to the collapsed or stowed crate. In another version, a pair of latches rotatably joined to a back wall for joining said the wall to the bottom tray in a collapsed configuration and securing the foldable cage to the back wall in an assembled configuration.

U.S. Patent Application No 20170268294, published 2017 Sep. 21, by Brad Cantwell, describes the present disclosure which provides a door frame assembly that includes a frame that defines an opening therein for allowing access therethrough. The door frame also includes a door pivotally coupled to a first vertical wire of the frame for pivoting the door between an open position and a closed position. The door frame further includes a first coupling mechanism and a second coupling mechanism. The first coupling mechanism releasably couples the door to the frame and is formed by a first horizontal wire. The first horizontal wire forms a hooked end protruding outward toward the door and spaced inwardly of the frame to intersect with the opening. The second coupling mechanism releasably couples the door to the frame. The second coupling mechanism includes a portion configured to limit movement of the door relative to the frame until the second portion is pivoted in a direction toward the door.

DISADVANTAGES OF THE PRIOR ART

The prior art have failed to solve many problems associated with pet crate, as follows:
1) No prior art mention or disclose any landscape edging, having
   interchangeable side frame supports 117a.
   Therefore, the prior art of pet crate:
   a) Can not provide a structure on which to mount and suspend interchangeable canopy-patio-balcony-windscreen-chair-awning-perch-tent-sled-stand-basket-hammock-and-bed 118
      (See FIG. 1A, FIG. 1B, FIG. 1C, FIG. 1D, FIG. 1E, FIG. 1F, FIG. 1G, FIG. 1H, FIG. 1I, FIG. 1J, FIG. 1K, FIG. 1L, FIG. 1M, FIG. 1N, FIG. 1O, FIG. 1P, FIG. 1Q, FIG. 12A, FIG. 12B, FIG. 12C, FIG. 12D, FIG. 12E, FIG. 12F, FIG. 12G, FIG. 12H, FIG. 12I, FIG. 12J, FIG. 12K, FIG. 12L, FIG. 12M, FIG. 12N, FIG. 12O, FIG. 12P, FIG. 12Q, FIG. 13A, FIG. 13B, FIG. 13C, FIG. 14A, FIG. 14B, FIG. 14C, FIG. 14D, FIG. 14E, and FIG. 14F);
   b) Can not collapse quickly for easy storage,
      to provide easy portability
      (See FIG. 16G);
   c) Can not provide a mounting structure for interchangeable T-shaped straight frame connectors 122 and interchangeable T-shaped corner frame connectors 123,
      to respectively be disposed in various configurations
      (See FIG. 1A, FIG. 1B, FIG. 1C, FIG. 1D, FIG. 1E, FIG. 1F, FIG. 1G, FIG. 1H, FIG. 1I, FIG. 1J, FIG. 1K, FIG. 1L, FIG. 1M, FIG. 1N, FIG. 1O, FIG. 1P, FIG. 1Q, FIG. 12A, FIG. 12B, FIG. 12C, FIG. 12D, FIG. 12E, FIG. 12F, FIG. 12G, FIG. 12H, FIG. 12I, FIG. 12J, FIG. 12K, FIG. 12L, FIG. 12M, FIG. 12N, FIG. 12O, FIG. 12P, FIG. 12Q, FIG. 13A, FIG. 13B, FIG. 13C, FIG. 14A, FIG. 14B, FIG. 14C, FIG. 14D, FIG. 14E, and FIG. 14F);
   d) Can not provide a structure on which to mount interchangeable canopy-patio-balcony-windscreen-chair-awning-perch-tent-sled-stand-basket-hammock-and-bed 118,
      to respectively be disposed in various configurations
      (See FIG. 1A, FIG. 1B, FIG. 1C, FIG. 1D, FIG. 1E, FIG. 1F, FIG. 1G, FIG. 1H, FIG. 1I, FIG. 1J, FIG. 1K, FIG. 1L, FIG. 1M, FIG. 1N, FIG. 1O, FIG. 1P, FIG. 1Q, FIG. 12A, FIG. 12B, FIG. 12C, FIG. 12D, FIG. 12E, FIG. 12F, FIG. 12G, FIG. 12H, FIG. 12I, FIG. 12J, FIG. 12K, FIG. 12L, FIG. 12M, FIG. 12N, FIG. 12O, FIG. 12P, FIG. 12Q, FIG. 13A, FIG. 13B, FIG. 13C, FIG. 14A, FIG. 14B, FIG. 14C, FIG. 14D, FIG. 14E, and FIG. 14F); and
e) Can not provide multiple configuration options when combined with interchangeable end frame supports 117b, interchangeable T-shaped straight frame connectors 122, interchangeable T-shaped corner frame connectors 123, interchangeable adjustable leg supports 124a, and interchangeable adjustable center-brace leg support 124b mounting on multi-pet-containing panel system 101,
to function as a pet canopy,
to function as a pet patio,
to function as a pet balcony,
to function as a pet hammock,
to function as a pet bed,
to function as a perch,
to function as an awning
in the direction of arrow 139e
(See FIG. 12E and FIG. 12F),
to function as a tent with storage,
to function as a chair,
to function as a crate stand,
to function as a sled
in the direction of arrow 139f
(See FIG. 12P),
to function as a roof with storage,
to function as a grooming platform,
to function as a multi-pet grooming table,
to function as a drying platform,
to function as a wind, sun, and weather block,
to function as a privacy screen, and
to function as an independent pet bed
(See FIG. 1A, FIG. 1B, FIG. 1C, FIG. 1D, FIG. 1E, FIG. 1F, FIG. 1G, FIG. 1H, FIG. 1I, FIG. 1J, FIG. 1K, FIG. 1L, FIG. 1M, FIG. 1N, FIG. 1O, FIG. 1P, FIG. 1Q, FIG. 12A, FIG. 12B, FIG. 12C, FIG. 12D, FIG. 12E, FIG. 12F, FIG. 12G, FIG. 12H, FIG. 12I, FIG. 12J, FIG. 12K, FIG. 12L, FIG. 12M, FIG. 12N, FIG. 12O, FIG. 12P, FIG. 12Q, FIG. 13A, FIG. 13B, FIG. 13C, FIG. 14A, FIG. 14B, FIG. 14C, FIG. 14D, FIG. 14E, and FIG. 14F).

2) No prior art mention or disclose any landscape edging, having
interchangeable end frame supports 117b.
Therefore, the prior art of pet crate:
a) Can not provide a structure on which to mount and suspend interchangeable canopy-patio-balcony-windscreen-chair-awning-perch-tent-sled-stand-basket-hammock-and-bed 118
(See FIG. 1A, FIG. 1B, FIG. 1C, FIG. 1D, FIG. 1E, FIG. 1F, FIG. 1G, FIG. 1H, FIG. 1I, FIG. 1J, FIG. 1K, FIG. 1L, FIG. 1M, FIG. 1N, FIG. 1O, FIG. 1P, FIG. 1Q, FIG. 12A, FIG. 12B, FIG. 12C, FIG. 12D, FIG. 12E, FIG. 12F, FIG. 12G, FIG. 12H, FIG. 12I, FIG. 12J, FIG. 12K, FIG. 12L, FIG. 12M, FIG. 12N, FIG. 12O, FIG. 12P, FIG. 12Q, FIG. 13A, FIG. 13B, FIG. 13C, FIG. 14A, FIG. 14B, FIG. 14C, FIG. 14D, FIG. 14E, and FIG. 14F);
b) Can not collapse quickly for easy storage,
to provide easy portability
(See FIG. 16G);
c) Can not provide a mounting structure for interchangeable T-shaped straight frame connectors 122 and interchangeable T-shaped corner frame connectors 123,
to respectively be disposed in various configurations
(See FIG. 1A, FIG. 1B, FIG. 1C, FIG. 1D, FIG. 1E, FIG. 1F, FIG. 1G, FIG. 1H, FIG. 1I, FIG. 1J, FIG. 1K, FIG. 1L, FIG. 1M, FIG. 1N, FIG. 1O, FIG. 1P, FIG. 1Q, FIG. 12A, FIG. 12B, FIG. 12C, FIG. 12D, FIG. 12E, FIG. 12F, FIG. 12G, FIG. 12H, FIG. 12I, FIG. 12J, FIG. 12K, FIG. 12L, FIG. 12M, FIG. 12N, FIG. 12O, FIG. 12P, FIG. 12Q, FIG. 13A, FIG. 13B, FIG. 13C, FIG. 14A, FIG. 14B, FIG. 14C, FIG. 14D, FIG. 14E, and FIG. 14F);
d) Can not provide a structure on which to mount interchangeable canopy-patio-balcony-windscreen-chair-awning-perch-tent-sled-stand-basket-hammock-and-bed 118,
to respectively be disposed in various configurations
(See FIG. 1A, FIG. 1B, FIG. 1C, FIG. 1D, FIG. 1E, FIG. 1F, FIG. 1G, FIG. 1H, FIG. 1I, FIG. 1J, FIG. 1K, FIG. 1L, FIG. 1M, FIG. 1N, FIG. 1O, FIG. 1P, FIG. 1Q, FIG. 12A, FIG. 12B, FIG. 12C, FIG. 12D, FIG. 12E, FIG. 12F, FIG. 12G, FIG. 12H, FIG. 12I, FIG. 12J, FIG. 12K, FIG. 12L, FIG. 12M, FIG. 12N, FIG. 12O, FIG. 12P, FIG. 12Q, FIG. 13A, FIG. 13B, FIG. 13C, FIG. 14A, FIG. 14B, FIG. 14C, FIG. 14D, FIG. 14E, and FIG. 14F); and
e) Can not provide multiple configuration options when combined with interchangeable side frame supports 117a, interchangeable T-shaped straight frame connectors 122, interchangeable T-shaped corner frame connectors 123, interchangeable adjustable leg supports 124a, and interchangeable adjustable center-brace leg support 124b mounting on multi-pet-containing panel system 101,
to function as a pet canopy,
to function as a pet patio,
to function as a pet balcony,
to function as a pet hammock,
to function as a pet bed,
to function as a perch,
to function as an awning
in the direction of arrow 139e
(See FIG. 12E and FIG. 12F),
to function as a tent with storage,
to function as a chair,
to function as a crate stand,
to function as a sled
in the direction of arrow 139f
(See FIG. 12P),
to function as a roof with storage,
to function as a grooming platform,
to function as a multi-pet grooming table,
to function as a drying platform,
to function as a wind, sun, and weather block,
to function as a privacy screen, and
to function as an independent pet bed
(See FIG. 1A, FIG. 1B, FIG. 1C, FIG. 1D, FIG. 1E, FIG. 1F, FIG. 1G, FIG. 1H, FIG. 1I, FIG. 1J, FIG. 1K, FIG. 1L, FIG. 1M, FIG. 1N, FIG. 1O, FIG. 1P, FIG. 1Q, FIG. 12A, FIG. 12B, FIG. 12C, FIG.

12D, FIG. 12E, FIG. 12F, FIG. 12G, FIG. 12H, FIG. 12I, FIG. 12J, FIG. 12K, FIG. 12L, FIG. 12M, FIG. 12N, FIG. 12O, FIG. 12P, FIG. 12Q, FIG. 13A, FIG. 13B, FIG. 13C, FIG. 14A, FIG. 14B, FIG. 14C, FIG. 14D, FIG. 14E, and FIG. 14F).

3) No prior art mention or disclose any landscape edging, having
interchangeable canopy-patio-balcony-windscreen-chair-awning-perch-tent-sled-stand-basket-hammock-bed 118.
Therefore, the prior art of pet crate:
   a) Can not provide multiple mounting positions above multi-pet-containing panel system 101,
      to be oriented longitudinally, laterally, or obliquely in the directions of arrows 140a and 140b(See FIG. 14D, FIG. 14E, and FIG. 14F);
   b) Can not function as a pet balcony and patio,
      to provide multiple pet balcony mounting positions above multi-pet-containing panel system 101, in which to allow pets to sit, stand, play, rest, and sleep thereon
      (See FIG. 14D, FIG. 14E, and FIG. 14F);
   c) Can not function as a pet hammock and bed,
      to be slung front-to-back or right-to-left, to allow pets to rest inside or above multi-pet-containing panel system 101
      (See FIG. 14D, FIG. 14E, and FIG. 14F);
   d) Can not function as a multiple position pet bed, to allow pets to rest inside or outside multi-pet-containing panel system 101
      (See FIG. 14D, FIG. 14E, and FIG. 14F);
   e) Can not function as a multiple position grooming platform, to provide a platform for a pet to stand, sit, or lay for grooming
      (See FIG. 14D, FIG. 14E, and FIG. 14F).

4) No prior art mention or disclose any landscape edging, having
interchangeable canopy-patio-balcony-windscreen-chair-awning-perch-tent-sled-stand-basket-hammock-bed 118.
Therefore, the prior art of pet crate:
   a) Can not function as a multiple position drying platform,
      to provide a clean, comfortable, waterproof platform on which to dry a pet following a washing
      (See FIG. 14D, FIG. 14E, and FIG. 14F);
   b) Can not function as a multiple-position wind, sun, and weather block, to provide a vertical side-shield from the sun and other weather elements
      (See FIG. 12C and FIG. 12D);
   c) Can not function as a privacy screen,
      to provide a vertical side-shield for privacy from other pets, noise, and distractions.
      (See FIG. 12C and FIG. 12D);
   d) Can not function as a chair,
      to provide a place to rest
      (See FIG. 12G and FIG. 12H).

5) No prior art mention or disclose any landscape edging, having
interchangeable canopy-patio-balcony-windscreen-chair-awning-perch-tent-sled-stand-basket-hammock-bed 118.
Therefore, the prior art of pet crate:
   a) Can not function as an awning,
      to provide shade to pets
      in the direction of arrow 139e
      (See FIG. 12E and FIG. 12F);
   b) Can not function as a perch,
      to provide multiple resting locations for pets
      (See FIG. 12I and FIG. 12J);
   c) Can not function as a tent,
      to provide shade to pets
      (See FIG. 12K and FIG. 12L); and
   d) Can not function as a multi-pet grooming table,
      to groom multiple pets simultaneously
      (See FIG. 12N).

6) No prior art mention or disclose any landscape edging, having
waterproof toilets 119.
Therefore, the prior art of pet crate:
   a) Can not provide openings,
      to conveniently sweep hair, dirt, food crumbs, and feces therein
      (See FIG. 1R, FIG. 1S, and FIG. 2A);
   b) Can not provide air-flow openings,
      to allow greater air circulation, reducing stagnation and odor.

7) No prior art mention or disclose any landscape edging, having
tick-blocking water-draining wire-clamping cap 128.
Therefore, the prior art of pet crate:
   a) Can not plug the end of interchangeable adjustable leg supports 124a; and
   b) Can not clamp on top panel 103a to allow interchangeable canopy-patio-balcony windscreen-chair-awning-perch-tent-sled-stand-basket-hammock-and-bed 118
      to function as a pet canopy, a pet patio, a pet balcony, a windscreen, a chair, an awning, a perch, a pet tent, a sled, a basket, a pet hammock, and a pet bed.

8) No prior art mention or disclose any landscape edging, having
tick-blocking teeth 129.
Therefore, the prior art of pet crate:
   a) Can not prevent ticks from entering interchangeable adjustable leg supports 124a and interchangeable adjustable center-brace leg support 124b,
      to prevent ticks from hiding therein
      in the direction of arrow 141
      (See FIG. 15A);
   b) Can not prevent ticks from hiding inside of tick-blocking water-draining wire-clamping cap 128,
      to protect pets from tick diseases
      (See FIG. 15A); and
   c) Can not allow water and condensation to drip downward
      to prevent rusting
      in the directions of arrows 142 and 143
      (See FIG. 15B).

9) No prior art mention or disclose any landscape edging, having gusset walls 132.
Therefore, the prior art of pet crate:
   a) Can not strengthen top, bottom, left, right, front, and rear panels 103a, 103b, 103c, 103d, 103e, and 103f;
   b) Can not strengthen multi-pet-containing panel system 101; and
   c) Can not lock top, bottom, left, right, front, and rear panels 103a, 103b, 103c, 103d, 103e, and 103f together.

10) No prior art mention or disclose any landscape edging, having
curved gusset springs 134*a*, 134*b*, and 134*c*.
Therefore, the prior art of pet crate:
   a) Can not resist the warping forces exerted on top, bottom, left, right, front, and rear panels 103*a*, 103*b*, 103*c*, 103*d*, 103*e*, and 103*f*;
   b) Can not resist the twisting forces exerted on top, bottom, left, right, front, and rear panels 103*a*, 103*b*, 103*c*, 103*d*, 103*e*, and 103*f*;
   c) Can not resist the bending forces exerted on top, bottom, left, right, front, and rear panels 103*a*, 103*b*, 103*c*, 103*d*, 103*e*, and 103*f*;
   d) Can not resist the sliding forces exerted on top, bottom, left, right, front, and rear panels 103*a*, 103*b*, 103*c*, 103*d*, 103*e*, and 103*f*;
   e) Can not resist the wobbling forces exerted on top, bottom, left, right, front, and rear panels 103*a*, 103*b*, 103*c*, 103*d*, 103*e*, and 103*f*.

11) No prior art mention or disclose any landscape edging, having curved gusset springs 134*a*, 134*b*, and 134*c*.
Therefore, the prior art of pet crate:
   a) Can not resist the folding forces exerted on top, bottom, left, right, front, and rear panels 103*a*, 103*b*, 103*c*, 103*d*, 103*e*, and 103*f*;
   b) Can not strengthen vertical gusset spring 135;
   c) Can not strengthen horizontal gusset spring 136; and
   d) Can not return multi-function tray-locking shock-absorbing gusset system 131 back to its former shape and dimensions in the directions of arrows 145*a*, 145*b*, and 145*c*
      (See FIG. 16A, FIG. 16B, FIG. 16C, FIG. 16D, FIG. 16E, and FIG. 16F).

12) No prior art mention or disclose any landscape edging, having
vertical gusset spring 135.
Therefore, the prior art of pet crate:
   a) Can not resist the warping forces exerted on top, bottom, left, right, front, and rear panels 103*a*, 103*b*, 103*c*, 103*d*, 103*e*, and 103*f*;
   b) Can not resist the twisting forces exerted on top, bottom, left, right, front, and rear panels 103*a*, 103*b*, 103*c*, 103*d*, 103*e*, and 103*f*;
   c) Can not resist the bending forces exerted on top, bottom, left, right, front, and rear panels 103*a*, 103*b*, 103*c*, 103*d*, 103*e*, and 103*f*;
   d) Can not resist the sliding forces exerted on top, bottom, left, right, front, and rear panels 103*a*, 103*b*, 103*c*, 103*d*, 103*e*, and 103*f*;
   e) Can not resist the wobbling forces exerted on top, bottom, left, right, front, and rear panels 103*a*, 103*b*, 103*c*, 103*d*, 103*e*, and 103*f*.

13) No prior art mention or disclose any landscape edging, having vertical gusset spring 135.
Therefore, the prior art of pet crate:
   a) Can not resist the folding forces exerted on top, bottom, left, right, front, and rear panels 103*a*, 103*b*, 103*c*, 103*d*, 103*e*, and 103*f*;
   b) Can not strengthen curved gusset springs 134*a*, 134*b*, and 134*c*;
   c) Can not strengthen horizontal gusset spring 136; and
   d) Can not return multi-function tray-locking shock-absorbing gusset system 131 back to its former shape and dimensions in the directions of arrows 145*a*, 145*b*, and 145*c*
      (See FIG. 16A, FIG. 16B, FIG. 16C, FIG. 16D, FIG. 16E, and FIG. 16F).

14) No prior art mention or disclose any landscape edging, having
horizontal gusset spring 136.
Therefore, the prior art of pet crate:
   a) Can not resist the warping forces exerted on top, bottom, left, right, front, and rear panels 103*a*, 103*b*, 103*c*, 103*d*, 103*e*, and 103*f*;
   b) Can not resist the twisting forces exerted on top, bottom, left, right, front, and rear panels 103*a*, 103*b*, 103*c*, 103*d*, 103*e*, and 103*f*;
   c) Can not resist the bending forces exerted on top, bottom, left, right, front, and rear panels 103*a*, 103*b*, 103*c*, 103*d*, 103*e*, and 103*f*;
   d) Can not resist the sliding forces exerted on top, bottom, left, right, front, and rear panels 103*a*, 103*b*, 103*c*, 103*d*, 103*e*, and 103*f*;
   e) Can not resist the wobbling forces exerted on top, bottom, left, right, front, and rear panels 103*a*, 103*b*, 103*c*, 103*d*, 103*e*, and 103*f*.

15) No prior art mention or disclose any landscape edging, having
horizontal gusset spring 136.
Therefore, the prior art of pet crate:
   a) Can not resist the folding forces exerted on top, bottom, left, right, front, and rear panels 103*a*, 103*b*, 103*c*, 103*d*, 103*e*, and 103*f*;
   b) Can not strengthen curved gusset springs 134*a*, 134*b*, and 134*c*;
   c) Can not strengthen horizontal gusset spring 136; and
   d) Can not return multi-function tray-locking shock-absorbing gusset system 131 back to its former shape and dimensions
      in the directions of arrows 145*a*, 145*b*, and 145*c*
      (See FIG. 16A, FIG. 16B, FIG. 16C, FIG. 16D, FIG. 16E, and FIG. 16F).

16) No prior art mention or disclose any landscape edging, having
tray-locking shock-absorbing gusset spring 137.
Therefore, the prior art of pet crate:
   a) Can not lock urine-waste-water-storing tray 108 in place
      (See FIG. 11A, FIG. 11B, FIG. 11C, FIG. and 11D);
   b) Can not prevent all eight corners of multi-pet-containing panel system 101 from scratching walls, floors, and furniture
      (See FIG. 7 and FIG. 9);
   c) Can not prevent all eight corners of multi-pet-containing panel system 101 from causing injuries to people and pets
      (See FIG. 7 and FIG. 9);
   d) Can not absorb shocks exerted on multi-pet-containing panel system 101,
      to provide pets with comfort while being stationary or transported;
   e) Can not absorb vibrations exerted on multi-pet-containing panel system 101,
      to provide pets with comfort while being stationary or transported.

17) No prior art mention or disclose any landscape edging, having
tray-locking shock-absorbing gusset spring 137.
Therefore, the prior art of pet crate:
   a) Can not resist the warping forces exerted on top, bottom, left, right, front, and rear panels 103*a*, 103*b*, 103*c*, 103*d*, 103*e*, and 103*f*;

b) Can not resist the twisting forces exerted on top, bottom, left, right, front, and rear panels 103*a*, 103*b*, 103*c*, 103*d*, 103*e*, and 103*f*;

c) Can not resist the bending forces exerted on top, bottom, left, right, front, and rear panels 103*a*, 103*b*, 103*c*, 103*d*, 103*e*, and 103*f*;

d) Can not resist the sliding forces exerted on top, bottom, left, right, front, and rear panels 103*a*, 103*b*, 103*c*, 103*d*, 103*e*, and 103*f*;

e) Can not resist the wobbling forces exerted on top, bottom, left, right, front, and rear panels 103*a*, 103*b*, 103*c*, 103*d*, 103*e*, and 103*f*.

18) No prior art mention or disclose any landscape edging, having
tray-locking shock-absorbing gusset spring 137.
Therefore, the prior art of pet crate:
a) Can not resist the folding forces exerted on top, bottom, left, right, front, and rear panels 103*a*, 103*b*, 103*c*, 103*d*, 103*e*, and 103*f*;
b) Can not strengthen curved gusset springs 134*a*, 134*b*, and 134*c*;
c) Can not strengthen vertical gusset spring 135;
d) Can not strengthen horizontal gusset spring 136; and
e) Can not return multi-function tray-locking shock-absorbing gusset system 131 back to its former shape and dimensions
in the directions of arrows 145*a*, 145*b*, and 145*c* (See FIG. 16A, FIG. 16B, FIG. 16C, FIG. 16D, FIG. 16E, and FIG. 16F).

OBJECTS AND ADVANTAGES OF THE INVENTION

The present invention substantially departs from the conventional concepts and designs of the prior art. In doing so, the present invention provides a twelve-device-in-one interchangeable-canopy-patio-balcony-windscreen-chair-awning-perch-tent-sled-stand-basket-hammock-bed pet crate (having: a) Multi-pet-containing panel system, b) Multi-pet multi-entrance door system, c) Interchangeable-canopy-patio-balcony-windscreen-chair-awning-perch-tent-sled-stand-basket-hammock-bed system, d) Tick-blocking water-draining wire-clamping cap systems, and e) Tray-locking shock-absorbing gusset systems), having many new and significant features, functions, and advantages, which overcome all the disadvantages of the prior art, as follows:

1) It is an object of the new invention to provide a twelve-device-in-one
interchangeable-canopy-patio-balcony-windscreen-chair-awning-perch-tent-sled-stand-basket-hammock-bed
pet crate, having
interchangeable side frame supports 117*a*.
Therefore, the twelve-device-in-one interchangeable-canopy-patio-balcony-windscreen-chair-awning-perch-tent-sled-stand-basket-hammock-bed pet crate:
a) Can provide a structure on which to mount and suspend interchangeable canopy-patio-balcony-windscreen-chair-awning-perch-tent-sled-stand-basket-hammock-and-bed 118
(See FIG. 1A, FIG. 1B, FIG. 1C, FIG. 1D, FIG. 1E, FIG. 1F, FIG. 1G, FIG. 1H, FIG. 1I, FIG. 1J, FIG. 1K, FIG. 1L, FIG. 1M, FIG. 1N, FIG. 1O, FIG. 1P, FIG. 1Q, FIG. 12A, FIG. 12B, FIG. 12C, FIG. 12D, FIG. 12E, FIG. 12F, FIG. 12G, FIG. 12H, FIG. 12I, FIG. 12J, FIG. 12K, FIG. 12L, FIG. 12M, FIG. 12N, FIG. 12O, FIG. 12P, FIG. 12Q, FIG. 13A, FIG. 13B, FIG. 13C, FIG. 14A, FIG. 14B, FIG. 14C, FIG. 14D, FIG. 14E, and FIG. 14F);

b) Can collapse quickly for easy storage,
to provide easy portability
(See FIG. 16G);

c) Can provide a mounting structure for interchangeable T-shaped straight frame connectors 122 and interchangeable T-shaped corner frame connectors 123,
to respectively be disposed in various configurations
(See FIG. 1A, FIG. 1B, FIG. 1C, FIG. 1D, FIG. 1E, FIG. 1F, FIG. 1G, FIG. 1H, FIG. 1I, FIG. 1J, FIG. 1K, FIG. 1L, FIG. 1M, FIG. 1N, FIG. 1O, FIG. 1P, FIG. 1Q, FIG. 12A, FIG. 12B, FIG. 12C, FIG. 12D, FIG. 12E, FIG. 12F, FIG. 12G, FIG. 12H, FIG. 12I, FIG. 12J, FIG. 12K, FIG. 12L, FIG. 12M, FIG. 12N, FIG. 12O, FIG. 12P, FIG. 12Q, FIG. 13A, FIG. 13B, FIG. 13C, FIG. 14A, FIG. 14B, FIG. 14C, FIG. 14D, FIG. 14E, and FIG. 14F);

d) Can provide a structure on which to mount interchangeable canopy-patio-balcony-windscreen-chair-awning-perch-tent-sled-stand-basket-hammock-and-bed 118,
to respectively be disposed in various configurations
(See FIG. 1A, FIG. 1B, FIG. 1C, FIG. 1D, FIG. 1E, FIG. 1F, FIG. 1G, FIG. 1H, FIG. 1I, FIG. 1J, FIG. 1K, FIG. 1L, FIG. 1M, FIG. 1N, FIG. 1O, FIG. 1P, FIG. 1Q, FIG. 12A, FIG. 12B, FIG. 12C, FIG. 12D, FIG. 12E, FIG. 12F, FIG. 12G, FIG. 12H, FIG. 12I, FIG. 12J, FIG. 12K, FIG. 12L, FIG. 12M, FIG. 12N, FIG. 12O, FIG. 12P, FIG. 12Q, FIG. 13A, FIG. 13B, FIG. 13C, FIG. 14A, FIG. 14B, FIG. 14C, FIG. 14D, FIG. 14E, and FIG. 14F); and e) Can provide multiple configuration options when combined with interchangeable end frame supports 117*b*, interchangeable T-shaped straight frame connectors 122, interchangeable T-shaped corner frame connectors 123, interchangeable adjustable leg supports 124*a*, and interchangeable adjustable center-brace leg support 124*b* mounting on multi-pet-containing panel system 101,
to function as a pet canopy,
to function as a pet patio,
to function as a pet balcony,
to function as a pet hammock,
to function as a pet bed,
to function as a perch,
to function as an awning
in the direction of arrow 139*e*
(See FIG. 12E and FIG. 12F),
to function as a tent with storage,
to function as a chair,
to function as a crate stand,
to function as a sled
in the direction of arrow 139*f*
(See FIG. 12P),
to function as a roof with storage,
to function as a grooming platform,
to function as a multi-pet grooming table,
to function as a drying platform,
to function as a wind, sun, and weather block,
to function as a privacy screen, and
to function as an independent pet bed (See FIG. 1A, FIG. 1B, FIG. 1C, FIG. 1D, FIG. 1E, FIG. 1F, FIG. 1G, FIG. 1H, FIG. 1I, FIG. 1J, FIG. 1K, FIG. 1L, FIG. 1M, FIG. 1N, FIG. 1O, FIG. 1P, FIG. 1Q, FIG. 12A, FIG. 12B, FIG. 12C, FIG. 12D, FIG. 12E, FIG. 12F, FIG. 12G, FIG. 12H, FIG. 12I, FIG. 12J, FIG. 12K, FIG. 12L, FIG. 12M, FIG. 12N, FIG. 12O, FIG. 12P, FIG. 12Q, FIG. 13A, FIG. 13B, FIG. 13C, FIG. 14A, FIG. 14B, FIG. 14C, FIG. 14D, FIG. 14E, and FIG. 14F).

2) It is another object of the new invention to provide a twelve-device-in-one interchangeable-canopy-patio-balcony-windscreen-chair-awning-perch-tent-sled-stand-basket-hammock-bed pet crate, having interchangeable end frame supports 117*b*.

Therefore, the twelve-device-in-one interchangeable-canopy-patio-balcony-windscreen-chair-awning-perch-tent-sled-stand-basket-hammock-bed pet crate:

a) Can provide a structure on which to mount and suspend interchangeable canopy-patio-balcony-windscreen-chair-awning-perch-tent-sled-stand-basket-hammock-and-bed 118
(See FIG. 1A, FIG. 1B, FIG. 1C, FIG. 1D, FIG. 1E, FIG. 1F, FIG. 1G, FIG. 1H, FIG. 1I, FIG. 1J, FIG. 1K, FIG. 1L, FIG. 1M, FIG. 1N, FIG. 1O, FIG. 1P, FIG. 1Q, FIG. 12A, FIG. 12B, FIG. 12C, FIG. 12D, FIG. 12E, FIG. 12F, FIG. 12G, FIG. 12H, FIG. 12I, FIG. 12J, FIG. 12K, FIG. 12L, FIG. 12M, FIG. 12N, FIG. 12O, FIG. 12P, FIG. 12Q, FIG. 13A, FIG. 13B, FIG. 13C, FIG. 14A, FIG. 14B, FIG. 14C, FIG. 14D, FIG. 14E, and FIG. 14F);

b) Can collapse quickly for easy storage,
to provide easy portability
(See FIG. 16G);

c) Can provide a mounting structure for interchangeable T-shaped straight frame connectors 122 and interchangeable T-shaped corner frame connectors 123,
to respectively be disposed in various configurations
(See FIG. 1A, FIG. 1B, FIG. 1C, FIG. 1D, FIG. 1E, FIG. 1F, FIG. 1G, FIG. 1H, FIG. 1I, FIG. 1J, FIG. 1K, FIG. 1L, FIG. 1M, FIG. 1N, FIG. 1O, FIG. 1P, FIG. 1Q, FIG. 12A, FIG. 12B, FIG. 12C, FIG. 12D, FIG. 12E, FIG. 12F, FIG. 12G, FIG. 12H, FIG. 12I, FIG. 12J, FIG. 12K, FIG. 12L, FIG. 12M, FIG. 12N, FIG. 12O, FIG. 12P, FIG. 12Q, FIG. 13A, FIG. 13B, FIG. 13C, FIG. 14A, FIG. 14B, FIG. 14C, FIG. 14D, FIG. 14E, and FIG. 14F);

d) Can provide a structure on which to mount interchangeable canopy-patio-balcony-windscreen-chair-awning-perch-tent-sled-stand-basket-hammock-and-bed 118,
to respectively be disposed in various configurations
(See FIG. 1A, FIG. 1B, FIG. 1C, FIG. 1D, FIG. 1E, FIG. 1F, FIG. 1G, FIG. 1H, FIG. 1I, FIG. 1J, FIG. 1K, FIG. 1L, FIG. 1M, FIG. 1N, FIG. 1O, FIG. 1P, FIG. 1Q, FIG. 12A, FIG. 12B, FIG. 12C, FIG. 12D, FIG. 12E, FIG. 12F, FIG. 12G, FIG. 12H, FIG. 12I, FIG. 12J, FIG. 12K, FIG. 12L, FIG. 12M, FIG. 12N, FIG. 12O, FIG. 12P, FIG. 12Q, FIG. 13A, FIG. 13B, FIG. 13C, FIG. 14A, FIG. 14B, FIG. 14C, FIG. 14D, FIG. 14E, and FIG. 14F); and e) Can provide multiple configuration options when combined with interchangeable side frame supports 117*a*, interchangeable T-shaped straight frame connectors 122, interchangeable T-shaped corner frame connectors 123, interchangeable adjustable leg supports 124*a*, and interchangeable adjustable center-brace leg support 124*b* mounting on multi-pet-containing panel system 101,
to function as a pet canopy,
to function as a pet patio,
to function as a pet balcony,
to function as a pet hammock,
to function as a pet bed,
to function as a perch,
to function as an awning
in the direction of arrow 139*e*
(See FIG. 12E and FIG. 12F),
to function as a tent with storage,
to function as a chair,
to function as a crate stand,
to function as a sled
in the direction of arrow 139*f*
(See FIG. 12P),
to function as a roof with storage,
to function as a grooming platform,
to function as a multi-pet grooming table,
to function as a drying platform,
to function as a wind, sun, and weather block,
to function as a privacy screen, and
to function as an independent pet bed
(See FIG. 1A, FIG. 1B, FIG. 1C, FIG. 1D, FIG. 1E, FIG. 1F, FIG. 1G, FIG. 1H, FIG. 1I, FIG. 1J, FIG. 1K, FIG. 1L, FIG. 1M, FIG. 1N, FIG. 1O, FIG. 1P, FIG. 1Q, FIG. 12A, FIG. 12B, FIG. 12C, FIG. 12D, FIG. 12E, FIG. 12F, FIG. 12G, FIG. 12H, FIG. 12I, FIG. 12J, FIG. 12K, FIG. 12L, FIG. 12M, FIG. 12N, FIG. 12O, FIG. 12P, FIG. 12Q, FIG. 13A, FIG. 13B, FIG. 13C, FIG. 14A, FIG. 14B, FIG. 14C, FIG. 14D, FIG. 14E, and FIG. 14F).

3) It is still another object of the new invention to provide a twelve-device-in-one interchangeable-canopy-patio-balcony-windscreen-chair-awning-perch-tent-sled-stand-basket-hammock-bed pet crate, having interchangeable canopy-patio-balcony-windscreen-chair-awning-perch-tent-sled-stand-basket-hammock-bed 118.

Therefore, the twelve-device-in-one interchangeable-canopy-patio-balcony-windscreen-chair-awning-perch-tent-sled-stand-basket-hammock-bed pet crate:

a) Can provide multiple mounting positions above multi-pet-containing panel
system 101,
to be oriented longitudinally, laterally, or obliquely in the directions of arrows 140*a* and 140*b* (See FIG. 14D, FIG. 14E, and FIG. 14F);

b) Can function as a pet balcony and patio,
to provide multiple pet balcony mounting positions above multi-pet-containing panel system 101, in which to allow pets to sit, stand, play, rest, and sleep thereon
(See FIG. 14D, FIG. 14E, and FIG. 14F);

c) Can function as a pet hammock and bed,
to be slung front-to-back or right-to-left, to allow pets to rest inside or above multi-pet-containing panel system 101
(See FIG. 14D, FIG. 14E, and FIG. 14F);

d) Can function as a multiple position pet bed,
to allow pets to rest inside or outside multi-pet-containing panel system 101
(See FIG. 14D, FIG. 14E, and FIG. 14F);
e) Can function as a multiple position grooming platform,
to provide a platform for a pet to stand, sit, or lay for grooming
(See FIG. 14D, FIG. 14E, and FIG. 14F).
4) It is yet still another object of the new invention to provide a twelve-device-in-one interchangeable-canopy-patio-balcony-windscreen-chair-awning-perch-tent-sled-stand-basket-hammock-bed pet crate, having
interchangeable canopy-patio-balcony-windscreen-chair-awning-perch-tent-sled-stand-basket-hammock-bed 118.
Therefore, the twelve-device-in-one interchangeable-canopy-patio-balcony-windscreen-chair-awning-perch-tent-sled-stand-basket-hammock-bed pet crate:
a) Can function as a multiple position drying platform,
to provide a clean, comfortable, waterproof platform on which to dry a pet following a washing
(See FIG. 14D, FIG. 14E, and FIG. 14F);
b) Can function as a multiple-position wind, sun, and weather block,
to provide a vertical side-shield from the sun and other weather elements
(See FIG. 12C and FIG. 12D);
c) Can function as a privacy screen,
to provide a vertical side-shield for privacy from other pets, noise, and distractions.
(See FIG. 12C and FIG. 12D);
d) Can function as a chair,
to provide a place to rest
(See FIG. 12G and FIG. 12H).
5) It is a further object of the new invention to provide a twelve-device-in-one interchangeable-canopy-patio-balcony-windscreen-chair-awning-perch-tent-sled-stand-basket-hammock-bed pet crate, having
interchangeable canopy-patio-balcony-windscreen-chair-awning-perch-tent-sled-stand-basket-hammock-bed 118.
Therefore, the twelve-device-in-one interchangeable-canopy-patio-balcony-windscreen-chair-awning-perch-tent-sled-stand-basket-hammock-bed pet crate:
a) Can function as an awning,
to provide shade to pets
in the direction of arrow 139e
(See FIG. 12E and FIG. 12F);
b) Can function as a perch,
to provide multiple resting locations for pets
(See FIG. 12I and FIG. 12J);
c) Can function as a tent,
to provide shade to pets
(See FIG. 12K and FIG. 12L); and
d) Can function as a multi-pet grooming table,
to groom multiple pets simultaneously
(See FIG. 12N).
6) It is an even further object of the new invention to provide a twelve-device-in-one interchangeable-canopy-patio-balcony-windscreen-chair-awning-perch-tent-sled-stand-basket-hammock-bed pet crate, having
waterproof toilets 119.
Therefore, the twelve-device-in-one interchangeable-canopy-patio-balcony-windscreen-chair-awning-perch-tent-sled-stand-basket-hammock-bed pet crate:
a) Can provide openings,
to conveniently sweep hair, dirt, food crumbs, and feces therein (See FIG. 1R, FIG. 1S, and FIG. 2A);
b) Can provide air-flow openings,
to allow greater air circulation, reducing stagnation and odor.
7) It is still an even further object of the new invention to provide a twelve-device-in-one interchangeable-canopy-patio-balcony-windscreen-chair-awning-perch-tent-sled-stand-basket-hammock-bed pet crate, having
tick-blocking water-draining wire-clamping cap 128.
Therefore, the twelve-device-in-one interchangeable-canopy-patio-balcony-windscreen-chair-awning-perch-tent-sled-stand-basket-hammock-bed pet crate:
a) Can plug the end of interchangeable adjustable leg supports 124a; and
b) Can clamp on top panel 103a to allow interchangeable canopy-patio-balcony windscreen-chair-awning-perch-tent-sled-stand-basket-hammock-and-bed 118
to function as a pet canopy, a pet patio, a pet balcony, a windscreen, a chair, an awning, a perch, a pet tent, a sled, a basket, a pet hammock, and a pet bed.
8) It is yet still an even further object of the new invention to provide a twelve-device-in-one interchangeable-canopy-patio-balcony-windscreen-chair-awning-perch-tent-sled-stand-basket-hammock-bed pet crate, having
tick-blocking teeth 129.
Therefore, the twelve-device-in-one interchangeable-canopy-patio-balcony-windscreen-chair-awning-perch-tent-sled-stand-basket-hammock-bed pet crate:
a) Can prevent ticks from entering interchangeable adjustable leg supports 124a and interchangeable adjustable center-brace leg support 124b,
to prevent ticks from hiding therein
in the direction of arrow 141
(See FIG. 15A);
b) Can prevent ticks from hiding inside of tick-blocking water-draining wire-clamping cap 128,
to protect pets from tick diseases
(See FIG. 15A); and
c) Can allow water and condensation to drip downward
to prevent rusting
in the directions of arrows 142 and 143
(See FIG. 15B).
9) It is yet still an even further object of the new invention to provide a twelve-device-in-one interchangeable-canopy-patio-balcony-windscreen-chair-awning-perch-tent-sled-stand-basket-hammock-bed pet crate,
having
gusset walls 132.
Therefore, the twelve-device-in-one interchangeable-canopy-patio-balcony-windscreen-chair-awning-perch-tent-sled-stand-basket-hammock-bed pet crate:
a) Can strengthen top, bottom, left, right, front, and rear panels 103a, 103b, 103c, 103d, 103e, and 103f;
b) Can strengthen multi-pet-containing panel system 101; and
c) Can lock top, bottom, left, right, front, and rear panels 103a, 103b, 103c, 103d, 103e, and 103f together.
10) It is yet still an even further object of the new invention to provide a twelve-device-in-one interchangeable-canopy-patio-balcony-windscreen-chair-awning-perch-tent-sled-stand-basket-hammock-bed pet crate, having
curved gusset springs 134a, 134b, and 134c.

Therefore, the twelve-device-in-one interchangeable-canopy-patio-balcony-windscreen-chair-awning-perch-tent-sled-stand-basket-hammock-bed pet crate:
   a) Can resist the warping forces exerted on top, bottom, left, right, front, and rear panels 103a, 103b, 103c, 103d, 103e, and 103f;
   b) Can resist the twisting forces exerted on top, bottom, left, right, front, and rear panels 103a, 103b, 103c, 103d, 103e, and 103f;
   c) Can resist the bending forces exerted on top, bottom, left, right, front, and rear panels 103a, 103b, 103c, 103d, 103e, and 103f;
   d) Can resist the sliding forces exerted on top, bottom, left, right, front, and rear panels 103a, 103b, 103c, 103d, 103e, and 103f;
   e) Can resist the wobbling forces exerted on top, bottom, left, right, front, and rear panels 103a, 103b, 103c, 103d, 103e, and 103f.

11) It is yet still an even further object of the new invention to provide a twelve-device-in-one interchangeable-canopy-patio-balcony-windscreen-chair-awning-perch-tent-sled-stand-basket-hammock-bed pet crate, having curved gusset springs 134a, 134b, and 134c.
Therefore, the twelve-device-in-one interchangeable-canopy-patio-balcony-windscreen-chair-awning-perch-tent-sled-stand-basket-hammock-bed pet crate:
   a) Can resist the folding forces exerted on top, bottom, left, right, front, and rear panels 103a, 103b, 103c, 103d, 103e, and 103f;
   b) Can strengthen vertical gusset spring 135;
   c) Can strengthen horizontal gusset spring 136; and
   d) Can return multi-function tray-locking shock-absorbing gusset system 131 back to its former shape and dimensions in the directions of arrows 145a, 145b, and 145c
      (See FIG. 16A, FIG. 16B, FIG. 16C, FIG. 16D, FIG. 16E, and FIG. 16F).

12) It is yet still an even further object of the new invention to provide a twelve-device-in-one interchangeable-canopy-patio-balcony-windscreen-chair-awning-perch-tent-sled-stand-basket-hammock-bed pet crate, having vertical gusset spring 135.
Therefore, the twelve-device-in-one interchangeable-canopy-patio-balcony-windscreen-chair-awning-perch-tent-sled-stand-basket-hammock-bed pet crate:
   a) Can resist the warping forces exerted on top, bottom, left, right, front, and rear panels 103a, 103b, 103c, 103d, 103e, and 103f;
   b) Can resist the twisting forces exerted on top, bottom, left, right, front, and rear panels 103a, 103b, 103c, 103d, 103e, and 103f;
   c) Can resist the bending forces exerted on top, bottom, left, right, front, and rear panels 103a, 103b, 103c, 103d, 103e, and 103f;
   d) Can resist the sliding forces exerted on top, bottom, left, right, front, and rear panels 103a, 103b, 103c, 103d, 103e, and 103f;
   e) Can resist the wobbling forces exerted on top, bottom, left, right, front, and rear panels 103a, 103b, 103c, 103d, 103e, and 103f.

13) It is yet still an even further object of the new invention to provide a twelve-device-in-one interchangeable-canopy-patio-balcony-windscreen-chair-awning-perch-tent-sled-stand-basket-hammock-bed pet crate, having vertical gusset spring 135.
Therefore, the twelve-device-in-one interchangeable-canopy-patio-balcony-windscreen-chair-awning-perch-tent-sled-stand-basket-hammock-bed pet crate:
   a) Can resist the folding forces exerted on top, bottom, left, right, front, and rear panels 103a, 103b, 103c, 103d, 103e, and 103f;
   b) Can strengthen curved gusset springs 134a, 134b, and 134c;
   c) Can strengthen horizontal gusset spring 136; and
   d) Can return multi-function tray-locking shock-absorbing gusset system 131 back to its former shape and dimensions in the directions of arrows 145a, 145b, and 145c
      (See FIG. 16A, FIG. 16B, FIG. 16C, FIG. 16D, FIG. 16E, and FIG. 16F).

14) It is yet still an even further object of the new invention to provide a twelve-device-in-one interchangeable-canopy-patio-balcony-windscreen-chair-awning-perch-tent-sled-stand-basket-hammock-bed pet crate, having horizontal gusset spring 136.
Therefore, the twelve-device-in-one interchangeable-canopy-patio-balcony-windscreen-chair-awning-perch-tent-sled-stand-basket-hammock-bed pet crate:
   a) Can resist the warping forces exerted on top, bottom, left, right, front, and rear panels 103a, 103b, 103c, 103d, 103e, and 103f;
   b) Can resist the twisting forces exerted on top, bottom, left, right, front, and rear panels 103a, 103b, 103c, 103d, 103e, and 103f;
   c) Can resist the bending forces exerted on top, bottom, left, right, front, and rear panels 103a, 103b, 103c, 103d, 103e, and 103f;
   d) Can resist the sliding forces exerted on top, bottom, left, right, front, and rear panels 103a, 103b, 103c, 103d, 103e, and 103f;
   e) Can resist the wobbling forces exerted on top, bottom, left, right, front, and rear panels 103a, 103b, 103c, 103d, 103e, and 103f.

15) It is yet still an even further object of the new invention to provide a twelve-device-in-one interchangeable-canopy-patio-balcony-windscreen-chair-awning-perch-tent-sled-stand-basket-hammock-bed pet crate, having horizontal gusset spring 136.
Therefore, the twelve-device-in-one interchangeable-canopy-patio-balcony-windscreen-chair-awning-perch-tent-sled-stand-basket-hammock-bed pet crate:
   a) Can resist the folding forces exerted on top, bottom, left, right, front, and rear panels 103a, 103b, 103c, 103d, 103e, and 103f;
   b) Can strengthen curved gusset springs 134a, 134b, and 134c;
   c) Can strengthen horizontal gusset spring 136; and
   d) Can return multi-function tray-locking shock-absorbing gusset system 131 back to its former shape and dimensions in the directions of arrows 145a, 145b, and 145c
      (See FIG. 16A, FIG. 16B, FIG. 16C, FIG. 16D, FIG. 16E, and FIG. 16F).

16) It is yet still an even further object of the new invention to provide a twelve-device-in-one interchangeable-canopy-patio-balcony-windscreen-chair-awning-perch-tent-sled-stand-basket-hammock-bed pet crate, having tray-locking shock-absorbing gusset spring 137.
Therefore, the twelve-device-in-one interchangeable-canopy-patio-balcony-windscreen-chair-awning-perch-tent-sled-stand-basket-hammock-bed pet crate:
   a) Can lock urine-waste-water-storing tray 108 in place (See FIG. 11A, FIG. 11B, FIG. 11C, FIG. and 11D);
b) Can prevent all eight corners of multi-pet-containing panel system 101 from scratching walls, floors, and furniture
(See FIG. 7 and FIG. 9);
c) Can prevent all eight corners of multi-pet-containing panel system 101 from causing injuries to people and pets
(See FIG. 7 and FIG. 9);
d) Can absorb shocks exerted on multi-pet-containing panel system 101, to provide pets with comfort while being stationary or transported;
e) Can absorb vibrations exerted on multi-pet-containing panel system 101,
to provide pets with comfort while being stationary or transported.

17) It is yet still an even further object of the new invention to provide a twelve-device-in-one interchangeable-canopy-patio-balcony-windscreen-chair-awning-perch-tent-sled-stand-basket-hammock-bed pet crate, having tray-locking shock-absorbing gusset spring 137.

Therefore, the twelve-device-in-one interchangeable-canopy-patio-balcony-windscreen-chair-awning-perch-tent-sled-stand-basket-hammock-bed pet crate:
a) Can resist the warping forces exerted on top, bottom, left, right, front, and rear panels 103a, 103b, 103c, 103d, 103e, and 103f;
b) Can resist the twisting forces exerted on top, bottom, left, right, front, and rear panels 103a, 103b, 103c, 103d, 103e, and 103f;
c) Can resist the bending forces exerted on top, bottom, left, right, front, and rear panels 103a, 103b, 103c, 103d, 103e, and 103f;
d) Can resist the sliding forces exerted on top, bottom, left, right, front, and rear panels 103a, 103b, 103c, 103d, 103e, and 103f;
e) Can resist the wobbling forces exerted on top, bottom, left, right, front, and rear panels 103a, 103b, 103c, 103d, 103e, and 103f.

18) It is yet still an even further object of the new invention to provide a twelve-device-in-one interchangeable-canopy-patio-balcony-windscreen-chair-awning-perch-tent-sled-stand-basket-hammock-bed pet crate, having tray-locking shock-absorbing gusset spring 137.

Therefore, the twelve-device-in-one interchangeable-canopy-patio-balcony-windscreen-chair-awning-perch-tent-sled-stand-basket-hammock-bed pet crate:
a) Can resist the folding forces exerted on top, bottom, left, right, front, and rear panels 103a, 103b, 103c, 103d, 103e, and 103f;
b) Can strengthen curved gusset springs 134a, 134b, and 134c;
c) Can strengthen vertical gusset spring 135;
d) Can strengthen horizontal gusset spring 136; and
e) Can return multi-function tray-locking shock-absorbing gusset system 131 back to its former shape and dimensions in the directions of arrows 145a, 145b, and 145c
(See FIG. 16A, FIG. 16B, FIG. 16C, FIG. 16D, FIG. 16E, and FIG. 16F).

BRIEF SUMMARY OF THE INVENTION

A twelve-device-in-one interchangeable canopy-patio-balcony-windscreen-chair-awning-perch-tent-sled-stand-basket-hammock-bed pet crate comprises: top, bottom, left, right, front, and rear panels, panel-locking hooks and panel-coupling hooks and panel-folding clamp coupling the panels together, tray-and-bed-locking clamp, multi-pet crate divider and urine-waste-water-storing tray inserted inside the panels to create multiple pet-containing compartments, first and second multi-pet doors hinged to the twelve-device-in-one pet crate, interchangeable side frame supports, interchangeable end frame supports, interchangeable canopy-patio-balcony-windscreen-chair-awning-perch-tent-sled-stand-basket-hammock bed attached to the side and end frame supports, waterproof toilets sewn to the bed, interchangeable T-shaped straight frame connectors and interchangeable T-shaped corner frame connectors and interchangeable adjustable leg supports and interchangeable adjustable center-brace leg support attached to the bed to configure the bed into twelve different devices to function as a canopy, a patio, a balcony, a windscreen, a chair, an awning, a perch, a pet tent, a sled, a stand, a basket, a pet hammock, a multi-position pet bed, a grooming platform, a drying platform, and a privacy screen, tick-blocking water-draining wire-clamping cap attached to the leg supports, tick-blocking teeth and water-draining T-shaped hole formed into the cap to prevent ticks from entering inside and to allow water to drain out to prevent rust and internal corrosion, gusset walls and wire-locking gusset recesses and curved gusset springs and vertical gusset spring and horizontal gusset spring and tray-locking shock-absorbing gusset spring molded to one another to form a gusset and attached to the corners of the twelve-device-in-one pet crate to resist against warping, twisting, bending, sliding, wobbling, and folding forces to strengthen the twelve-device-in-one pet crate, to prevent the corners of the pet crate from injuring people and damaging walls and floors and furniture, and to absorb shocks and vibrations to protect and provide comfort to pets within the twelve-device-in-one pet crate.

BRIEF DESCRIPTION OF THE DRAWINGS

FIG. 1A and FIG. 1B illustrate front views of how interchangeable-canopy-patio-balcony-windscreen-chair-awning-perch-tent-sled-stand-basket-hammock-bed system is mounted atop multi-pet-containing panel system, and functions as a roof with storage.

FIG. 1E and FIG. 1F illustrate front views of how interchangeable-canopy-patio-balcony-windscreen-chair-awning-perch-tent-sled-stand-basket-hammock-bed system is mounted atop the multi-pet-containing panel system, and functions as an awning.

FIG. 1O illustrates a front view of how interchangeable-canopy-patio-balcony-windscreen-chair-awning-perch-tent-sled-stand-basket-hammock-bed system can be configured to function as a stand.

FIG. 1Q illustrates a front view of how interchangeable-canopy-patio-balcony-windscreen-chair-awning-perch-tent-sled-stand-basket-hammock-bed system is mounted atop multi-pet-containing panel system, and functions as a hammock.

FIG. 1R illustrates a perspective view of multi-pet-containing panel system.

FIG. 2B illustrates a left-side view of interchangeable-canopy-patio-balcony-windscreen-chair-awning-perch-tent-sled-stand-basket-hammock-bed system.

FIG. 2C illustrates a top view of interchangeable-canopy-patio-balcony-windscreen-chair-awning-perch-tent-sled-stand-basket-hammock-bed system.

FIG. 2D illustrates a left-side view of how interchangeable canopy-patio-balcony-windscreen-chair-awning-perch-tent-sled-stand-basket-hammock-bed attaches to interchangeable side and end frame supports.

FIG. 2F and FIG. 2G illustrate top views of interchangeable side and end frame supports, interchangeable T-shaped straight and corner frame connectors, and interchangeable canopy-patio-balcony-windscreen-chair-awning-perch-tent-sled-stand-basket-hammock-bed.

FIG. 3A, FIG. 3B, FIG. 3C, FIG. 3D, FIG. 3E, and FIG. 3F illustrate side, top, and left views of interchangeable canopy-patio-balcony-windscreen-chair-awning-perch-tent-sled-stand-basket-hammock-bed, waterproof toilets, bed Velcro strips, and left, right, front, and rear bed sleeves.

FIG. 4A, FIG. 4B, FIG. 4C, and FIG. 4D illustrate side and bottom views of tick-blocking water-draining wire-clamping cap system.

FIG. 5A and FIG. 5B illustrate perspective and front views of multi-pet crate divider.

FIG. 5C illustrates a front view of multi-pet crate divider installed within multi-pet containing panel system.

FIG. 8A, FIG. 8B, FIG. 8C, and FIG. 8D illustrate top, bottom, front, and rear views of tray-locking shock-absorbing gusset system.

FIG. 9 illustrates a front view of how to remove interchangeable-canopy-patio-balcony-windscreen-chair-awning-perch-tent-sled-stand-basket-hammock-bed system and urine-waste-water-storing tray.

FIG. 12A, FIG. 12B, FIG. 12C, FIG. 12D, FIG. 12E, FIG. 12F, FIG. 12G, FIG. 12H,

FIG. 12I, FIG. 12J, FIG. 12K, FIG. 12L, FIG. 12M, FIG. 12N, FIG. 12O, FIG. 12P, and FIG. 12Q illustrate perspective and front views of how interchangeable-canopy-patio-balcony-windscreen-chair-awning-perch-tent-sled-stand-basket-hammock-bed system can be configured differently.

FIG. 13A, FIG. 13B, and FIG. 13C illustrate front and perspective views of how interchangeable-canopy-patio-balcony-windscreen-chair-awning-perch-tent-sled-stand-basket-hammock-bed system and urine-waste-water-storing tray are mounted atop multi-pet-containing panel system.

FIG. 14A, FIG. 14B, FIG. 14C, FIG. 14D, FIG. 14E, and FIG. 14F illustrate top and side views of interchangeable-canopy-patio-balcony-windscreen-chair-awning-perch-tent-sled-stand-basket-hammock-bed system, having interchangeable adjustable leg supports, interchangeable adjustable center-brace leg support, and tick-blocking water-draining wire-clamping caps mounted in various positions and heights.

FIG. 15A and FIG. 15B illustrate cross-sectional views of how tick-blocking water-draining wire-clamping caps drain water, and block ticks from entering and adjustable leg supports.

FIG. 16A, FIG. 16B, FIG. 16C, FIG. 16D, FIG. 16E, and FIG. 16F illustrate top and side views of how tray-locking shock-absorbing gusset systems are mounted on multi-pet-containing panel system, and absorb shocks, in vertical, horizontal, and angled directions.

DETAILED DESCRIPTION OF THE INVENTION

Component

Figure 1C:
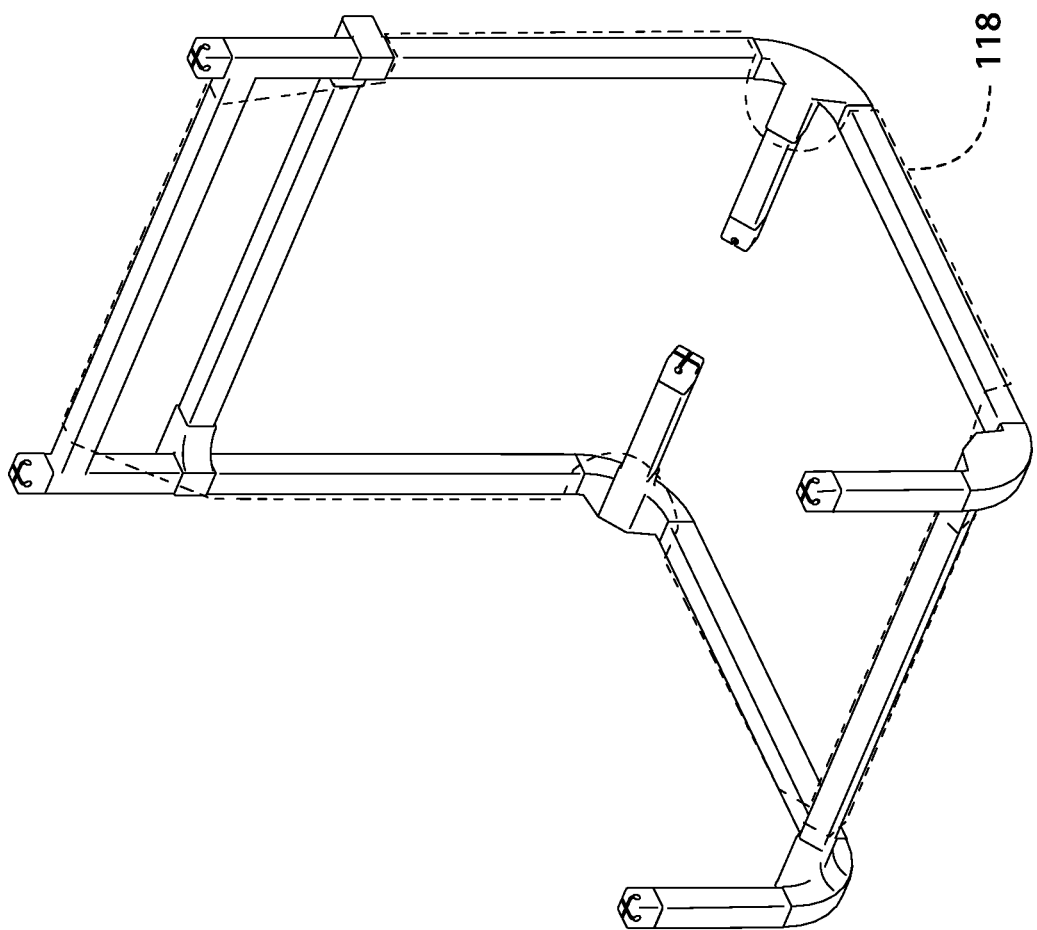
FIG. 1C and FIG. 1D illustrate perspective views of how interchangeable-canopy-patio-balcony-windscreen-chair-awning-perch-tent-sled-stand-basket-hammock-bed system can be configured to function as a privacy screen.
Figure 1D:
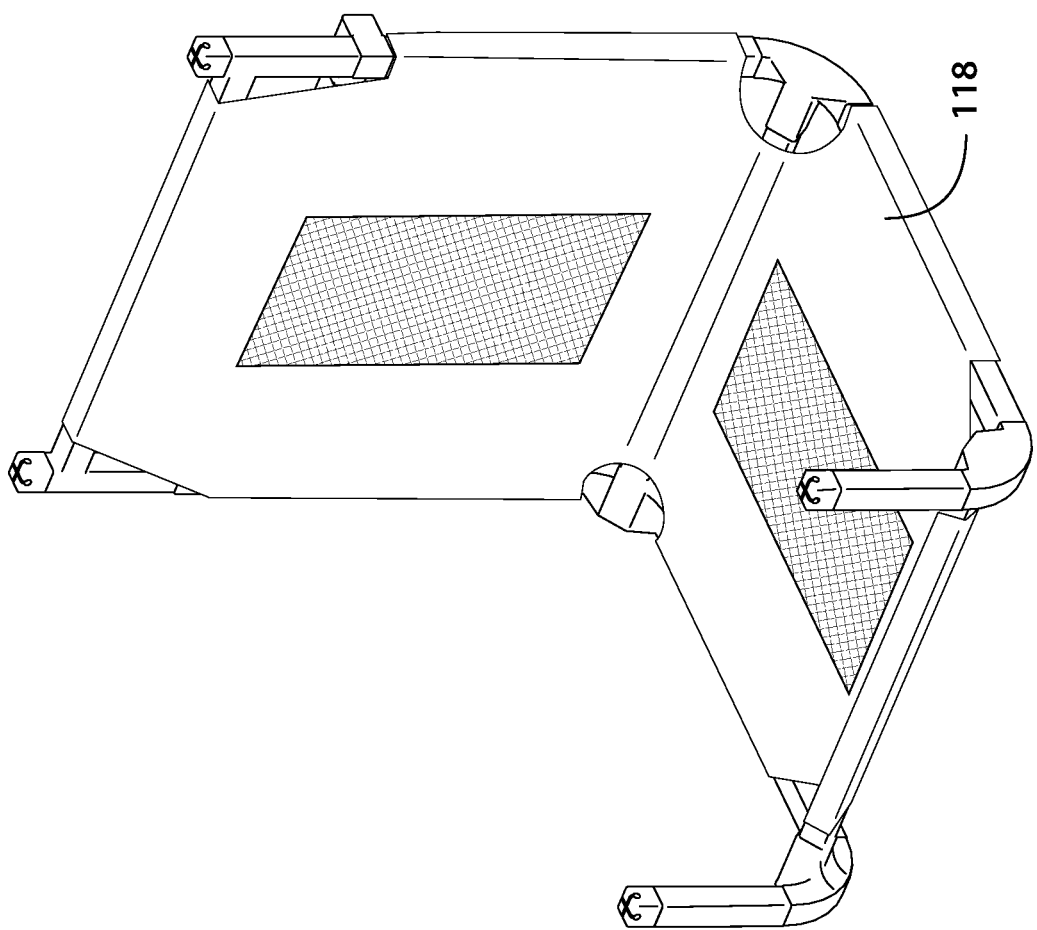
Figure 1E:
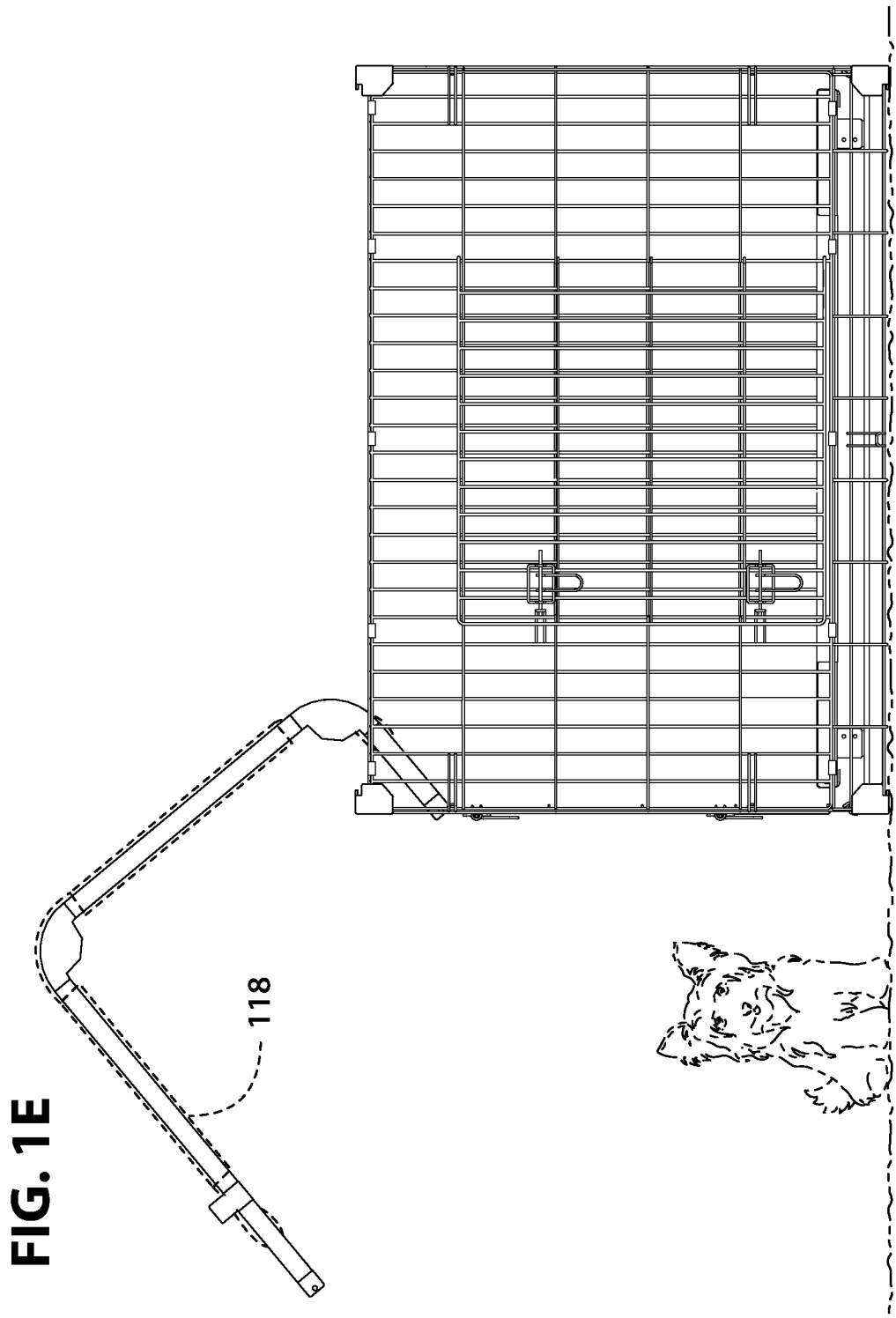
Figure 1G:
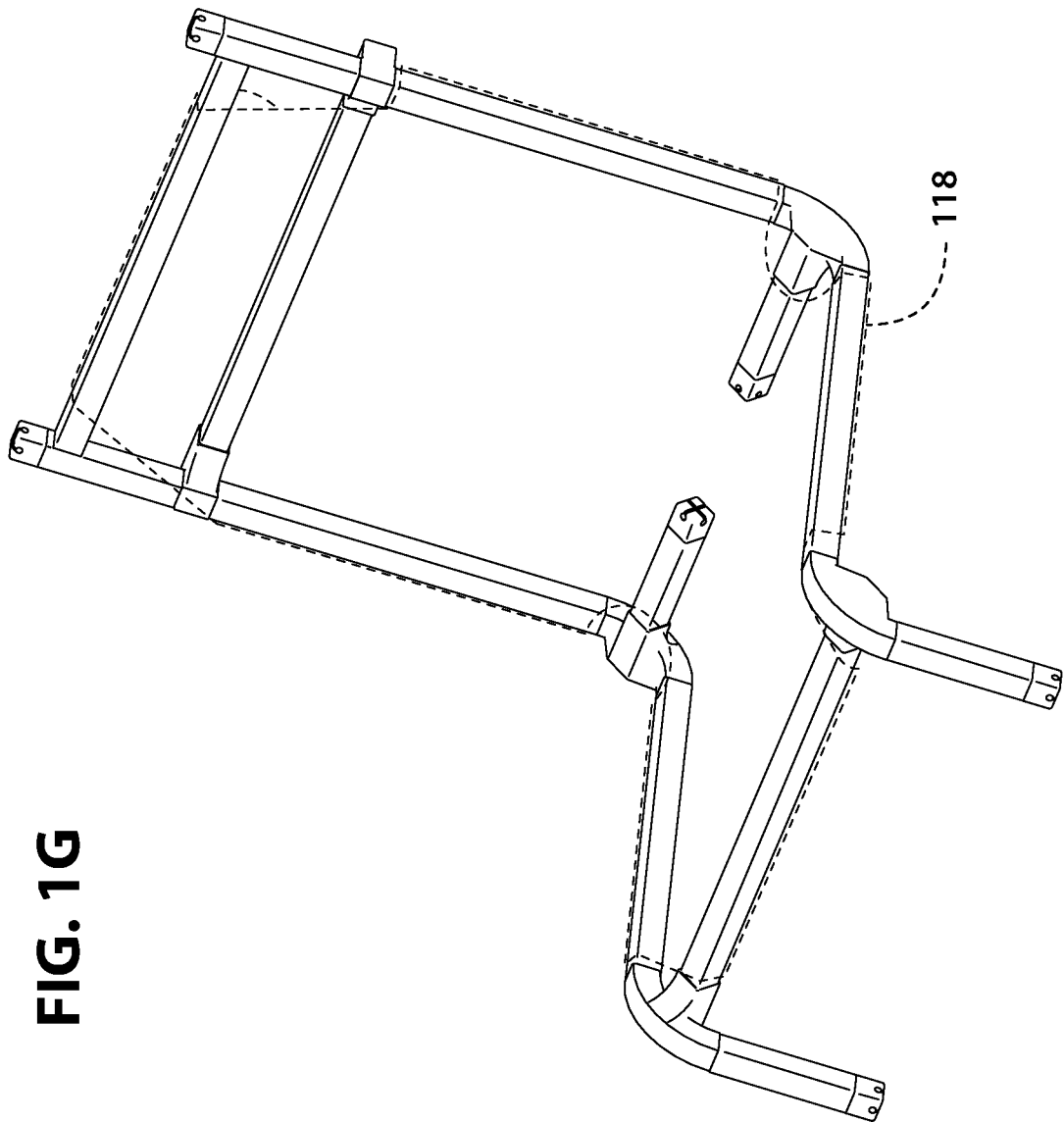
FIG. 1G and FIG. 1H illustrate perspective views of how interchangeable-canopy-patio-balcony-windscreen-chair-awning-perch-tent-sled-stand-basket-hammock-bed system 116 can be configured to function as a chair.
Figure 1H:
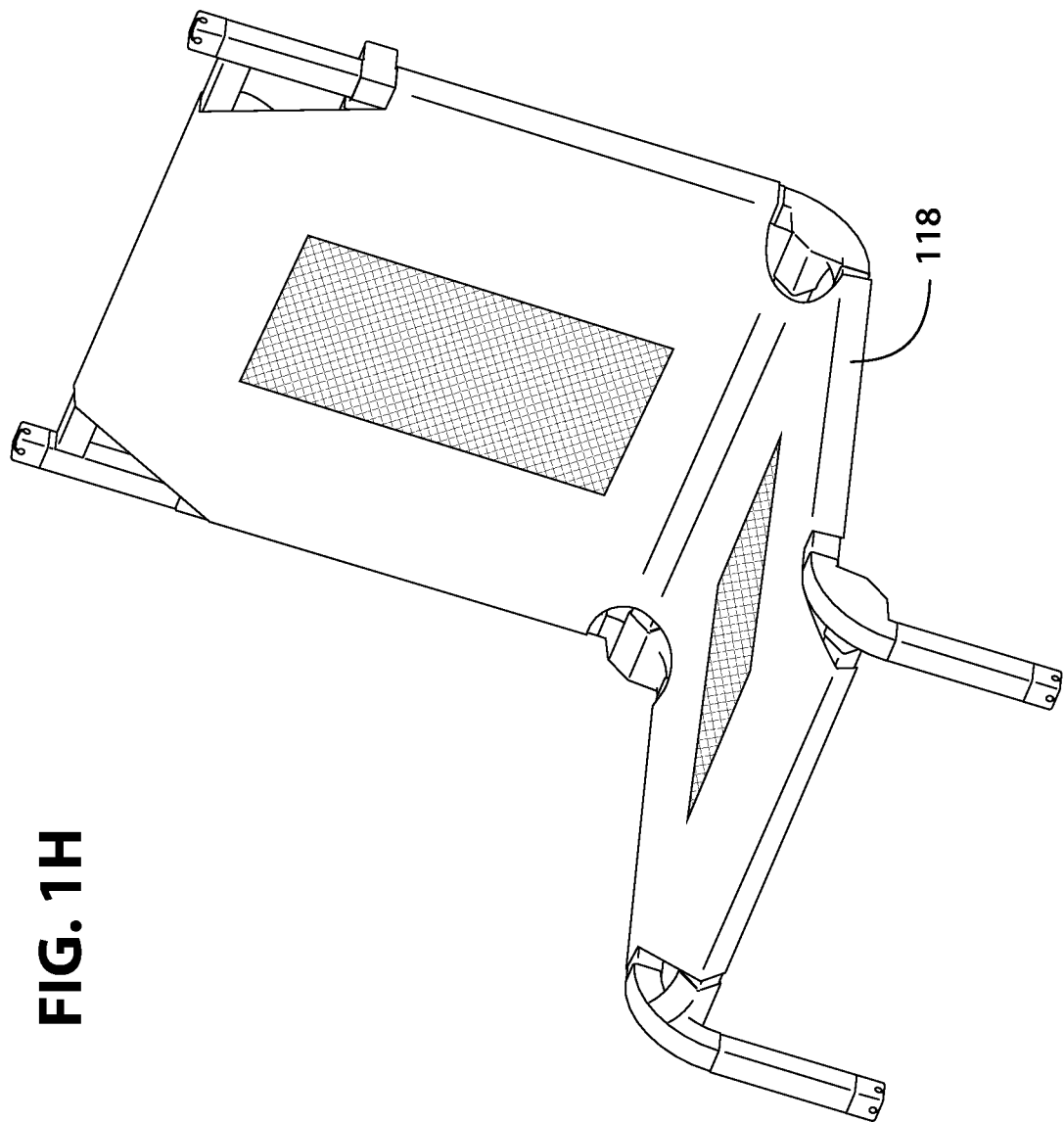
Figure 1I:
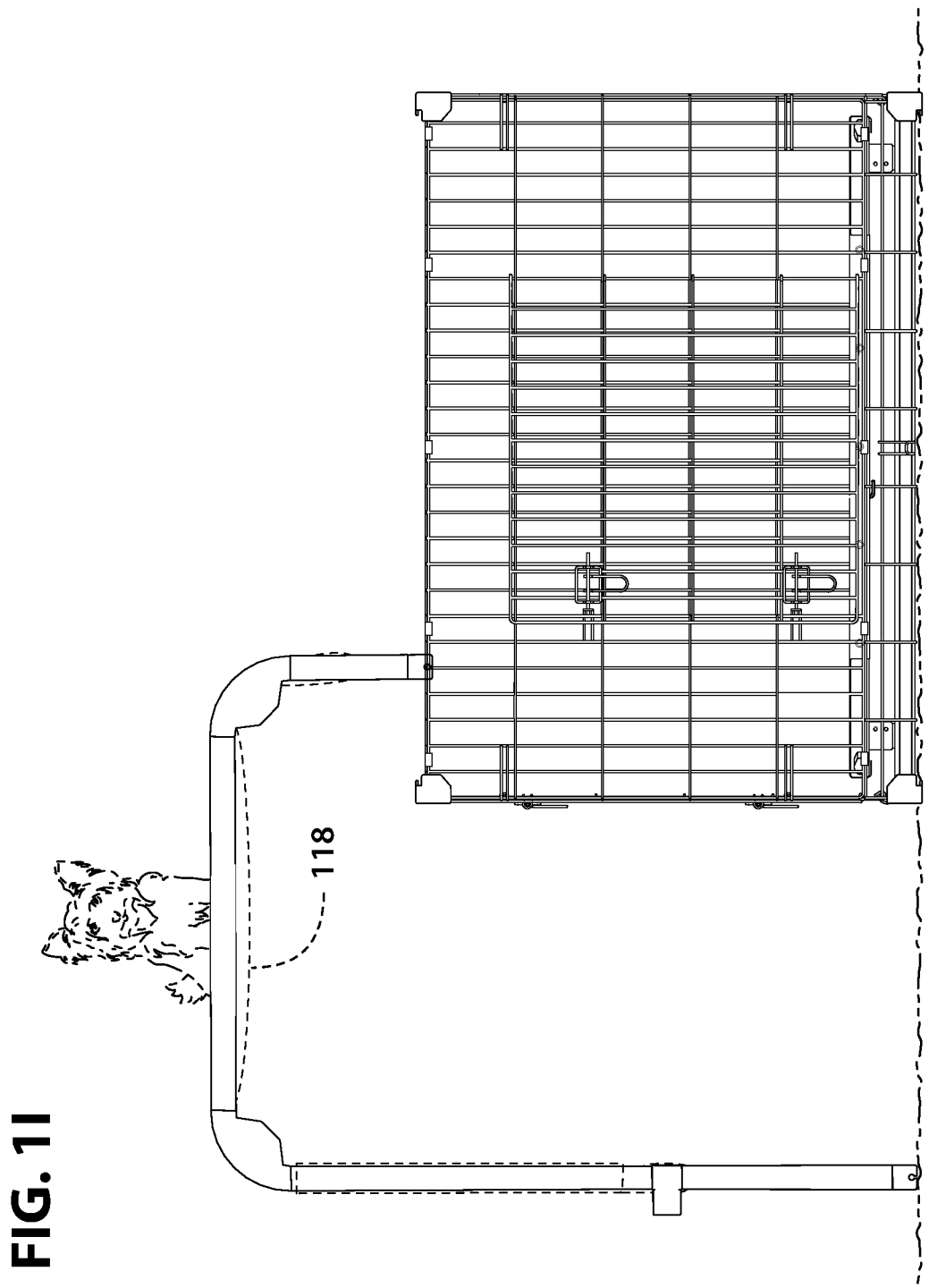
FIG. 1I and FIG. 1J illustrate front views of how interchangeable-canopy-patio-balcony-windscreen-chair-awning-perch-tent-sled-stand-basket-hammock-bed system is mounted atop multi-pet-containing panel system, and functions as a perch.
Figure 1J:
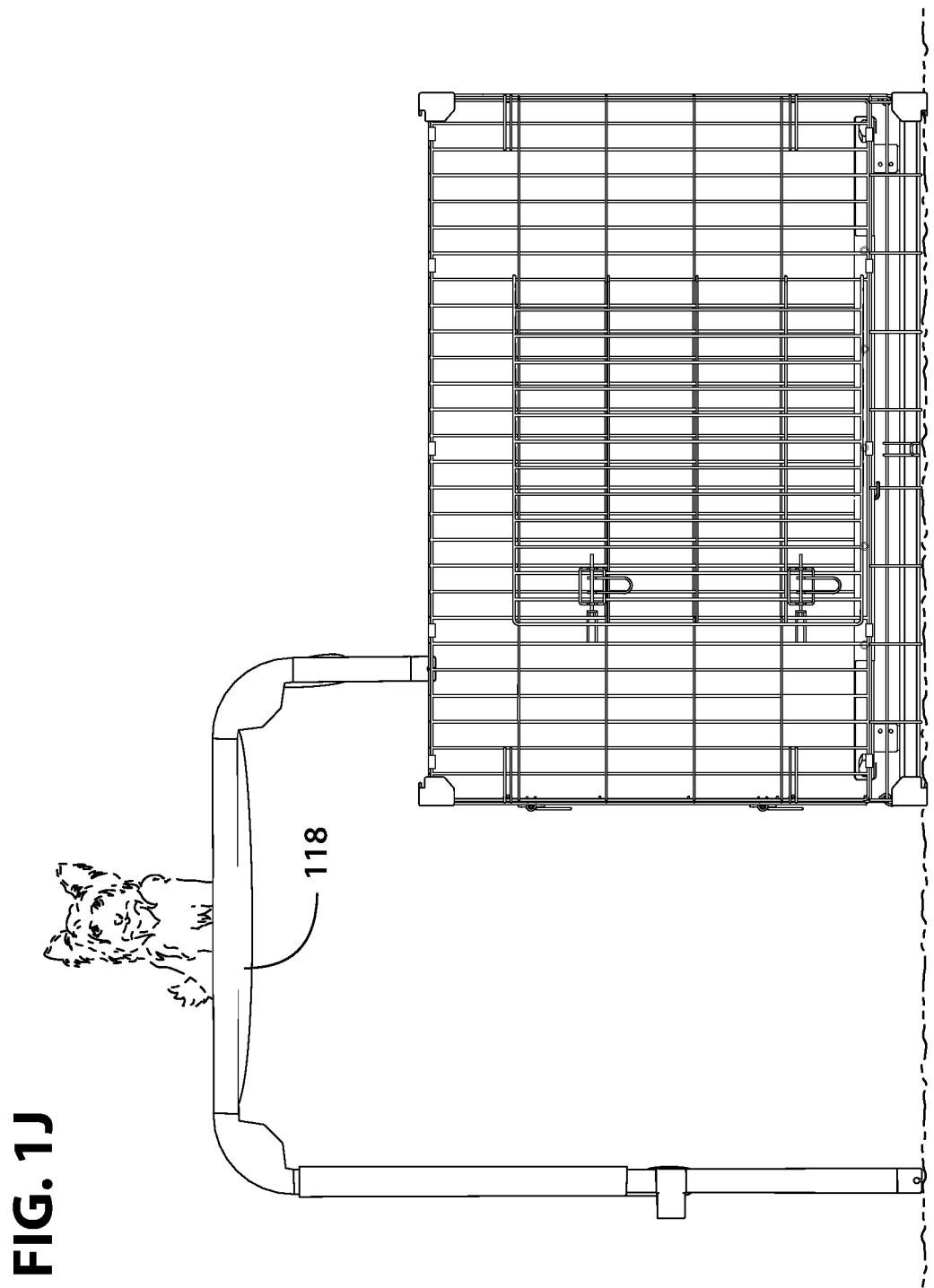
Figure 1K:
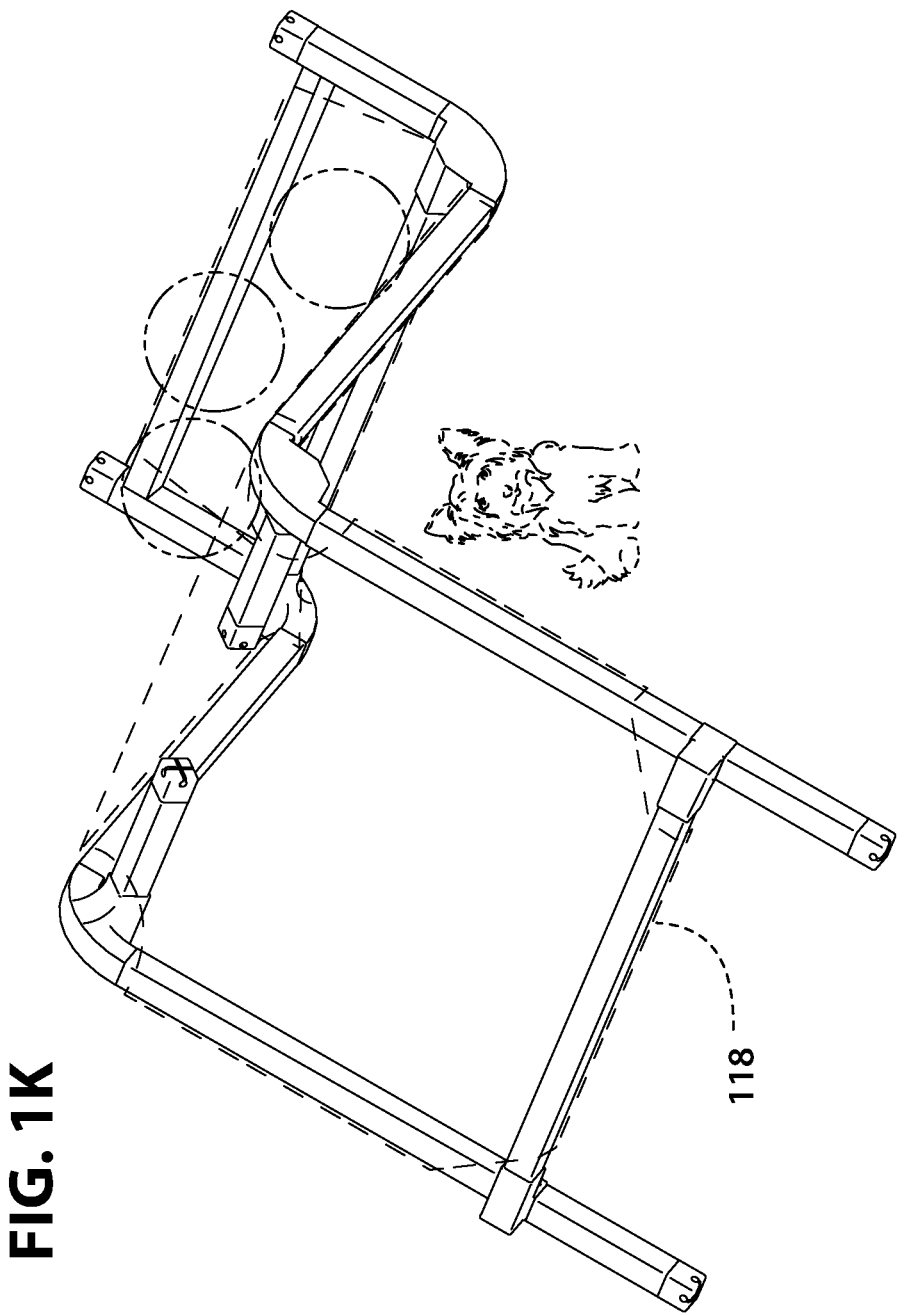
FIG. 1K and FIG. 1L illustrate perspective views of how interchangeable-canopy-patio-balcony-windscreen-chair-awning-perch-tent-sled-stand-basket-hammock-bed system can be configured to function as a tent with storage.
Figure 1L:
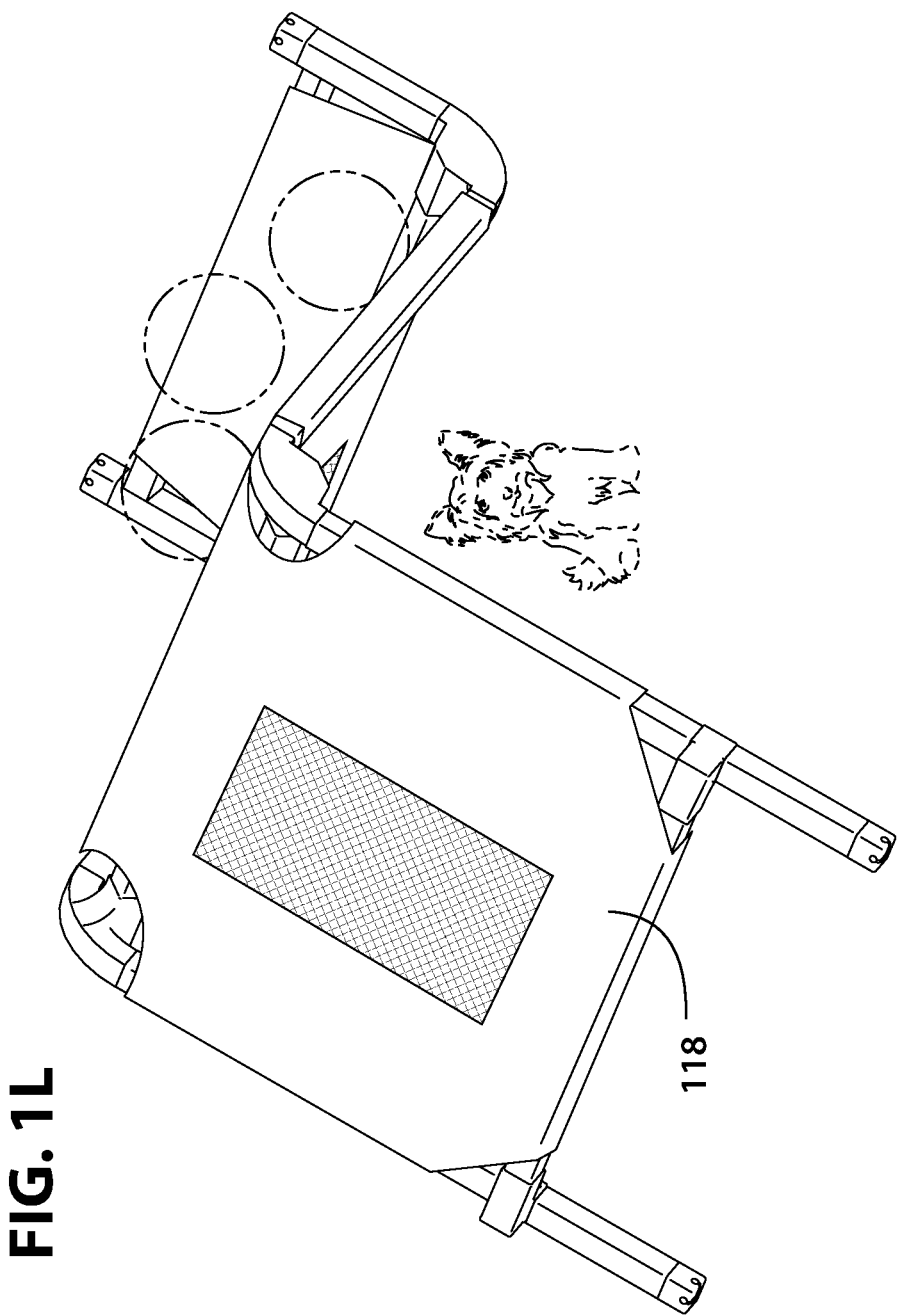
Figure 1M:
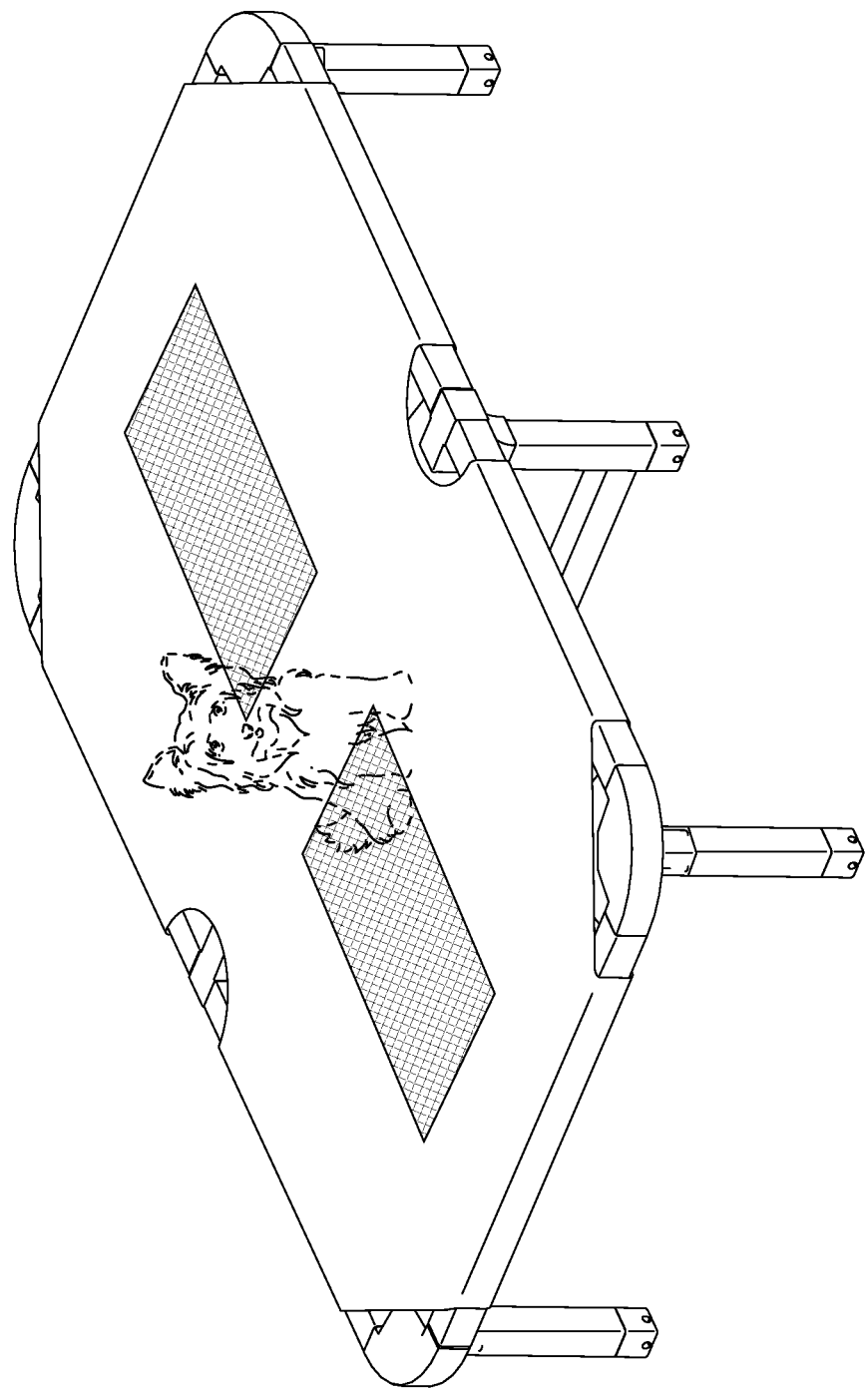
FIG. 1M illustrates a perspective view of how interchangeable-canopy-patio-balcony-windscreen-chair-awning-perch-tent-sled-stand-basket-hammock-bed system can be configured to function as a bed.
Figure 1N:
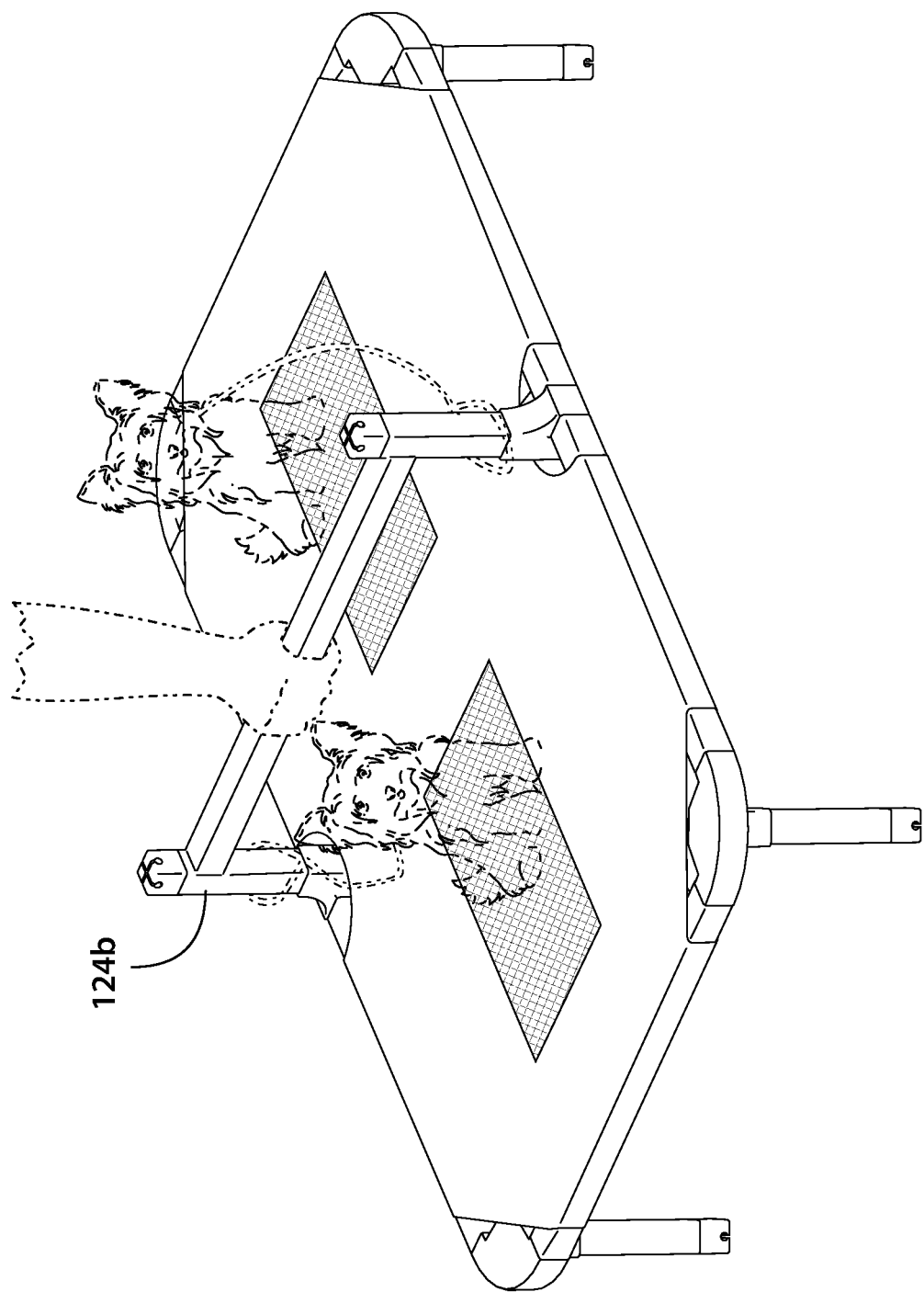
FIG. 1N illustrates a perspective view of how interchangeable-canopy-patio-balcony-windscreen-chair-awning-perch-tent-sled-stand-basket-hammock-bed system can be configured to function as a basket.
Figure 10:
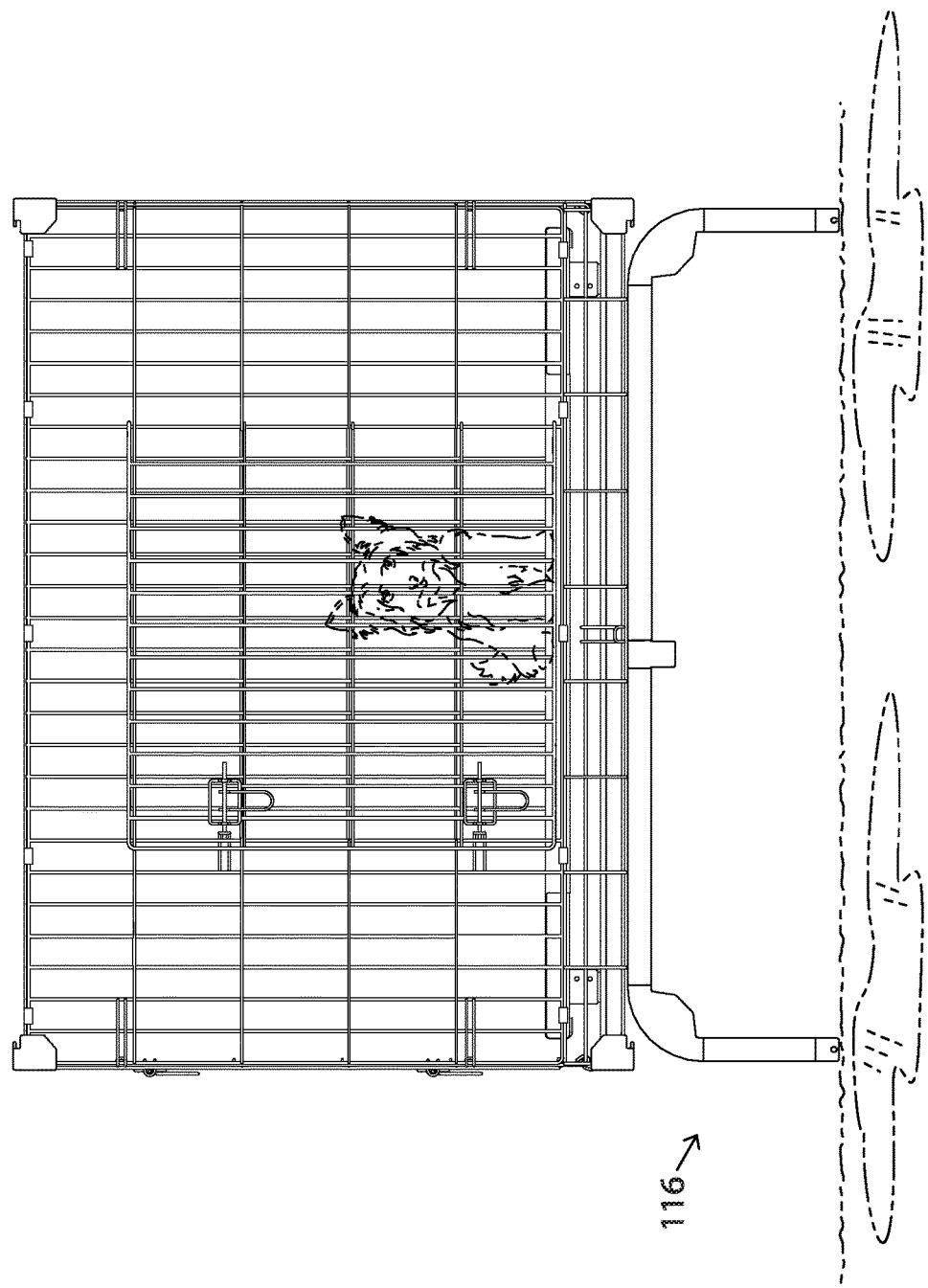
FIG. 10 illustrates a front view of how multi-pet crate divider divides multi-pet containing panel system into multiple pet compartments.
Figure 1P:
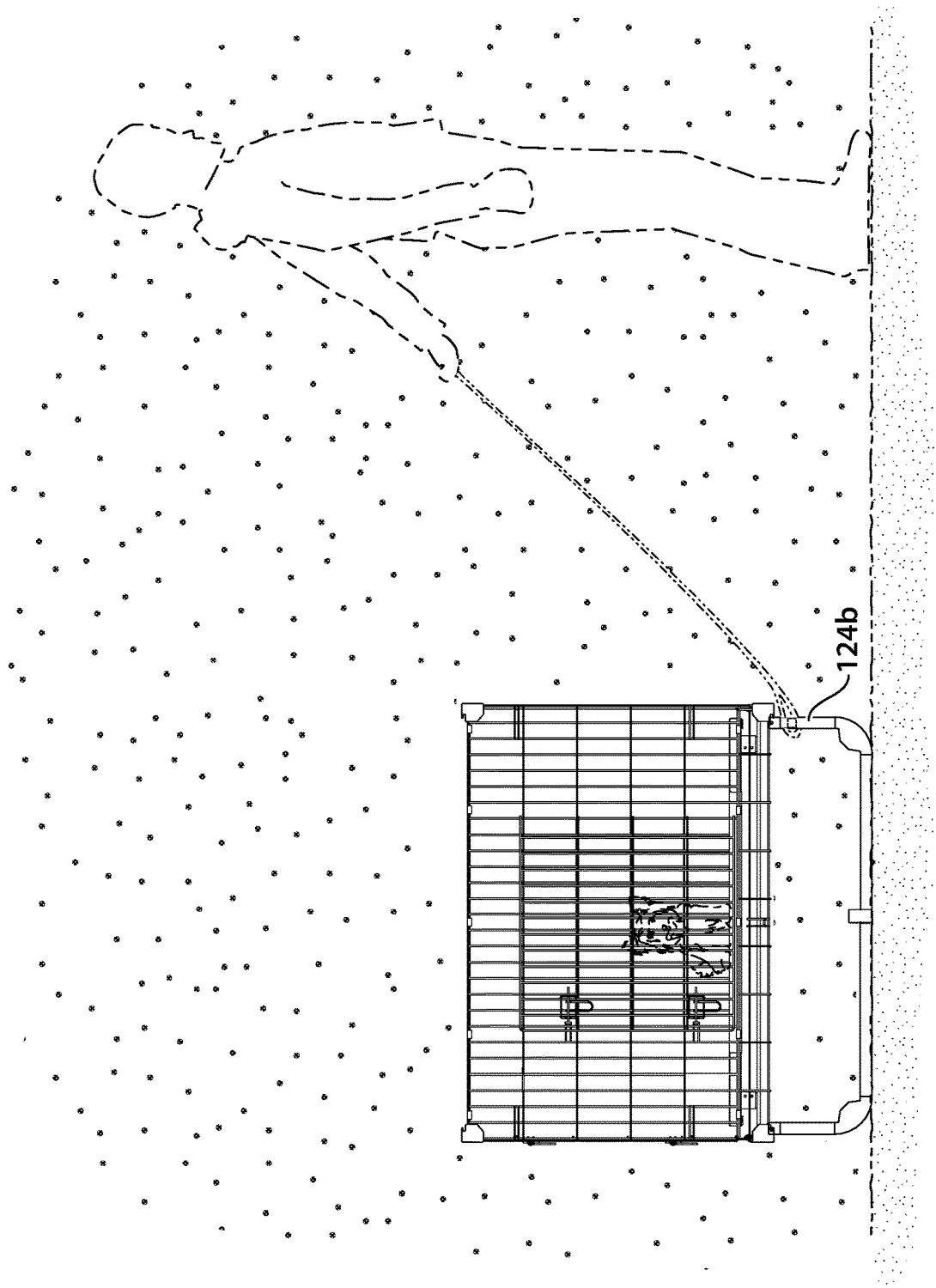
FIG. 1P illustrates a front view of how interchangeable-canopy-patio-balcony-windscreen-chair-awning-perch-tent-sled-stand-basket-hammock-bed system can be configured to function as a sled.
Figure 1S:
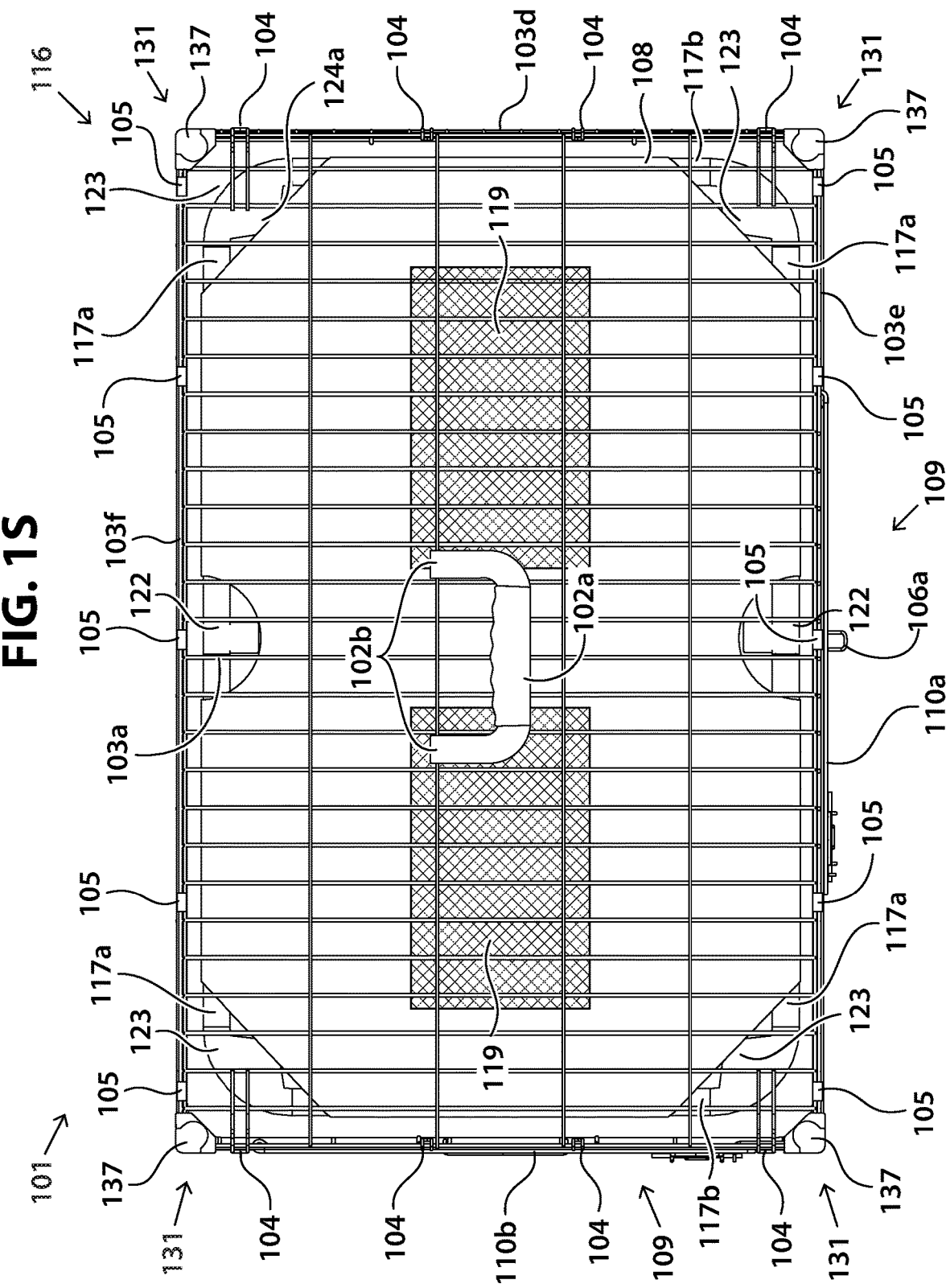
FIG. 1S illustrates a top view of multi-pet-containing panel system.
Figure 1T:
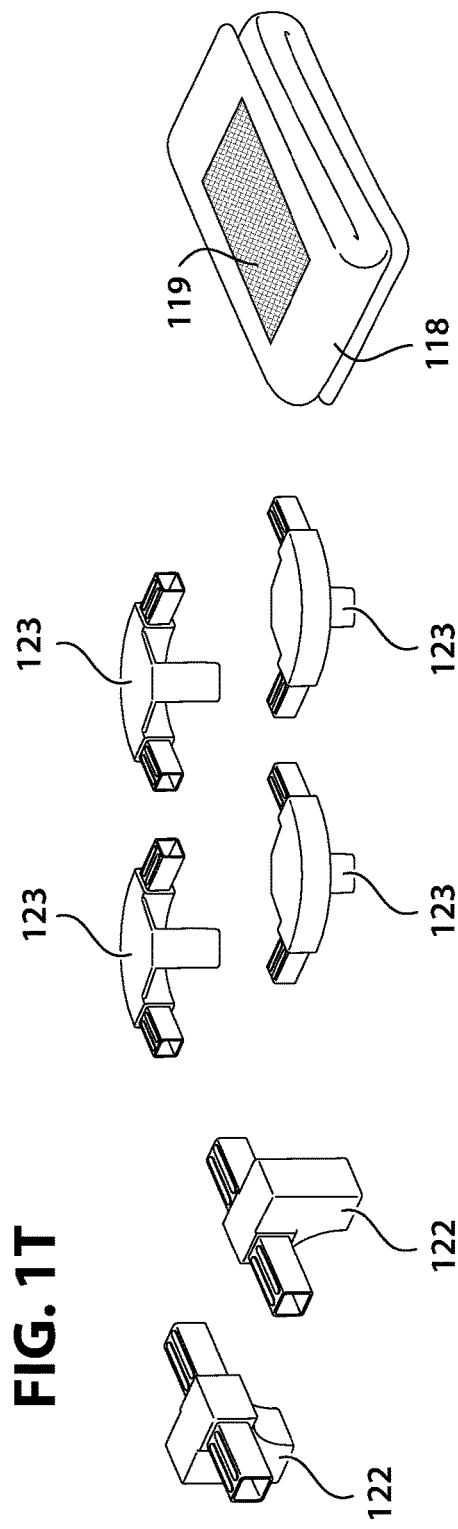
FIG. 1T and FIG. 1U illustrate perspective views of interchangeable T-shaped straight and corner frame connectors.
Figure 1U:
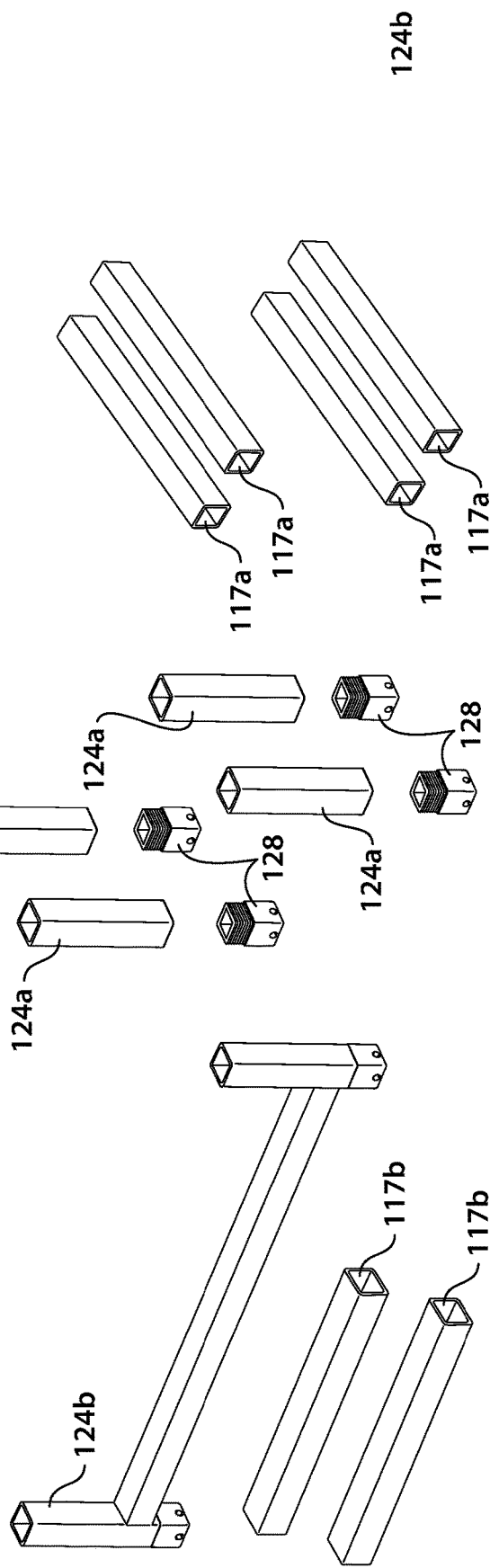
Figure 2A:
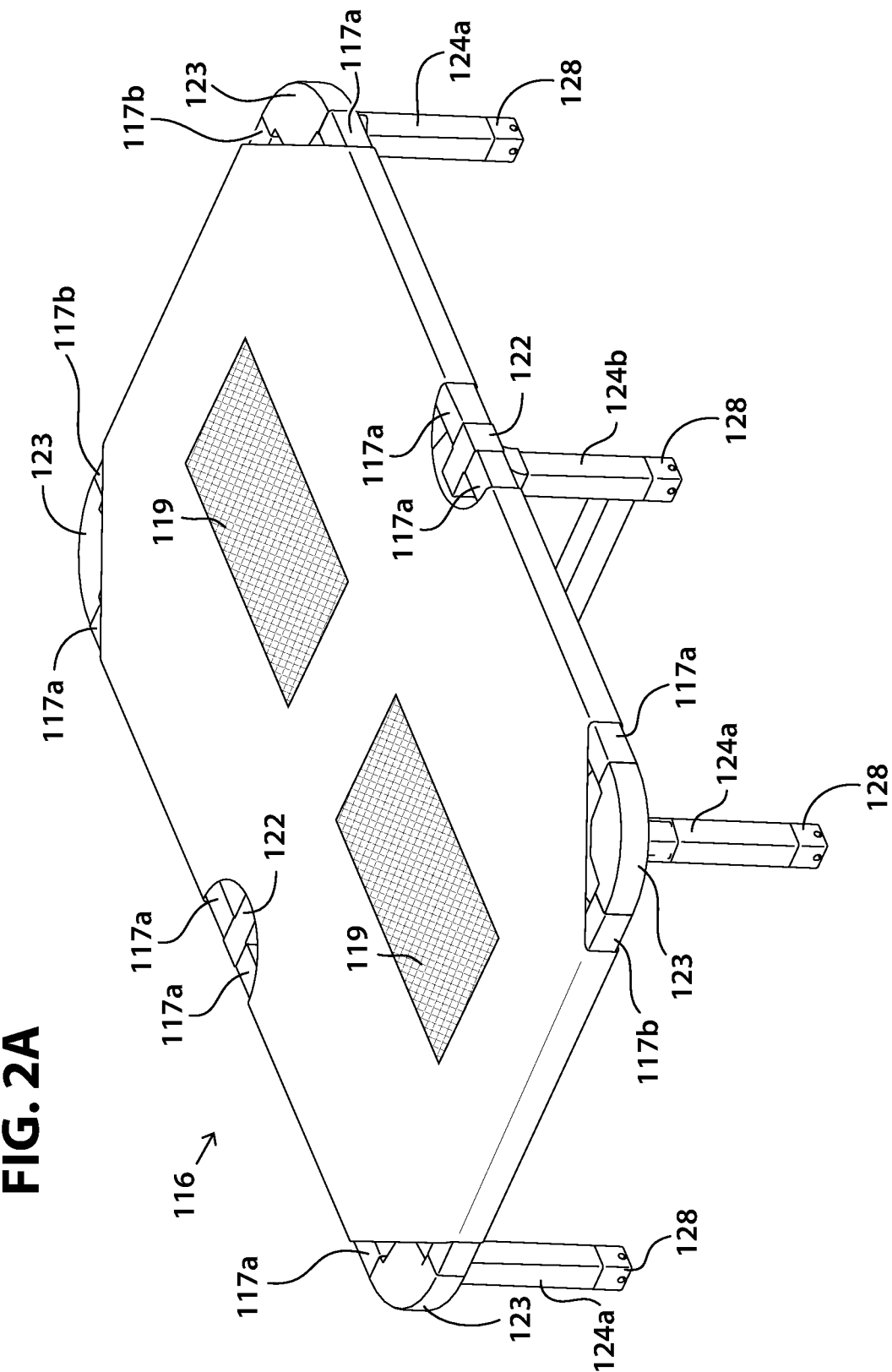
FIG. 2A illustrates a perspective view of interchangeable-canopy-patio-balcony-windscreen-chair-awning-perch-tent-sled-stand-basket-hammock-bed system.
Figure 2E:
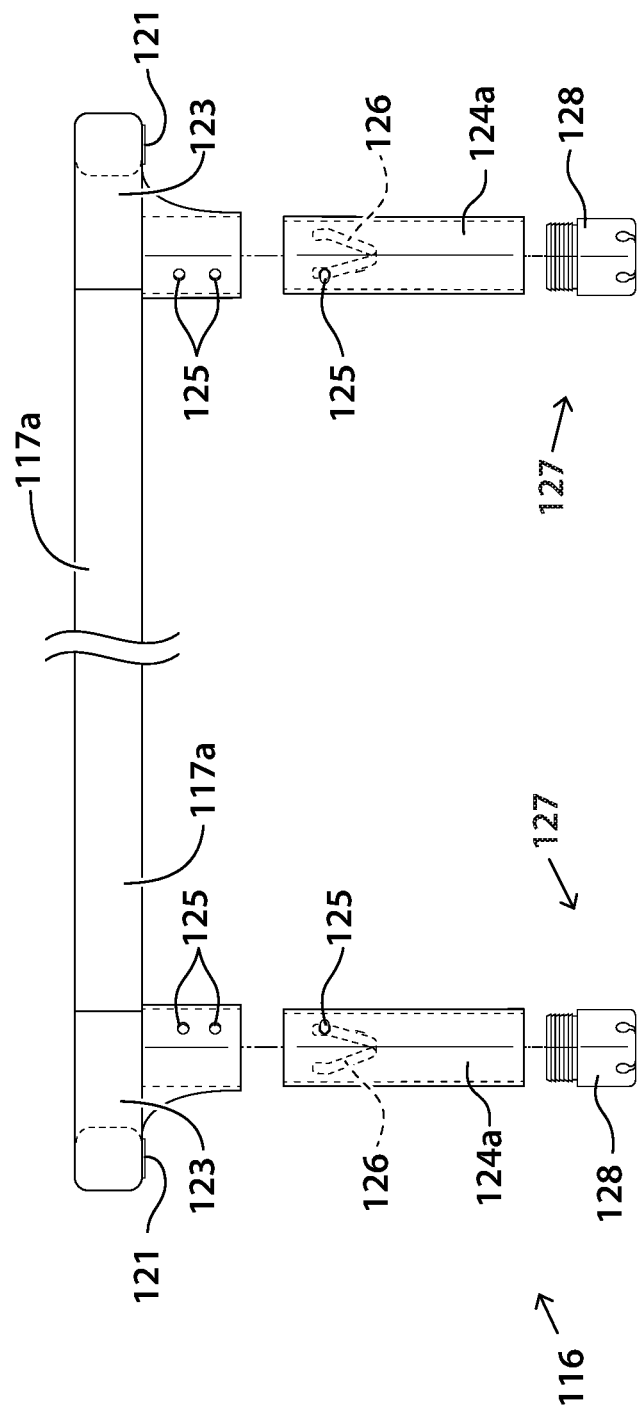
FIG. 2E illustrates an exploded left-side view of interchangeable side and end frame supports, interchangeable T-shaped straight and corner frame connectors, interchangeable adjustable leg supports, and tick-blocking water-draining wire-clamping cap.
Figure 3A:
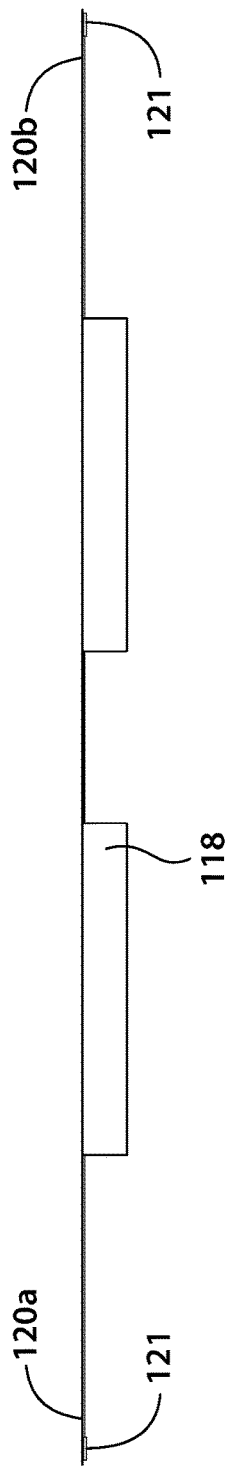
Figure 3B:
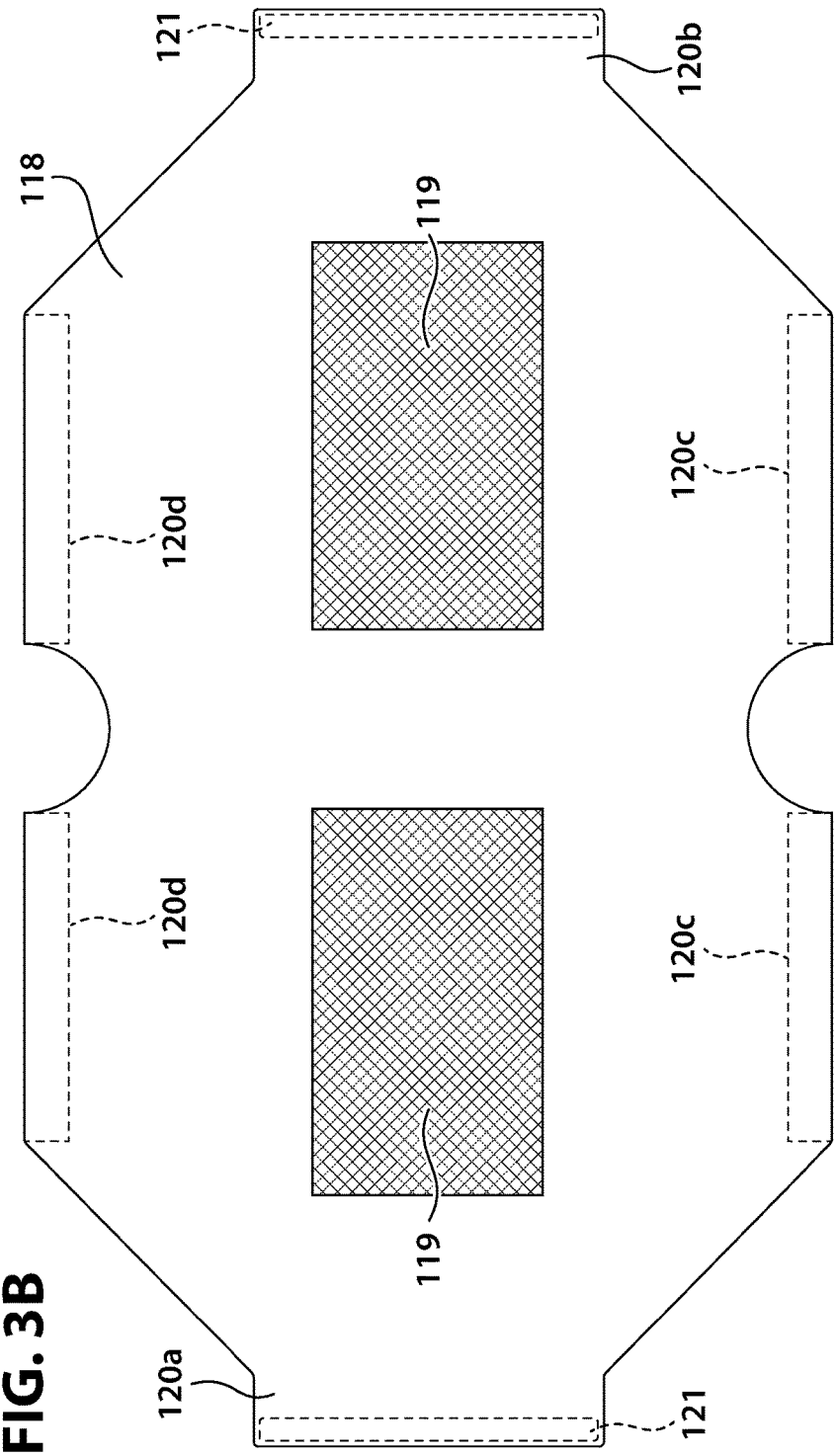
Figure 3E:
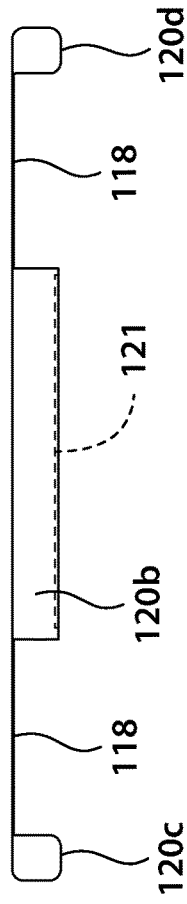
Figure 3F:
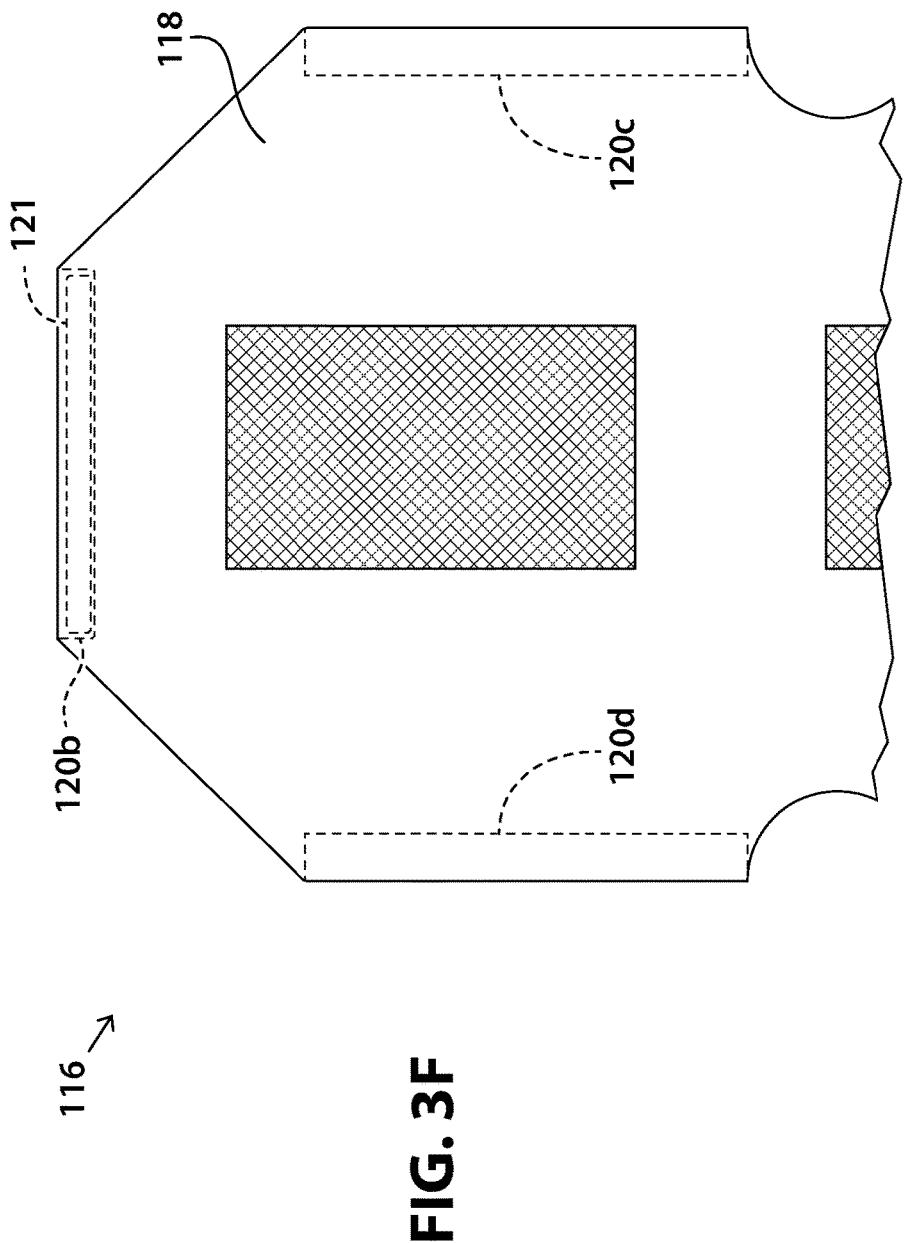
Figure 6A:
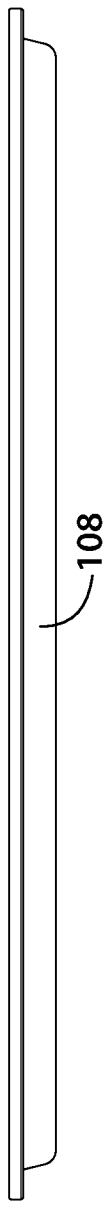
FIG. 6A and FIG. 6B illustrate side and top views of urine-waste-water-storing tray.
Figure 6B:
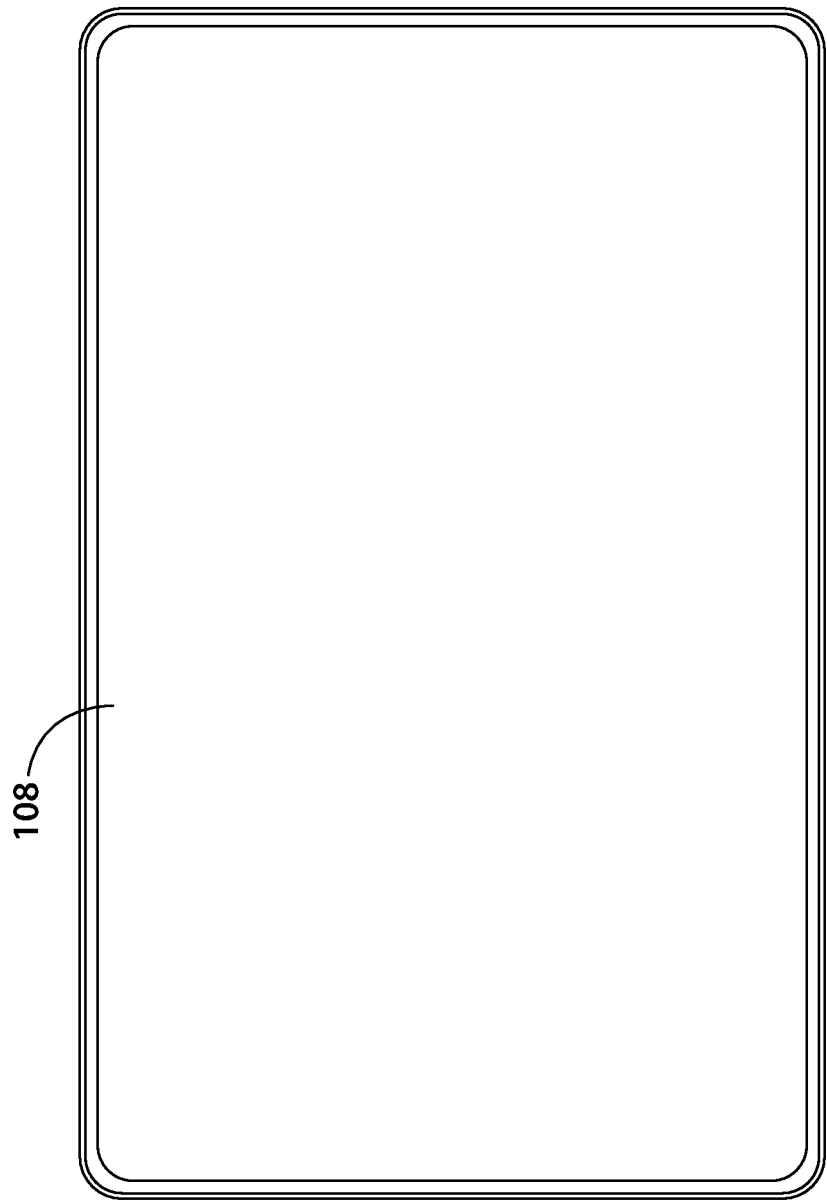

The twelve-device-in-one interchangeable-canopy-patio-balcony-windscreen-chair-awning-perch-tent-sled-stand-basket-hammock-bed pet crate has:
1) Multi-pet-containing panel system,
2) Multi-pet multi-entrance door system,
3) Interchangeable-canopy-patio-balcony-windscreen-chair-awning-perch-tent-sled-stand-basket-hammock-bed system,
4) Tick-blocking water-draining wire-clamping cap systems, and
5) Tray-locking shock-absorbing gusset systems.

Referring to FIG. 1A, FIG. 1B, FIG. 1C, FIG. 1D, FIG. 1E, FIG. 1F, FIG. 1G, FIG. 1H, FIG. 1I, FIG. 1J, FIG. 1K, FIG. 1L, FIG. 1M, FIG. 1N, FIG. 1O, FIG. 1P, FIG. 1Q, FIG. 1R, FIG. 1S, FIG. 1T, FIG. 1U, FIG. 2A, FIG. 2B, FIG. 2C, FIG. 2D, FIG. 2E, FIG. 2F, FIG. 2G, FIG. 3A, FIG. 3B, FIG. 3C, FIG. 3D, FIG. 3E, FIG. 3F, FIG. 4A, FIG. 4B, FIG. 4C, FIG. 4D, FIG. 5A, FIG. 5B, FIG. 5C, FIG. 6A, FIG. 6B, FIG. 7, FIG. 8A, FIG. 8B, FIG. 8C, and FIG. 8D, the twelve-device-in-one interchangeable-canopy-patio-balcony-windscreen-chair-awning-perch-tent-sled-stand-basket-hammock-bed pet crate comprises:
1) Multi-pet-containing panel system 101, comprising:
2) Handle and handle hooks 102a and 102b,
3) Top, bottom, left, right, front, and rear panels 103a, 103b, 103c, 103d, 103e, and 103f,
4) Panel-locking hooks 104,
5) Panel-coupling hooks 105,
6) Panel-folding clamp 106a, and
   Tray-and-bed-locking clamp 106b,
7) Multi-pet crate divider 107, and
8) Urine-waste-water-storing tray 108;
9) Multi-pet multi-entrance door system 109, comprising:
10) First and second multi-pet doors 110a and 110b,
11) First and second door openings 111a and 111b,
12) First and second push-rod hinges 112a and 112b,
13) First and second push-rod levers 113a and 113b,
14) First and second push-rods 114a and 114b, and
15) First and second push-rod-locking rings 115a and 115b;
16) Interchangeable-canopy-patio-balcony-windscreen-chair-awning-perch-tent-sled-stand-basket-hammock-bed system 116, comprising:
17) Interchangeable side frame supports 117a,
    Interchangeable end frame supports 117b,
18) Interchangeable canopy-patio-balcony-windscreen-chair-awning-perch-tent-sled-stand-basket-hammock bed 118,
19) Waterproof toilets 119,
20) Left, right, front, and rear bed sleeves 120a, 120b, 120c, and 120d
21) Bed Velcro strips 121,
22) Interchangeable T-shaped straight frame connectors 122,
23) Interchangeable T-shaped corner frame connectors 123,
24) Interchangeable adjustable leg supports 124a,
    Interchangeable adjustable center-brace leg support 124b,
25) Spring-pin holes 125, and
26) Spring-pins 126;
27) Tick-blocking water-draining cap systems 127, each comprising:
28) Tick-blocking water-draining wire-clamping cap 128,
29) Tick-blocking teeth 129, and
30) Water-draining T-shaped hole 130; and
31) Tray-locking shock-absorbing gusset systems 131, each comprising:
32) Gusset walls 132,
33) Wire-locking gusset recesses 133,
34) Curved gusset springs 134a, 134b, and 134c,
35) Vertical gusset spring 135,
36) Horizontal gusset spring 136, and
37) Tray-locking shock-absorbing gusset spring 137.

Material

Referring to FIG. 1A, FIG. 1B, FIG. 1C, FIG. 1D, FIG. 1E, FIG. 1F, FIG. 1G, FIG. 1H, FIG. 1I, FIG. 1J, FIG. 1K, FIG. 1L, FIG. 1M, FIG. 1N, FIG. 1O, FIG. 1P, FIG. 1Q, FIG. 1R, FIG. 1S, FIG. 1T, FIG. 1U, FIG. 2A, FIG. 2B, FIG. 2C, FIG. 2D, FIG. 2E, FIG. 2F, FIG. 2G, FIG. 3A, FIG. 3B, FIG. 3C, FIG. 3D, FIG. 3E, FIG. 3F, FIG. 4A, FIG. 4B, FIG. 4C, FIG. 4D, FIG. 5A, FIG. 5B, FIG. 5C, FIG. 6A, FIG. 6B, FIG. 7, FIG. 8A, FIG. 8B, FIG. 8C, and FIG. 8D:
1) Multi-pet-containing panel system 101 is made of the combined materials of its components.
2) Handle and handle hooks 102a and 102B
   each are made of plastic material.
3) Top, bottom, left, right, front, and rear panels 103a, 103b, 103c, 103d, 103e, and 103f
   each are made of metallic material.
4) Panel-locking hooks 104
   each are made of plastic or metallic material.
5) Panel-coupling hooks 105
   each are made of metallic material.
6) Panel-folding clamp 106a
   is made of metallic material.
   Tray-and-bed-locking clamp 106b
   is made of metallic material.
7) Multi-pet crate divider 107
   is made of metallic material.
8) Urine-waste-water-storing tray 108
   is made of plastic material.
9) Multi-pet multi-entrance door system 109 is made of the combined materials of its components.
10) First and second multi-pet doors 110a and 110b
    each are made of metallic material.
11) First and second door openings 111a and 111b
    each are made of empty space.
12) First and second push-rod hinges 112a and 112b
    each are made of metallic material.
13) First and second push-rod levers 113a and 113b
    each are made of metallic material.
14) First and second push-rods 114a and 114b
    each are made of metallic material.
15) First and second push-rod-locking rings 115a and 115b
    each are made of metallic material.
16) Interchangeable-canopy-patio-balcony-windscreen-chair-awning-perch-tent-sled-stand-basket-hammock-bed system 116 is made of the combined materials of its components.
17) Interchangeable side frame supports 117a
    each are made of metallic material.
    Interchangeable end frame supports 117b
    each are made of metallic material.
18) Interchangeable canopy-patio-balcony-windscreen-chair-awning-perch-tent-sled-stand-basket-hammock bed 118 is made of fabric, nylon, polyester, plastic, waterproof material, the like, or the equivalent material.
19) Waterproof toilets 119
each are made of empty space.
20) Left, right, front, and rear bed sleeves 120a, 120b, 120c, and 120d
each are made of fabric, nylon, polyester, plastic, waterproof material, the like, or the equivalent material.
21) Bed Velcro strips 121
each are made of fabric, nylon, polyester, plastic, waterproof material, the like, or the equivalent material.
22) Interchangeable T-shaped straight frame connectors 122
each are made of plastic material.
23) Interchangeable T-shaped corner frame connectors 123
each are made of plastic material.
24) Interchangeable adjustable leg supports 124a
each are made of metallic material.
Interchangeable adjustable center-brace leg support 124b
is made of metallic or plastic materials.
25) Spring-pin holes 125
each are made of empty space.
26) Spring-pins 126
each are made of metallic material.
27) Tick-blocking water-draining wire-clamping cap systems 127 each are made of the combined materials of its components.
28) Tick-blocking water-draining wire-clamping cap 128
is made of plastic material.
29) Tick-blocking teeth 129
each are made of plastic material.
30) Water-draining T-shaped hole 130
is made of empty space.
31) Tray-locking shock-absorbing gusset systems 131 each are made of the combined materials of its components.
32) Gusset walls 132
each are made of plastic material.
33) Wire-locking gusset recesses 133
each are made of empty space.
34) Curved gusset springs 134a, 134b, and 134c
each are made of plastic material.
35) Vertical gusset spring 135
is made of plastic material.
36) Horizontal gusset spring 136
is made of plastic material.
37) Tray-locking shock-absorbing gusset spring 137
is made of plastic material.
Shape
Referring to FIG. 1A, FIG. 1B, FIG. 1C, FIG. 1D, FIG. 1E, FIG. 1F, FIG. 1G, FIG. 1H, FIG. 1I, FIG. 1J, FIG. 1K, FIG. 1L, FIG. 1M, FIG. 1N, FIG. 1O, FIG. 1P, FIG. 1Q, FIG. 1R, FIG. 1S, FIG. 1T, FIG. 1U, FIG. 2A, FIG. 2B, FIG. 2C, FIG. 2D, FIG. 2E, FIG. 2F, FIG. 2G, FIG. 3A, FIG. 3B, FIG. 3C, FIG. 3D, FIG. 3E, FIG. 3F, FIG. 4A, FIG. 4B, FIG. 4C, FIG. 4D, FIG. 5A, FIG. 5B, FIG. 5C, FIG. 6A, FIG. 6B, FIG. 7, FIG. 8A, FIG. 8B, FIG. 8C, and FIG. 8D:
1) Multi-pet-containing panel system 101 is formed into the combined shapes of its components.
2) Handle and handle hooks 102a and 102b
each are formed into C shape.
3) Top, bottom, left, right, front, and rear panels 103a, 103b, 103c, 103d, 103e, and 103f
each are formed into a rectangular shape.
4) Panel-locking hooks 104
each are formed into a J shape.
5) Panel-coupling hooks 105
each are formed into a C shape.
6) Panel-folding clamp 106a
is formed into a C shape.
Tray-and-bed-locking clamp 106b
is formed into a J shape.
7) Multi-pet crate divider 107
is formed into a rectangular shape.
8) Urine-waste-water-storing tray 108
is formed into a rectangular shape.
9) Multi-pet multi-entrance door system 109 is formed into the combined shapes of its components.
10) First and second multi-pet doors 110a and 110b
each are formed into a rectangular shape.
11) First and second door openings 111a and 111b
each are formed into a rectangular shape.
12) First and second push-rod hinges 112a and 112b
each are formed into an O shape.
13) First and second push-rod levers 113a and 113b
each are formed into an elongated U shape.
14) First and second push-rods 114a and 114b
each are formed into an I shape.
15) First and second push-rod-locking rings 115a and 115b
each are formed into a rectangular-ring shape.
16) Interchangeable-canopy-patio-balcony-windscreen-chair-awning-perch-tent-sled-stand-basket-hammock-bed system 116 is formed into the combined shapes of its components.
17) Interchangeable side frame supports 117a
each are formed into a tubular shape with a square cross-section.
Interchangeable end frame supports 117b
each are formed into a tubular shape with a square cross-section.
18) Interchangeable canopy-patio-balcony-windscreen-chair-awning-perch-tent-sled-stand-basket-hammock bed 118
is formed into an octagonal shape.
19) Waterproof toilets 119
each are formed into a rectangular or trapezoidal shape.
20) Left, right, front, and rear bed sleeves 120a, 120b, 120c, and 120d
each are formed into a tubular shape.
21) Bed Velcro strips 121
each are formed into a rectangular shape.
22) Interchangeable T-shaped straight frame connectors 122
each are formed into a T shape with a square tube cross-section.
23) Interchangeable T-shaped corner frame connectors 123
each are formed into a T shape with one quarter-rounded side and a square tube cross-section.
24) Interchangeable adjustable leg supports 124a
each are formed into a tubular shape with a square cross-section.
Interchangeable adjustable center-brace leg support 124b
is formed into an H shape with a square tube cross-section.
25) Spring-pin holes 125
each are formed into a circular shape.
26) Spring-pins 126
each are formed into a V shape with a cup-like end.
27) Tick-blocking water-draining wire-clamping cap systems 127 each are formed into the combined shapes of its components.
28) Tick-blocking water-draining wire-clamping cap 128
is formed into a square tubular shape with external square rings.
29) Tick-blocking teeth 129
each are formed into a tooth-like shape.

30) Water-draining T-shaped hole 130
is formed into a T shape.
31) Tray-locking shock-absorbing gusset systems 131 each
are formed into the combined shapes of its components.
32) Gusset walls 132
each are formed into a triangular shape.
33) Wire-locking gusset recesses 133
each are formed into a triangular shape.
34) Curved gusset springs 134a, 134b, and 134c
each are formed into a curved rectangular shape.
35) Vertical gusset spring 135
is formed into a rectangular shape.
36) Horizontal gusset spring 136
is formed into a triangular shape.
37) Tray-locking shock-absorbing gusset spring 137
is formed into a triangular shape with a curved front edge.

Connection
Referring to FIG. 1A, FIG. 1B, FIG. 1C, FIG. 1D, FIG. 1E, FIG. 1F, FIG. 1G, FIG. 1H, FIG. 1I, FIG. 1J, FIG. 1K, FIG. 1L, FIG. 1M, FIG. 1N, FIG. 1O, FIG. 1P, FIG. 1Q, FIG. 1R, FIG. 1S, FIG. 1T, FIG. 1U, FIG. 2A, FIG. 2B, FIG. 2C, FIG. 2D, FIG. 2E, FIG. 2F, FIG. 2G, FIG. 3A, FIG. 3B, FIG. 3C, FIG. 3D, FIG. 3E, FIG. 3F, FIG. 4A, FIG. 4B, FIG. 4C, FIG. 4D, FIG. 5A, FIG. 5B, FIG. 5C, FIG. 6A, FIG. 6B, FIG. 7, FIG. 8A, FIG. 8B, FIG. 8C, and FIG. 8D:

1) Multi-pet-containing panel system 101 has the combined connections of its components.
2) Handle and handle hooks 102a and 102b
respectively are molded to each other and hooked onto top panel 103a.
3) Top, bottom, left, right, front, and rear panels 103a, 103b, 103c, 103d, 103e, and 103f respectively are hooked together.
4) Panel-locking hooks 104
respectively are hooked onto top, front, and rear panels 103a, 103e, and 103f.
5) Panel-coupling hooks 105
respectively are clamped onto top, bottom, left, right, front, and rear panels 103a, 103b, 103c, 103d, 103e, and 103f.
6) Panel-folding clamp 106a
is foldably hinged to bottom panel 103b.
Tray-and-bed-locking clamp 106b
is foldably hinged to bottom panel 103b.
7) Multi-pet crate divider 107
is disposed between and hooked onto top, bottom, left, right, front, or rear panels 103a, 103b, 103c, 103d, 103e, and 103f.
8) Urine-waste-water-storing tray 108
is disposed on bottom panel 108b.
9) Multi-pet multi-entrance door system 109 has the combined connections of its components.
10) First and second multi-pet doors 110a and 110b
respectively are hinged onto left and front panels 103c, and 103e.
11) First and second door openings 111a and 111b
respectively are formed within left and front panels 103c, and 103e.
12) First and second push-rod hinges 112a and 112b
respectively are welded to first and second multi-pet doors 110a and 110b.
13) First and second push-rod levers 113a and 113b
respectively are welded to first and second push-rod hinges 112a and 112b.
14) First and second push-rods 114a and 114b
respectively and rotatably are attached to first and second push-rod hinges 112a and 112b.
15) First and second push-rod-locking rings 115a and 115b
respectively are welded to second and first multi-pet doors 110b and 110a.
16) Interchangeable-canopy-patio-balcony-windscreen-chair-awning-perch-tent-sled-stand-basket-hammock-and-bed system 116 has the combined connections of its components.
17) Interchangeable side frame supports 117a
respectively and detachably are inserted into or slid onto interchangeable T-shaped straight frame connectors 122 or interchangeable T-shaped corner frame connectors 123.
Interchangeable end frame supports 117b
respectively and detachably are inserted into or slid onto interchangeable T-shaped straight frame connectors 122 or interchangeable T-shaped corner frame connectors 123.
18) Interchangeable canopy-patio-balcony-windscreen-chair-awning-perch-tent-sled-stand-basket-hammock bed 118
is weaved or sewn to left, right, front, and rear bed sleeves 120a, 120b, 120c, and 120d.
19) Waterproof toilets 119
respectively are cut out of interchangeable canopy-patio-balcony-windscreen-chair-awning-perch-tent-sled-stand-basket-hammock bed 118.
20) Left, right, front, and rear bed sleeves 120a, 120b, 120c, and 120d
respectively are slid or Velcroed on interchangeable side frame supports 117a and interchangeable end frame supports 117b.
21) Bed Velcro strips 121
respectively are sewn or glued on interchangeable canopy-patio-balcony-windscreen-chair-awning-perch-tent-sled-stand-basket-hammock bed 118 or left, right, front, and rear bed sleeves 120a, 120b, 120c, and 120d.
22) Interchangeable T-shaped straight frame connectors 122
respectively and detachably are inserted into or slid onto interchangeable side frame supports 117a, interchangeable end frame supports 117b, interchangeable adjustable leg supports 124a, or interchangeable adjustable center-brace leg support 124b.
23) Interchangeable T-shaped corner frame connectors 123
respectively and detachably are inserted into or slid onto interchangeable side frame supports 117a, interchangeable end frame supports 117b, interchangeable adjustable leg supports 124a, or interchangeable adjustable center-brace leg support 124b.
24) Interchangeable adjustable leg supports 124a
respectively and detachably are inserted into or slid onto interchangeable T-shaped straight frame connectors 122 or interchangeable T-shaped corner frame connectors 123.
Interchangeable adjustable center-brace leg support 124b
respectively and detachably is inserted into or slid onto interchangeable T-shaped straight frame connectors 122 or interchangeable T-shaped corner frame connectors 123.
25) Spring-pin holes 125
respectively are drilled in upper and interchangeable T-shaped corner frame connectors 123 and interchangeable adjustable leg supports 124a.
26) Spring-pins 126
respectively are springably inserted inside interchangeable T-shaped corner frame connectors 123 with their cup-like ends poking through spring-pin holes 125.

27) Tick-blocking water-draining wire-clamping cap systems 127 respectively have the combined connections of its components.
28) Tick-blocking water-draining wire-clamping cap 128
is snapped into interchangeable adjustable leg supports 124*a* and
interchangeable adjustable center-brace leg support 124*b*.
29) Tick-blocking teeth 129
respectively are molded on the surface of water-draining T-shaped hole 130.
30) Water-draining T-shaped hole 130
is molded in the end of tick-blocking water-draining wire-clamping cap 128.
31) Tray-locking shock-absorbing gusset systems 131 respectively have the combined connections of its components.
32) Gusset walls 132
respectively are molded to curved gusset springs 134*a*, 134*b*, and 134*c*, vertical gusset spring 135, and horizontal gusset spring 136.
33) Wire-locking gusset recesses 133
respectively are molded inside gusset walls 132.
34) Curved gusset springs 134*a*, 134*b*, and 134*c*
respectively are molded to gusset walls 132, vertical gusset spring 135, and horizontal gusset spring 136.
35) Vertical gusset spring 135
is molded to gusset walls 132, curved gusset springs 134*a*, 134*b*, and 134*c*, and horizontal gusset spring 136.
36) Horizontal gusset spring 136
is molded to gusset walls 132, curved gusset springs 134*a*, 134*b*, and 134*c*, and vertical gusset spring 135.
37) Tray-locking shock-absorbing gusset spring 137
is molded to horizontal gusset spring 136.

Function

Referring to FIG. 9, FIG. 10, FIG. 11A, FIG. 11B, FIG. 11C, FIG. 11D, FIG. 12A, FIG. 12B, FIG. 12C, FIG. 12D, FIG. 12E, FIG. 12F, FIG. 12G, FIG. 12H, FIG. 12I, FIG. 12J, FIG. 12K, FIG. 12L, FIG. 12M, FIG. 12N, FIG. 12O, FIG. 12P, FIG. 12Q, FIG. 13A, FIG. 13B, FIG. 13C, FIG. 14A, FIG. 14B, FIG. 14C, FIG. 14D, FIG. 14E, FIG. 14F, FIG. 15A, FIG. 15B, FIG. 15C, FIG. 15D, FIG. 15E, FIG. 15F, FIG. 16A, FIG. 16B, FIG. 16C, FIG. 16D, FIG. 16E, FIG. 16F, and FIG. 16G:

1) Multi-pet-containing panel system 101 is for performing the combined functions of its components.
2) Handle and handle hooks 102*a* and 102*b* respectively are for:
Being held on to carry the interchangeable canopy-patio-balcony-windscreen-chair-awning-perch-tent-sled-stand-basket-hammock-bed pet crate and detachably connecting handle 102*a* and handle hooks 102*b* to top panel 103*a*.
3) Top, bottom, left, right, front, and rear panels 103*a*, 103*b*, 103*c*, 103*d*, 103*e*, and 103*f* respectively are for:
Functioning as a roof, walls, and floor,
to create a mobile pet enclosure.
4) Panel-locking hooks 104 respectively are for:
Securably locking top, bottom, left, right, front, and rear panels 103*a*, 103*b*, 103*c*, 103*d*, 103*e*, and 103*f* together
(See FIG. 1L).
5) Panel-coupling hooks 105 respectively are for:
Hingeably coupling top, bottom, left, right, front, and rear panels 103*a*, 103*b*, 103*c*, 103*d*, 103*e*, and 103*f* together
(See FIG. 1R).

6) Panel-folding clamp 106*a* is for:
Releasably clamping multi-pet-containing panel system 101 together, to allow convenient storage and transportation
(See FIG. 16G).
Tray-and-bed-locking clamp 106*b* is for:
a) Releasably clamping urine-waste-water-storing tray 108 to multi-pet-containing panel system to allow urine-waste-water-storing tray 108 to be removed
in the direction of arrow 138
(See FIG. 9);
b) Providing easy access to slide out urine-waste-water-storing tray 108, to quickly and conveniently clean and sanitize
(See FIG. 9);
c) Conveniently sliding out urine-waste-water-storing tray 108 and interchangeable canopy-patio-balcony-windscreen-chair-awning-perch-tent-sled-stand-basket-hammock bed 118
to allow access without first opening first and second multi-pet doors 110*a* and 110*b*
(See FIG. 9); and
d) Providing easy access to slide out on interchangeable canopy-patio-balcony-windscreen-chair-awning-perch-tent-sled-stand-basket-hammock bed 118,
to quickly and conveniently clean and sanitize
(See FIG. 9).
7) Multi-pet crate divider 107 is for:
a) Creating multiple pet-containing compartments,
to accommodate two or more pets
(See FIG. 10);
b) Creating multiple sized pet-containing compartments,
to accommodate pet growth from puppy to adult stage
(See FIG. 10);
c) Creating multiple sized pet-containing compartments,
to accommodate large and small pets simultaneously
(See FIG. 10); and
d) Separating multiple pets,
to allow multiple pets to sleep, rest and play simultaneously therein
(See FIG. 10).
8) Urine-waste-water-storing tray 108 is for:
a) Preventing pets from getting diseases and infections caused by their own urine;
b) Storing urine running down from waterproof toilets 119,
to keep interchangeable canopy-patio-balcony-windscreen-chair-awning-perch-tent-sled-stand-basket-hammock bed 118 dry;
c) Keeping pets' feet and pets away from, and not on urine when pets step in or lay on interchangeable canopy-patio-balcony-windscreen-chair-awning-perch-tent-sled-stand-basket-hammock bed 118,
to keep pets' feet and pets dry;
d) Providing a grooming surface to sit atop multi-pet-containing panel system 101,
to allow pet to stand, sit, or lay on to be groomed upon, when installed into tray-locking shock-absorbing gusset spring 137, in the directions of arrows 139*a*, 139*b*, 139*c*, and 139*d*
(See FIG. 11A, FIG. 11B, FIG. 11C, and FIG. 11D); and
e) Providing a receptacle for storage
to catch hair, dirt, food, crumbs, urine, and wetness when pet is being groomed, washed, or has an accident.

Figure 7:
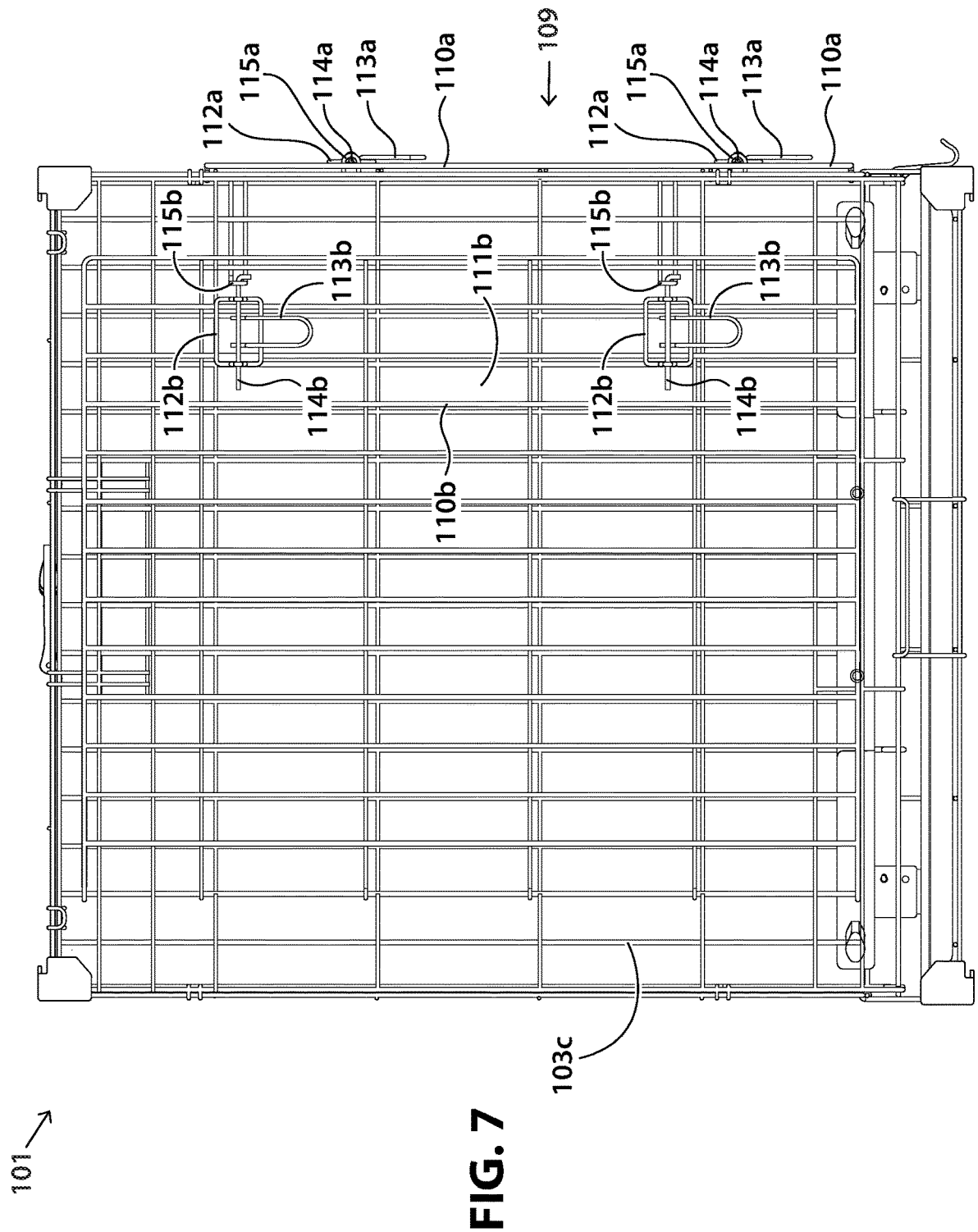
FIG. 7 illustrates a left-side view of multi-pet multi-entrance door system.
Figure 10:
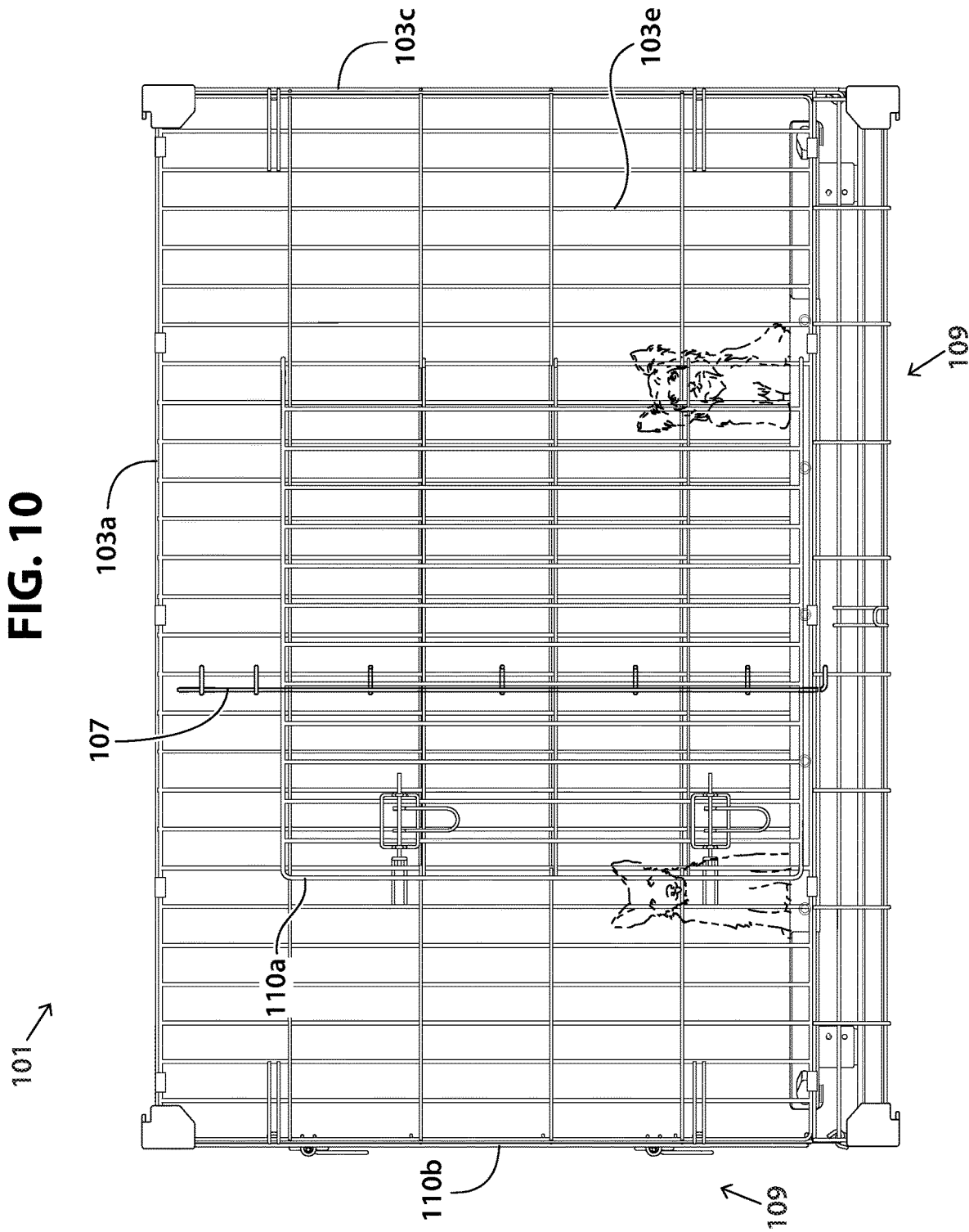
Figure 11B:
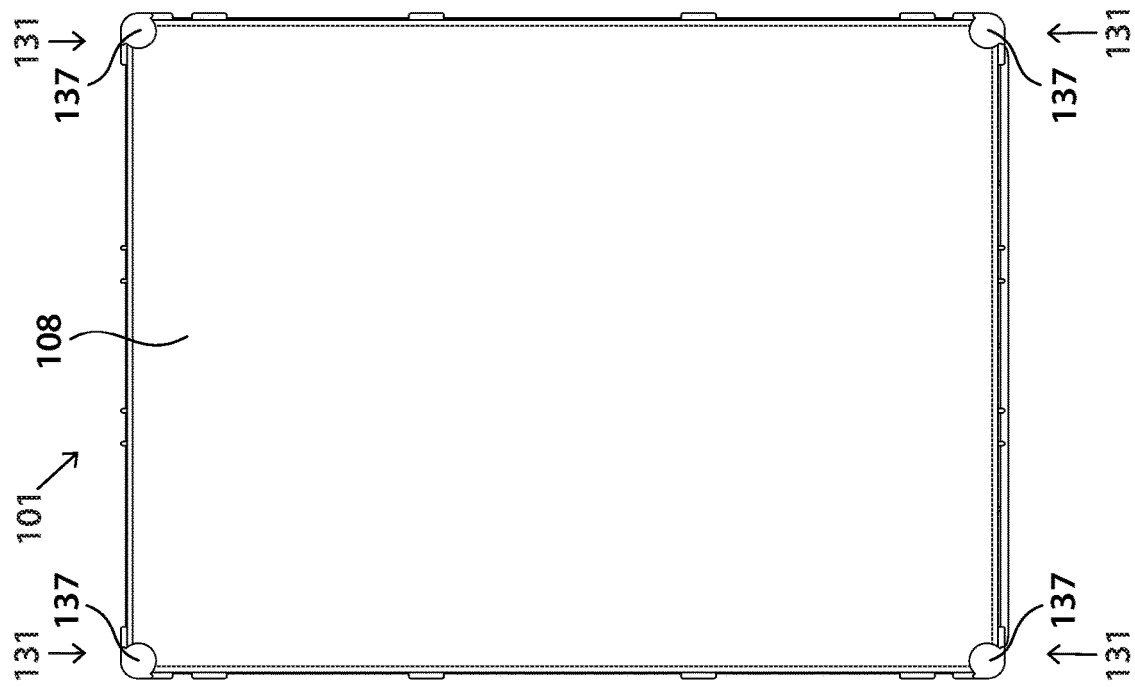
FIG. 11A, FIG. 11B, FIG. 11C, and FIG. 11D illustrate top and side views of how urine-waste-water-storing tray is snapping into tray-locking shock absorbing gusset system atop multi-pet-containing panel system.
Figure 11A:
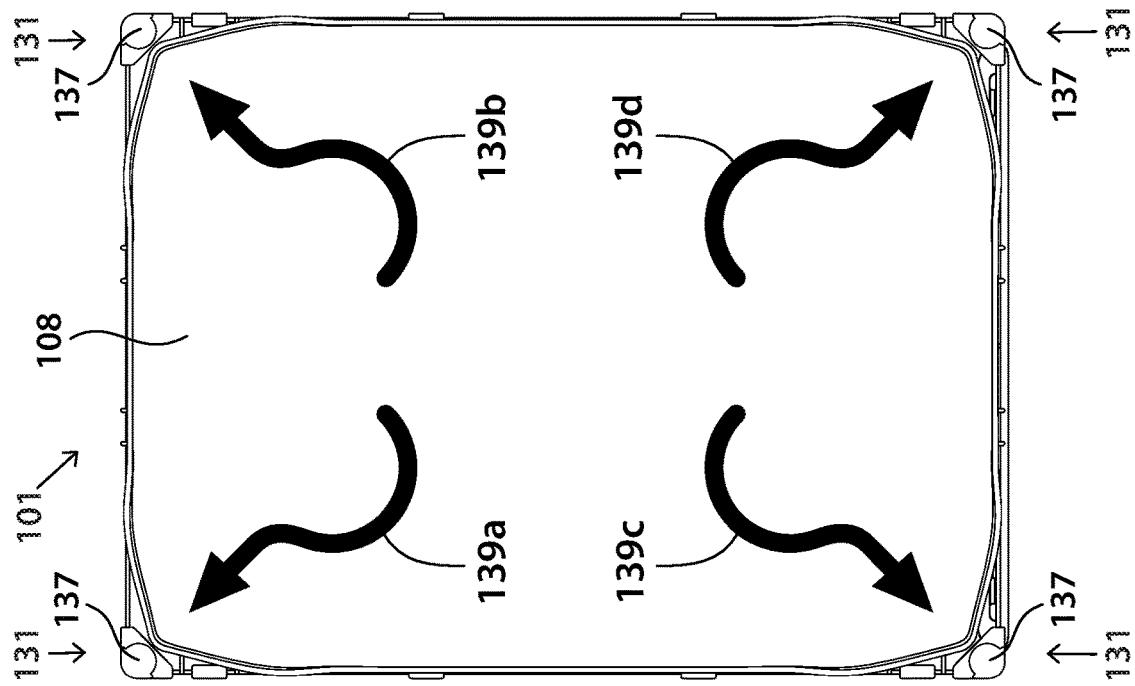
Figure 11C:
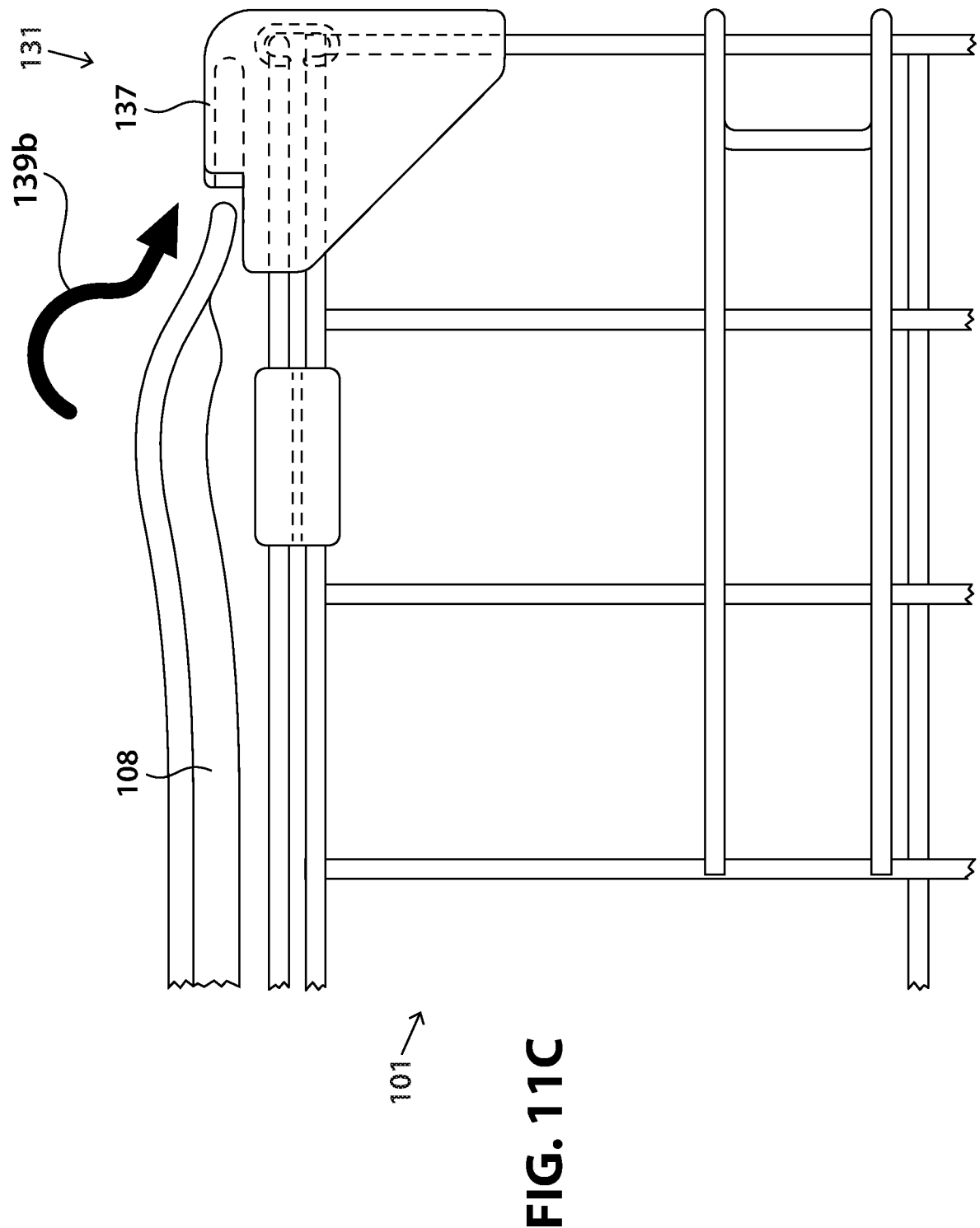
Figure 11D:
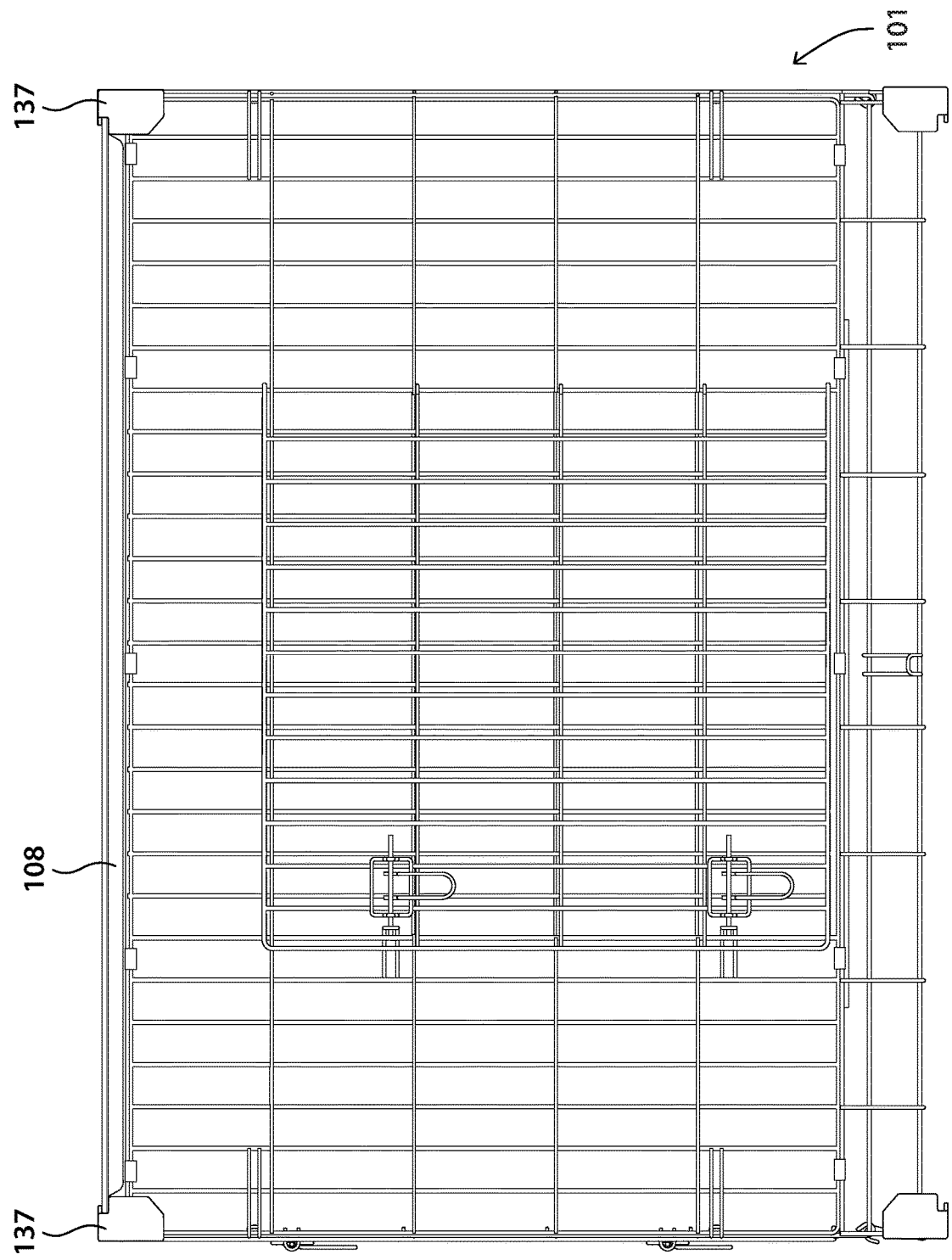

9) Multi-pet multi-entrance door system 109 is for performing the combined functions of its components:

10) First and second multi-pet doors 110a and 110b respectively are for:

Closing and opening first and second door openings 111a and 111b (See FIG. 7).

11) First and second door openings 111a and 111b respectively are for:

Allowing pets to enter and exit
(See FIG. 7).

12) First and second push-rod hinges 112a and 112b respectively are for:

Hingedly securing first and second push-rods 114a and 114b and first and second push-rod levers 113a and 113b together
(See FIG. 7).

13) First and second push-rod levers 113a and 113b respectively are for:

Operating first and second push-rods 114a and 114b
(See FIG. 7).

14) First and second push-rods 114a and 114b respectively are for:

Releasably locking first and second multi-pet doors 110a and 110b
(See FIG. 7).

15) First and second push-rod-locking rings 115a and 115b respectively are for:

Releasably locking first and second push-rods 114a and 114b.
(See FIG. 7).

Figure 16D:
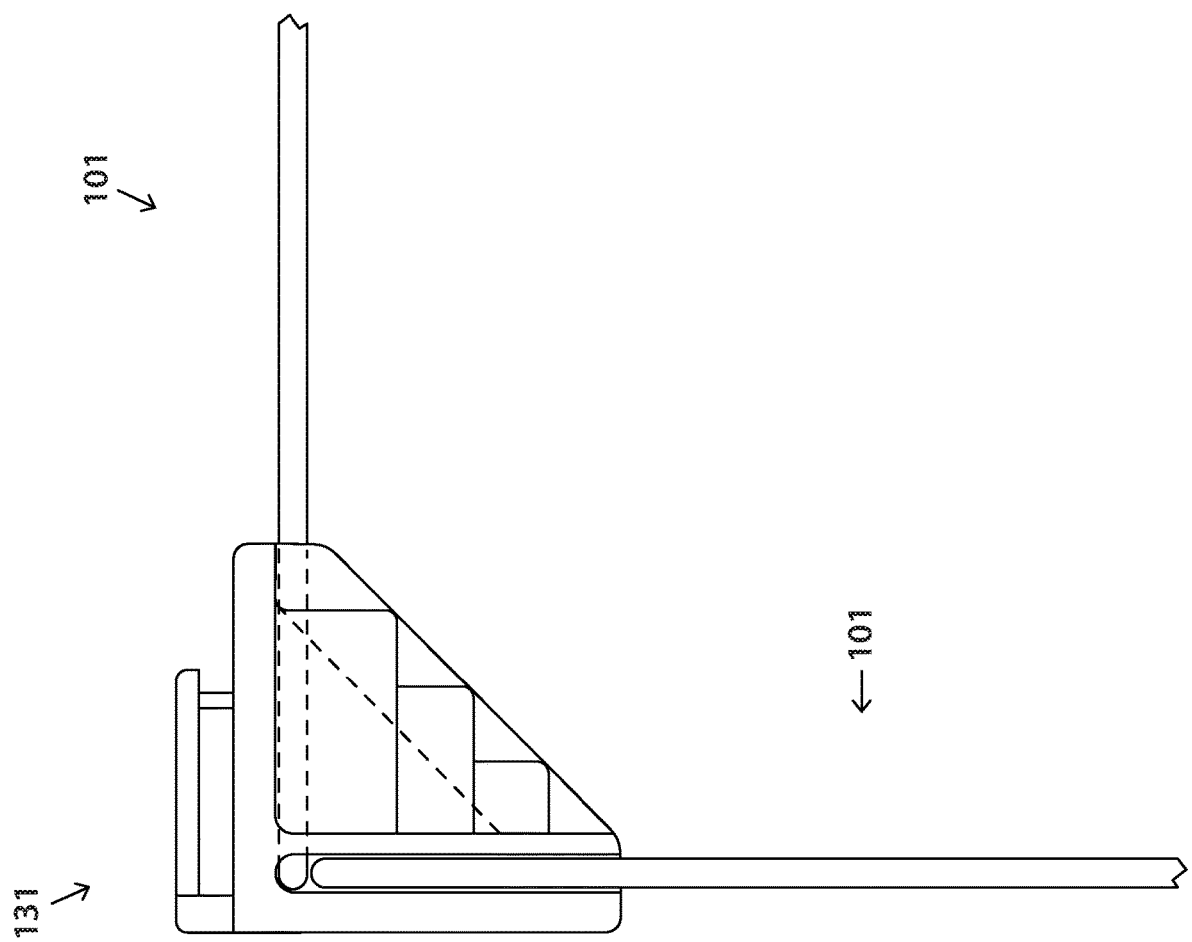
Figure 16E:
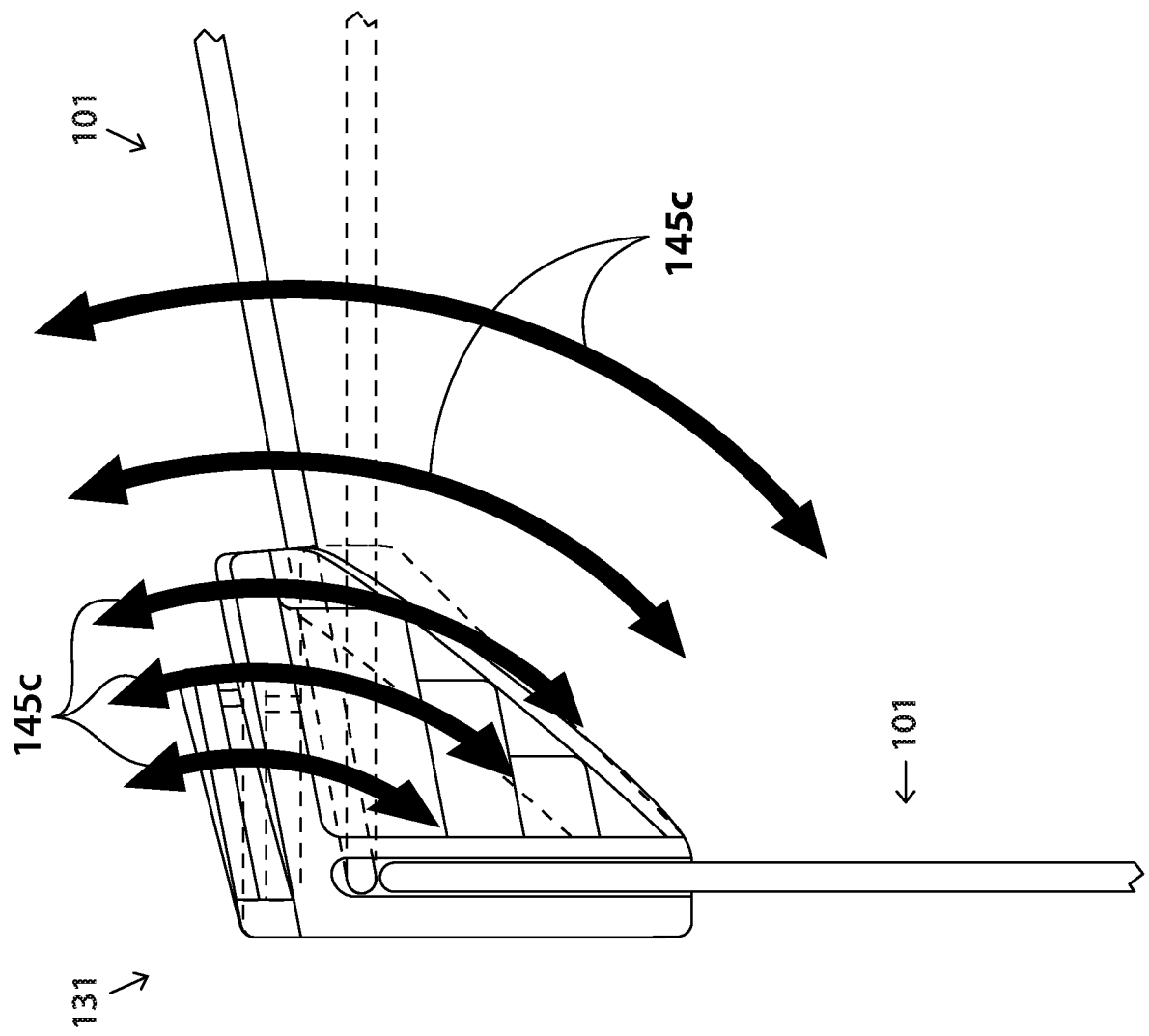
Figure 16F:
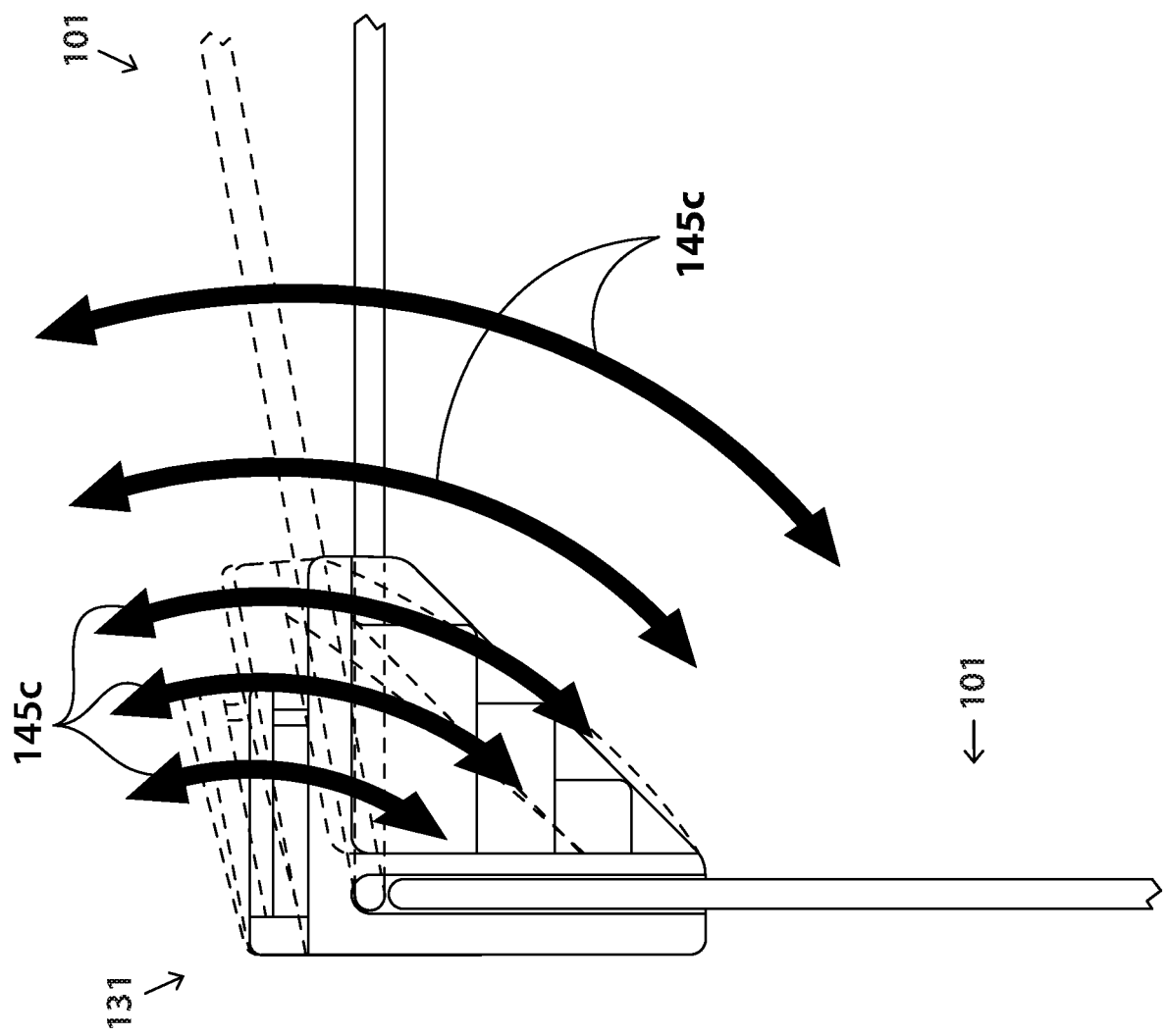
Figure 16G:
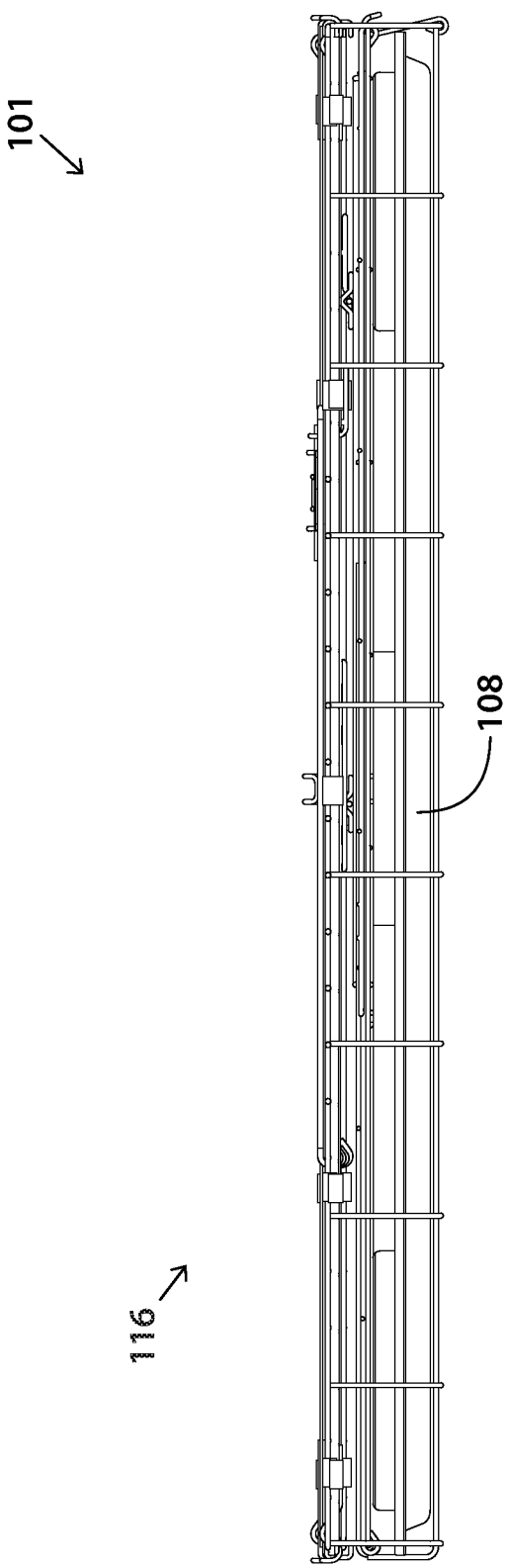
FIG. 16G illustrates a side view of the twelve-device-in-one interchangeable-canopy-patio-balcony-windscreen-chair-awning-perch-tent-sled-stand-basket-hammock-bed pet crate being folded while reducing 30% of the prior-art-pet-crate volume for reduced-cost and convenient storage and transportation.

16) Interchangeable-canopy-patio-balcony-windscreen-chair-awning-perch-tent-sled-stand-basket-hammock-bed system 116 is for performing the combined functions of its components:

17) Interchangeable side frame supports 117a respectively are for:

a) Providing a structure on which to mount and suspend interchangeable canopy-patio-balcony-windscreen-chair-awning-perch-tent-sled-stand-basket-hammock bed 118
(See FIG. 1A, FIG. 1B, FIG. 1C, FIG. 1D, FIG. 1E, FIG. 1F, FIG. 1G, FIG. 1H, FIG. 1I, FIG. 1J, FIG. 1K, FIG. 1L, FIG. 1M, FIG. 1N, FIG. 1O, FIG. 1P, FIG. 1Q, FIG. 12A, FIG. 12B, FIG. 12C, FIG. 12D, FIG. 12E, FIG. 12F, FIG. 12G, FIG. 12H, FIG. 12I, FIG. 12J, FIG. 12K, FIG. 12L, FIG. 12M, FIG. 12N, FIG. 12O, FIG. 12P, FIG. 12Q, FIG. 13A, FIG. 13B, FIG. 13C, FIG. 14A, FIG. 14B, FIG. 14C, FIG. 14D, FIG. 14E, and FIG. 14F);

b) Collapsing quickly for easy storage,
to provide easy portability
(See FIG. 16G);

c) Providing a mounting structure for interchangeable T-shaped straight frame connectors 122 and interchangeable T-shaped corner frame connectors 123,
to respectively be disposed in various configurations
(See FIG. 1A, FIG. 1B, FIG. 1C, FIG. 1D, FIG. 1E, FIG. 1F, FIG. 1G, FIG. 1H, FIG. 1I, FIG. 1J, FIG. 1K, FIG. 1L, FIG. 1M, FIG. 1N, FIG. 1O, FIG. 1P, FIG. 1Q, FIG. 12A, FIG. 12B, FIG. 12C, FIG. 12D, FIG. 12E, FIG. 12F, FIG. 12G, FIG. 12H, FIG. 12I, FIG. 12J, FIG. 12K, FIG. 12L, FIG. 12M, FIG. 12N, FIG. 12O, FIG. 12P, FIG. 12Q, FIG. 13A, FIG. 13B, FIG. 13C, FIG. 14A, FIG. 14B, FIG. 14C, FIG. 14D, FIG. 14E, and FIG. 14F);

d) Providing a structure on which to mount interchangeable canopy-patio-balcony-windscreen-chair-awning-perch-tent-sled-stand-basket-hammock bed 118,
to respectively be disposed in various configurations
(See FIG. 1A, FIG. 1B, FIG. 1C, FIG. 1D, FIG. 1E, FIG. 1F, FIG. 1G, FIG. 1H, FIG. 1I, FIG. 1J, FIG. 1K, FIG. 1L, FIG. 1M, FIG. 1N, FIG. 1O, FIG. 1P, FIG. 1Q, FIG. 12A, FIG. 12B, FIG. 12C, FIG. 12D, FIG. 12E, FIG. 12F, FIG. 12G, FIG. 12H, FIG. 12I, FIG. 12J, FIG. 12K, FIG. 12L, FIG. 12M, FIG. 12N, FIG. 12O, FIG. 12P, FIG. 12Q, FIG. 13A, FIG. 13B, FIG. 13C, FIG. 14A, FIG. 14B, FIG. 14C, FIG. 14D, FIG. 14E, and FIG. 14F); and e) Providing multiple configuration options when combined with interchangeable end frame supports 117b, interchangeable T-shaped straight frame connectors 122, interchangeable T-shaped corner frame connectors 123, interchangeable adjustable leg supports 124a, and interchangeable adjustable center-brace leg support 124b mounting on multi-pet-containing panel system 101, to function as a pet canopy,
to function as a pet patio,
to function as a pet balcony,
to function as a pet hammock,
to function as a pet bed,
to function as a perch,
to function as an awning
in the direction of arrow 139e
(See FIG. 12E and FIG. 12F),
to function as a tent with storage,
to function as a chair,
to function as a crate stand,
to function as a sled
in the direction of arrow 139f
(See FIG. 12P),
to function as a roof with storage,
to function as a grooming platform,
to function as a multi-pet grooming table,
to function as a drying platform,
to function as a wind, sun, and weather block,
to function as a privacy screen, and
to function as an independent pet bed
(See FIG. 1A, FIG. 1B, FIG. 1C, FIG. 1D, FIG. 1E, FIG. 1F, FIG. 1G, FIG. 1H, FIG. 1I, FIG. 1J, FIG. 1K, FIG. 1L, FIG. 1M, FIG. 1N, FIG. 1O, FIG. 1P, FIG. 1Q, FIG. 12A, FIG. 12B, FIG. 12C, FIG. 12D, FIG. 12E, FIG. 12F, FIG. 12G, FIG. 12H, FIG. 12I, FIG. 12J, FIG. 12K, FIG. 12L, FIG. 12M, FIG. 12N, FIG. 12O, FIG. 12P, FIG. 12Q, FIG. 13A, FIG. 13B, FIG. 13C, FIG. 14A, FIG. 14B, FIG. 14C, FIG. 14D, FIG. 14E, and FIG. 14F).

Interchangeable end frame supports 117b respectively are for:

a) Providing a structure on which to mount and suspend interchangeable canopy-patio-balcony-windscreen-chair-awning-perch-tent-sled-stand-basket-hammock bed 118
(See FIG. 1A, FIG. 1B, FIG. 1C, FIG. 1D, FIG. 1E, FIG. 1F, FIG. 1G, FIG. 1H, FIG. 1I, FIG. 1J, FIG. 1K, FIG. 1L, FIG. 1M, FIG. 1N, FIG. 1O, FIG. 1P, FIG. 1Q, FIG. 12A, FIG. 12B, FIG. 12C, FIG. 12D, FIG. 12E, FIG. 12F, FIG. 12G, FIG. 12H, FIG. 12I, FIG. 12J, FIG. 12K, FIG. 12L, FIG. 12M, FIG. 12N, FIG. 12O, FIG. 12P, FIG. 12Q, FIG. 13A, FIG. 13B, FIG. 13C, FIG. 14A, FIG. 14B, FIG. 14C, FIG. 14D, FIG. 14E, and FIG. 14F);

b) Collapsing quickly for easy storage,
    to provide easy portability
    (See FIG. 16G);
    Providing a mounting structure for interchangeable T-shaped straight frame connectors 122 and interchangeable T-shaped corner frame connectors 123,
    to respectively be disposed in various configurations
    (See FIG. 1A, FIG. 1B, FIG. 1C, FIG. 1D, FIG. 1E, FIG. 1F, FIG. 1G, FIG. 1H, FIG. 1I, FIG. 1J, FIG. 1K, FIG. 1L, FIG. 1M, FIG. 1N, FIG. 1O, FIG. 1P, FIG. 1Q, FIG. 12A, FIG. 12B, FIG. 12C, FIG. 12D, FIG. 12E, FIG. 12F, FIG. 12G, FIG. 12H, FIG. 12I, FIG. 12J, FIG. 12K, FIG. 12L, FIG. 12M, FIG. 12N, FIG. 12O, FIG. 12P, FIG. 12Q, FIG. 13A, FIG. 13B, FIG. 13C, FIG. 14A, FIG. 14B, FIG. 14C, FIG. 14D, FIG. 14E, and FIG. 14F);
c) Providing a structure on which to mount interchangeable canopy-patio-balcony-windscreen-chair-awning-perch-tent-sled-stand-basket-hammock bed 118,
    to respectively be disposed in various configurations
    (See FIG. 1A, FIG. 1B, FIG. 1C, FIG. 1D, FIG. 1E, FIG. 1F, FIG. 1G, FIG. 1H, FIG. 1I, FIG. 1J, FIG. 1K, FIG. 1L, FIG. 1M, FIG. 1N, FIG. 1O, FIG. 1P, FIG. 1Q, FIG. 12A, FIG. 12B, FIG. 12C, FIG. 12D, FIG. 12E, FIG. 12F, FIG. 12G, FIG. 12H, FIG. 12I, FIG. 12J, FIG. 12K, FIG. 12L, FIG. 12M, FIG. 12N, FIG. 12O, FIG. 12P, FIG. 12Q, FIG. 13A, FIG. 13B, FIG. 13C, FIG. 14A, FIG. 14B, FIG. 14C, FIG. 14D, FIG. 14E, and FIG. 14F); and
d) Providing multiple configuration options when combined with interchangeable side frame supports 117a, interchangeable T-shaped straight frame connectors 122, interchangeable T-shaped corner frame connectors 123, interchangeable adjustable leg supports 124a, and interchangeable adjustable center-brace leg support 124b mounting on multi-pet-containing panel system 101,
    to function as a pet canopy,
    to function as a pet patio,
    to function as a pet balcony,
    to function as a pet hammock,
    to function as a pet bed,
    to function as a perch,
    to function as an awning
    in the direction of arrow 139e
    (See FIG. 12E and FIG. 12F),
    to function as a tent with storage,
    to function as a chair,
    to function as a crate stand,
    to function as a sled
    in the direction of arrow 139f
    (See FIG. 12P),
    to function as a roof with storage,
    to function as a grooming platform,
    to function as a multi-pet grooming table,
    to function as a drying platform,
    to function as a wind, sun, and weather block,
    to function as a privacy screen, and
    to function as an independent pet bed
    (See FIG. 1A, FIG. 1B, FIG. 1C, FIG. 1D, FIG. 1E, FIG. 1F, FIG. 1G, FIG. 1H, FIG. 1I, FIG. 1J, FIG. 1K, FIG. 1L, FIG. 1M, FIG. 1N, FIG. 1O, FIG. 1P, FIG. 1Q, FIG. 12A, FIG. 12B, FIG. 12C, FIG. 12D, FIG. 12E, FIG. 12F, FIG. 12G, FIG. 12H, FIG. 12I, FIG. 12J, FIG. 12K, FIG. 12L, FIG. 12M, FIG. 12N, FIG. 12O, FIG. 12P, FIG. 12Q, FIG. 13A, FIG. 13B, FIG. 13C, FIG. 14A, FIG. 14B, FIG. 14C, FIG. 14D, FIG. 14E, and FIG. 14F).

Figure 12A:
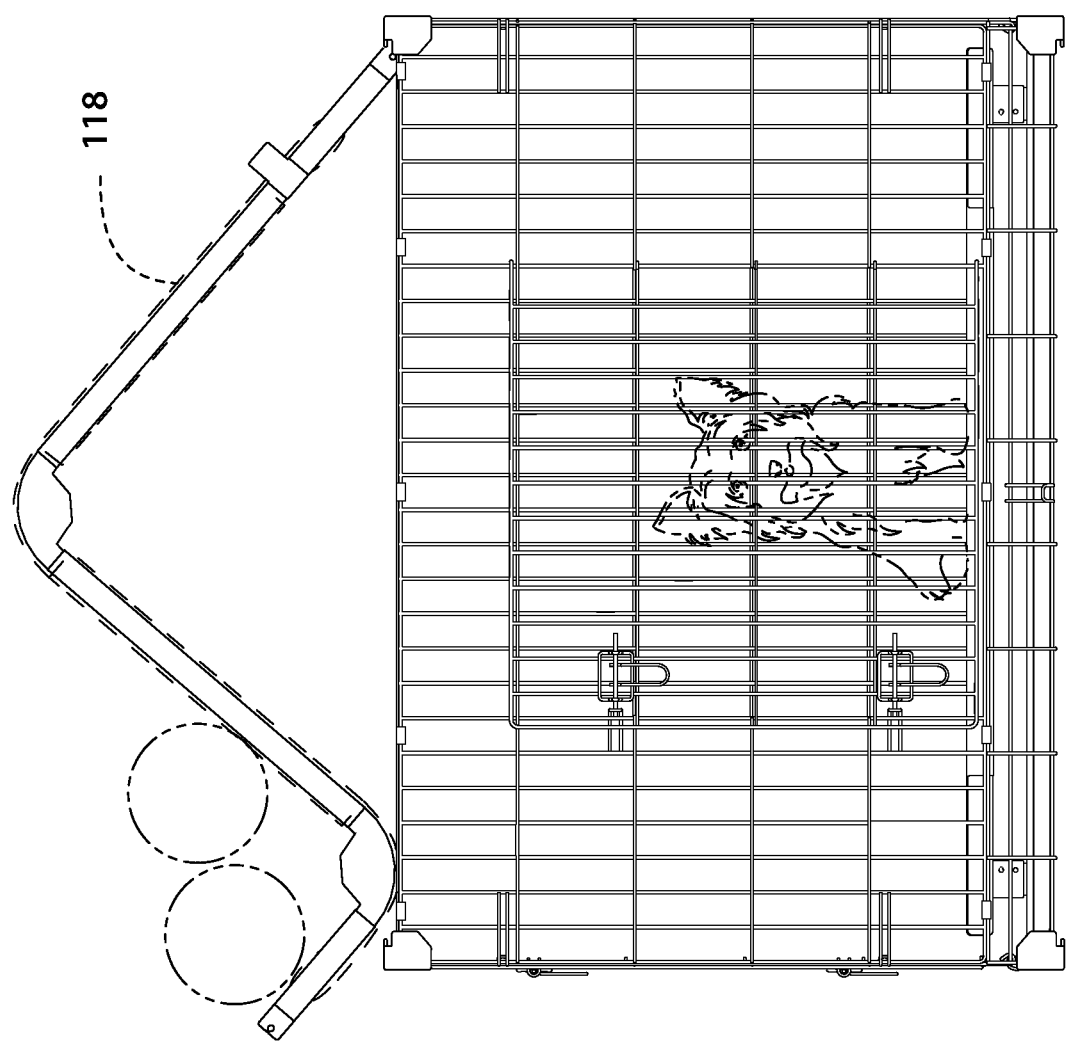
Figure 12C:
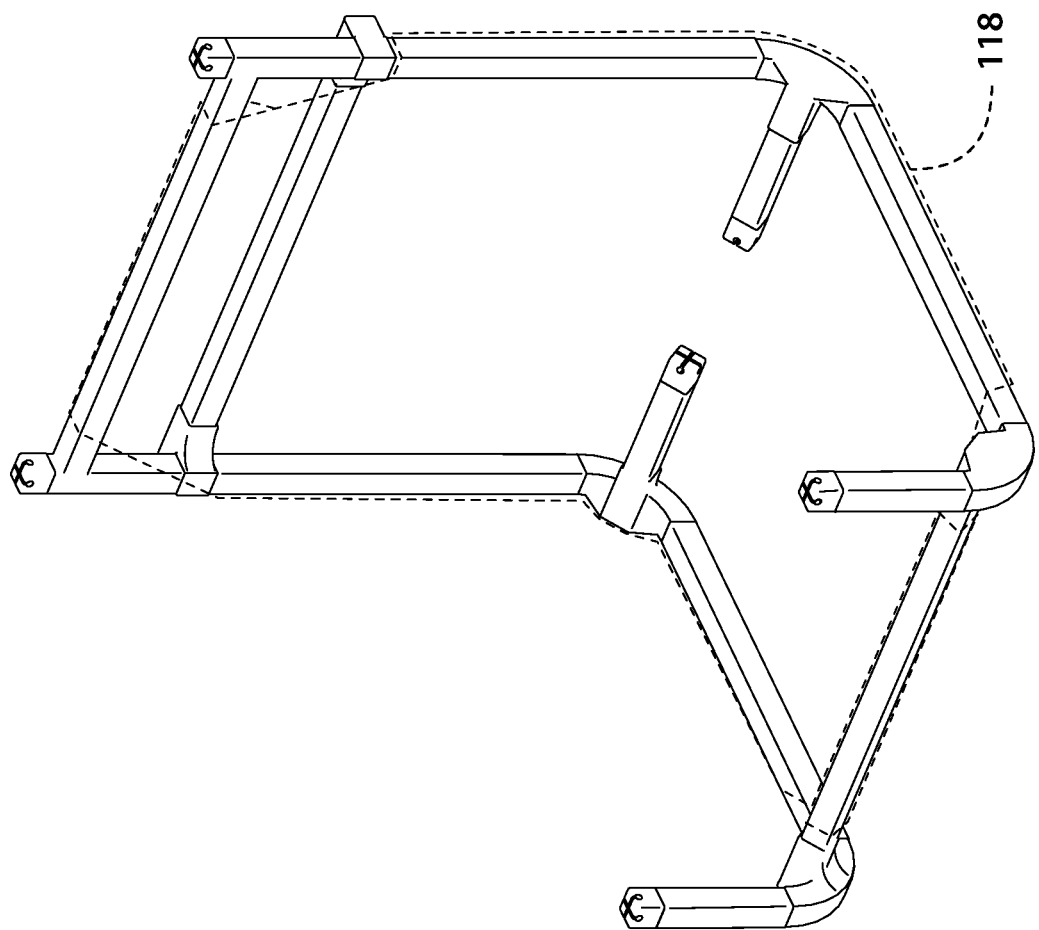
Figure 12D:
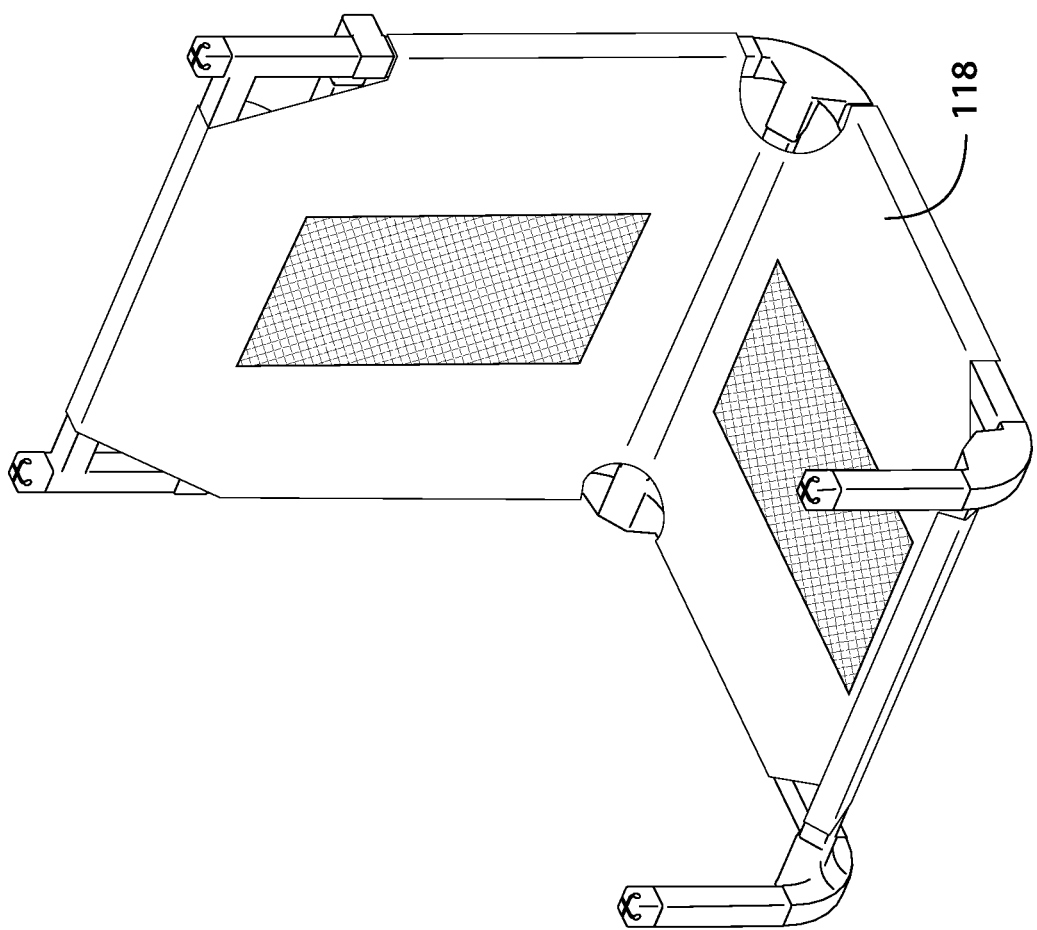
Figure 12G:
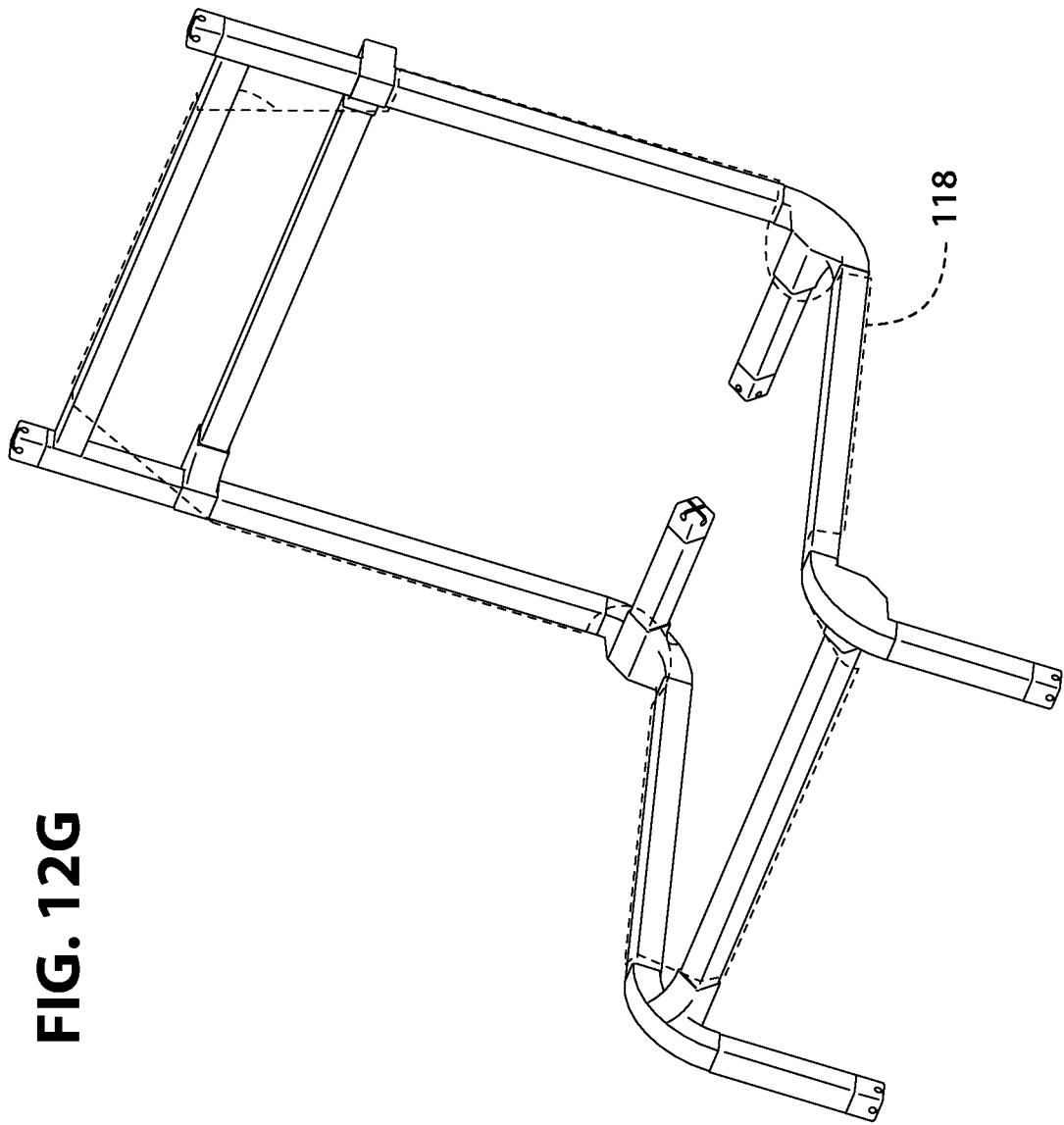
Figure 12H:
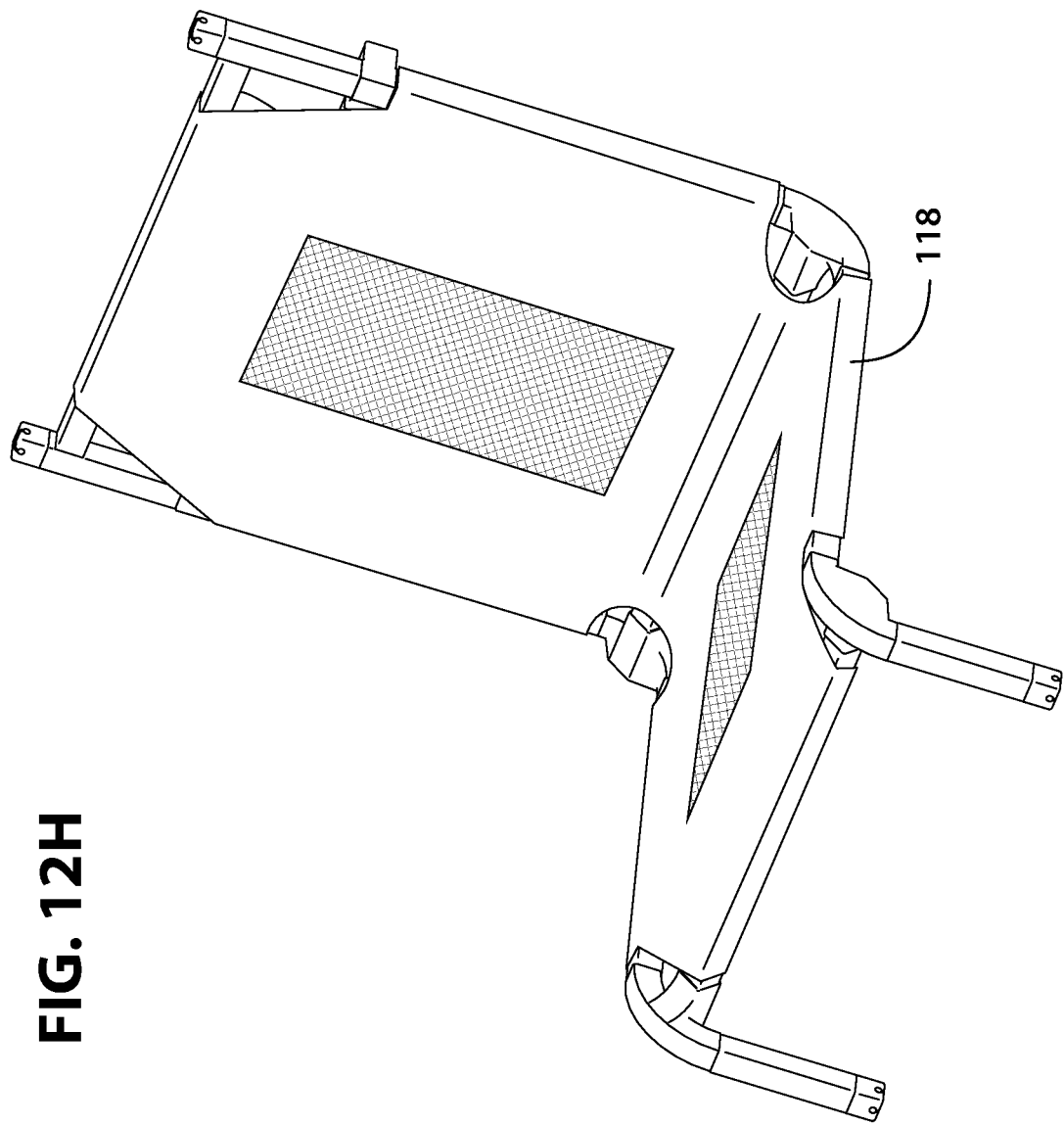
Figure 12I:
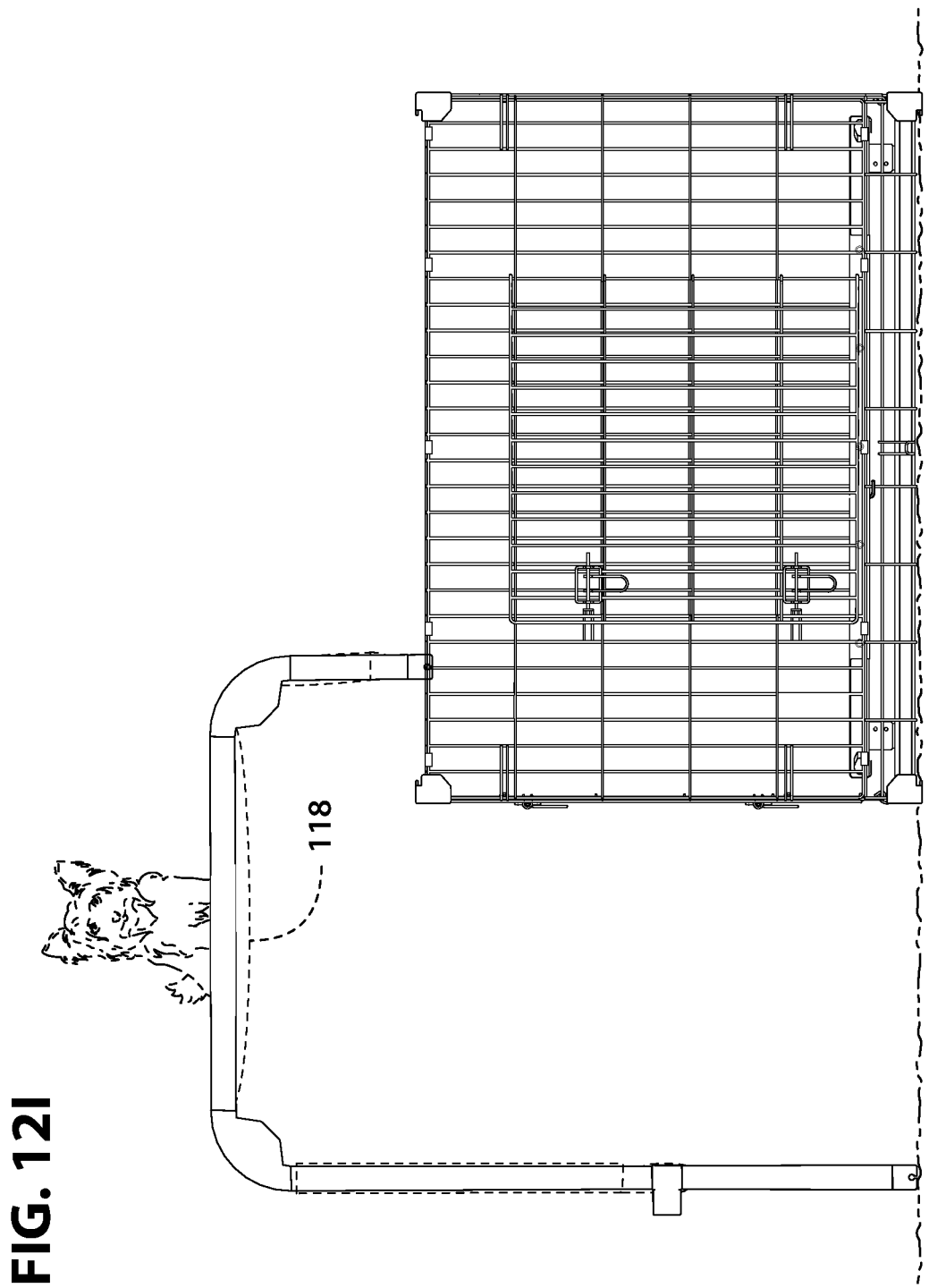
Figure 12J:
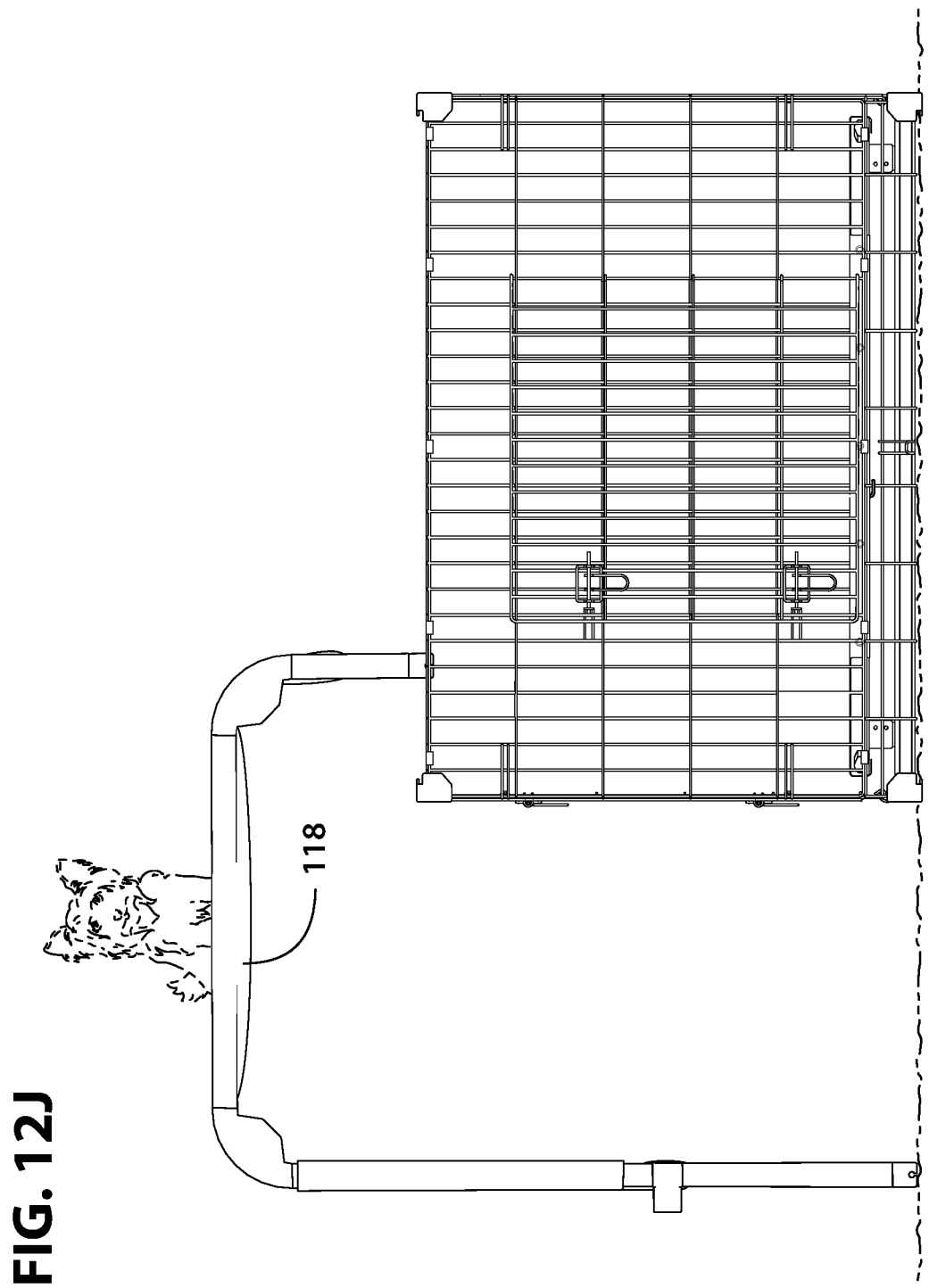
Figure 12K:
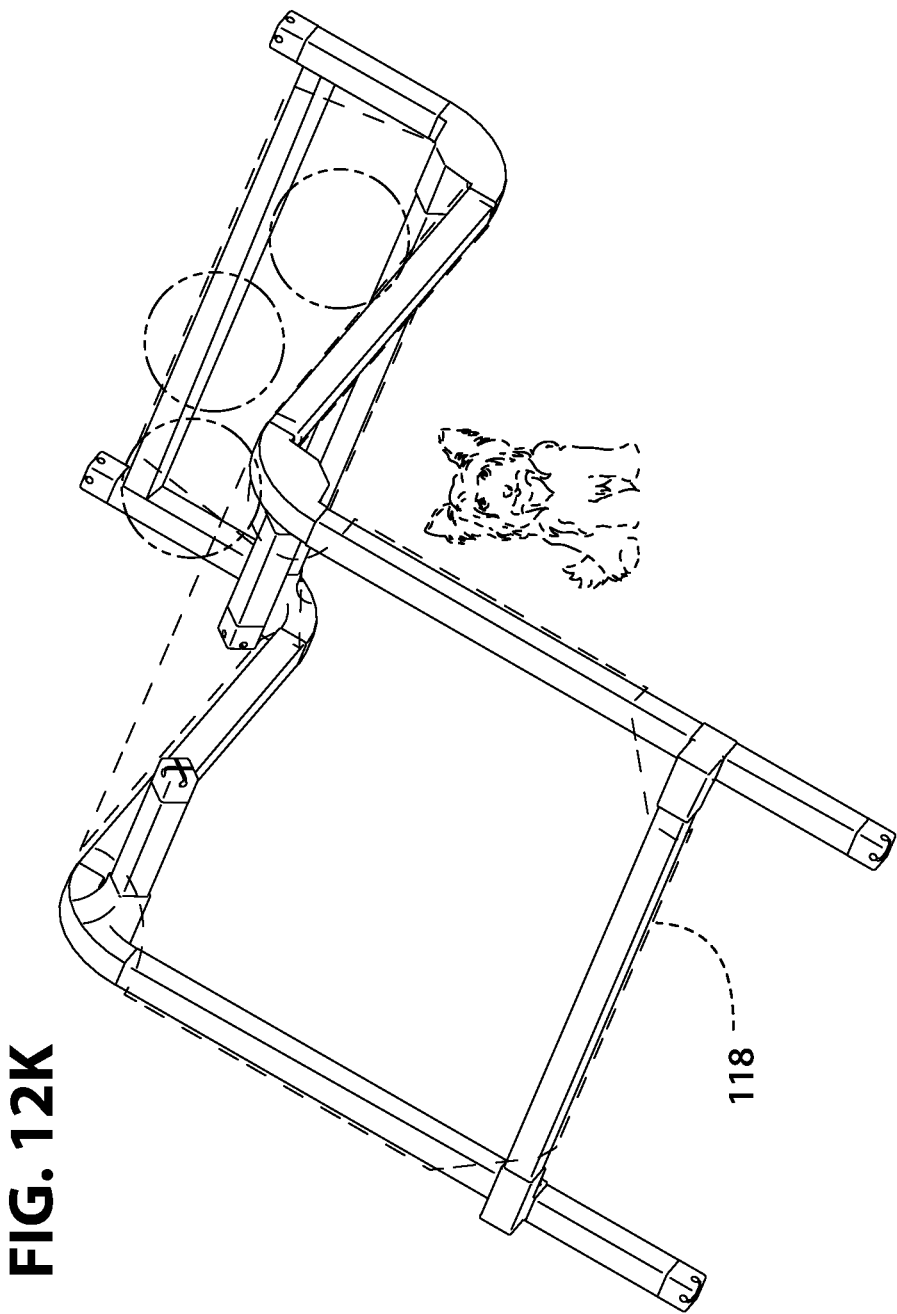
Figure 12L:
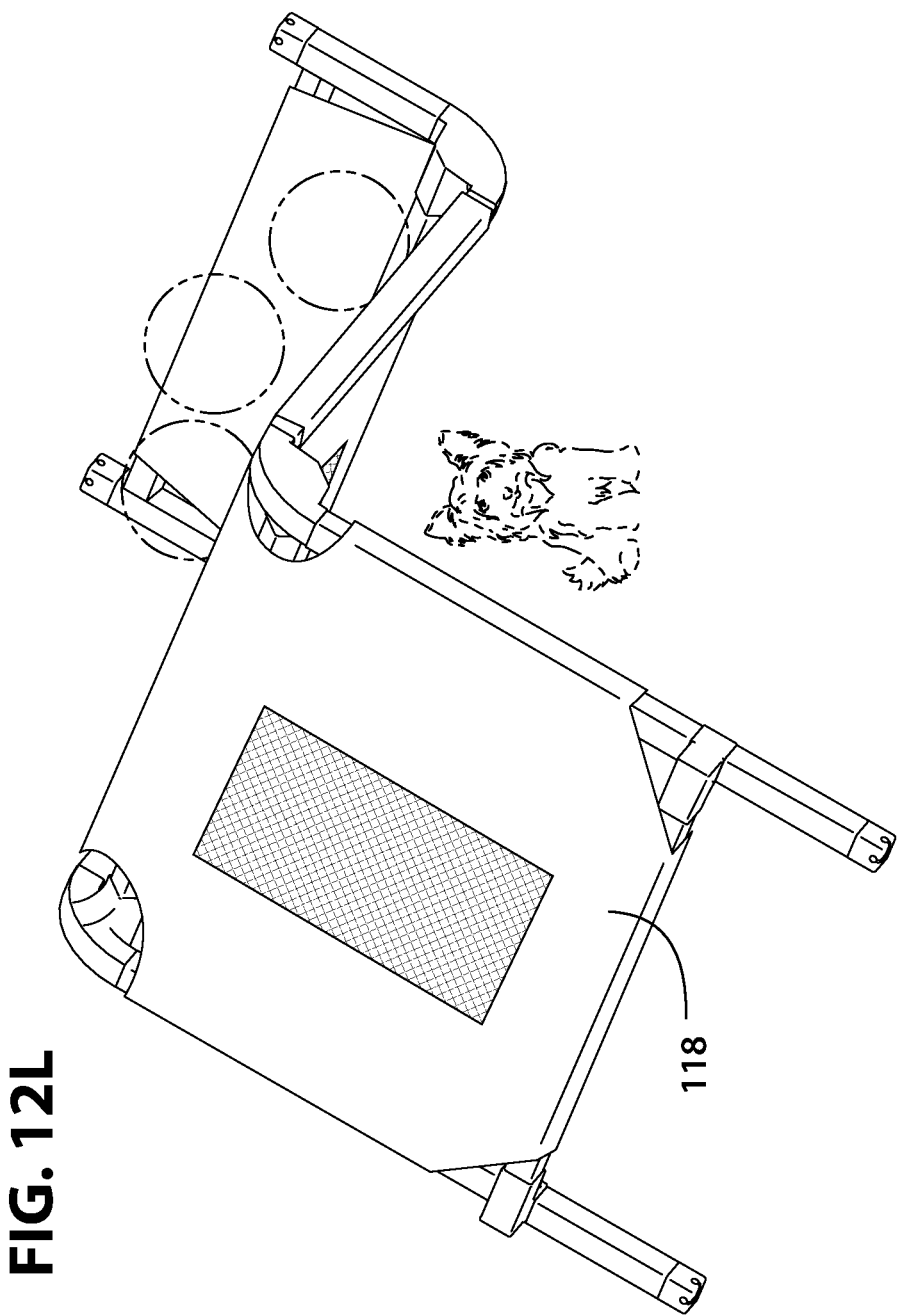
Figure 12M:
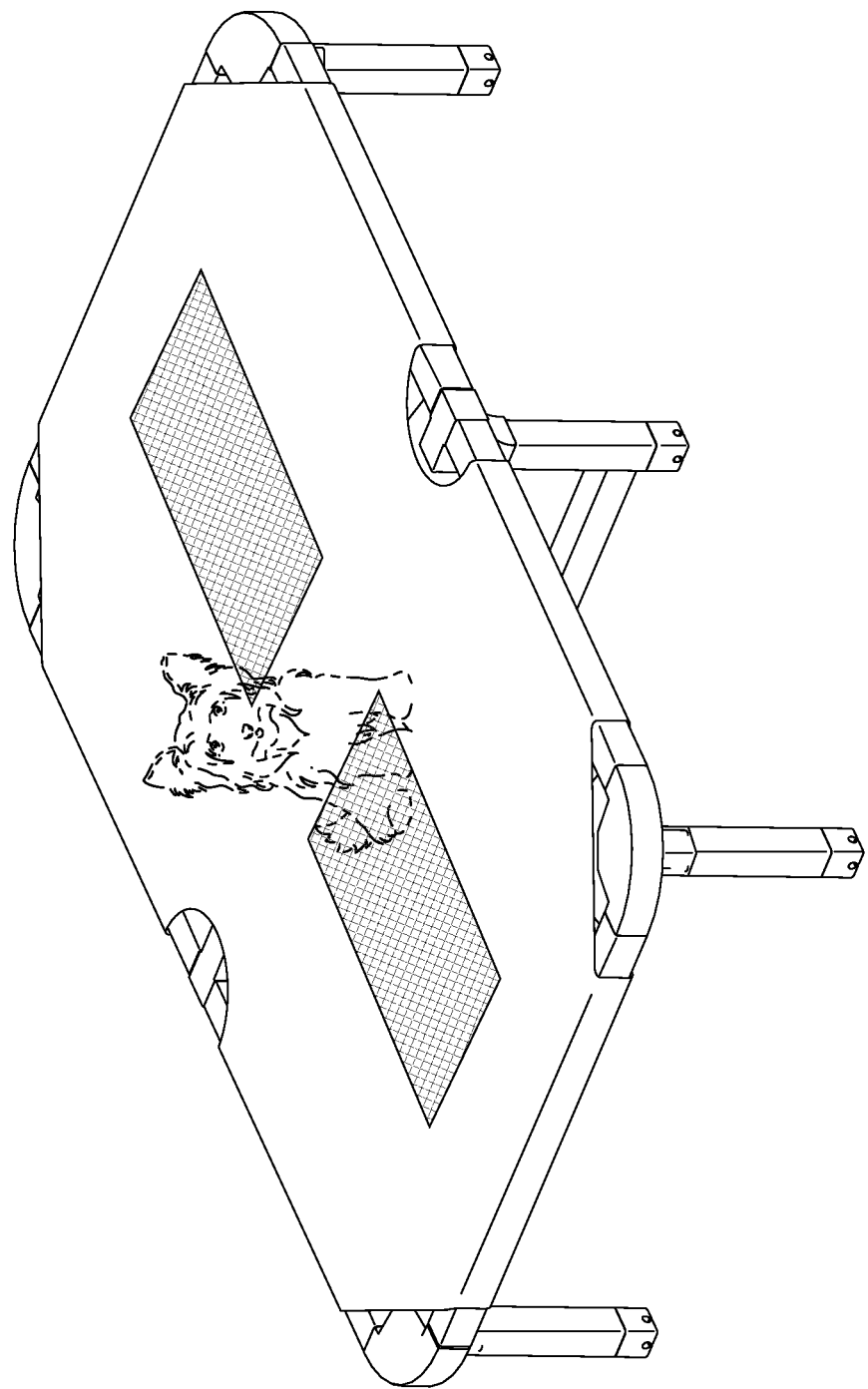
Figure 12N:
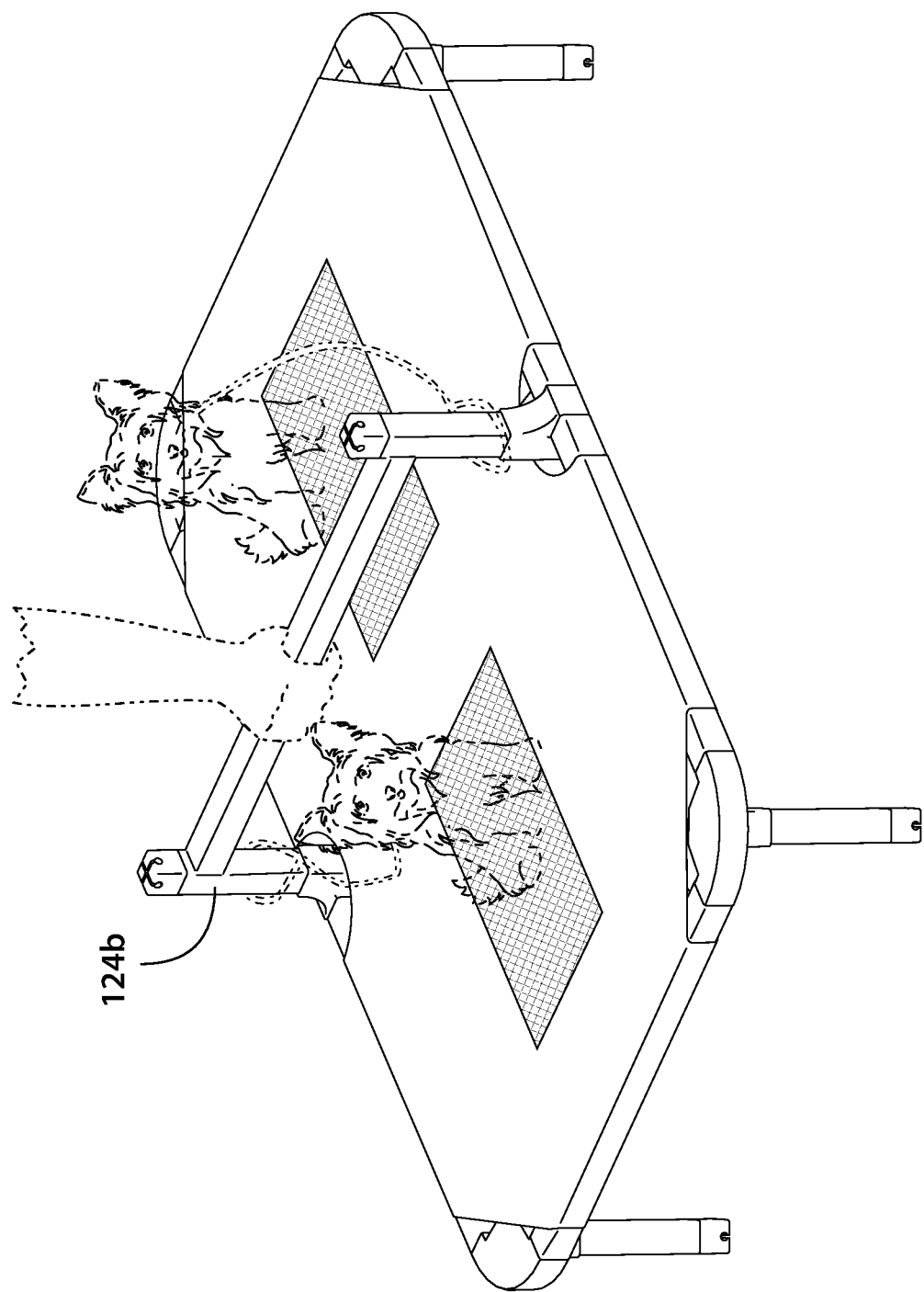
Figure 12P:
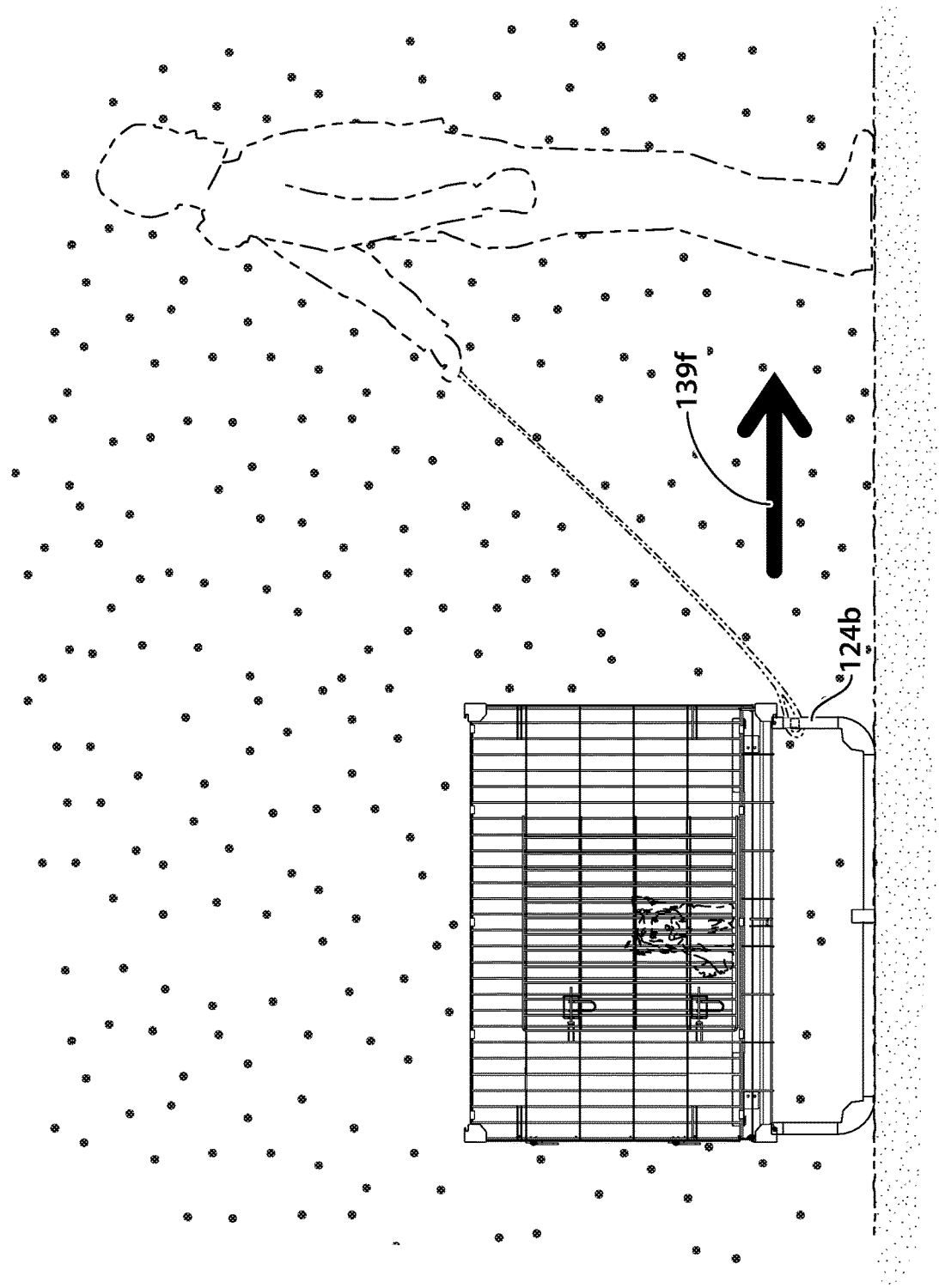
Figure 14B:
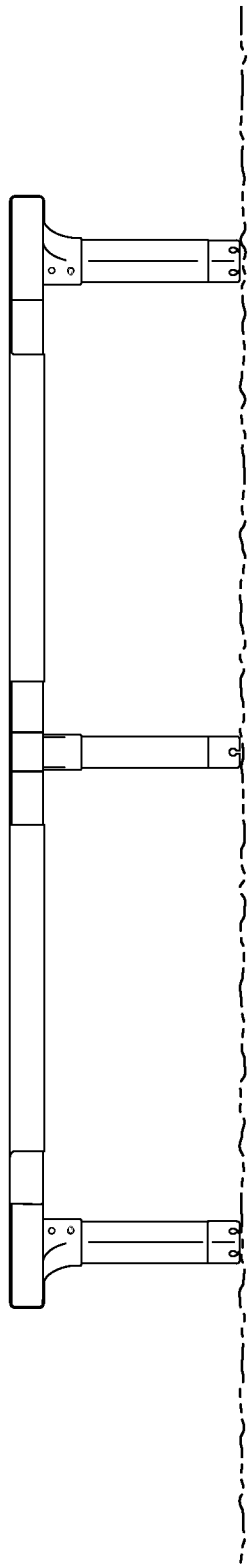
Figure 14C:
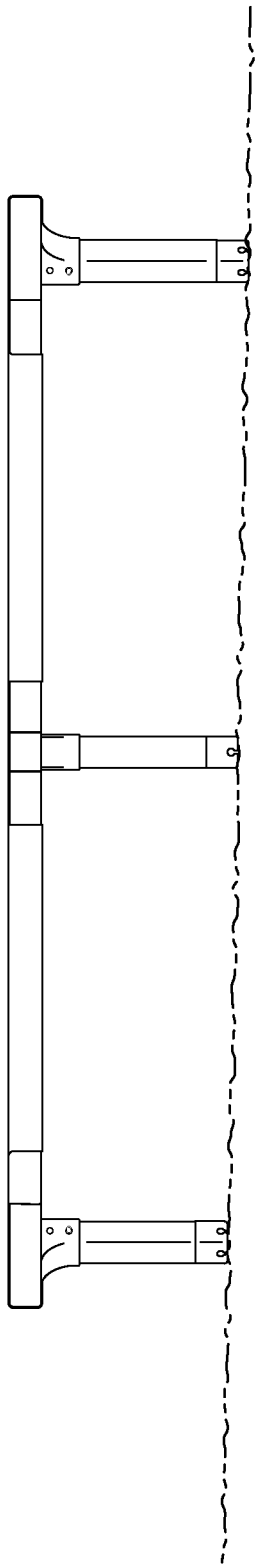
Figure 14F:
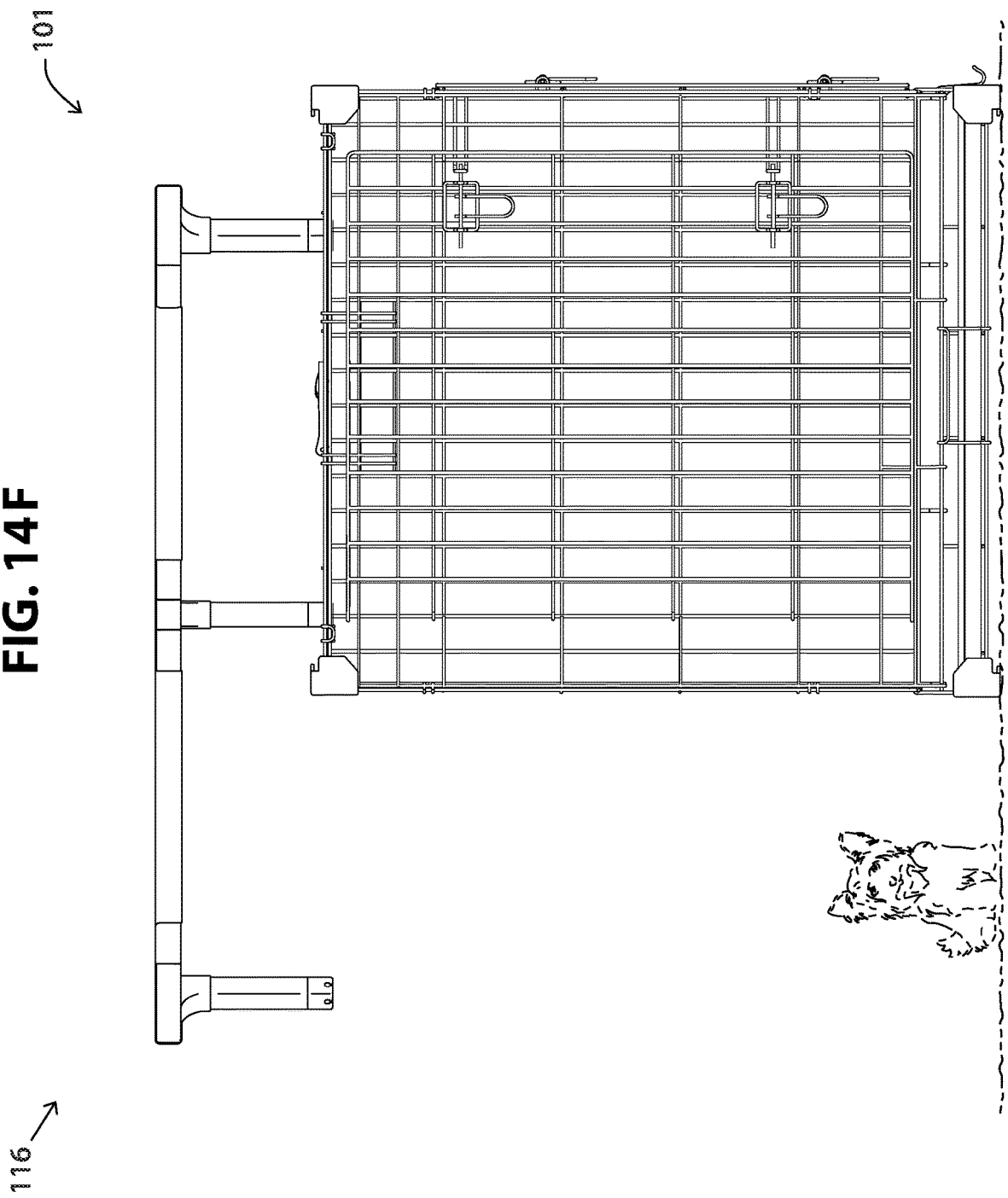
Figure 15D:
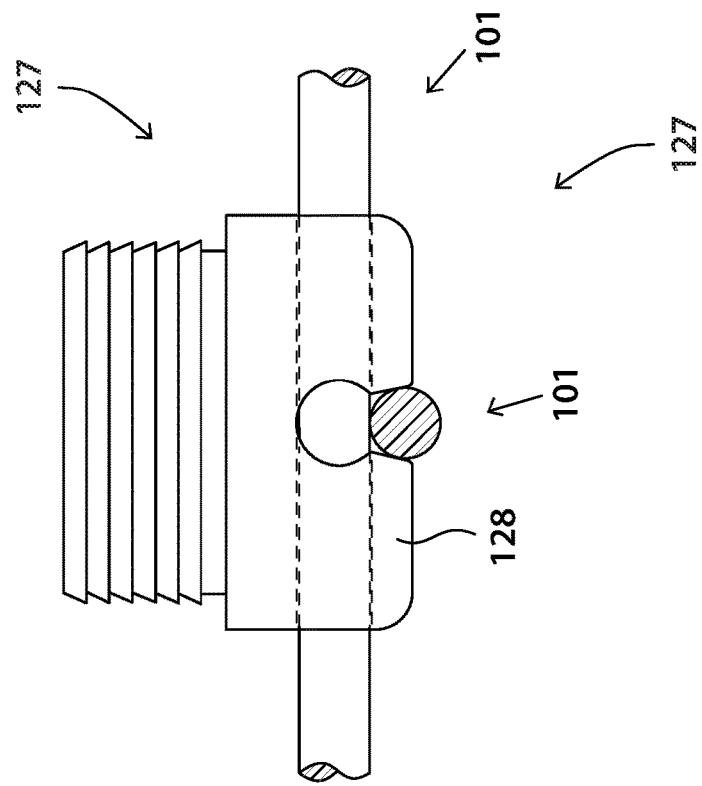
FIG. 15C, FIG. 15D, FIG. 15E, and FIG. 15F illustrate top and side views of how tick-blocking water-draining wire-clamping caps are securely mounted on multi-pet-containing panel system in various positions and orientations.
Figure 15C:
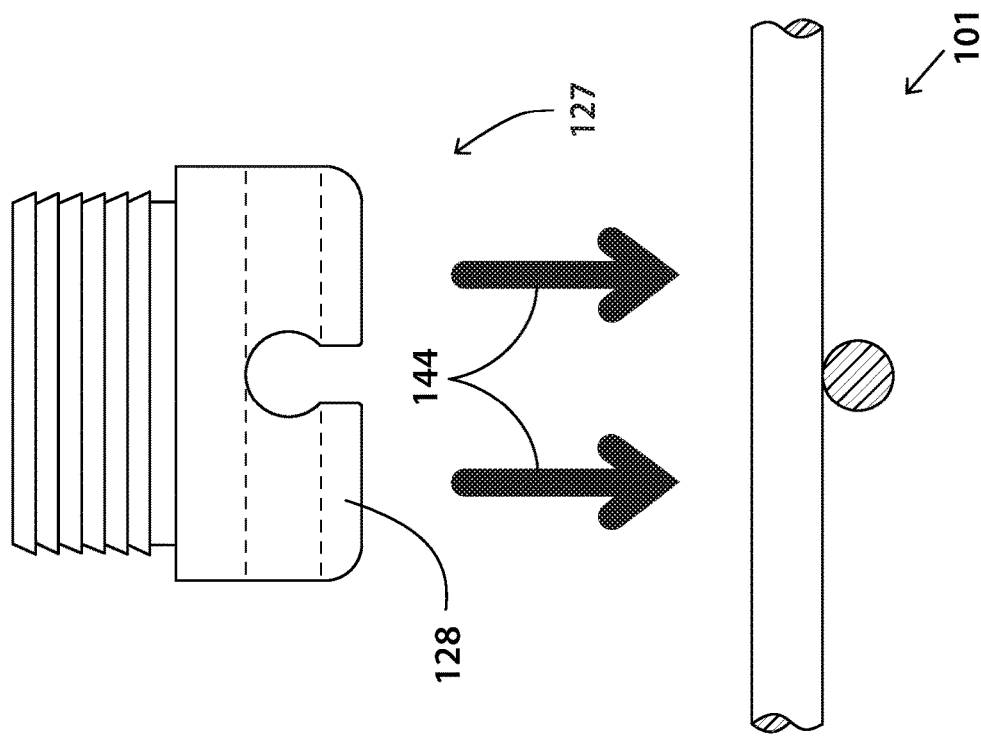
Figure 15F:
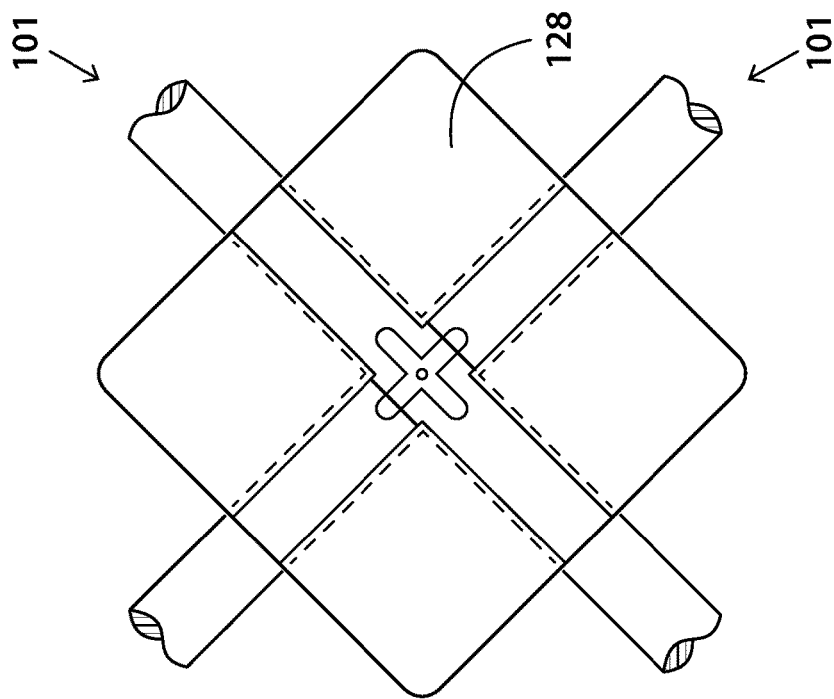
Figure 15E:
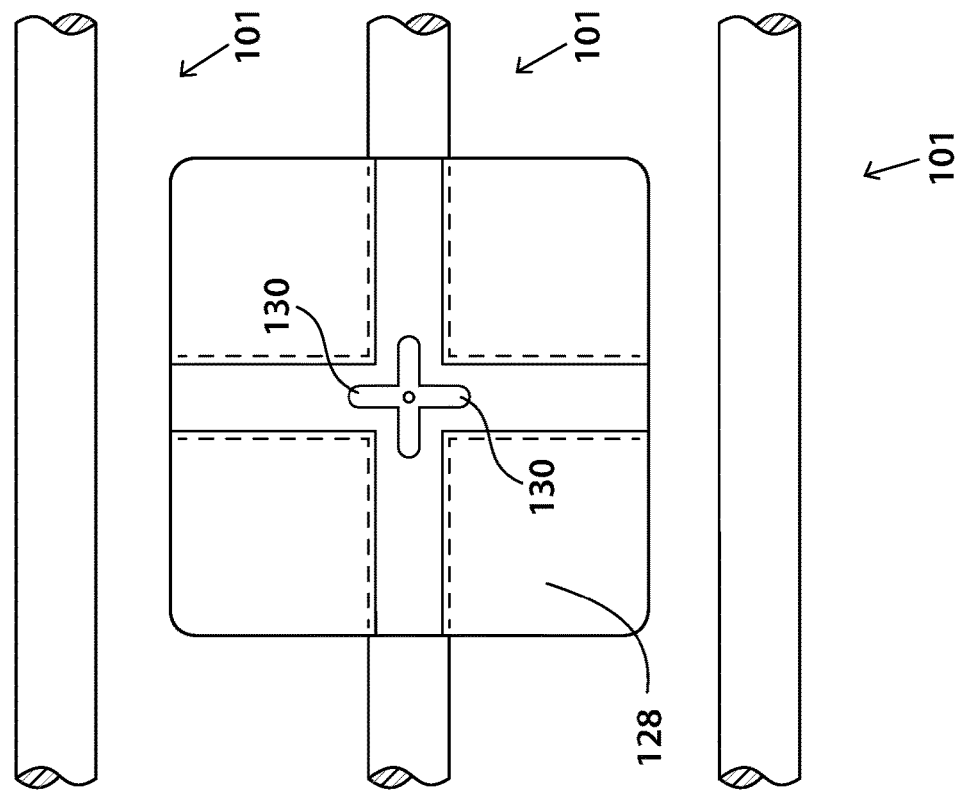

18) Interchangeable canopy-patio-balcony-windscreen-chair-awning-perch-tent-sled-stand-basket-hammock bed 118 is for:
  a) Providing multiple mounting positions above multi-pet-containing panel system 101,
      to be oriented longitudinally, laterally, or obliquely in the directions of arrows 140a and 140b
      (See FIG. 14D, FIG. 14E, and FIG. 14F);
  b) Functioning as a pet balcony and patio,
      to provide multiple pet balcony mounting positions above multi-pet-containing panel system 101, in which to allow pets to sit, stand, play, rest, and sleep thereon
      (See FIG. 14D, FIG. 14E, and FIG. 14F);
  c) Functioning as a pet hammock and bed,
      to be slung front-to-back or right-to-left, to allow pets to rest inside or above multi-pet-containing panel system 101
      (See FIG. 14D, FIG. 14E, and FIG. 14F);
  d) Functioning as a multiple position pet bed,
      to allow pets to rest inside or outside multi-pet-containing panel system 101
      (See FIG. 14D, FIG. 14E, and FIG. 14F);
  e) Functioning as a multiple position grooming platform,
      to provide a platform for a pet to stand, sit, or lay for grooming
      (See FIG. 14D, FIG. 14E, and FIG. 14F);
  f) Functioning as a multiple position drying platform,
      to provide a clean, comfortable, waterproof platform on which to dry a pet following a washing
      (See FIG. 14D, FIG. 14E, and FIG. 14F);
  g) Functioning as a multiple-position wind, sun, and weather block,
      to provide a vertical side-shield from the sun and other weather elements
      (See FIG. 12C and FIG. 12D);
  h) Functioning as a privacy screen,
      to provide a vertical side-shield for privacy from other pets, noise, and distractions
      (See FIG. 12C and FIG. 12D);
  i) Functioning as a chair,
      to provide a place to rest
      (See FIG. 12G and FIG. 12H);
  j) Functioning as an awning,
      to provide shade to pets
      in the direction of arrow 139e
      (See FIG. 12E and FIG. 12F);
  k) Functioning as a perch,
      to provide multiple resting locations for pets
      (See FIG. 12I and FIG. 12J);
  l) Functioning as a tent,
      to provide shade to pets
      (See FIG. 12K and FIG. 12L); and
  m) Functioning as a multi-pet grooming table,
      to groom multiple pets simultaneously
      (See FIG. 12N).

19) Waterproof toilets 119 respectively are for:
  a) Providing openings,
      to conveniently sweep hair, dirt, food crumbs, and feces therein
      (See FIG. 1R, FIG. 1S, and FIG. 2A);
  b) Providing air-flow openings,
      to allow greater air circulation, reducing stagnation and odor;

20) Left, right, front, and rear bed sleeves 120*a*, 120*b*, 120*c*, and 120*d* respectively are for:
   a) Attaching interchangeable canopy-patio-balcony-windscreen-chair-awning-perch-tent-sled-stand-basket-hammock bed 118
   to interchangeable side frame supports 117*a* and interchangeable end frame supports 117*b*
   (See FIG. 2A and FIG. 2B);
   b) Attaching interchangeable canopy-patio-balcony-windscreen-chair-awning-perch-tent-sled-stand-basket-hammock bed 118 to form a hammock
   (See FIG. 12Q).
21) Bed Velcro strips 121 respectively are for:
   Securing interchangeable canopy-patio-balcony-windscreen-chair-awning-perch-tent-sled-stand-basket-hammock bed 118 to interchangeable side frame supports 117*a*, and interchangeable end frame supports 117*b*.
22) Interchangeable T-shaped straight frame connectors 122 respectively are for:
   a) Quickly and releasably connecting interchangeable side frame supports 117*a*, interchangeable end frame supports 117*b*, interchangeable adjustable leg supports 124*a*, and interchangeable adjustable center-brace leg support 124*b*; and
   b) Quickly and releasably securing interchangeable adjustable leg supports 124*a* and interchangeable adjustable center-brace leg support 124*b* at multiple locations internally and externally, respectively,
      to mount interchangeable adjustable leg supports 124*a* and
      interchangeable adjustable center-brace leg support 124*b*.
23) Interchangeable T-shaped corner frame connectors 123 respectively are for:
   Quick-releasably securing upper and interchangeable adjustable leg supports 124*a* and interchangeable adjustable center-brace leg support 124*b* at multiple locations internally and externally, respectively,
      to mount interchangeable adjustable leg supports 124*a* and
      interchangeable adjustable center-brace leg support 124*b*.
24) Interchangeable adjustable leg supports 124*a* respectively are for:
   Being adjusted to variable heights,
      to form a slanted pet canopy surface;
      to form a slanted pet patio surface;
      to form a slanted pet balcony surface;
      to form a slanted pet bed surface;
      to form a slanted pet grooming platform surface;
      to form a slanted pet drying platform surface; and
      to form a slanted independent pet bed surface
      (See FIG. 14A, FIG. 14B, FIG. 14C, FIG. 14D, FIG. 14E, and FIG. 14F).
   Interchangeable adjustable center-brace leg support 124*b* is for:
   Being adjusted to variable heights,
      to form a slanted pet canopy surface;
      to form a slanted pet patio surface;
      to form a slanted pet balcony surface;
      to form a slanted pet bed surface;
      to form a slanted pet grooming platform surface;
      to form a slanted pet drying platform surface; and
      to form a slanted independent pet bed surface
      (See FIG. 14A, FIG. 14B, FIG. 14C, FIG. 14D, FIG. 14E, and FIG. 14F).
25) Spring-pin holes 125 respectively are for:
   Allowing spring-pins 126 to snap in to lock interchangeable T-shaped corner frame connectors 123 and interchangeable adjustable leg supports 124*a* together, and to retract for storage.
26) Spring-pins 126 respectively are for:
   Adjustably snapping in spring-pin holes 125
      to lock interchangeable T-shaped corner frame connectors 123 and interchangeable adjustable leg supports 124*a* together, and to retract for storage,
      (See FIG. 2E, FIG. 14D, FIG. 14E, and FIG. 14F).
27) Tick-blocking water-draining wire-clamping cap systems 127 respectively are for performing the combined functions of its components:
28) Tick-blocking water-draining wire-clamping cap 128 is for:
   a) Plugging the end of interchangeable adjustable leg supports 124*a*; and
   b) Clamping on top panel 103*a* to allow interchangeable canopy-patio-balcony-windscreen-chair-awning-perch-tent-sled-stand-basket-hammock bed 118 to function as a pet canopy, a pet patio, a pet balcony, a windscreen, a chair, an awning, a perch, a pet tent, a sled, a basket, a pet hammock, and a pet bed;
29) Tick-blocking teeth 129 respectively are for:
   a) Preventing ticks from entering interchangeable adjustable leg supports 124*a* and interchangeable adjustable center-brace leg support 124*b*,
      to prevent ticks from hiding therein
      in the direction of arrow 141
      (See FIG. 15A);
   b) Preventing ticks from hiding inside of tick-blocking water-draining wire-clamping cap 128,
      to protect pets from tick diseases
      (See FIG. 15A); and
   c) Allowing water and condensation to drip downward
      to prevent rusting
      in the directions of arrows 142 and 143
      (See FIG. 15B).
30) Water-draining T-shaped hole 130 is for:
   a) Allowing condensation and rain water to drain away,
      to prevent rusting
      in the directions of arrows 142 and 143
      (See FIG. 15B);
   b) Allowing condensation to evaporate,
      to prevent rusting
      (See FIG. 15B);
   c) Being inserted by the wires of top panel 103*a*,
      to secure Interchangeable canopy-patio-balcony-windscreen-chair-awning-perch-tent-sled-stand-basket-hammock bed 118 on top panel 103*a*,
      in the direction of arrow 144
      (See FIG. 15C, FIG. 15D, FIG. 15E, and FIG. 15F).
31) Tray-locking shock-absorbing gusset systems 131 respectively are for performing the combined functions of its components:
32) Gusset walls 132 respectively are for:
   a) Strengthening top, bottom, left, right, front, and rear panels 103*a*, 103*b*, 103*c*, 103*d*, 103*e*, and 103*f*;
   b) Strengthening multi-pet-containing panel system 101; and
   c) Locking top, bottom, left, right, front, and rear panels 103*a*, 103*b*, 103*c*, 103*d*, 103*e*, and 103*f* together.
33) Wire-locking gusset recesses 133 respectively are for:
   Locking the corners of top, bottom, left, right, front, and rear panels 103*a*, 103*b*, 103*c*, 103*d*, 103*e*, and 103*f*.

34) Curved gusset springs 134*a*, 134*b*, and 134*c* respectively are for:
   a) Resisting the warping forces exerted on top, bottom, left, right, front, and rear panels 103*a*, 103*b*, 103*c*, 103*d*, 103*e*, and 103*f*;
   b) Resisting the twisting forces exerted on top, bottom, left, right, front, and rear panels 103*a*, 103*b*, 103*c*, 103*d*, 103*e*, and 103*f*;
   c) Resisting the bending forces exerted on top, bottom, left, right, front, and rear panels 103*a*, 103*b*, 103*c*, 103*d*, 103*e*, and 103*f*;
   d) Resisting the sliding forces exerted on top, bottom, left, right, front, and rear panels 103*a*, 103*b*, 103*c*, 103*d*, 103*e*, and 103*f*;
   e) Resisting the wobbling forces exerted on top, bottom, left, right, front, and rear panels 103*a*, 103*b*, 103*c*, 103*d*, 103*e*, and 103*f*;
   f) Resisting the folding forces exerted on top, bottom, left, right, front, and rear panels 103*a*, 103*b*, 103*c*, 103*d*, 103*e*, and 103*f*;
   g) Strengthening vertical gusset spring 135;
   h) Strengthening horizontal gusset spring 136; and
   i) Returning multi-function tray-locking shock-absorbing gusset system 131 back to its former shape and dimensions
      in the directions of arrows 145*a*, 145*b*, and 145*c*
      (See FIG. 16A, FIG. 16B, FIG. 16C, FIG. 16D, FIG. 16E, and FIG. 16F).

35) Vertical gusset spring 135 is for:
   a) Resisting the warping forces exerted on top, bottom, left, right, front, and rear panels 103*a*, 103*b*, 103*c*, 103*d*, 103*e*, and 103*f*;
   b) Resisting the twisting forces exerted on top, bottom, left, right, front, and rear panels 103*a*, 103*b*, 103*c*, 103*d*, 103*e*, and 103*f*;
   c) Resisting the bending forces exerted on top, bottom, left, right, front, and rear panels 103*a*, 103*b*, 103*c*, 103*d*, 103*e*, and 103*f*;
   d) Resisting the sliding forces exerted on top, bottom, left, right, front, and rear panels 103*a*, 103*b*, 103*c*, 103*d*, 103*e*, and 103*f*;
   e) Resisting the wobbling forces exerted on top, bottom, left, right, front, and rear panels 103*a*, 103*b*, 103*c*, 103*d*, 103*e*, and 103*f*;
   f) Resisting the folding forces exerted on top, bottom, left, right, front, and rear panels 103*a*, 103*b*, 103*c*, 103*d*, 103*e*, and 103*f*;
   g) Strengthening curved gusset springs 134*a*, 134*b*, and 134*c*;
   h) Strengthening horizontal gusset spring 136; and
   i) Returning multi-function tray-locking shock-absorbing gusset system 131 back to its former shape and dimensions
      in the directions of arrows 145*a*, 145*b*, and 145*c*
      (See FIG. 16A, FIG. 16B, FIG. 16C, FIG. 16D, FIG. 16E, and FIG. 16F).

36) Horizontal gusset spring 136 is for:
   a) Resisting the warping forces exerted on top, bottom, left, right, front, and rear panels 103*a*, 103*b*, 103*c*, 103*d*, 103*e*, and 103*f*;
   b) Resisting the twisting forces exerted on top, bottom, left, right, front, and rear panels 103*a*, 103*b*, 103*c*, 103*d*, 103*e*, and 103*f*;
   c) Resisting the bending forces exerted on top, bottom, left, right, front, and rear panels 103*a*, 103*b*, 103*c*, 103*d*, 103*e*, and 103*f*;
   d) Resisting the sliding forces exerted on top, bottom, left, right, front, and rear panels 103*a*, 103*b*, 103*c*, 103*d*, 103*e*, and 103*f*;
   e) Resisting the wobbling forces exerted on top, bottom, left, right, front, and rear panels 103*a*, 103*b*, 103*c*, 103*d*, 103*e*, and 103*f*;
   f) Resisting the folding forces exerted on top, bottom, left, right, front, and rear panels 103*a*, 103*b*, 103*c*, 103*d*, 103*e*, and 103*f*;
   g) Strengthening vertical gusset spring 135;
   h) Strengthening curved gusset springs 134*a*, 134*b*, and 134*c*; and
   i) Returning multi-function tray-locking shock-absorbing gusset system 131 back to its former shape and dimensions
      in the directions of arrows 145*a*, 145*b*, and 145*c*
      (See FIG. 16A, FIG. 16B, FIG. 16C, FIG. 16D, FIG. 16E, and FIG. 16F).

37) Tray-locking shock-absorbing gusset spring 137 is for:
   a) Locking urine-waste-water-storing tray 108 in place
      (See FIG. 11A, FIG. 11B, FIG. 11C, FIG. and 11D);
   b) Preventing all eight corners of multi-pet-containing panel system 101 from scratching walls, floors, and furniture
      (See FIG. 7 and FIG. 9);
   c) Preventing all eight corners of multi-pet-containing panel system 101 from causing injuries to people and pets
      (See FIG. 7 and FIG. 9);
   d) Absorbing shocks exerted on multi-pet-containing panel system 101,
      to provide pets with comfort while being stationary or transported;
   e) Absorbing vibrations exerted on multi-pet-containing panel system 101,
      to provide pets with comfort while being stationary or transported;
   f) Resisting the warping forces exerted on top, bottom, left, right, front, and rear panels 103*a*, 103*b*, 103*c*, 103*d*, 103*e*, and 103*f*;
   g) Resisting the twisting forces exerted on top, bottom, left, right, front, and rear panels 103*a*, 103*b*, 103*c*, 103*d*, 103*e*, and 103*f*;
   h) Resisting the bending forces exerted on top, bottom, left, right, front, and rear panels 103*a*, 103*b*, 103*c*, 103*d*, 103*e*, and 103*f*;
   i) Resisting the sliding forces exerted on top, bottom, left, right, front, and rear panels 103*a*, 103*b*, 103*c*, 103*d*, 103*e*, and 103*f*;
   j) Resisting the wobbling forces exerted on top, bottom, left, right, front, and rear panels 103*a*, 103*b*, 103*c*, 103*d*, 103*e*, and 103*f*;
   k) Resisting the folding forces exerted on top, bottom, left, right, front, and rear panels 103*a*, 103*b*, 103*c*, 103*d*, 103*e*, and 103*f*;
   l) Strengthening curved gusset springs 134*a*, 134*b*, and 134*c*;
   m) Strengthening vertical gusset spring 135;
   n) Strengthening horizontal gusset spring 136; and
   o) Returning multi-function tray-locking shock-absorbing gusset system 131 back to its former shape and dimensions
      in the directions of arrows 145*a*, 145*b*, and 145*c*
      (See FIG. 16A, FIG. 16B, FIG. 16C, FIG. 16D, FIG. 16E, and FIG. 16F).

Variation

Referring to FIG. 16G, FIG. 17A, FIG. 17B, FIG. 18, FIG. 19, FIG. 20A, FIG. 20B, FIG. 21A, FIG. 21B, FIG. 21C, FIG. 21D, FIG. 21E, and FIG. 21F.

Figure 17A:
FIG. 17A and FIG. 17B illustrate top and side views of a variation of interchangeable-canopy-patio-balcony-windscreen-chair-awning-perch-tent-sled-stand-basket-hammock-bed system.
Figure 17B:
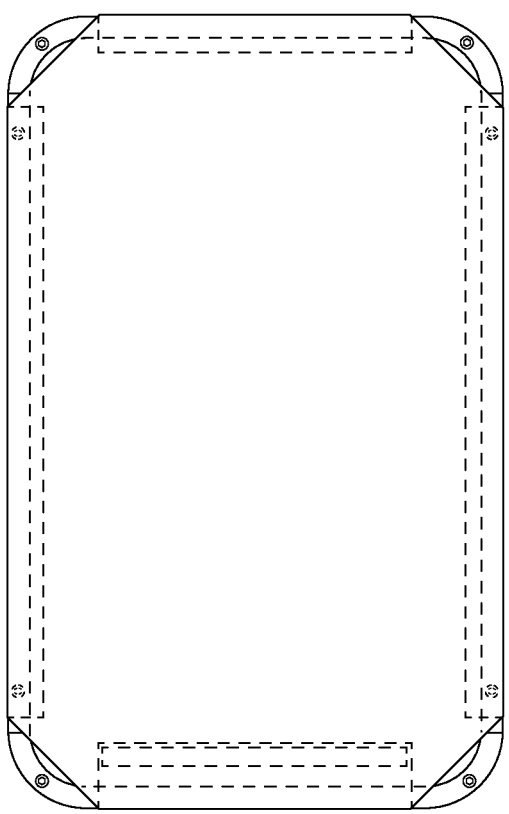
Figure 20A:
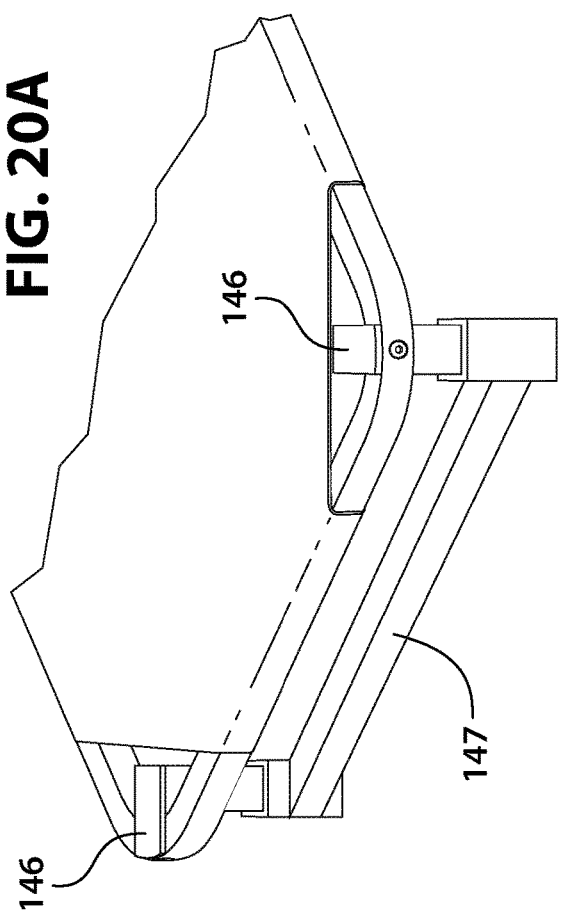
FIG. 20A and FIG. 20B illustrate perspective-top and perspective-bottom views of two variation braces for interchangeable adjustable leg supports of the bed.
Figure 20B:
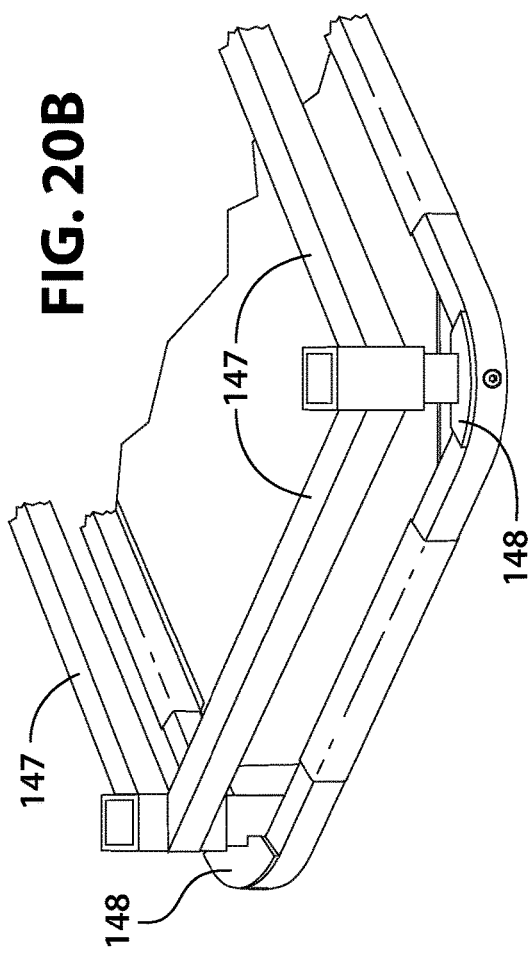
Figure 18:
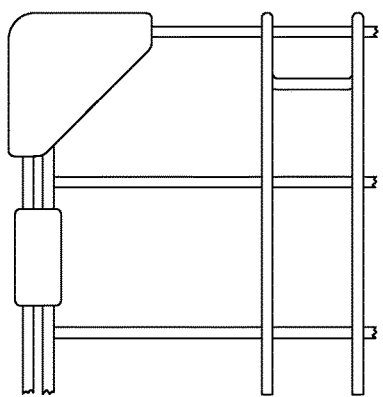
FIG. 18 illustrates a side view of a variation of tray-locking shock-absorbing gusset system.
Figure 19:
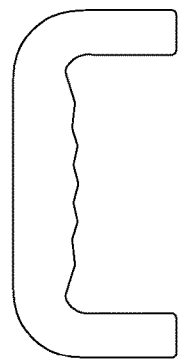
FIG. 19 illustrates a front view of a variation of handle.
Figure 21A:
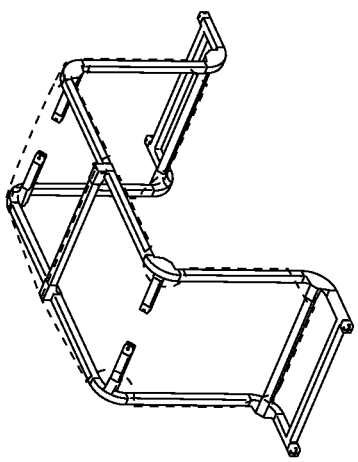
FIG. 21A, FIG. 21B, FIG. 21C, FIG. 21D, FIG. 21E, and FIG. 21F illustrate perspective views of multiple variations of interchangeable canopy-patio-balcony-windscreen-chairawning-perch-tent-sled-stand-basket-hammock-beds being attached to and working in conjunction with each other or one another.
Figure 21B:
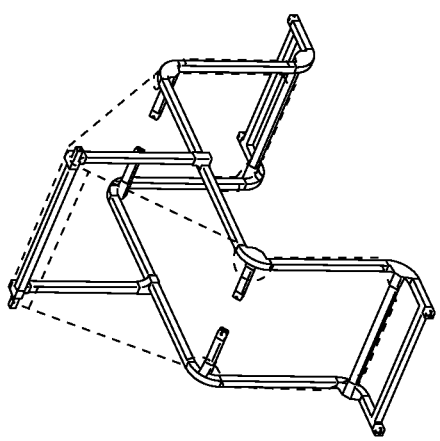
Figure 21C:
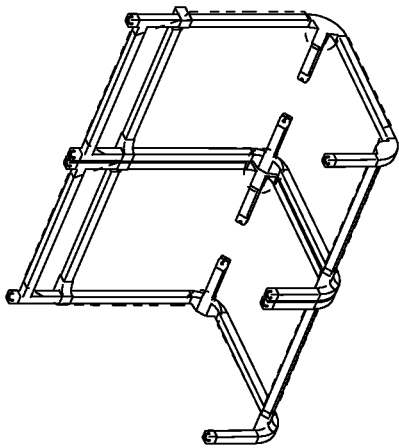
Figure 21D:
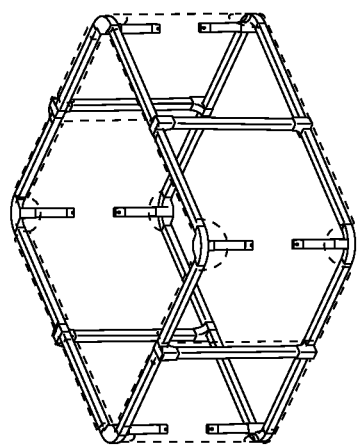
Figure 21E:
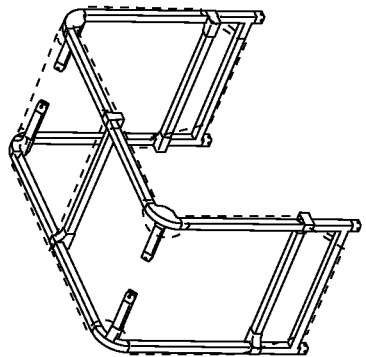
Figure 21F:
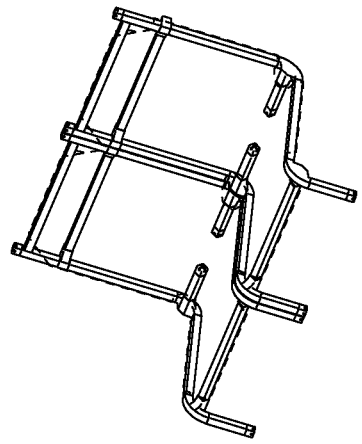

Any component of the twelve-device-in-one interchangeable-canopy-patio-balcony-windscreen-chair-awning-perch-tent-sled-stand-basket-hammock-bed pet crate can be made of any material(s). Any component of the twelve-device-in-one interchangeable-canopy-patio-balcony-windscreen-chair-awning-perch-tent-sled-stand-basket-hammock-bed pet crate can be formed into any shape and size. For example, interchangeable side frame supports 117a and interchangeable end frame supports 117b each can have a cross-section of any geometric shape, such as, square, rectangle, or oval. FIG. 16G illustrates a front view of the twelve-device-in-one interchangeable-canopy-patio-balcony-windscreen-chair-awning-perch-tent-sled-stand-basket-hammock-bed pet crate being folded up while reducing 30% of the prior-art-pet-crate volume for reduced-cost for convenient storage and transportation. FIG. 17A illustrates a side view of a variation of interchangeable-canopy-patio-balcony-windscreen-chair-awning-perch-tent-sled-stand-basket-hammock-bed system 116, having interchangeable T-shaped corner frame connectors 123 inserted inside interchangeable adjustable leg supports 124a, and having no interchangeable adjustable center-brace leg support 124b, spring-pin holes 125, nor spring-pins 126. Interchangeable T-shaped corner frame connectors 123 are longer than interchangeable adjustable leg supports 124a to raise interchangeable canopy-patio-balcony-windscreen-chair-awning-perch-tent-sled-stand-basket-hammock bed 118 up. FIG. 17B illustrates a top view of a variation of interchangeable-canopy-patio-balcony-windscreen-chair-awning-perch-tent-sled-stand-basket-hammock-bed system 116, having left bed sleeve 120a weaved or Velcroed to interchangeable canopy-patio-balcony-windscreen-chair-awning-perch-tent-sled-stand-basket-hammock bed 118, and right, front, and rear bed sleeves 120b, 120c, and 120d weaved or sewn to interchangeable canopy-patio-balcony-windscreen-chair-awning-perch-tent-sled-stand-basket-hammock bed 118. Interchangeable T-shaped corner frame connectors 123 are perpendicularly disposed under and screwed to the four corners of interchangeable canopy-patio-balcony-windscreen-chair-awning-perch-tent-sled-stand-basket-hammock bed 118 by screwing perpendicularly downwards through the four corners of interchangeable canopy-patio-balcony-windscreen-chair-awning-perch-tent-sled-stand-basket-hammock bed 118. Four waterproof toilets are at the four corners of interchangeable canopy-patio-balcony-windscreen-chair-awning-perch-tent-sled-stand-basket-hammock bed 118. FIG. 18 illustrates a side view of a variation of tray-locking shock-absorbing gusset system 131. FIG. 19 illustrates a front view of a variation of handle 102a. FIG. 20A illustrates a perspective-top view of upper leg braces 146 and lower leg braces 147. Each of upper-leg braces 146 has a generally rectangular or oval shape and is welded to or otherwise attached to one of interchangeable adjustable leg supports 124a to brace interchangeable adjustable leg supports 124a to interchangeable straight and corner frame connectors 122 and 123. Each of lower leg braces 147 has a tube or rod shape and is welded to or otherwise attached to two of interchangeable adjustable leg supports 124a to brace interchangeable adjustable leg supports 124a together. FIG. 20B illustrates a perspective-bottom view of a variation of upper leg braces 148. Each of upper leg braces 148 has a generally rectangular or oval shape and is welded to or otherwise attached to one of interchangeable T-shaped corner frame connectors 123 to brace interchangeable T-shaped corner frame connectors 123 to interchangeable adjustable leg supports 124a. FIG. 21A, FIG. 21B, FIG. 21C, FIG. 21D, FIG. 21E, and FIG. 21F illustrate perspective views of combinations of multiple twelve-device-in-one interchangeable-canopy-patio-balcony-windscreen-chair-awning-perch-tent-sled-stand-basket-hammock-bed pet crates attached together for multiple additional shapes and multiple additional uses.

Major Advantages of the Invention

The present invention substantially departs from the conventional concepts and designs of the prior art. In doing so, the present invention provides a twelve-device-in-one interchangeable-canopy-patio-balcony-windscreen-chair-awning-perch-tent-sled-stand-basket-hammock-bed pet crate (having: a) Multi-pet-containing panel system, b) Multi-pet multi-entrance door system, c) Interchangeable-canopy-patio-balcony-windscreen-chair-awning-perch-tent-sled-stand-basket-hammock-bed system, d) Tick-blocking water-draining wire-clamping cap systems, and e) Tray-locking shock-absorbing gusset systems), having many new and significant features, functions, and advantages, which overcome all the disadvantages of the prior art, as follows:

1) It is an object of the new invention to provide a twelve-device-in-one interchangeable-canopy-patio-balcony-windscreen-chair-awning-perch-tent-sled-stand-basket-hammock-bed pet crate, having
   interchangeable side frame supports 117a.
   Therefore, the twelve-device-in-one interchangeable-canopy-patio-balcony-windscreen-chair-awning-perch-tent-sled-stand-basket-hammock-bed pet crate:
   a) Can provide a structure on which to mount and suspend interchangeable canopy-patio-balcony-windscreen-chair-awning-perch-tent-sled-stand-basket-hammock-and-bed 118
   (See FIG. 1A, FIG. 1B, FIG. 1C, FIG. 1D, FIG. 1E, FIG. 1F, FIG. 1G, FIG. 1H, FIG. 1I, FIG. 1J, FIG. 1K, FIG. 1L, FIG. 1M, FIG. 1N, FIG. 1O, FIG. 1P, FIG. 1Q, FIG. 12A, FIG. 12B, FIG. 12C, FIG. 12D, FIG. 12E, FIG. 12F, FIG. 12G, FIG. 12H, FIG. 12I, FIG. 12J, FIG. 12K, FIG. 12L, FIG. 12M, FIG. 12N, FIG. 12O, FIG. 12P, FIG. 12Q, FIG. 13A, FIG. 13B, FIG. 13C, FIG. 14A, FIG. 14B, FIG. 14C, FIG. 14D, FIG. 14E, and FIG. 14F);
   b) Can collapse quickly for easy storage,
   to provide easy portability
   (See FIG. 16G);
   c) Can provide a mounting structure for interchangeable T-shaped straight frame connectors 122 and interchangeable T-shaped corner frame connectors 123,
   to respectively be disposed in various configurations
   (See FIG. 1A, FIG. 1B, FIG. 1C, FIG. 1D, FIG. 1E, FIG. 1F, FIG. 1G, FIG. 1H, FIG. 1I, FIG. 1J, FIG. 1K, FIG. 1L, FIG. 1M, FIG. 1N, FIG. 1O, FIG. 1P, FIG. 1Q, FIG. 12A, FIG. 12B, FIG. 12C, FIG. 12D, FIG. 12E, FIG. 12F, FIG. 12G, FIG. 12H, FIG. 12I, FIG. 12J, FIG. 12K, FIG. 12L, FIG. 12M, FIG. 12N, FIG. 12O, FIG. 12P, FIG. 12Q, FIG. 13A, FIG. 13B, FIG. 13C, FIG. 14A, FIG. 14B, FIG. 14C, FIG. 14D, FIG. 14E, and FIG. 14F);

d) Can provide a structure on which to mount interchangeable canopy-patio-balcony-windscreen-chair-awning-perch-tent-sled-stand-basket-hammock-and-bed 118, to respectively be disposed in various configurations
(See FIG. 1A, FIG. 1B, FIG. 1C, FIG. 1D, FIG. 1E, FIG. 1F, FIG. 1G, FIG. 1H, FIG. 1I, FIG. 1J, FIG. 1K, FIG. 1L, FIG. 1M, FIG. 1N, FIG. 1O, FIG. 1P, FIG. 1Q, FIG. 12A, FIG. 12B, FIG. 12C, FIG. 12D, FIG. 12E, FIG. 12F, FIG. 12G, FIG. 12H, FIG. 12I, FIG. 12J, FIG. 12K, FIG. 12L, FIG. 12M, FIG. 12N, FIG. 12O, FIG. 12P, FIG. 12Q, FIG. 13A, FIG. 13B, FIG. 13C, FIG. 14A, FIG. 14B, FIG. 14C, FIG. 14D, FIG. 14E, and FIG. 14F); and e) Can provide multiple configuration options when combined with interchangeable end frame supports 117*b*, interchangeable T-shaped straight frame connectors 122, interchangeable T-shaped corner frame connectors 123, interchangeable adjustable leg supports 124*a*, and interchangeable adjustable center-brace leg support 124*b* mounting on multi-pet-containing panel system 101, to function as a pet canopy,
to function as a pet patio,
to function as a pet balcony,
to function as a pet hammock,
to function as a pet bed,
to function as a perch,
to function as an awning
in the direction of arrow 139*e*
(See FIG. 12E and FIG. 12F),
to function as a tent with storage,
to function as a chair,
to function as a crate stand,
to function as a sled
in the direction of arrow 139*f*
(See FIG. 12P),
to function as a roof with storage,
to function as a grooming platform,
to function as a multi-pet grooming table,
to function as a drying platform,
to function as a wind, sun, and weather block,
to function as a privacy screen, and
to function as an independent pet bed
(See FIG. 1A, FIG. 1B, FIG. 1C, FIG. 1D, FIG. 1E, FIG. 1F, FIG. 1G, FIG. 1H, FIG. 1I, FIG. 1J, FIG. 1K, FIG. 1L, FIG. 1M, FIG. 1N, FIG. 1O, FIG. 1P, FIG. 1Q, FIG. 12A, FIG. 12B, FIG. 12C, FIG. 12D, FIG. 12E, FIG. 12F, FIG. 12G, FIG. 12H, FIG. 12I, FIG. 12J, FIG. 12K, FIG. 12L, FIG. 12M, FIG. 12N, FIG. 12O, FIG. 12P, FIG. 12Q, FIG. 13A, FIG. 13B, FIG. 13C, FIG. 14A, FIG. 14B, FIG. 14C, FIG. 14D, FIG. 14E, and FIG. 14F).

2) It is another object of the new invention to provide a twelve-device-in-one interchangeable-canopy-patio-balcony-windscreen-chair-awning-perch-tent-sled-stand-basket-hammock-bed pet crate, having interchangeable end frame supports 117*b*.

Therefore, the twelve-device-in-one interchangeable-canopy-patio-balcony-windscreen-chair-awning-perch-tent-sled-stand-basket-hammock-bed pet crate:

a) Can provide a structure on which to mount and suspend interchangeable canopy-patio-balcony-windscreen-chair-awning-perch-tent-sled-stand-basket-hammock-and-bed 118
(See FIG. 1A, FIG. 1B, FIG. 1C, FIG. 1D, FIG. 1E, FIG. 1F, FIG. 1G, FIG. 1H, FIG. 1I, FIG. 1J, FIG. 1K, FIG. 1L, FIG. 1M, FIG. 1N, FIG. 1O, FIG. 1P, FIG. 1Q, FIG. 12A, FIG. 12B, FIG. 12C, FIG. 12D, FIG. 12E, FIG. 12F, FIG. 12G, FIG. 12H, FIG. 12I, FIG. 12J, FIG. 12K, FIG. 12L, FIG. 12M, FIG. 12N, FIG. 12O, FIG. 12P, FIG. 12Q, FIG. 13A, FIG. 13B, FIG. 13C, FIG. 14A, FIG. 14B, FIG. 14C, FIG. 14D, FIG. 14E, and FIG. 14F);

b) Can collapse quickly for easy storage, to provide easy portability
(See FIG. 16G);

c) Can provide a mounting structure for interchangeable T-shaped straight frame connectors 122 and interchangeable T-shaped corner frame connectors 123, to respectively be disposed in various configurations
(See FIG. 1A, FIG. 1B, FIG. 1C, FIG. 1D, FIG. 1E, FIG. 1F, FIG. 1G, FIG. 1H, FIG. 1I, FIG. 1J, FIG. 1K, FIG. 1L, FIG. 1M, FIG. 1N, FIG. 1O, FIG. 1P, FIG. 1Q, FIG. 12A, FIG. 12B, FIG. 12C, FIG. 12D, FIG. 12E, FIG. 12F, FIG. 12G, FIG. 12H, FIG. 12I, FIG. 12J, FIG. 12K, FIG. 12L, FIG. 12M, FIG. 12N, FIG. 12O, FIG. 12P, FIG. 12Q, FIG. 13A, FIG. 13B, FIG. 13C, FIG. 14A, FIG. 14B, FIG. 14C, FIG. 14D, FIG. 14E, and FIG. 14F);

d) Can provide a structure on which to mount interchangeable canopy-patio-balcony-windscreen-chair-awning-perch-tent-sled-stand-basket-hammock-and-bed 118, to respectively be disposed in various configurations
(See FIG. 1A, FIG. 1B, FIG. 1C, FIG. 1D, FIG. 1E, FIG. 1F, FIG. 1G, FIG. 1H, FIG. 1I, FIG. 1J, FIG. 1K, FIG. 1L, FIG. 1M, FIG. 1N, FIG. 1O, FIG. 1P, FIG. 1Q, FIG. 12A, FIG. 12B, FIG. 12C, FIG. 12D, FIG. 12E, FIG. 12F, FIG. 12G, FIG. 12H, FIG. 12I, FIG. 12J, FIG. 12K, FIG. 12L, FIG. 12M, FIG. 12N, FIG. 12O, FIG. 12P, FIG. 12Q, FIG. 13A, FIG. 13B, FIG. 13C, FIG. 14A, FIG. 14B, FIG. 14C, FIG. 14D, FIG. 14E, and FIG. 14F); and e) Can provide multiple configuration options when combined with interchangeable side frame supports 117*a*, interchangeable T-shaped straight frame connectors 122, interchangeable T-shaped corner frame connectors 123, interchangeable adjustable leg supports 124*a*, and interchangeable adjustable center-brace leg support 124*b* mounting on multi-pet-containing panel system 101, to function as a pet canopy,
to function as a pet patio,
to function as a pet balcony,
to function as a pet hammock,
to function as a pet bed,
to function as a perch,
to function as an awning
in the direction of arrow 139*e*
(See FIG. 12E and FIG. 12F),
to function as a tent with storage,
to function as a chair,
to function as a crate stand,
to function as a sled
in the direction of arrow 139*f*
(See FIG. 12P),
to function as a roof with storage, to function as a grooming platform,
to function as a multi-pet grooming table,
to function as a drying platform,
to function as a wind, sun, and weather block,
to function as a privacy screen, and
to function as an independent pet bed
(See FIG. 1A, FIG. 1B, FIG. 1C, FIG. 1D, FIG. 1E, FIG. 1F, FIG. 1G, FIG. 1H, FIG. 1I, FIG. 1J, FIG. 1K, FIG. 1L, FIG. 1M, FIG. 1N, FIG. 1O, FIG. 1P, FIG. 1Q, FIG. 12A, FIG. 12B, FIG. 12C, FIG. 12D, FIG. 12E, FIG. 12F, FIG. 12G, FIG. 12H, FIG. 12I, FIG. 12J, FIG. 12K, FIG. 12L, FIG. 12M, FIG. 12N, FIG. 12O, FIG. 12P, FIG. 12Q, FIG. 13A, FIG. 13B, FIG. 13C, FIG. 14A, FIG. 14B, FIG. 14C, FIG. 14D, FIG. 14E, and FIG. 14F).

3) It is still another object of the new invention to provide a twelve-device-in-one interchangeable-canopy-patio-balcony-windscreen-chair-awning-perch-tent-sled-stand-basket-hammock-bed pet crate, having
interchangeable canopy-patio-balcony-windscreen-chair-awning-perch-tent-sled-stand-basket-hammock-bed 118.
Therefore, the twelve-device-in-one interchangeable-canopy-patio-balcony-windscreen-chair-awning-perch-tent-sled-stand-basket-hammock-bed pet crate:
  a) Can provide multiple mounting positions above multi-pet-containing panel
    system 101,
      to be oriented longitudinally, laterally, or obliquely in the directions of arrows 140*a* and 140*b*(See FIG. 14D, FIG. 14E, and FIG. 14F);
  b) Can function as a pet balcony and patio,
    to provide multiple pet balcony mounting positions above multi-pet-containing panel system 101, in which to allow pets to sit, stand, play, rest, and sleep thereon
    (See FIG. 14D, FIG. 14E, and FIG. 14F);
  c) Can function as a pet hammock and bed,
    to be slung front-to-back or right-to-left, to allow pets to rest inside or above multi-pet-containing panel system 101
    (See FIG. 14D, FIG. 14E, and FIG. 14F);
  d) Can function as a multiple position pet bed,
    to allow pets to rest inside or outside multi-pet-containing panel system 101
    (See FIG. 14D, FIG. 14E, and FIG. 14F);
  e) Can function as a multiple position grooming platform,
    to provide a platform for a pet to stand, sit, or lay for grooming
    (See FIG. 14D, FIG. 14E, and FIG. 14F).

4) It is yet still another object of the new invention to provide a twelve-device-in-one interchangeable-canopy-patio-balcony-windscreen-chair-awning-perch-tent-sled-stand-basket-hammock-bed pet crate, having
interchangeable canopy-patio-balcony-windscreen-chair-awning-perch-tent-sled-stand-basket-hammock-bed 118.
Therefore, the twelve-device-in-one interchangeable-canopy-patio-balcony-windscreen-chair-awning-perch-tent-sled-stand-basket-hammock-bed pet crate:
  a) Can function as a multiple position drying platform,
    to provide a clean, comfortable, waterproof platform on which to dry a pet following a washing
    (See FIG. 14D, FIG. 14E, and FIG. 14F);
  b) Can function as a multiple-position wind, sun, and weather block, to provide a vertical side-shield from the sun and other weather elements
    (See FIG. 12C and FIG. 12D);
  c) Can function as a privacy screen,
    to provide a vertical side-shield for privacy from other pets, noise, and distractions.
    (See FIG. 12C and FIG. 12D);
  d) Can function as a chair,
    to provide a place to rest
    (See FIG. 12G and FIG. 12H).

5) It is a further object of the new invention to provide a twelve-device-in-one interchangeable-canopy-patio-balcony-windscreen-chair-awning-perch-tent-sled-stand-basket-hammock-bed pet crate, having
interchangeable canopy-patio-balcony-windscreen-chair-awning-perch-tent-sled-stand-basket-hammock-bed 118.
Therefore, the twelve-device-in-one interchangeable-canopy-patio-balcony-windscreen-chair-awning-perch-tent-sled-stand-basket-hammock-bed pet crate:
  a) Can function as an awning,
    to provide shade to pets
    in the direction of arrow 139*e*
    (See FIG. 12E and FIG. 12F);
  b) Can function as a perch,
    to provide multiple resting locations for pets
    (See FIG. 12I and FIG. 12J);
  c) Can function as a tent,
    to provide shade to pets
    (See FIG. 12K and FIG. 12L); and
  d) Can function as a multi-pet grooming table,
    to groom multiple pets simultaneously
    (See FIG. 12N).

6) It is an even further object of the new invention to provide a twelve-device-in-one interchangeable-canopy-patio-balcony-windscreen-chair-awning-perch-tent-sled-stand-basket-hammock-bed pet crate, having
waterproof toilets 119.
Therefore, the twelve-device-in-one interchangeable-canopy-patio-balcony-windscreen-chair-awning-perch-tent-sled-stand-basket-hammock-bed pet crate:
  a) Can provide openings,
    to conveniently sweep hair, dirt, food crumbs, and feces therein
    (See FIG. 1R, FIG. 1S, and FIG. 2A);
  b) Can provide air-flow openings,
    to allow greater air circulation, reducing stagnation and odor.

7) It is still an even further object of the new invention to provide a twelve-device-in-one interchangeable-canopy-patio-balcony-windscreen-chair-awning-perch-tent-sled-stand-basket-hammock-bed pet crate, having
tick-blocking water-draining wire-clamping cap 128.
Therefore, the twelve-device-in-one interchangeable-canopy-patio-balcony-windscreen-chair-awning-perch-tent-sled-stand-basket-hammock-bed pet crate:
  a) Can plug the end of interchangeable adjustable leg supports 124*a*; and
  b) Can clamp on top panel 103*a* to allow interchangeable canopy-patio-balcony windscreen-chair-awning-perch-tent-sled-stand-basket-hammock-and-bed 118
    to function as a pet canopy, a pet patio, a pet balcony, a windscreen, a chair, an awning, a perch, a pet tent, a sled, a basket, a pet hammock, and a pet bed.

8) It is yet still an even further object of the new invention to provide a twelve-device-in-one interchangeable-canopy-patio-balcony-windscreen-chair-awning-perch-tent-sled-stand-basket-hammock-bed pet crate, having tick-blocking teeth 129.

Therefore, the twelve-device-in-one interchangeable-canopy-patio-balcony-windscreen-chair-awning-perch-tent-sled-stand-basket-hammock-bed pet crate:
  a) Can prevent ticks from entering interchangeable adjustable leg supports 124*a* and interchangeable adjustable center-brace leg support 124*b*,
    to prevent ticks from hiding therein
    in the direction of arrow 141
    (See FIG. 15A);
  b) Can prevent ticks from hiding inside of tick-blocking water-draining wire-clamping cap 128,
    to protect pets from tick diseases
    (See FIG. 15A); and
  c) Can allow water and condensation to drip downward to prevent rusting
    in the directions of arrows 142 and 143
    (See FIG. 15B).

9) It is yet still an even further object of the new invention to provide a twelve-device-in-one interchangeable-canopy-patio-balcony-windscreen-chair-awning-perch-tent-sled-stand-basket-hammock-bed pet crate,
  having
  gusset walls 132.

Therefore, the twelve-device-in-one interchangeable-canopy-patio-balcony-windscreen-chair-awning-perch-tent-sled-stand-basket-hammock-bed pet crate:
  a) Can strengthen top, bottom, left, right, front, and rear panels 103*a*, 103*b*, 103*c*, 103*d*, 103*e*, and 103*f*;
  b) Can strengthen multi-pet-containing panel system 101; and
  c) Can lock top, bottom, left, right, front, and rear panels 103*a*, 103*b*, 103*c*, 103*d*, 103*e*, and 103*f* together.

10) It is yet still an even further object of the new invention to provide a twelve-device-in-one interchangeable-canopy-patio-balcony-windscreen-chair-awning-perch-tent-sled-stand-basket-hammock-bed pet crate, having curved gusset springs 134*a*, 134*b*, and 134*c*.

Therefore, the twelve-device-in-one interchangeable-canopy-patio-balcony-windscreen-chair-awning-perch-tent-sled-stand-basket-hammock-bed pet crate:
  a) Can resist the warping forces exerted on top, bottom, left, right, front, and rear panels 103*a*, 103*b*, 103*c*, 103*d*, 103*e*, and 103*f*;
  b) Can resist the twisting forces exerted on top, bottom, left, right, front, and rear panels 103*a*, 103*b*, 103*c*, 103*d*, 103*e*, and 103*f*;
  c) Can resist the bending forces exerted on top, bottom, left, right, front, and rear panels 103*a*, 103*b*, 103*c*, 103*d*, 103*e*, and 103*f*;
  d) Can resist the sliding forces exerted on top, bottom, left, right, front, and rear panels 103*a*, 103*b*, 103*c*, 103*d*, 103*e*, and 103*f*;
  e) Can resist the wobbling forces exerted on top, bottom, left, right, front, and rear panels 103*a*, 103*b*, 103*c*, 103*d*, 103*e*, and 103*f*.

11) It is yet still an even further object of the new invention to provide a twelve-device-in-one interchangeable-canopy-patio-balcony-windscreen-chair-awning-perch-tent-sled-stand-basket-hammock-bed pet crate, having curved gusset springs 134*a*, 134*b*, and 134*c*.

Therefore, the twelve-device-in-one interchangeable-canopy-patio-balcony-windscreen-chair-awning-perch-tent-sled-stand-basket-hammock-bed pet crate:
  a) Can resist the folding forces exerted on top, bottom, left, right, front, and rear panels 103*a*, 103*b*, 103*c*, 103*d*, 103*e*, and 103*f*;
  b) Can strengthen vertical gusset spring 135;
  c) Can strengthen horizontal gusset spring 136; and
  d) Can return multi-function tray-locking shock-absorbing gusset system 131 back to its former shape and dimensions
    in the directions of arrows 145*a*, 145*b*, and 145*c*
    (See FIG. 16A, FIG. 16B, FIG. 16C, FIG. 16D, FIG. 16E, and FIG. 16F).

12) It is yet still an even further object of the new invention to provide a twelve-device-in-one interchangeable-canopy-patio-balcony-windscreen-chair-awning-perch-tent-sled-stand-basket-hammock-bed pet crate, having vertical gusset spring 135.

Therefore, the twelve-device-in-one interchangeable-canopy-patio-balcony-windscreen-chair-awning-perch-tent-sled-stand-basket-hammock-bed pet crate:
  a) Can resist the warping forces exerted on top, bottom, left, right, front, and rear panels 103*a*, 103*b*, 103*c*, 103*d*, 103*e*, and 103*f*;
  b) Can resist the twisting forces exerted on top, bottom, left, right, front, and rear panels 103*a*, 103*b*, 103*c*, 103*d*, 103*e*, and 103*f*;
  c) Can resist the bending forces exerted on top, bottom, left, right, front, and rear panels 103*a*, 103*b*, 103*c*, 103*d*, 103*e*, and 103*f*;
  d) Can resist the sliding forces exerted on top, bottom, left, right, front, and rear panels 103*a*, 103*b*, 103*c*, 103*d*, 103*e*, and 103*f*;
  e) Can resist the wobbling forces exerted on top, bottom, left, right, front, and rear panels 103*a*, 103*b*, 103*c*, 103*d*, 103*e*, and 103*f*.

13) It is yet still an even further object of the new invention to provide a twelve-device-in-one interchangeable-canopy-patio-balcony-windscreen-chair-awning-perch-tent-sled-stand-basket-hammock-bed pet crate, having vertical gusset spring 135.

Therefore, the twelve-device-in-one interchangeable-canopy-patio-balcony-windscreen-chair-awning-perch-tent-sled-stand-basket-hammock-bed pet crate:
  a) Can resist the folding forces exerted on top, bottom, left, right, front, and rear panels 103*a*, 103*b*, 103*c*, 103*d*, 103*e*, and 103*f*;
  b) Can strengthen curved gusset springs 134*a*, 134*b*, and 134*c*;
  c) Can strengthen horizontal gusset spring 136; and
  d) Can return multi-function tray-locking shock-absorbing gusset system 131 back to its former shape and dimensions
    in the directions of arrows 145*a*, 145*b*, and 145*c*
    (See FIG. 16A, FIG. 16B, FIG. 16C, FIG. 16D, FIG. 16E, and FIG. 16F).

14) It is yet still an even further object of the new invention to provide a twelve-device-in-one interchangeable-canopy-patio-balcony-windscreen-chair-awning-perch-tent-sled-stand-basket-hammock-bed pet crate, having horizontal gusset spring 136.

Therefore, the twelve-device-in-one interchangeable-canopy-patio-balcony-windscreen-chair-awning-perch-tent-sled-stand-basket-hammock-bed pet crate:
  a) Can resist the warping forces exerted on top, bottom, left, right, front, and rear panels 103a, 103b, 103c, 103d, 103e, and 103f;
  b) Can resist the twisting forces exerted on top, bottom, left, right, front, and rear panels 103a, 103b, 103c, 103d, 103e, and 103f;
  c) Can resist the bending forces exerted on top, bottom, left, right, front, and rear panels 103a, 103b, 103c, 103d, 103e, and 103f;
  d) Can resist the sliding forces exerted on top, bottom, left, right, front, and rear panels 103a, 103b, 103c, 103d, 103e, and 103f;
  e) Can resist the wobbling forces exerted on top, bottom, left, right, front, and rear panels 103a, 103b, 103c, 103d, 103e, and 103f.

15) It is yet still an even further object of the new invention to provide a twelve-device-in-one interchangeable-canopy-patio-balcony-windscreen-chair-awning-perch-tent-sled-stand-basket-hammock-bed pet crate, having horizontal gusset spring 136.
Therefore, the twelve-device-in-one interchangeable-canopy-patio-balcony-windscreen-chair-awning-perch-tent-sled-stand-basket-hammock-bed pet crate:
  a) Can resist the folding forces exerted on top, bottom, left, right, front, and rear panels 103a, 103b, 103c, 103d, 103e, and 103f;
  b) Can strengthen curved gusset springs 134a, 134b, and 134c;
  c) Can strengthen horizontal gusset spring 136; and
  d) Can return multi-function tray-locking shock-absorbing gusset system 131 back to its former shape and dimensions
    in the directions of arrows 145a, 145b, and 145c
    (See FIG. 16A, FIG. 16B, FIG. 16C, FIG. 16D, FIG. 16E, and FIG. 16F).

16) It is yet still an even further object of the new invention to provide a twelve-device-in-one interchangeable-canopy-patio-balcony-windscreen-chair-awning-perch-tent-sled-stand-basket-hammock-bed pet crate, having tray-locking shock-absorbing gusset spring 137.
Therefore, the twelve-device-in-one interchangeable-canopy-patio-balcony-windscreen-chair-awning-perch-tent-sled-stand-basket-hammock-bed pet crate:
  a) Can lock urine-waste-water-storing tray 108 in place
    (See FIG. 11A, FIG. 11B, FIG. 11C, FIG. and 11D);
  b) Can prevent all eight corners of multi-pet-containing panel system 101 from scratching walls, floors, and furniture
    (See FIG. 7 and FIG. 9);
  c) Can prevent all eight corners of multi-pet-containing panel system 101 from causing injuries to people and pets
    (See FIG. 7 and FIG. 9);
  d) Can absorb shocks exerted on multi-pet-containing panel system 101,
    to provide pets with comfort while being stationary or transported;
  e) Can absorb vibrations exerted on multi-pet-containing panel system 101,
    to provide pets with comfort while being stationary or transported.

17) It is yet still an even further object of the new invention to provide a twelve-device-in-one interchangeable-canopy-patio-balcony-windscreen-chair-awning-perch-tent-sled-stand-basket-hammock-bed pet crate, having tray-locking shock-absorbing gusset spring 137.
Therefore, the twelve-device-in-one interchangeable-canopy-patio-balcony-windscreen-chair-awning-perch-tent-sled-stand-basket-hammock-bed pet crate:
  a) Can resist the warping forces exerted on top, bottom, left, right, front, and rear panels 103a, 103b, 103c, 103d, 103e, and 103f;
  b) Can resist the twisting forces exerted on top, bottom, left, right, front, and rear panels 103a, 103b, 103c, 103d, 103e, and 103f;
  c) Can resist the bending forces exerted on top, bottom, left, right, front, and rear panels 103a, 103b, 103c, 103d, 103e, and 103f;
  d) Can resist the sliding forces exerted on top, bottom, left, right, front, and rear panels 103a, 103b, 103c, 103d, 103e, and 103f;
  e) Can resist the wobbling forces exerted on top, bottom, left, right, front, and rear panels 103a, 103b, 103c, 103d, 103e, and 103f.

18) It is yet still an even further object of the new invention to provide a twelve-device-in-one interchangeable-canopy-patio-balcony-windscreen-chair-awning-perch-tent-sled-stand-basket-hammock-bed pet crate, having tray-locking shock-absorbing gusset spring 137.
Therefore, the twelve-device-in-one interchangeable-canopy-patio-balcony-windscreen-chair-awning-perch-tent-sled-stand-basket-hammock-bed pet crate:
  a) Can resist the folding forces exerted on top, bottom, left, right, front, and rear panels 103a, 103b, 103c, 103d, 103e, and 103f;
  b) Can strengthen curved gusset springs 134a, 134b, and 134c;
  c) Can strengthen vertical gusset spring 135;
  d) Can strengthen horizontal gusset spring 136; and
  e) Can return multi-function tray-locking shock-absorbing gusset system 131 back to its former shape and dimensions
    in the directions of arrows 145a, 145b, and 145c
    (See FIG. 16A, FIG. 16B, FIG. 16C, FIG. 16D, FIG. 16E, and FIG. 16F).

What is claimed is:

1. A twelve-device-in-one interchangeable-canopy-patio-balcony-windscreen-chair-awning-perch-tent-sled-stand-basket-hammock-bed pet crate comprising:
  a handle;
  a plurality of handle hooks;
  a top panel;
  a bottom panel;
  a left panel;
  a right panel;
  a front panel;
  a rear panel,
    said top, said bottom, said left, said right, said front, and said rear panels each having four panel corners;
  a plurality of panel-locking hooks;
  a plurality of panel-coupling hooks;
  a panel-folding clamp;
  a tray-and-bed-locking clamp;
  a multi-pet crate divider;
  a urine-waste-water-storing tray;
  a first multi-pet door;
  a second multi-pet door;
  a first door opening;
  a second door opening;
  a first push-rod hinge;

a second push-rod hinge;
a first push-rod lever;
a second push-rod lever;
a first push-rod;
a second push-rod;
a first push-rod-locking ring;
a second push-rod-locking ring;
a plurality of interchangeable side frame supports;
a plurality of interchangeable end frame supports;
an interchangeable canopy-patio-balcony-windscreen-chair-awning-perch-tent-sled-stand-basket-hammock bed;
a plurality of waterproof toilets;
a left bed sleeve;
a right bed sleeve;
a front bed sleeve;
a rear bed sleeve;
a plurality of bed hook-and-loop-fastener strips;
a plurality of interchangeable t-shaped straight frame connectors;
a plurality of interchangeable t-shaped corner frame connectors
  each having cup-like connector ends;
a plurality of interchangeable adjustable leg supports;
an interchangeable adjustable center-brace leg support;
a plurality of spring-pin holes;
a plurality of spring pins;
a tick-blocking water-draining wire-clamping cap;
a plurality of tick-blocking teeth; and
a water-draining t-shaped hole,
wherein:
said handle and said handle hooks
  respectively are molded to each other and hooked onto said top panel,
said top, said bottom, said left, said right, said front, and said rear panels
  respectively are hooked together,
said panel-locking hooks
  respectively are hooked onto said top, said front, and said rear panels,
said panel-coupling hooks
  respectively are clamped onto said top, said bottom, said left, said right, said front, and said rear panels,
said panel-folding clamp
  foldably are hinged to said bottom panel,
said tray-and-bed-locking clamp
  foldably are hinged to said bottom panel,
said multi-pet crate divider
  is disposed between and hooked onto said top, said bottom, said left, said right, said front, or said rear panels,
said urine-waste-water-storing tray
  is disposed on said bottom panel,
said first and said second multi-pet doors
  respectively are hinged onto said left and said front panels,
said first and said second door openings
  respectively are formed within said left and said front panels,
said first and said second push-rod hinges
  respectively are welded to said first and said second multi-pet doors,
said first and said second push-rod levers
  respectively are welded to said first and said second push-rod hinges,
said first and said second push-rods
  respectively and rotatably are attached to said first and said second push-rod hinges,
said first and said second push-rod-locking rings
  respectively are welded to said first and said second multi-pet doors,
said interchangeable side frame supports
  respectively and detachably are inserted into or slid onto said interchangeable t-shaped straight frame connectors or said interchangeable t-shaped corner frame connectors
    for providing a structure on which to mount and suspend said
    interchangeable canopy-patio-balcony-windscreen-chair-awning-perch-tent-sled-stand-basket-hammock bed,
    for collapsing quickly for easy storage,
    to provide easy portability,
    for providing a mounting structure for said interchangeable T-shaped straight frame connectors and said interchangeable T-shaped corner frame connectors,
      to respectively be disposed in various configurations, for providing a structure on which to mount said interchangeable canopy-patio-balcony-windscreen-chair-awning-perch-tent-sled-stand-basket-hammock bed,
      to respectively be disposed in various configurations, and for providing multiple configuration options when combined with said interchangeable end frame supports, said interchangeable T-shaped straight frame connectors, said interchangeable T-shaped corner frame connectors, said interchangeable adjustable leg supports, and said interchangeable adjustable center-brace leg support mounting on said top panel or said bottom panel,
        to function as pet canopy,
        to function as pet patio,
        to function as pet balcony,
        to function as pet hammock,
        to function as pet bed,
        to function as perch,
        to function as awning,
        to function as tent with storage,
        to function as chair,
        to function as crate stand,
        to function as sled,
        to function as roof with storage,
        to function as grooming platform,
        to function as multi-pet grooming table,
        to function as drying platform,
        to function as wind, sun, and weather block,
        to function as privacy screen, and
        to function as independent pet bed,
said interchangeable end frame supports
  respectively and detachably are inserted into or slid onto said interchangeable t-shaped straight frame connectors or said interchangeable t-shaped corner frame connectors
    for providing a structure on which to mount and suspend said
    interchangeable canopy-patio-balcony-windscreen-chair-awning-perch-tent-sled-stand-basket-hammock bed,
    for collapsing quickly for easy storage,
    to provide easy portability, for providing a mounting structure for said interchangeable T-shaped straight frame connectors and said interchangeable T-shaped corner frame connectors,
to respectively be disposed in various configurations,
for providing a structure on which to mount said interchangeable canopy-patio-balcony-windscreen-chair-awning-perch-tent-sled-stand-basket-hammock bed,
to respectively be disposed in various configurations, and for providing multiple configuration options when combined with said interchangeable side frame supports, said interchangeable T-shaped straight frame connectors, said interchangeable T-shaped corner frame connectors, said interchangeable adjustable leg supports, and said interchangeable adjustable center-brace leg support mounting on said top panel or said bottom panel,
to function as pet canopy,
to function as pet patio,
to function as pet balcony,
to function as pet hammock,
to function as pet bed,
to function as perch,
to function as awning,
to function as tent with storage,
to function as chair,
to function as crate stand,
to function as sled,
to function as roof with storage,
to function as grooming platform,
to function as multi-pet grooming table,
to function as drying platform,
to function as wind, sun, and weather block,
to function as privacy screen, and
to function as independent pet bed,
said interchangeable canopy-patio-balcony-windscreen-chair-awning-perch-tent-sled stand-basket-hammock bed
is weaved or sewn to said left, said right, said front, and said rear bed sleeves
for providing multiple mounting positions,
to be oriented longitudinally, laterally, or obliquely,
for functioning as pet balcony and patio,
to provide multiple pet balcony mounting positions on which to allow pets to sit, stand, play, rest, and sleep thereon,
for functioning as pet hammock and bed,
to be slung front-to-back or right-to-left, to allow pets to rest inside,
for functioning as multiple position pet bed,
to allow pets to rest inside or outside said twelve-device-in-one interchangeable-canopy-patio-balcony-windscreen-chair-awning-perch-tent-sled-stand-basket-hammock-bed pet crate,
for functioning as multiple position grooming platform,
to provide platform for pet to stand, sit, or lay for grooming,
for functioning as multiple position drying platform,
to provide clean, comfortable, waterproof platform on which to dry pet following a washing,
for functioning as multiple-position wind, sun, and weather block,
to provide vertical side-shield from sun and other weather elements,
for functioning as privacy screen,
to provide vertical side-shield for privacy from other pets, noise, and distractions,
for functioning as chair,
to provide place to rest,
for functioning as awning,
to provide shade to pets,
for functioning as perch,
to provide multiple resting locations for pets,
for functioning as tent,
to provide shade to pets, and
for functioning as multi-pet grooming table,
to groom multiple pets simultaneously,
said waterproof toilets
respectively are cut out of said interchangeable canopy-patio-balcony-windscreen-chair-awning-perch-tent-sled-stand-basket-hammock bed
for providing openings,
to conveniently sweep hair, dirt, food crumbs, and feces therein, and
for providing air-flow openings,
to allow greater air circulation, reducing stagnation and odor, said left, said right, said front, and said rear bed sleeves
respectively are slid or hooked onto said interchangeable side frame supports and said interchangeable end frame supports,
said bed hook-and-loop-fastener strips
respectively are sewn or glued onto said interchangeable canopy-patio-balcony-windscreen-chair-awning-perch-tent-sled-stand-basket-hammock bed or said left, said right, said front, and said rear bed sleeves,
said interchangeable t-shaped straight frame connectors
respectively and detachably are inserted into or slid onto said interchangeable side frame supports, said interchangeable end frame supports, said interchangeable adjustable leg supports, or said interchangeable adjustable center-brace leg support,
said interchangeable t-shaped corner frame connectors
respectively and detachably are inserted into or slid onto said interchangeable side frame supports, said interchangeable end frame supports, said interchangeable adjustable leg supports, or said interchangeable adjustable center-brace leg support,
said interchangeable adjustable leg supports
respectively and detachably are inserted into or slid onto said interchangeable t-shaped straight frame connectors or said interchangeable t-shaped corner frame connectors,
said interchangeable adjustable center-brace leg support
respectively and detachably are inserted into or slid onto said interchangeable t-shaped straight frame connectors or said interchangeable t-shaped corner frame connectors,
said spring-pin holes
respectively are drilled into said interchangeable t-shaped corner frame connectors and said interchangeable adjustable leg supports,
said spring-pins
respectively are springably inserted inside said interchangeable t-shaped corner frame connectors with said cup-like connector ends poking through said spring-pin holes, said tick-blocking water-draining wire-clamping cap
is snapped into said interchangeable adjustable leg supports and said interchangeable adjustable center-brace leg support
for plugging said interchangeable adjustable leg supports, and
for clamping on said top panel to allow said interchangeable canopy-patio-balcony-windscreen-chair-awning-perch-tent-sled-stand-basket-hammock bed
to function as pet canopy, pet patio, pet balcony, windscreen, chair, awning, perch, pet tent, sled, basket, pet hammock, or pet bed,
said tick-blocking teeth
respectively are molded on said water-draining t-shaped hole
for preventing ticks from entering said interchangeable adjustable leg supports and said interchangeable adjustable center-brace leg support,
to prevent ticks from hiding therein,
for preventing ticks from hiding inside of said tick-blocking water-draining wire-clamping cap, and
for allowing water and condensation to drip downward
to prevent rusting, and
said water-draining t-shaped hole
is molded in said tick-blocking water-draining wire-clamping cap.

2. The twelve-device-in-one interchangeable-canopy-patio-balcony-windscreen-chair-awning-perch-tent-sled-stand-basket-hammock-bed pet crate of claim 1, further comprising:
a plurality of gusset walls;
a plurality of wire-locking gusset recesses
respectively molded inside said gusset walls;
a plurality of curved gusset springs
respectively molded to said gusset walls;
a vertical gusset spring
molded to said gusset walls and said curved gusset springs;
a horizontal gusset spring
molded to said gusset walls, said curved gusset springs, and said vertical gusset spring; and
a tray-locking shock-absorbing gusset spring
molded to said horizontal gusset spring,
wherein:
said gusset walls
respectively are for
strengthening said top, said bottom, said left, said right, said front, and said rear panels, and
locking said top, said bottom, said left, said right, said front, and said rear panels together,
said wire-locking gusset recesses
respectively are for
locking said four panel corners of said top, said bottom, said left, said right, said front, and said rear panels,
said curved gusset springs
respectively are for
resisting warping of said top, said bottom, said left, said right, said front, and said rear panels,
resisting twisting of said top, said bottom, said left, said right, said front, and said rear panels,
resisting bending of said top, said bottom, said left, said right, said front, and said rear panels,
resisting sliding of said top, said bottom, said left, said right, said front, and said rear panels,
resisting wobbling of said top, said bottom, said left, said right, said front, and said rear panels,
resisting folding of said top, said bottom, said left, said right, said front, and said rear panels,
strengthening said vertical gusset spring, and
strengthening said horizontal gusset spring,
said vertical gusset spring
is for
resisting warping of said top, said bottom, said left, said right, said front, and said rear panels,
resisting twisting of said top, said bottom, said left, said right, said front, and said rear panels,
resisting bending of said top, said bottom, said left, said right, said front, and said rear panels,
resisting sliding of said top, said bottom, said left, said right, said front, and said rear panels,
resisting wobbling of said top, said bottom, said left, said right, said front, and said rear panels,
resisting folding of said top, said bottom, said left, said right, said front, and said rear panels,
strengthening said curved gusset springs, and
strengthening said horizontal gusset spring,
said horizontal gusset spring
is for
resisting warping of said top, said bottom, said left, said right, said front, and said rear panels,
resisting twisting of said top, said bottom, said left, said right, said front, and said rear panels,
resisting bending of said top, said bottom, said left, said right, said front, and said rear panels,
resisting sliding of said top, said bottom, said left, said right, said front, and said rear panels,
resisting wobbling of said top, said bottom, said left, said right, said front, and said rear panels,
resisting folding of said top, said bottom, said left, said right, said front, and said rear panels,
strengthening said vertical gusset spring, and
strengthening said curved gusset springs, and
said tray-locking shock-absorbing gusset spring
is for
locking urine-waste-water-storing tray in place,
preventing said four panel corners of said top, said bottom, said left, said right, said front, and said rear panels from scratching walls, floors, and furniture,
preventing said four panel corners of said top, said bottom, said left, said right, said front, and said rear panels from causing injuries to people and pets,
absorbing shocks exerted on said twelve-device-in-one interchangeable-canopy-patio-balcony-windscreen-chair-awning-perch-tent-sled-stand-basket-hammock-bed pet crate,
to provide pets with comfort while being stationary or transported;
absorbing vibrations exerted on said twelve-device-in-one interchangeable-canopy-patio-balcony-windscreen-chair-awning-perch-tent-sled-stand-basket-hammock-bed pet crate,
to provide pets with comfort while being stationary or transported, resisting warping of said said top, said bottom, said left, said right, said front, and said rear panels,
resisting twisting of said top, said bottom, said left, said right, said front, and said rear panels, resisting bending of said on said top, said bottom, said left, said right, said front, and said rear panels,
resisting sliding of said said top, said bottom, said left, said right, said front, and said rear panels,
resisting wobbling of said top, said bottom, said left, said right, said front, and said rear panels,
resisting folding of said top, said bottom, said left, said right, said front, and said rear panels,
strengthening said curved gusset springs,
strengthening said vertical gusset spring, and
strengthening said horizontal gusset spring.

3. The twelve-device-in-one interchangeable-canopy-patio-balcony-windscreen-chair-awning-perch-tent-sled-stand-basket-hammock-bed pet crate of claim 1,
wherein
said interchangeable side frame supports
each are made of metallic material.

4. The twelve-device-in-one interchangeable-canopy-patio-balcony-windscreen-chair-awning-perch-tent-sled-stand-basket-hammock-bed pet crate of claim 1,
wherein
said interchangeable end frame supports
each are made of metallic material.

5. The twelve-device-in-one interchangeable-canopy-patio-balcony-windscreen-chair-awning-perch-tent-sled-stand-basket-hammock-bed pet crate of claim 1,
wherein
said waterproof toilets
each have a rectangular or trapezoidal shape.

6. The twelve-device-in-one interchangeable-canopy-patio-balcony-windscreen-chair-awning-perch-tent-sled-stand-basket-hammock-bed pet crate of claim 1,
wherein
said interchangeable canopy-patio-balcony-windscreen-chair-awning-perch-tent-sled-stand-basket-hammock bed
is made of fabric, nylon, polyester, plastic, or waterproof material.

7. The twelve-device-in-one interchangeable-canopy-patio-balcony-windscreen-chair-awning-perch-tent-sled-stand-basket-hammock-bed pet crate of claim 1,
wherein
said interchangeable canopy-patio-balcony-windscreen-chair-awning-perch-tent-sled-stand-basket-hammock bed
has an octagonal shape.

8. The twelve-device-in-one interchangeable-canopy-patio-balcony-windscreen-chair-awning-perch-tent-sled-stand-basket-hammock-bed pet crate of claim 1,
wherein:
said interchangeable T-shaped straight frame connectors
each have a T shape with a square tube cross-section,
said interchangeable T-shaped corner frame connectors
each have a T shape with one quarter-rounded side and a square tube cross-section,
said interchangeable adjustable leg supports
each have a tubular shape with a square cross-section, and
said interchangeable adjustable center-brace leg support
has an H shape with a square tube cross-section.

9. The twelve-device-in-one interchangeable-canopy-patio-balcony-windscreen-chair-awning-perch-tent-sled-stand-basket-hammock-bed pet crate of claim 1,
wherein:
said interchangeable T-shaped straight frame connectors
each are made of plastic material,
said interchangeable T-shaped corner frame connectors
each are made of plastic material,
said interchangeable adjustable leg supports
each are made of metallic material, and
said interchangeable adjustable center-brace leg support
is made of metallic or plastic materials.

10. A twelve-device-in-one interchangeable-canopy-patio-balcony-awning-perch-tent-bed pet crate comprising:
a handle;
a plurality of handle hooks;
a top panel;
a bottom panel;
a left panel;
a right panel;
a front panel;
a rear panel,
said top, said bottom, said left, said right, said front, and said rear panels each having four panel corners;
a plurality of panel-locking hooks;
a plurality of panel-coupling hooks;
a panel-folding clamp;
a tray-and-bed-locking clamp;
a multi-pet crate divider;
a urine-waste-water-storing tray;
a first multi-pet door;
a second multi-pet door;
a first door opening;
a second door opening;
a first push-rod hinge;
a second push-rod hinge;
a first push-rod lever;
a second push-rod lever;
a first push-rod;
a second push-rod;
a first push-rod-locking ring;
a second push-rod-locking ring;
a plurality of interchangeable side frame supports;
a plurality of interchangeable end frame supports;
an interchangeable canopy-patio-balcony-awning-perch-tent-bed;
a plurality of waterproof toilets;
a left bed sleeve;
a right bed sleeve;
a front bed sleeve;
a rear bed sleeve;
a plurality of bed hook-and-loop-fastener strips;
a plurality of interchangeable t-shaped straight frame connectors;
a plurality of interchangeable t-shaped corner frame connectors,
each having cup-like connector ends;
a plurality of interchangeable adjustable leg supports;
an interchangeable adjustable center-brace leg support;
a plurality of spring-pin holes;
a plurality of spring pins;
a tick-blocking wire-clamping cap;
a plurality of tick-blocking teeth; and
a water-draining t-shaped hole,
wherein:
said handle and said handle hooks
respectively are molded to each other and hooked onto said top panel, said top, said bottom, said left, said right, said front, and said rear panels, respectively are hooked together,
said panel-locking hooks
    respectively are hooked onto said top, said front, and said rear panels, said panel-coupling hooks
    respectively are clamped onto said top, said bottom, said left, said right, said front, and said rear panels,
said panel-folding clamp
    is foldably hinged to said bottom panel,
said tray-and-bed-locking clamp
    is foldably hinged to said bottom panel,
said multi-pet crate divider
    is disposed between and hooked onto said top, said bottom, said left, said right, said front, or said rear panels,
said urine-waste-water-storing tray
    is disposed on said bottom panel,
said first and said second multi-pet doors
    respectively are hinged onto said left and said front panels,
said first and said second door openings
    respectively are formed within said left and said front panels,
said first and said second push-rod hinges
    respectively are welded to said first and said second multi-pet doors,
said first and said second push-rod levers
    respectively are welded to said first and said second push-rod hinges,
said first and said second push-rods
    respectively and rotatably are attached to said first and said second push-rod hinges,
said first and said second push-rod-locking rings
    respectively are welded to said first and said second multi-pet doors,
said interchangeable side frame supports
    respectively and detachably are inserted into or slid onto said interchangeable t-shaped straight frame connectors or said interchangeable t-shaped corner frame connectors
        for providing a structure on which to mount and suspend said interchangeable canopy-patio-balcony-awning-perch-tent-bed, for collapsing quickly for easy storage,
        to provide easy portability,
        for providing a mounting structure for said interchangeable T-shaped straight frame connectors and said interchangeable T-shaped corner frame connectors,
            to respectively be disposed in various configurations,
        for providing a structure on which to mount said interchangeable canopy-patio-balcony-awning-perch-tent-bed,
            to respectively be disposed in various configurations, and for providing multiple configuration options when combined with said interchangeable end frame supports, said interchangeable T-shaped straight frame connectors, said interchangeable T-shaped corner frame connectors, said interchangeable adjustable leg supports, and said interchangeable adjustable center-brace leg support mounting on said top panel or said bottom panel,
                to function as pet canopy,
                to function as pet patio,
                to function as pet balcony,
                to function as pet hammock,
                to function as pet bed,
                to function as perch,
                to function as awning,
                to function as tent with storage,
                to function as chair,
                to function as crate stand,
                to function as sled,
                to function as roof with storage,
                to function as grooming platform,
                to function as multi-pet grooming table,
                to function as drying platform,
                to function as wind, sun, and weather block,
                to function as privacy screen, and
                to function as independent pet bed,
said interchangeable end frame supports
    respectively and detachably are inserted into or slid onto said interchangeable t-shaped straight frame connectors or said interchangeable t-shaped corner frame connectors
        for providing a structure on which to mount and suspend said interchangeable canopy-patio-balcony-awning-perch-tent-bed, for collapsing quickly for easy storage,
        to provide easy portability,
        for providing a mounting structure for said interchangeable T-shaped straight frame connectors and said interchangeable T-shaped corner frame connectors,
            to respectively be disposed in various configurations,
        for providing a structure on which to mount said interchangeable canopy-patio-balcony-awning-perch-tent-bed,
            to respectively be disposed in various configurations, and
        for providing multiple configuration options when combined with said interchangeable side frame supports, said interchangeable T-shaped straight frame connectors, said interchangeable T-shaped corner frame connectors, said interchangeable adjustable leg supports, and said interchangeable adjustable center-brace leg support mounting on said top panel or said bottom panel,
            to function as pet canopy,
            to function as pet patio,
            to function as pet balcony,
            to function as pet hammock,
            to function as pet bed,
            to function as perch,
            to function as awning,
            to function as tent with storage,
            to function as chair,
            to function as crate stand,
            to function as sled,
            to function as roof with storage,
            to function as grooming platform,
            to function as multi-pet grooming table,
            to function as drying platform,
            to function as wind, sun, and weather block,
            to function as privacy screen, and
            to function as independent pet bed,
said interchangeable canopy-patio-balcony-awning-perch-tent-bed
    is weaved or sewn to said left, said right, said front, and said rear bed sleeves for providing multiple mounting positions,
  to be oriented longitudinally, laterally, or obliquely,
for functioning as pet balcony and patio,
  to provide multiple pet balcony mounting positions on which to allow pets to sit, stand, play, rest, and sleep thereon,
for functioning as pet hammock and bed,
  to be slung front-to-back or right-to-left, to allow pets to rest inside,
for functioning as multiple position pet bed,
  to allow pets to rest inside or outside said twelve-device-in-one interchangeable-canopy-patio-balcony-awning-perch-tent-bed pet crate,
for functioning as multiple position grooming platform,
  to provide platform for pet to stand, sit, or lay for grooming,
for functioning as multiple position drying platform,
  to provide clean, comfortable, waterproof platform on which to dry pet following a washing,
for functioning as multiple-position wind, sun, and weather block, to provide vertical side-shield from sun and other weather elements,
for functioning as privacy screen,
  to provide vertical side-shield for privacy from other pets, noise, and distractions,
for functioning as chair,
  to provide place to rest,
for functioning as awning,
  to provide shade to pets,
for functioning as perch,
  to provide multiple resting locations for pets,
for functioning as tent,
  to provide shade to pets, and
for functioning as multi-pet grooming table,
  to groom multiple pets simultaneously,
said waterproof toilets
  respectively are cut out of said interchangeable canopy-patio-balcony-awning-perch-tent-bed
  for providing openings,
    to conveniently sweep hair, dirt, food crumbs, and feces therein, and
  for providing air-flow openings,
    to allow greater air circulation, reducing stagnation and odor,
said left, said right, said front, and said rear bed sleeves
  respectively are slid or hooked onto said interchangeable side frame supports and said interchangeable end frame supports,
said bed hook-and-loop-fastener strips
  respectively are sewn or glued onto said interchangeable canopy-patio-balcony-awning-perch-tent-bed or said left, said right, said front, and said rear bed sleeves,
said interchangeable t-shaped straight frame connectors
  respectively and detachably are inserted into or slid onto said interchangeable side frame supports, said interchangeable end frame supports, said interchangeable adjustable leg supports, or said interchangeable adjustable center-brace leg support,
said interchangeable t-shaped corner frame connectors
  respectively and detachably are inserted into or slid onto said interchangeable side frame supports, said interchangeable end frame supports, said interchangeable adjustable leg supports, or said interchangeable adjustable center-brace leg support,
said interchangeable adjustable leg supports
  respectively and detachably are inserted into or slid onto said interchangeable t-shaped straight frame connectors or said interchangeable t-shaped corner frame connectors,
said interchangeable adjustable center-brace leg support
  respectively and detachably are inserted into or slid onto said interchangeable t-shaped straight frame connectors or said interchangeable t-shaped corner frame connectors,
said spring-pin holes
  respectively are drilled into said interchangeable t-shaped corner frame connectors and said interchangeable adjustable leg supports,
said spring-pins
  respectively are springably inserted inside said interchangeable t-shaped corner frame connectors with said cup-like connector ends poking through said spring-pin holes,
said tick-blocking wire-clamping cap
  is snapped into said interchangeable adjustable leg supports and said
  interchangeable adjustable center-brace leg support
    for plugging said interchangeable adjustable leg supports, and
    for clamping on said top panel to allow said interchangeable canopy-patio-balcony-awning-perch-tent-bed
      to function as pet canopy, pet patio, pet balcony, windscreen, chair, awning, perch, pet tent, sled, basket, pet hammock, or pet bed,
said tick-blocking teeth
  respectively are molded on said water-draining t-shaped hole
    for preventing ticks from entering said interchangeable adjustable leg supports and said interchangeable adjustable center-brace leg support,
      to prevent ticks from hiding therein,
    for preventing ticks from hiding inside of said tick-blocking wire-clamping cap, and
    for allowing water and condensation to drip downward
      to prevent rusting, and
said water-draining t-shaped hole
  is molded in said tick-blocking wire-clamping cap.

11. The twelve-device-in-one interchangeable-canopy-patio-balcony-awning-perch-tent-bed pet crate of claim 10,
further comprising:
  a plurality of gusset walls;
  a plurality of wire-locking gusset recesses;
    respectively molded inside said gusset walls;
  a plurality of curved gusset springs
    respectively molded to said gusset walls;
  a vertical gusset spring
    molded to said gusset walls and said curved gusset springs;
  a horizontal gusset spring
    molded to said gusset walls, said curved gusset springs, and said vertical gusset spring; and
  a tray-locking shock-absorbing gusset spring
    molded to said horizontal gusset spring,
wherein:
  said gusset walls
    respectively are for
      strengthening said top, said bottom, said left, said right, said front, and said rear panels, and locking said top, said bottom, said left, said right, said front, and said rear panels together,
said wire-locking gusset recesses
respectively are for
locking said four panel corners of said top, said bottom, said left, said right, said front, and said rear panels,
said curved gusset springs
respectively are for
resisting warping of said top, said bottom, said left, said right, said front, and said rear panels,
resisting twisting of said top, said bottom, said left, said right, said front, and said rear panels,
resisting bending of said top, said bottom, said left, said right, said front, and said rear panels,
resisting sliding of said top, said bottom, said left, said right, said front, and said rear panels,
resisting wobbling of said top, said bottom, said left, said right, said front, and said rear panels,
resisting folding of said top, said bottom, said left, said right, said front, and said rear panels,
strengthening said vertical gusset spring, and
strengthening said horizontal gusset spring,
said vertical gusset spring
is for
resisting warping of said top, said bottom, said left, said right, said front, and said rear panels,
resisting twisting of said top, said bottom, said left, said right, said front, and said rear panels,
resisting bending of said top, said bottom, said left, said right, said front, and said rear panels,
resisting sliding of said top, said bottom, said left, said right, said front, and said rear panels,
resisting wobbling of said top, said bottom, said left, said right, said front, and said rear panels,
resisting folding of said top, said bottom, said left, said right, said front, and said rear panels,
strengthening said curved gusset springs, and
strengthening said horizontal gusset spring,
said horizontal gusset spring
is for
resisting warping of said top, said bottom, said left, said right, said front, and said rear panels,
resisting twisting of said top, said bottom, said left, said right, said front, and said rear panels,
resisting bending of said top, said bottom, said left, said right, said front, and said rear panels,
resisting sliding of said top, said bottom, said left, said right, said front, and said rear panels,
resisting wobbling of said top, said bottom, said left, said right, said front, and said rear panels,
resisting folding of said top, said bottom, said left, said right, said front, and said rear panels,
strengthening said vertical gusset spring, and
strengthening said curved gusset springs, and
said tray-locking shock-absorbing gusset spring
is for
locking urine-waste-water-storing tray in place,
preventing said four panel corners of said top, said bottom, said left, said right, said front, and said rear panels from scratching walls, floors, and furniture,
preventing said four panel corners of said top, said bottom, said left, said right, said front, and said rear panels from causing injuries to people and pets,
absorbing shocks exerted on said twelve-device-in-one interchangeable-canopy-patio-balcony-awning-perch-tent-bed pet crate, to provide pets with comfort while being stationary or transported;
absorbing vibrations exerted on said interchangeable-canopy-patio-balcony-awning-perch-tent-bed pet crate,
to provide pets with comfort while being stationary or transported, resisting warping of said top, said bottom, said left, said right, said front, and said rear panels,
resisting twisting of said top, said bottom, said left, said right, said front, and said rear panels,
resisting bending of said top, said bottom, said left, said right, said front, and said rear panels,
resisting sliding of said top, said bottom, said left, said right, said front, and said rear panels,
resisting wobbling of said top, said bottom, said left, said right, said front, and said rear panels,
resisting folding of said top, said bottom, said left, said right, said front, and said rear panels,
strengthening said curved gusset springs,
strengthening said vertical gusset spring, and
strengthening said horizontal gusset spring.

12. The twelve-device-in-one interchangeable-canopy-patio-balcony-awning-perch-tent-bed pet crate of claim 10, wherein
said interchangeable side frame supports
each are made of metallic material.

13. The twelve-device-in-one interchangeable-canopy-patio-balcony-awning-perch-tent-bed pet crate of claim 10, wherein
said interchangeable end frame supports
each are made of metallic material.

14. The twelve-device-in-one interchangeable-canopy-patio-balcony-awning-perch-tent-bed pet crate of claim 10, wherein
said waterproof toilets
each have a rectangular or trapezoidal shape.

15. The twelve-device-in-one interchangeable-canopy-patio-balcony-awning-perch-tent-bed pet crate of claim 10, wherein
said interchangeable canopy-patio-balcony-awning-perch-tent-bed
is made of fabric, nylon, polyester, plastic, or waterproof material.

16. The twelve-device-in-one interchangeable-canopy-patio-balcony-awning-perch-tent-bed pet crate of claim 10, wherein
said interchangeable canopy-patio-balcony-awning-perch-tent-bed
has an octagonal shape.

17. The twelve-device-in-one interchangeable-canopy-patio-balcony-awning-perch-tent-bed pet crate of claim 10, wherein:
said interchangeable T-shaped straight frame connectors
each have a T shape with a square tube cross-section,
said interchangeable T-shaped corner frame connectors
each have a T shape with one quarter-rounded side and a square tube cross-section,
said interchangeable adjustable leg supports
each have a tubular shape with a square cross-section, and said interchangeable adjustable center-brace leg support
has an H shape with a square tube cross-section.

18. The twelve-device-in-one interchangeable-canopy-patio-balcony-awning-perch-tent-bed pet crate of claim 10, wherein:
said interchangeable T-shaped straight frame connectors
each are made of plastic material,
said interchangeable T-shaped corner frame connectors
each are made of plastic material,
said interchangeable adjustable leg supports
each are made of metallic material, and
said interchangeable adjustable center-brace leg support
is made of metallic or plastic materials.

19. A twelve-device-in-one interchangeable-bed pet crate comprising:
a handle;
a plurality of handle hooks;
a top panel;
a bottom panel;
a left panel;
a right panel;
a front panel;
a rear panel;
a plurality of panel-locking hooks;
a plurality of panel-coupling hooks;
a panel-folding clamp;
a tray-and-bed-locking clamp;
a urine-waste-water-storing tray;
at least one least one pet door;
at least one first door opening;
at least one push-rod hinge;
at least one push-rod lever;
at least one push-rod;
at least one push-rod-locking ring;
a plurality of interchangeable side frame supports;
a plurality of interchangeable end frame supports;
an interchangeable canopy-patio-balcony-awning-perch-tent-bed;
a plurality of waterproof toilets;
a left bed sleeve;
a right bed sleeve;
a front bed sleeve;
a rear bed sleeve;
a plurality of bed hook-and-loop-fastener strips;
a plurality of interchangeable t-shaped straight frame connectors;
a plurality of interchangeable t-shaped corner frame connectors
each having cup-like connector ends;
a plurality of interchangeable adjustable leg supports;
an interchangeable adjustable center-brace leg support;
a plurality of spring-pin holes;
a plurality of spring pins;
a wire-clamping cap; and
a water-draining hole,
wherein:
said handle and said handle hooks
respectively are molded to each other and hooked onto said top panel, said top, said bottom, said left, said right, said front, and said rear panels,
respectively are hooked together,
said panel-locking hooks
respectively are hooked onto said top, said front, and said rear panels,
said panel-coupling hooks
respectively are clamped onto said top, said bottom, said left, said right, said front, and said rear panels,
said panel-folding clamp
is foldably hinged to said bottom panel,
said tray-and-bed-locking clamp
is foldably hinged to said bottom panel,
said urine-waste-water-storing tray
is disposed on said bottom panel,
said at least one pet doors
respectively are hinged onto said left and said front panels,
said at least one door openings
respectively are formed within said left and said front panels,
said at least one push-rod hinges
respectively are welded to said at least one pet doors,
said at least one push-rod levers
respectively are welded to said at least one push-rod hinges,
said at least one push-rods
respectively and rotatably are attached to said at least one push-rod hinges,
said at least one push-rod-locking rings
respectively are welded to said at least one pet doors,
said interchangeable side frame supports
respectively and detachably are inserted into or slid onto said interchangeable t-shaped straight frame connectors or said interchangeable t-shaped corner frame connectors
for providing a structure on which to mount and suspend said interchangeable canopy-patio-balcony-awning-perch-tent-bed, for collapsing quickly for easy storage,
to provide easy portability,
for providing a mounting structure for said interchangeable T-shaped straight frame connectors and said interchangeable T-shaped corner frame connectors,
to respectively be disposed in various configurations, for providing a structure on which to mount said interchangeable canopy-patio-balcony-awning-perch-tent-bed,
to respectively be disposed in various configurations, and for providing multiple configuration options when combined with said interchangeable end frame supports, said interchangeable T-shaped straight frame connectors, said interchangeable T-shaped corner frame connectors, said interchangeable adjustable leg supports, and said interchangeable adjustable center-brace leg support mounting on said top panel or said bottom panel,
to function as pet canopy,
to function as pet patio,
to function as pet balcony,
to function as pet hammock,
to function as pet bed,
to function as perch,
to function as awning,
to function as tent with storage,
to function as chair,
to function as crate stand,
to function as sled,
to function as roof with storage,
to function as grooming platform,
to function as multi-pet grooming table, to function as drying platform,
to function as wind, sun, and weather block,
to function as privacy screen, and
to function as independent pet bed,
said interchangeable end frame supports
respectively and detachably are inserted into or slid onto said interchangeable t-shaped straight frame connectors or said interchangeable t-shaped corner frame connectors
for providing a structure on which to mount and suspend said interchangeable canopy-patio-balcony-awning-perch-tent-bed,
for collapsing quickly for easy storage,
to provide easy portability,
for providing a mounting structure for said interchangeable T-shaped straight frame connectors and said interchangeable T-shaped corner frame connectors,
to respectively be disposed in various configurations,
for providing a structure on which to mount said interchangeable canopy-patio-balcony-awning-perch-tent-bed,
to respectively be disposed in various configurations, and for providing multiple configuration options when combined with said interchangeable side frame supports, said interchangeable T-shaped straight frame connectors, said interchangeable T-shaped corner frame connectors, said interchangeable adjustable leg supports, and said interchangeable adjustable center-brace leg support mounting on said top panel or said bottom panel,
to function as pet canopy,
to function as pet patio,
to function as pet balcony,
to function as pet hammock,
to function as pet bed,
to function as perch,
to function as awning,
to function as tent with storage,
to function as chair,
to function as crate stand,
to function as sled,
to function as roof with storage,
to function as grooming platform,
to function as multi-pet grooming table,
to function as drying platform,
to function as wind, sun, and weather block,
to function as privacy screen, and
to function as independent pet bed,
said interchangeable canopy-patio-balcony-perch-tent-bed
is weaved or sewn to said left, said right, said front, and said rear bed sleeves
for providing multiple mounting positions,
to be oriented longitudinally, laterally, or obliquely,
for functioning as pet balcony and patio,
to provide multiple pet balcony mounting positions on which to allow pets to sit, stand, play, rest, and sleep thereon,
for functioning as pet hammock and bed,
to be slung front-to-back or right-to-left, to allow pets to rest inside,
for functioning as multiple position pet bed,
to allow pets to rest inside or outside said twelve-device-in-one interchangeable-bed pet crate,
for functioning as multiple position grooming platform,
to provide platform for pet to stand, sit, or lay for grooming,
for functioning as multiple position drying platform,
to provide clean, comfortable, waterproof platform on which to dry pet following a washing,
for functioning as multiple-position wind, sun, and weather block, to provide vertical side-shield from sun and other weather elements,
for functioning as privacy screen,
to provide vertical side-shield for privacy from other pets, noise, and distractions,
for functioning as chair,
to provide place to rest,
for functioning as awning,
to provide shade to pets,
for functioning as perch,
to provide multiple resting locations for pets,
for functioning as tent,
to provide shade to pets, and
for functioning as multi-pet grooming table,
to groom multiple pets simultaneously,
said waterproof toilets
respectively are cut out of said interchangeable canopy-patio-balcony-awning-perch-tent-bed
for providing openings,
to conveniently sweep hair, dirt, food crumbs, and feces therein, and
for providing air-flow openings,
to allow greater air circulation, reducing stagnation and odor,
said left, said right, said front, and said rear bed sleeves
respectively are slid or Velcroed hooked onto said interchangeable side frame supports and said interchangeable end frame supports,
said bed hook-and-loop-fastener strips
respectively are sewn or glued onto said interchangeable canopy-patio-balcony-awning-perch-tent-bed or said left, said right, said front, and said rear bed sleeves,
said interchangeable t-shaped straight frame connectors
respectively and detachably are inserted into or slid onto said interchangeable side frame supports, said interchangeable end frame supports, said interchangeable adjustable leg supports, or said interchangeable adjustable center-brace leg support,
said interchangeable t-shaped corner frame connectors
respectively and detachably are inserted into or slid onto said interchangeable side frame supports, said interchangeable end frame supports, said interchangeable adjustable leg supports, or said interchangeable adjustable center-brace leg support,
said interchangeable adjustable leg supports
respectively and detachably are inserted into or slid onto said interchangeable t-shaped straight frame connectors or said interchangeable t-shaped corner frame connectors,
said interchangeable adjustable center-brace leg support
respectively and detachably are inserted into or slid onto said interchangeable t-shaped straight frame connectors or said interchangeable t-shaped corner frame connectors, said spring-pin holes
respectively are drilled into said interchangeable t-shaped corner frame connectors and said interchangeable adjustable leg supports,
said spring-pins
respectively are springably inserted inside said interchangeable t-shaped corner frame connectors with said cup-like connector ends poking through said spring-pin holes,
said wire-clamping cap
is snapped into said interchangeable adjustable leg supports and said interchangeable adjustable center-brace leg support
for plugging said interchangeable adjustable leg supports, and
for clamping on said top panel to allow said interchangeable canopy-patio-balcony-awning-perch-tent-bed
to function as pet canopy, pet patio, pet balcony, windscreen, chair,
awning, perch, pet tent, sled, basket, pet hammock, or pet bed, said water-draining hole
is molded in said wire-clamping cap.

20. The twelve-device-in-one interchangeable-bed pet crate of claim 19, wherein
said interchangeable canopy-patio-balcony-awning-perch-tent-bed has an octagonal shape.

\* \* \* \* \*